US012625745B2

(12) United States Patent (10) Patent No.: US 12,625,745 B2
Kibardin et al. (45) Date of Patent: May 12, 2026

(54) OPTIMIZED PLACEMENT FOR EFFICIENCY FOR ACCELERATED DEEP LEARNING

(71) Applicant: Cerebras Systems Inc., Sunnyvale, CA (US)

(72) Inventors: Vladimir Kibardin, Palo Alto, CA (US); Michael Edwin James, San Carlos, CA (US); Michael Morrison, Sunnyvale, CA (US); Sean Lie, Los Altos, CA (US); Gary R. Lauterbach, Los Altos, CA (US); Stanislav Funiak, St Lucia (AU)

(73) Assignee: Cerebras Systems Inc., Sunnyvale, CA (US)

( * ) Notice: Subject to any disclaimer, the term of this patent is extended or adjusted under 35 U.S.C. 154(b) by 1046 days.

(21) Appl. No.: 17/771,606

(22) PCT Filed: Oct. 30, 2020

(86) PCT No.: PCT/IB2020/060231
§ 371 (c)(1),
(2) Date: Apr. 25, 2022

(87) PCT Pub. No.: WO2021/084505

PCT Pub. Date: May 6, 2021

(65) Prior Publication Data

US 2023/0125522 A1 Apr. 27, 2023

Related U.S. Application Data

(60) Provisional application No. 62/929,055, filed on Oct. 31, 2019, provisional application No. 62/928,198, filed on Oct. 30, 2019.

(51) Int. Cl.
*G06F 9/54* (2006.01)
*G06F 9/50* (2006.01)
(Continued)

(52) U.S. Cl.
CPC .............. *G06F 9/54* (2013.01); *G06F 9/5027* (2013.01); *G06F 18/214* (2023.01); *G06N 3/04* (2013.01); *G06N 3/063* (2013.01)

(58) Field of Classification Search
USPC ......................................................... 716/100
See application file for complete search history.

(56) References Cited

U.S. PATENT DOCUMENTS 7,986,629 B1 7/2011 Ferguson et al.
11,256,985 B2 2/2022 Regev
(Continued)

FOREIGN PATENT DOCUMENTS

WO 2012/044432 A1 4/2012
WO 2021/074795 A1 4/2021
(Continued)

OTHER PUBLICATIONS

International Search Report in PCT/IB2020/060231 (the international stage of the instant case), Feb. 22, 2021, 4 pages.
(Continued)

*Primary Examiner* — Bryce M Aisaka
(74) *Attorney, Agent, or Firm* — HG LAW LLP

(57) ABSTRACT

Techniques in optimized placement for efficiency for accelerated deep learning provide improvements in one or more of accuracy, performance, and energy efficiency. An array of processing elements comprising a portion of a neural network accelerator performs flow-based computations on wavelets of data. Each processing element comprises a compute element to execute programmed instructions using the data and a router to route the wavelets. The routing is in accordance with virtual channel specifiers of the wavelets and controlled by routing configuration information of the router. A software stack determines optimized placement based on a description of a neural network. The determined (Continued)

placement is used to configure the routers including usage of the respective colors. The determined placement is used to configure the compute elements including the respective programmed instructions each is configured to execute.

12 Claims, 44 Drawing Sheets

(51) Int. Cl.
  *G06F 18/214*  (2023.01)
  *G06N 3/04*  (2023.01)
  *G06N 3/063*  (2023.01)

(56)       References Cited

U.S. PATENT DOCUMENTS

| | | | |
|---|---|---|---|
| 11,580,376 | B2 | 2/2023 | Hwang et al. |
| 11,934,945 | B2 | 3/2024 | Lie et al. |
| 2005/0131660 | A1 | 6/2005 | Yadegar et al. |
| 2005/0220094 | A1 | 10/2005 | Parker et al. |
| 2015/0302295 | A1 | 10/2015 | Rivera et al. |
| 2015/0304797 | A1 | 10/2015 | Rhoads et al. |
| 2015/0324684 | A1 | 11/2015 | Alvarez-Icaza Rivera et al. |
| 2017/0295061 | A1 | 10/2017 | Wittenschlaeger |
| 2018/0189642 | A1 | 7/2018 | Boesch et al. |
| 2018/0314941 | A1* | 11/2018 | Lie ........................... G06N 3/04 |
| 2019/0102338 | A1 | 4/2019 | Tang et al. |
| 2019/0258919 | A1 | 8/2019 | Lie et al. |
| 2023/0071424 | A1 | 3/2023 | Kibardin et al. |

FOREIGN PATENT DOCUMENTS

| | | | |
|---|---|---|---|
| WO | 2021/074865 | A1 | 4/2021 |
| WO | 2021/074867 | A1 | 4/2021 |
| WO | 2021/084485 | A1 | 5/2021 |
| WO | 2021/084506 | A1 | 5/2021 |
| WO | 2021084505 | A1 | 5/2021 |

OTHER PUBLICATIONS

Written Opinion of the International Searching Authority in PCT/IB2020/060231 (the international stage of the instant case), Feb. 22, 2021, 5 pages.
International Preliminary Report On Patentability (Chapter II) in PCT/IB2020/060231 (the International stage of the instant case), Jan. 27, 2022, 5 pages.
Mohammed Amine Meghabber et al., 'A Flexible Network on-Chip Router for Data-Flow Monitoring', The 5th International Conference on Electrical Engineering—Boumerdes (ICEE-B), Oct. 31, 2017, 6 pages.
Cotter F. et al., Deep Learning In The Wavelet Domain, arXiv:1811.06115v1 [cs.CV]. pp. 1-5. Nov. 14, 2018.
International Preliminary Report On Patentability (Ch II) in PCT/IB2020/060188, Jan. 26, 2022, 5 pages.
International Search Report in the related case PCT/IB2020/060188, Feb. 22, 2021, 4 pages.
Narayanamurthy N et al: "Evolving Bio Plausible Design with Heterogeneous Noc", The 15th International Conference on Advanced Communications Technology-ICACT2013, Jan. 27, 2013, (pp. 451-456), 6 pages.
Shawahna A. et al., 'FPGA-Based Accelerators of Deep Learning Networks for Learning and Classification: A Review', IEEE Access, vol. 7, Dec. 28, 2018, pp. 7825-7828.
Written Opinion of the International Searching Authority in PCT/IB2020/060188 (the international stage of the instant case), Feb. 22, 2021, 4 pages.
Xinyu You et al., "Toward Packet Routing with Fully-distributed Multi-agent Deep Reinforcement Learning", arXiv:1905.03494v1, May 9, 2019 [retrieved on Jan. 27, 2021]. Retrieved from <https://arxiv.org/pdf/1905.03494v1.pdf>, 12 pages.
Yiping Dong et al: "Network on Chip Architecture for BP neural network", Communications, Circuits and Systems, 2008. ICCCAS 2008. International Conference On, IEEE, Piscataway, NJ, USA, May 25, 2008 (May 25, 2008), pp. 964-968, XP031353080, 5 pages.

* cited by examiner

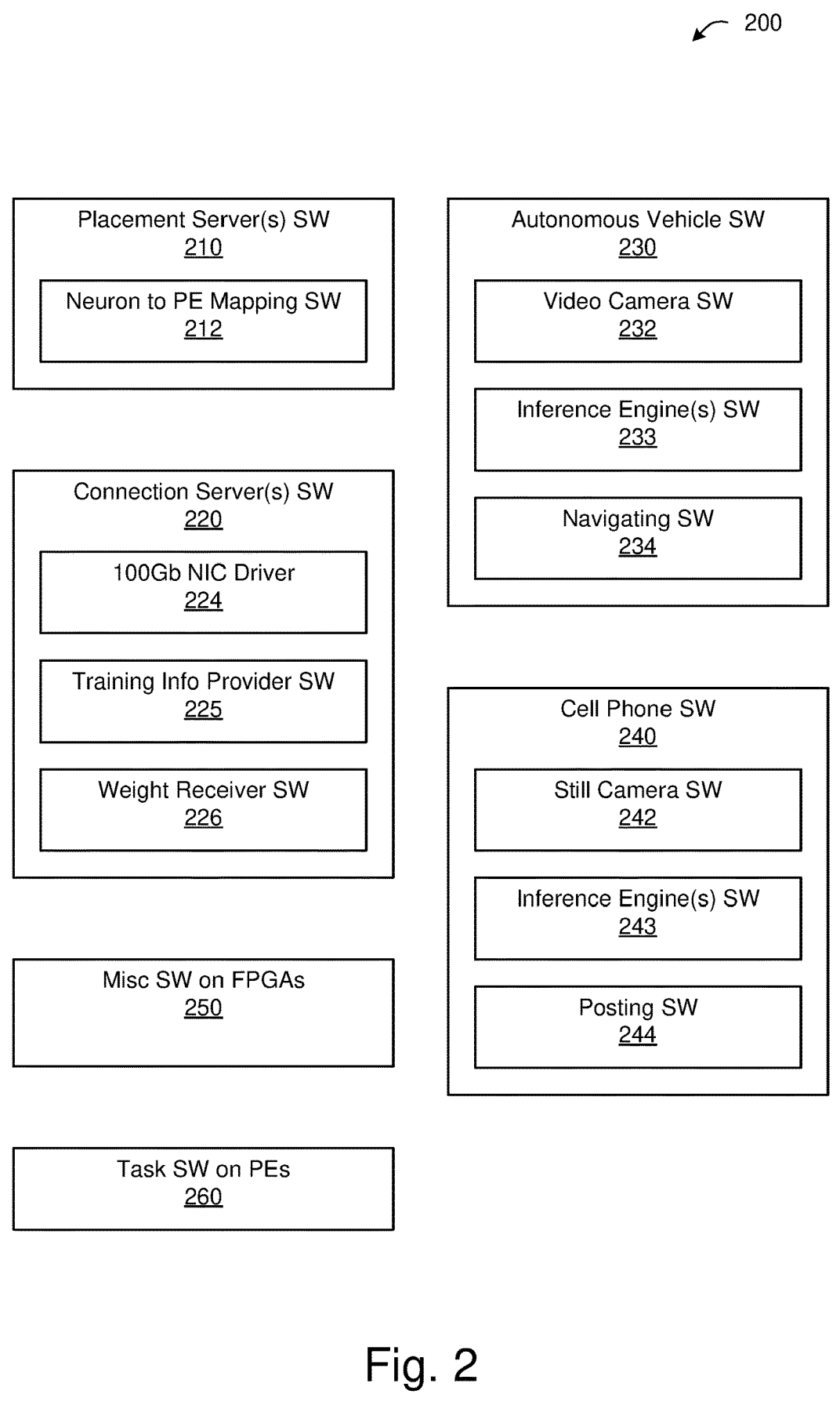

200

Placement Server(s) SW
210

> Neuron to PE Mapping SW
> 212

Connection Server(s) SW
220

> 100Gb NIC Driver
> 224

> Training Info Provider SW
> 225

> Weight Receiver SW
> 226

Misc SW on FPGAs
250

Task SW on PEs
260

Autonomous Vehicle SW
230

> Video Camera SW
> 232

> Inference Engine(s) SW
> 233

> Navigating SW
> 234

Cell Phone SW
240

> Still Camera SW
> 242

> Inference Engine(s) SW
> 243

> Posting SW
> 244

Fig. 2

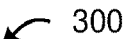
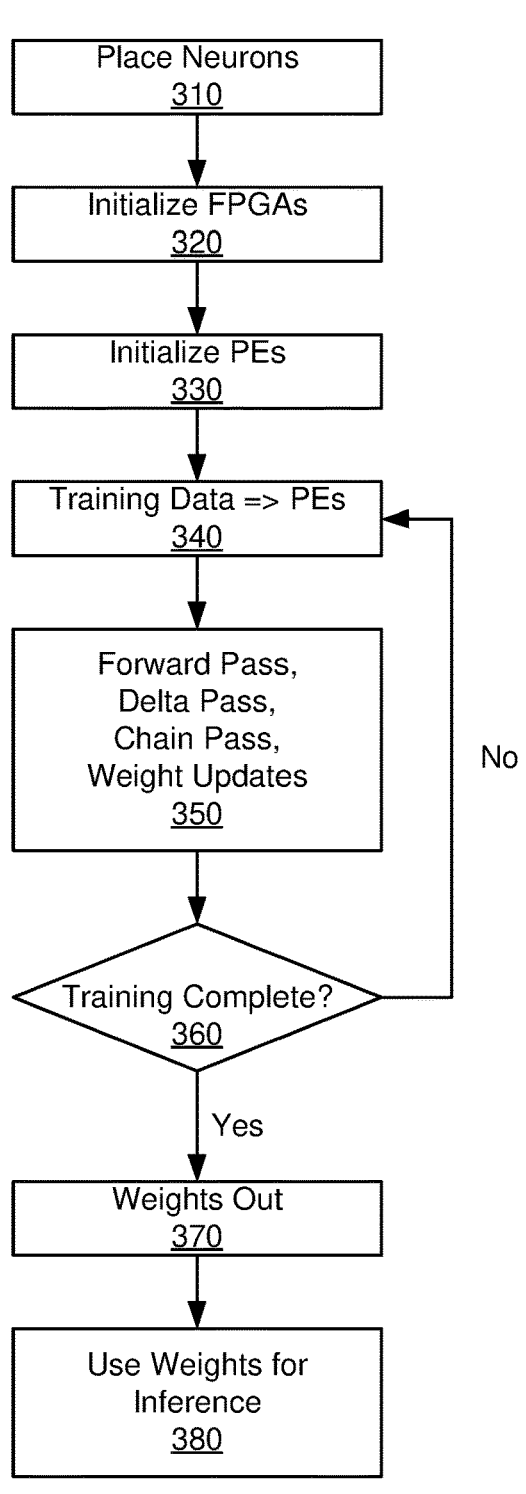
Fig. 3

DLA, 400C

Substrate, 414

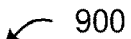
900

```
        ┌──────────────┐
        │    Start     │
        │     901      │
        └──────┬───────┘
               │
               ▼
     ┌──────────────────┐
     │ Select Ready Wavelet │
     │  for Task Initiation │
     │       902        │
     └────────┬─────────┘
              │
              ▼
         ◇ Control/Data? ◇ ──Control──▶ ┌────────────────────┐
         ◇     903     ◇                │ Add Lower Index Bits to │
              │                         │ Base Register to Form   │
             Data                       │ Instruction Address     │
              │                         │        910              │
              ▼                         └──────────┬─────────────┘
     ┌──────────────────┐                          │
     │ Add (Color * 4) to Base │                   │
     │  Register to Form       │                   │
     │  Instruction Address    │                   │
     │        904              │                   │
     └────────┬────────────────┘                   │
              │                                     │
              ▼                                     │
     ┌──────────────────┐                          │
     │ Fetch Instructions From │ ◀────────────────┘
     │ Memory at Instruction   │
     │      Address            │
     │        905              │
     └────────┬────────────────┘
              │
              ▼
     ┌──────────────────┐
     │ Execute Fetched         │
     │  Instruction(s)         │
     │        906              │
     └────────┬────────────────┘
```

Not Terminate, 908

Terminate, 909

```
        ┌──────────────┐
        │     End      │
        │     919      │
        └──────────────┘
```

Fig. 9A

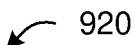
920
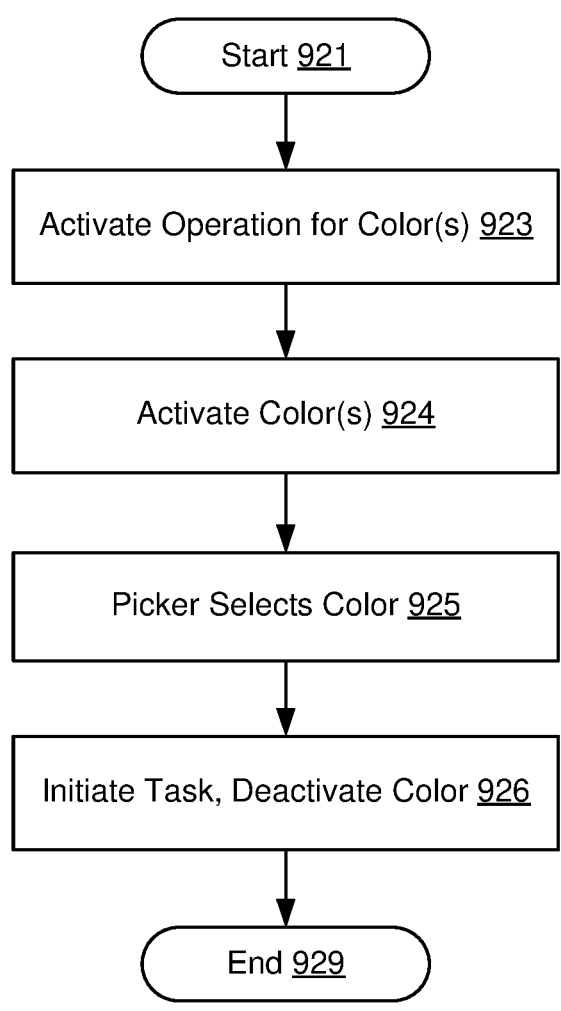
Fig. 9B

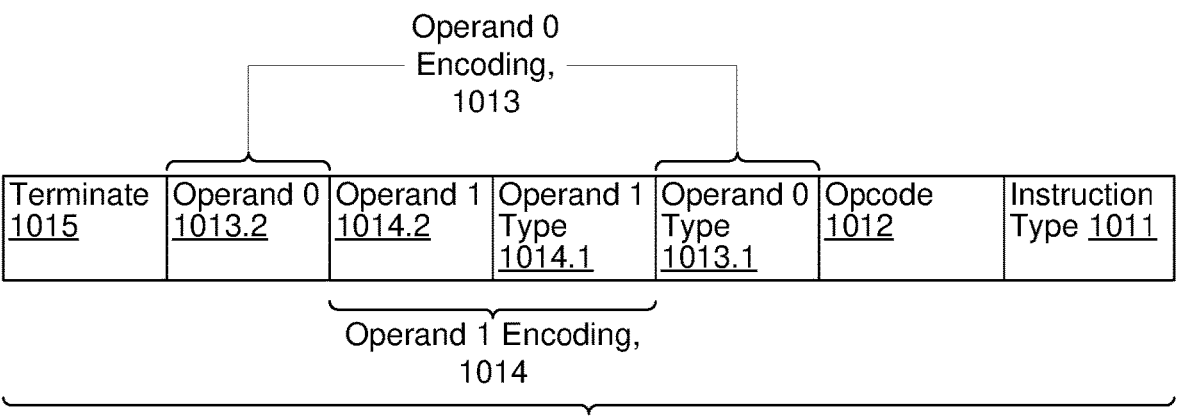

Operand 0
Encoding,
1013

| Terminate 1015 | Operand 0 1013.2 | Operand 1 1014.2 | Operand 1 Type 1014.1 | Operand 0 Type 1013.1 | Opcode 1012 | Instruction Type 1011 |

Operand 1 Encoding,
1014

Multiple Operand Instruction 1010

Fig. 10

| Terminate 1025 | Immediate High 1024 | Operand 1 1023.2 | Operand 1 Type 1023.1 | Opcode 1022 | Instruction Type 1021 |

One Source, No Destination Operand Instruction, 1010

Fig. 11

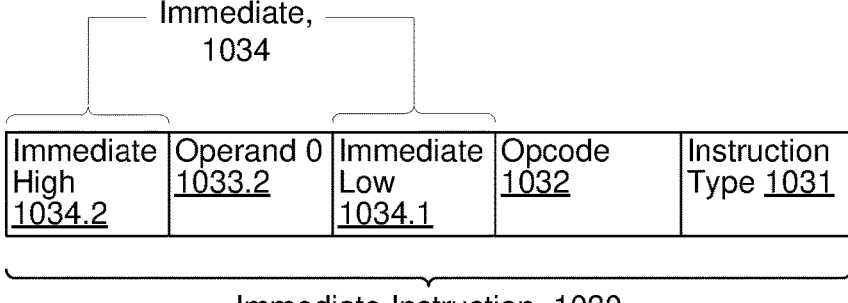

Immediate,
1034

| Immediate High 1034.2 | Operand 0 1033.2 | Immediate Low 1034.1 | Opcode 1032 | Instruction Type 1031 |

Immediate Instruction, 1030

Fig. 12

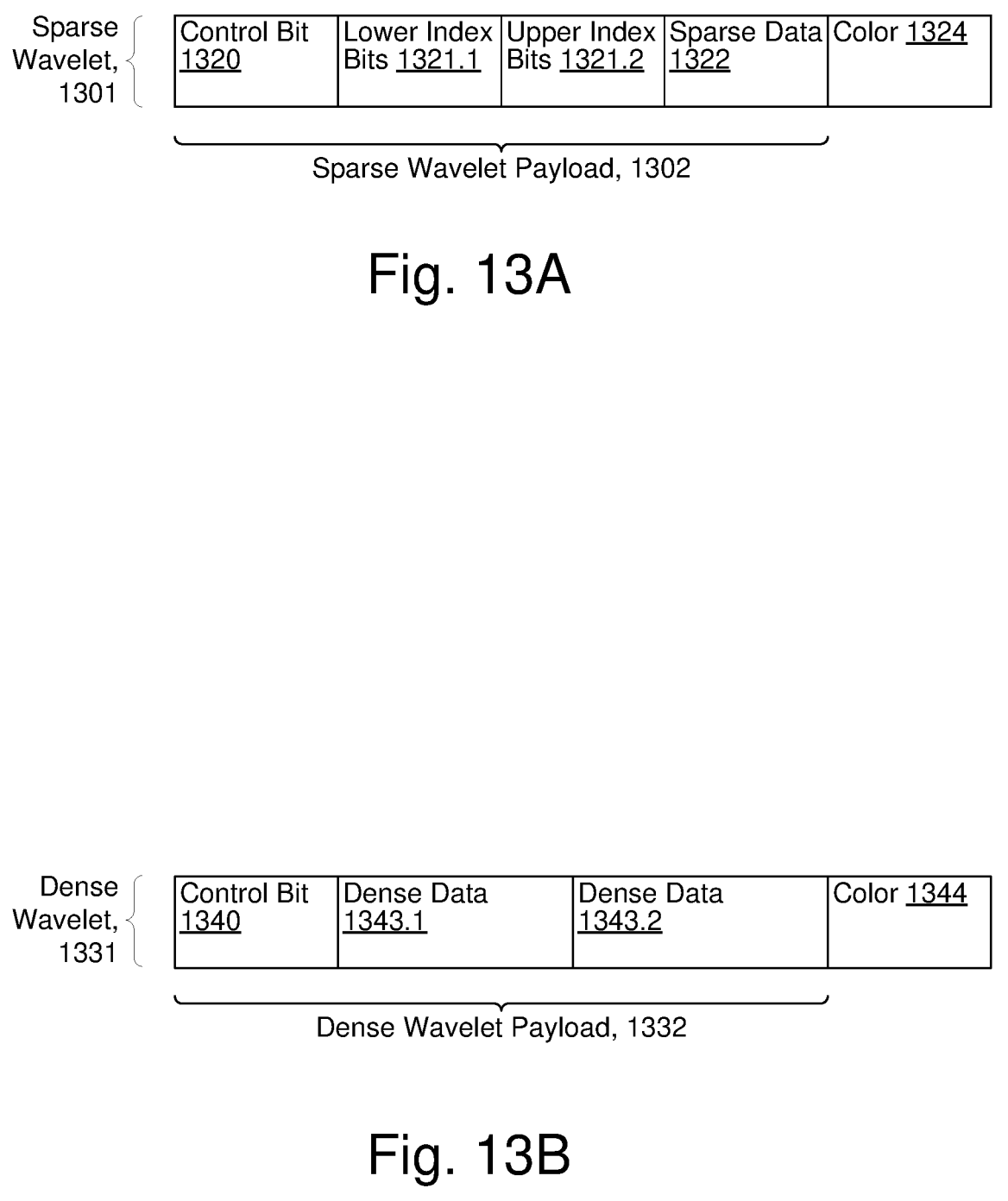

Sparse Wavelet, 1301

| Control Bit 1320 | Lower Index Bits 1321.1 | Upper Index Bits 1321.2 | Sparse Data 1322 | Color 1324 |
|---|---|---|---|---|

Sparse Wavelet Payload, 1302

Fig. 13A

Dense Wavelet, 1331

| Control Bit 1340 | Dense Data 1343.1 | Dense Data 1343.2 | Color 1344 |
|---|---|---|---|

Dense Wavelet Payload, 1332

Fig. 13B

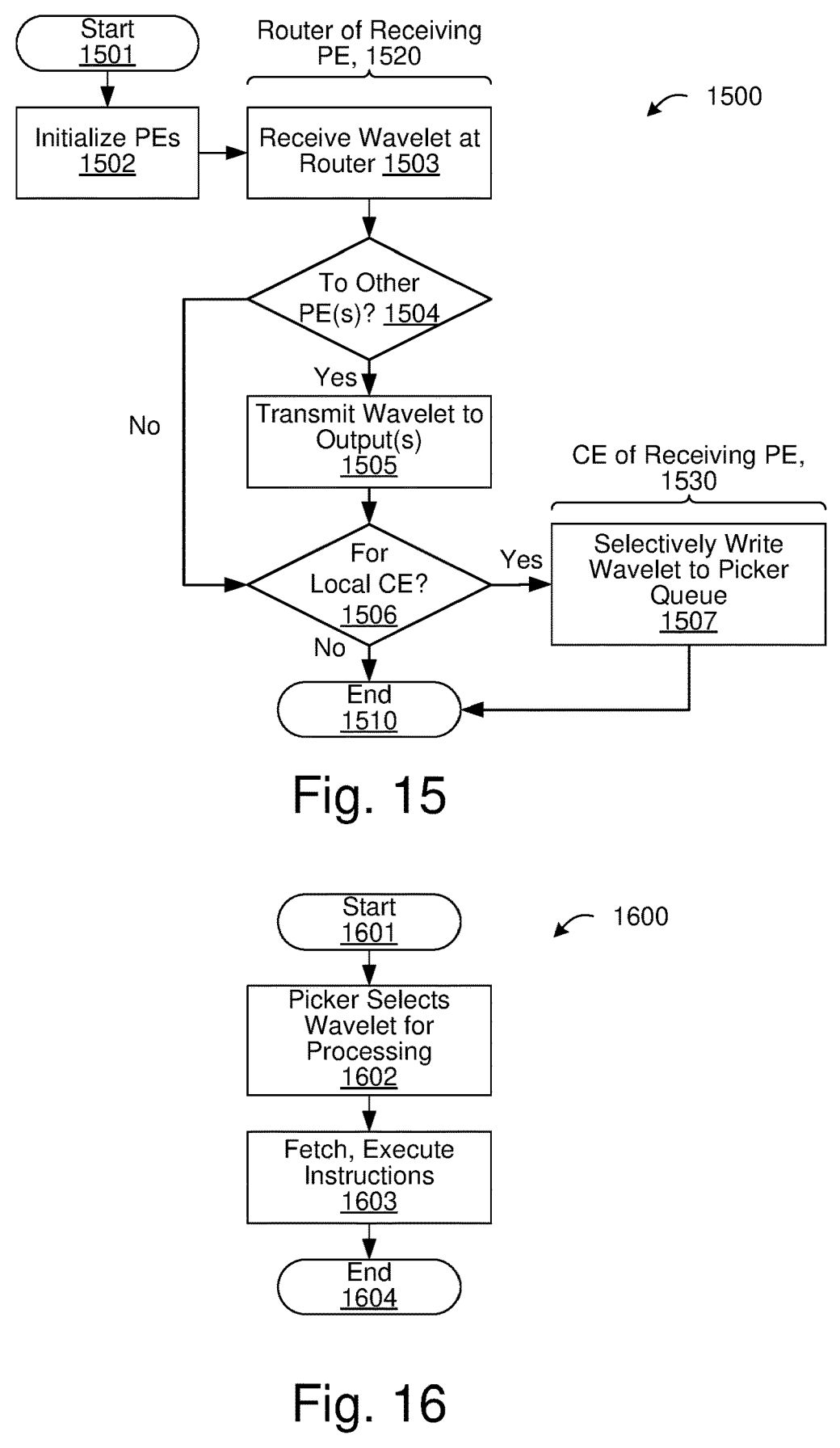

Start
1501

Router of Receiving
PE, 1520

1500

Initialize PEs
1502

Receive Wavelet at
Router 1503

To Other
PE(s)? 1504

Yes

Transmit Wavelet to
Output(s)
1505

CE of Receiving PE,
1530

No

For
Local CE?
1506

Yes

Selectively Write
Wavelet to Picker
Queue
1507

No

End
1510

Fig. 15

Start
1601

1600

Picker Selects
Wavelet for
Processing
1602

Fetch, Execute
Instructions
1603

End
1604

NNPU
Systems

Model Training, 1710

1800

Load Neural Model, 2001 ⟶ DLA 120

Read/Write Parameters, 2002 ⟶

Stream Training Data, 2003 ⟶

Script Control Loop, 2004 ⟶

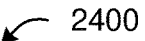
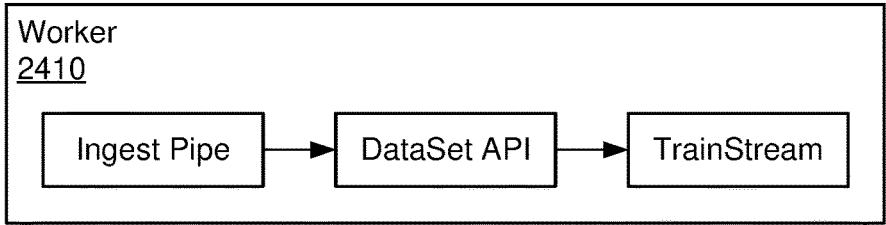
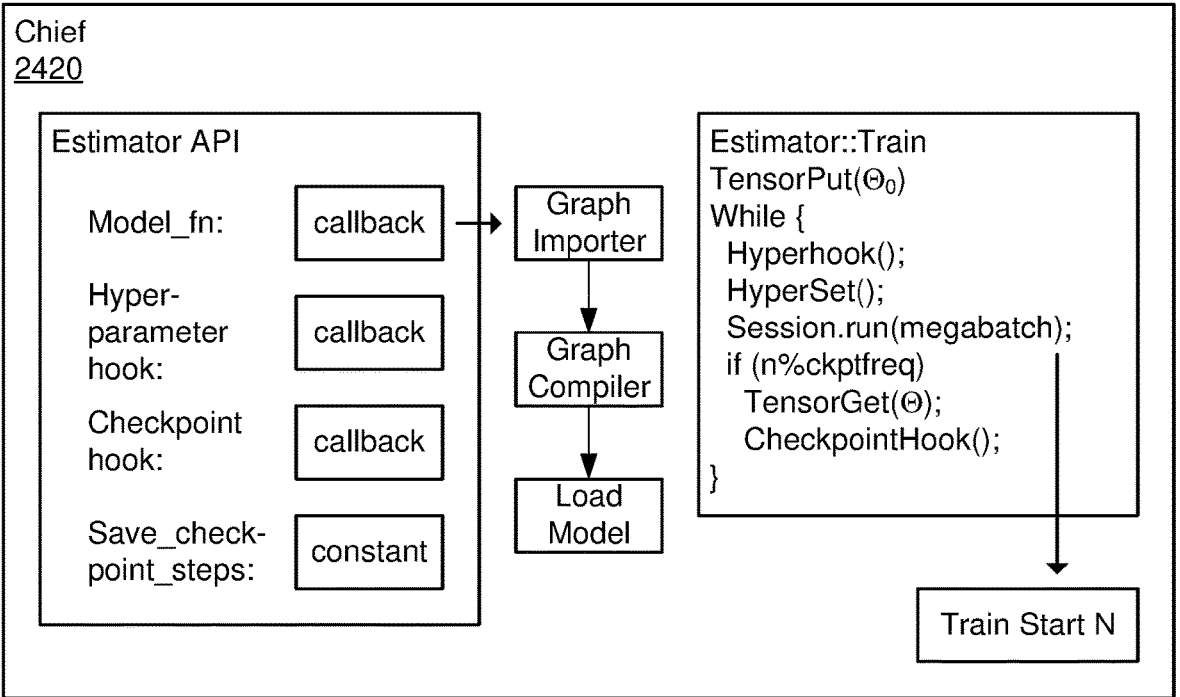
Fig. 24

Algorithm: Image Convolution

```
for (h=0; h<H; ++h)
  for (w=0; w<W; ++w)
    for (s=0; s<S; ++s)
      for (r=0; r<R; ++r)
        for (c=0; c<C; ++c)
          for (k=0; k<K; ++k)
            c[h][w][k] +=
            a[s][r][c][k]*b[h-s][w-r][c]
```

2801

| $A_0$ | $A_1$ | $A_2$ | $A_3$ | $B_0$ | $B_1$ | $B_2$ | $C_0$ | $C_1$ | $C_2$ | + | * |
|---|---|---|---|---|---|---|---|---|---|---|---|
|  |  |  |  | 1 |  |  | 1 |  |  | h | H |
|  |  |  |  |  | 1 |  |  | 1 |  | w | W |
| 1 |  |  |  | -1 |  |  |  |  |  | s | S |
|  | 1 |  |  |  | -1 |  |  |  |  | r | R |
|  |  | 1 |  |  |  | 1 |  |  |  | c | C |
|  |  |  | 1 |  |  |  |  |  | 1 | k | K |

2802

2900 x, 2905    phi1, 2901    z2, 2903    sigma2, 2904    phi'1, 2902    sub, 2907    y, 2906

3100

$$\Theta = \langle \theta_0, \theta_1 \rangle \in \mathbb{R}^{200 \times 784} \times \mathbb{R}^{10 \times 200}$$

$$\tilde{y}(x, \Theta) = \sigma(\theta_1 \phi(\theta_0 x))$$

$$\mathcal{L}(y, x, \Theta) = H(y, \tilde{y})$$

$$\Theta_{t+1} = \Theta_t - \eta \frac{\partial \mathcal{L}}{\partial \Theta}(x_t, y_t, \Theta_t)$$

3200

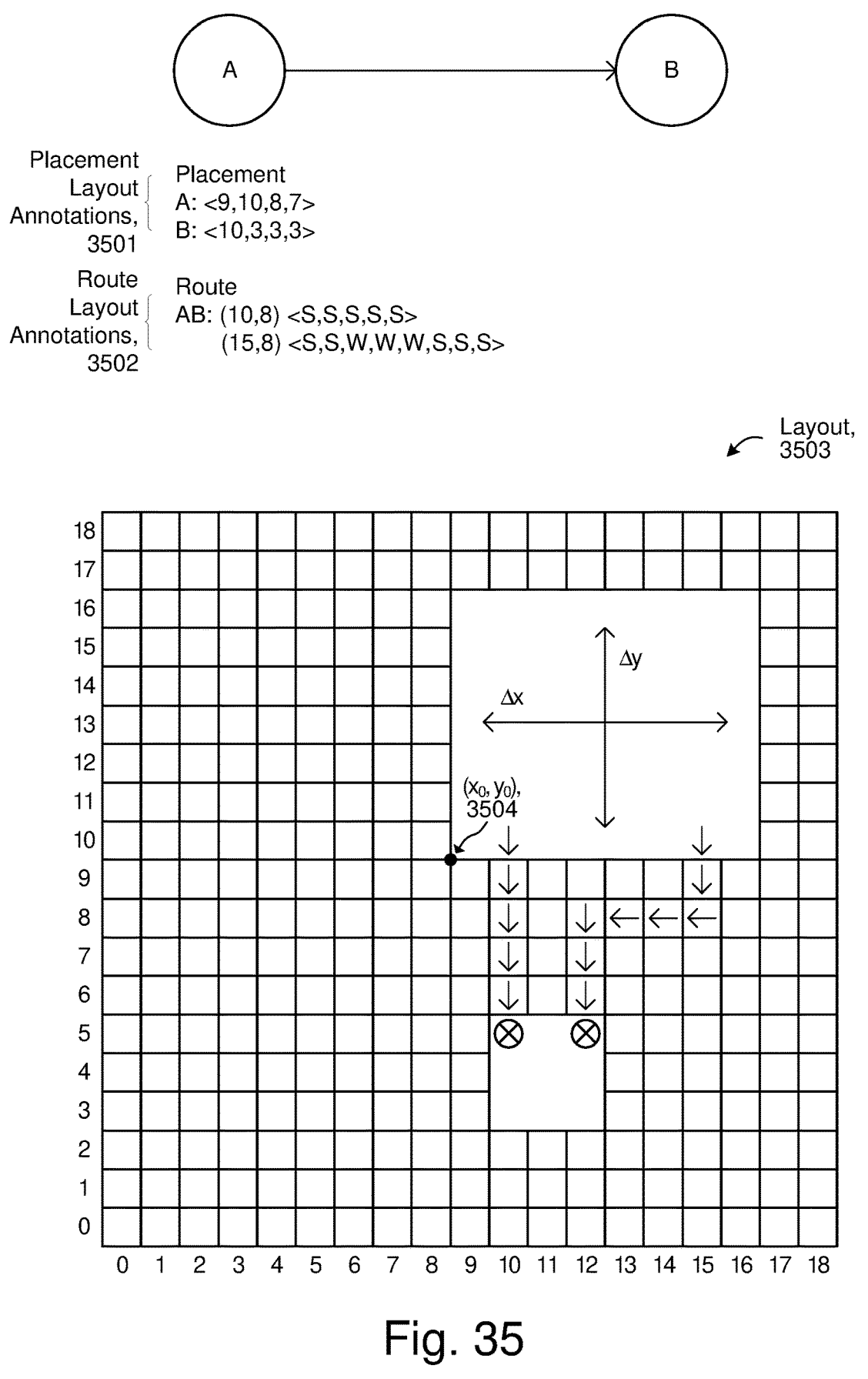

Placement
Layout
Annotations,
3501

Placement
A: <9,10,8,7>
B: <10,3,3,3>

Route
Layout
Annotations,
3502

Route
AB: (10,8) <S,S,S,S,S>
      (15,8) <S,S,W,W,W,S,S,S>

Layout,
3503

Fig. 35

Table, 3610
| | LAYER FLOPS | ESTIMATED UTILIZATION | RELATIVE AREA |
|---|---|---|---|
| A | 15 | 85% | 8% |
| B | 45 | 85% | 25% |
| C | 35 | 85% | 19% |
| D | 10 | 85% | 6% |
| E | 75 | 85% | 42% |
Tree, 3620
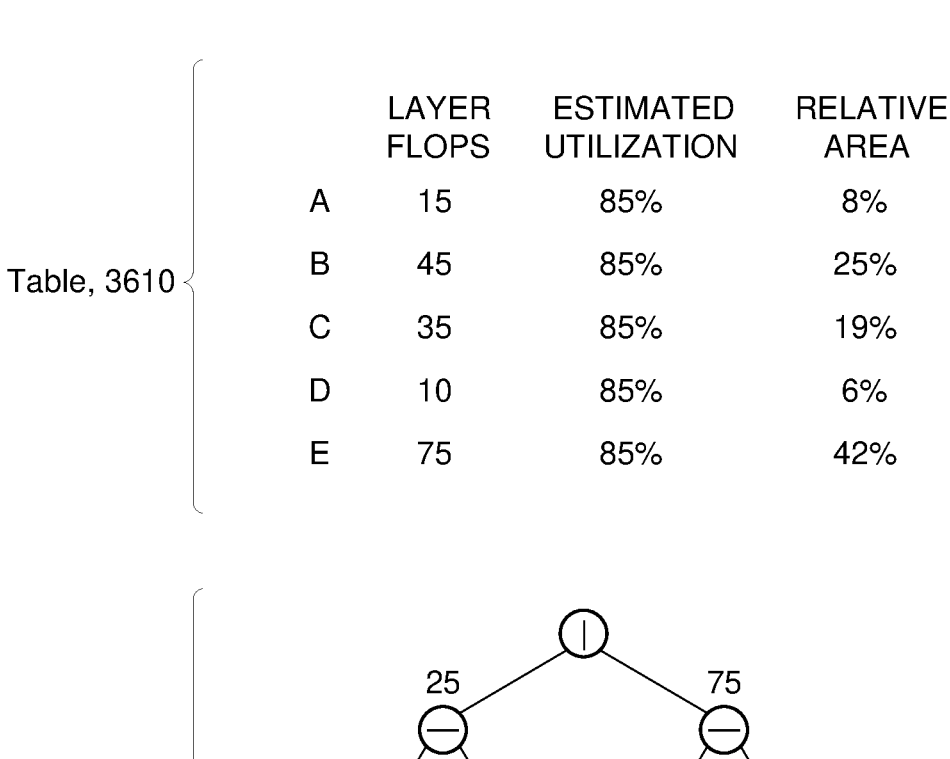
Placement, 3630
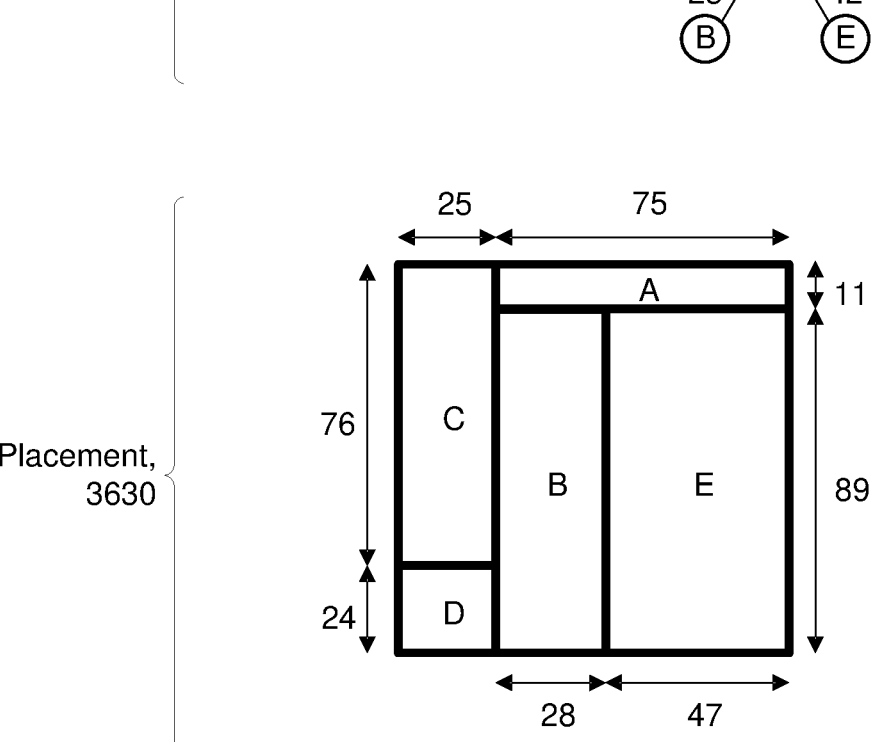
Fig. 36

Table, 3710
| | LAYER FLOPS | ESTIMATED UTILIZATION | RELATIVE AREA |
|---|---|---|---|
| A | 15 | 89% | 8% |
| B | 45 | 94% | 24% |
| C | 35 | 86% | 21% |
| D | 10 | 77% | 7% |
| E | 75 | 95% | 40% |
Tree, 3720
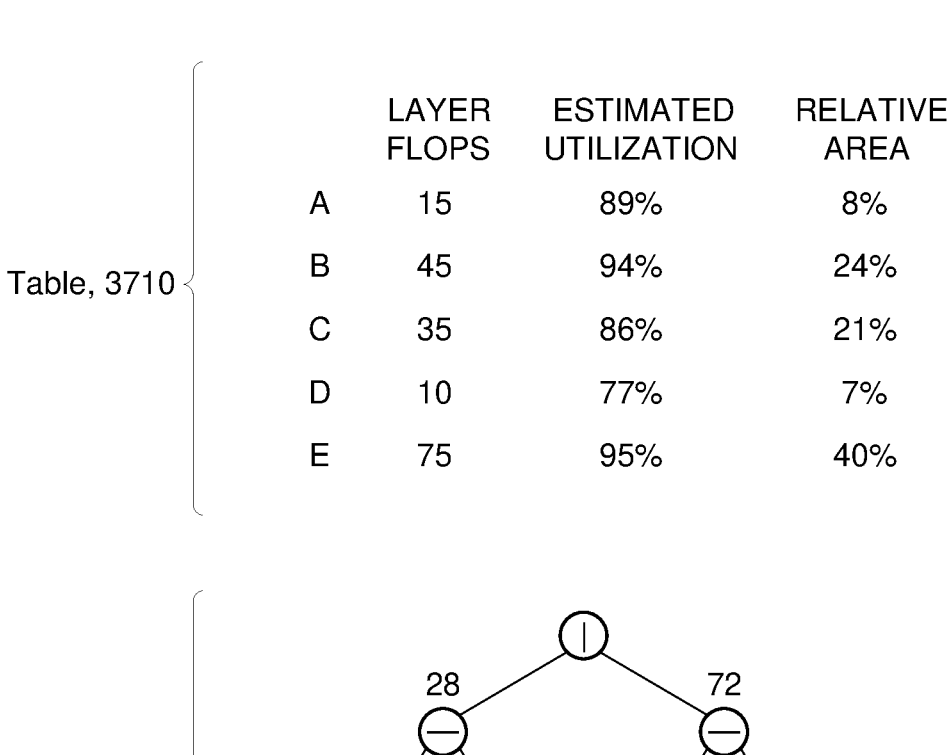
Placement, 3730
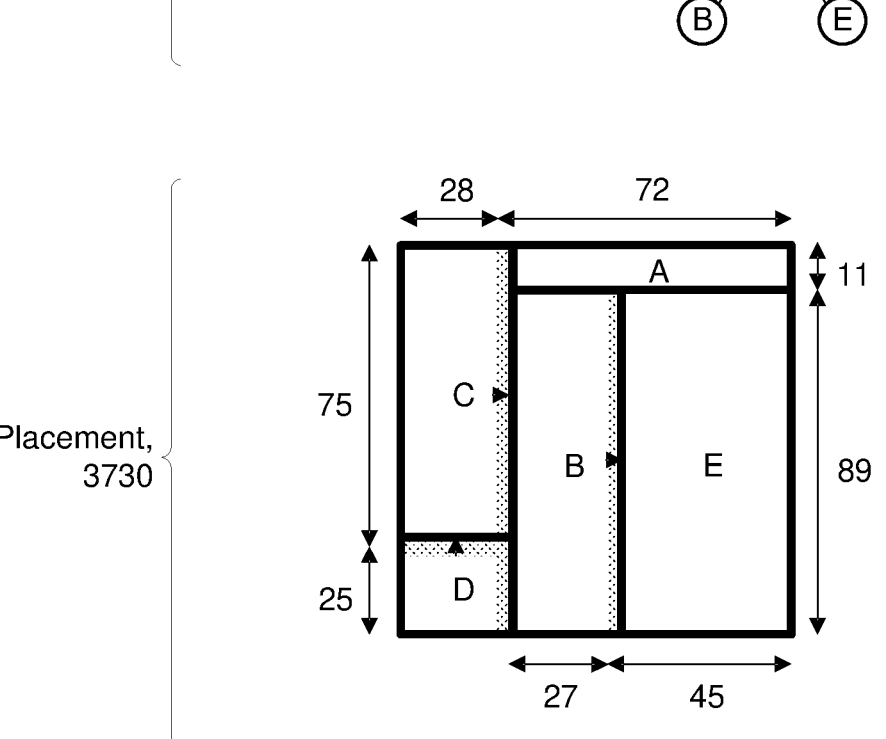
Fig. 37

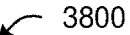
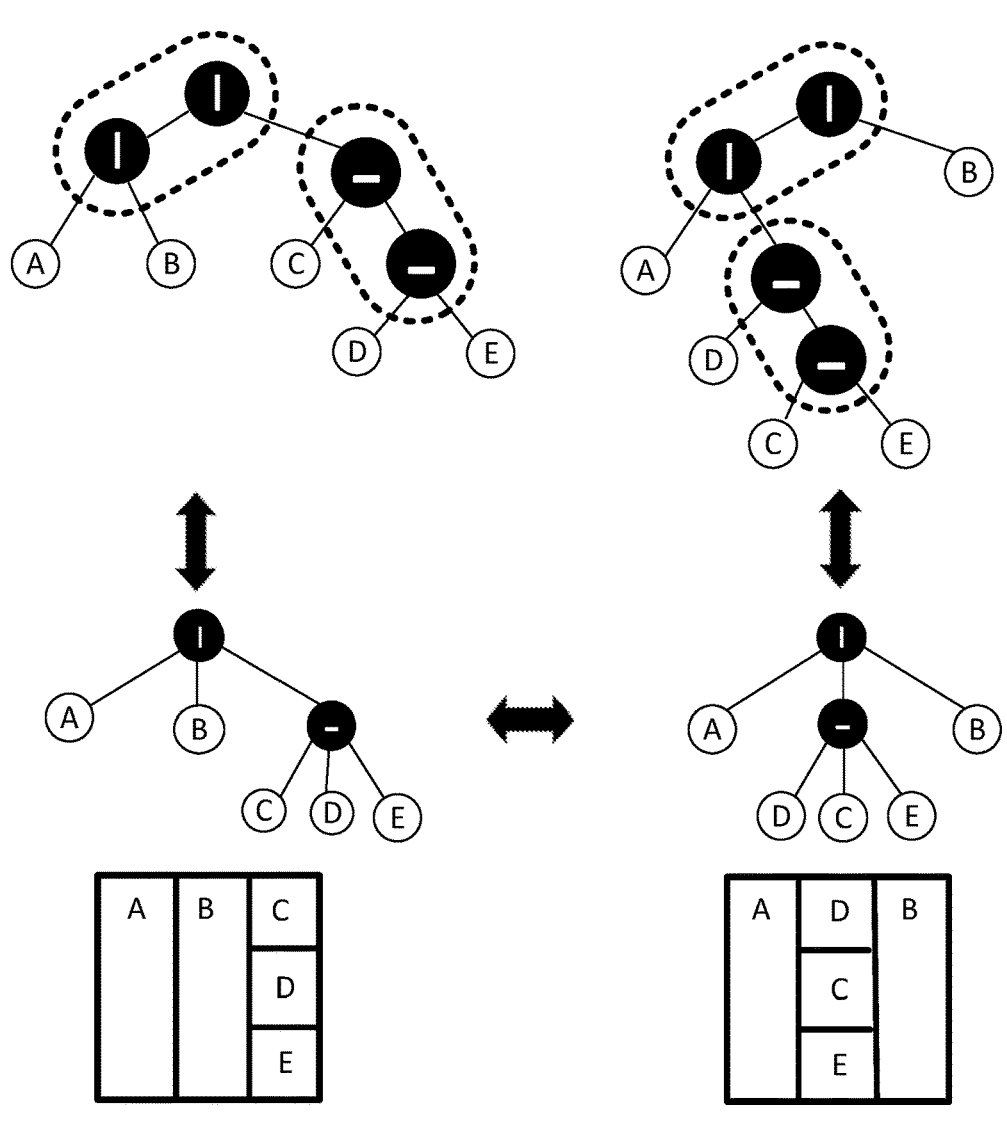
Fig. 38

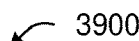
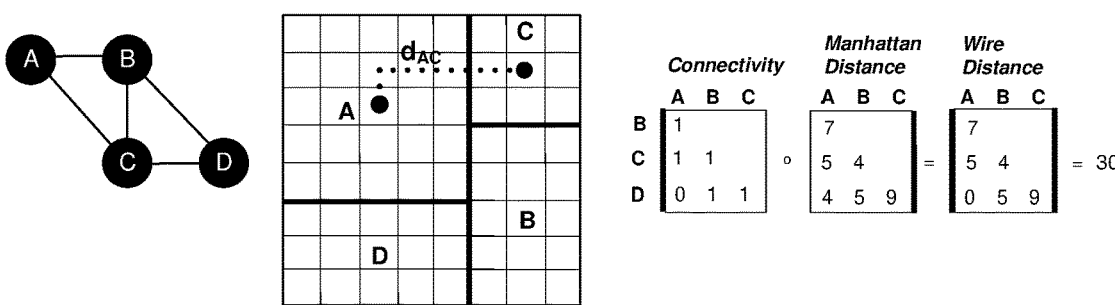
Fig. 39
Fig. 40

Distributed Buffer, 4310

→   Input Net (undelayed), 4301
→   Output Net (delayed tap), 4302
    Total buffer capacity = 300

Gap, 4410

Arbitrary Route, 4420

Input Net Available, 4510

Output Net
Available,
4520

Kernel 1
4601

Buf 1to2
4612

Kernel 2
4602

Buf 2to3
4623

Kernel 3
4603

Buf 3to6
4636

Buf 3to4
4634

Kernel 4
4604

Buf 4to6
4646

Buf 4to5
4645

Kernel 6
4606

Kernel 5
4605

Buf 6to7
4667

Buf 5to7
4657

Kernel 7
4607

| DAG₁ | G | Extract Cycles | DAG₂ | Linear Constraints Cost Function | LP |
|---|---|---|---|---|---|

DAG$_1$ 4681   G 4682   Extract Cycles 4683   DAG$_2$ 4684   Linear Constraints Cost Function 4685   LP 4686

Region 1
4671

Region 4
4674

Buf 3to4
4634

Region 2
4672

Region 3
4673

Buf 3to6
4636

Region 6
4676

Region 5
4675

Region 7
4677

Kernel
Placement
&
Buffer Sizing
4691

Hierarchical
Rectangular
Regions

4692

Find "Best"
Region

4693

Update
Regions

4694

Repeat Until
all Buffers Placed, 4695~

Region 1
4671

Region 4
4674

Bus 3,
4703

Region 6
4676

Region 2
4672

Region 3
4673

Region 5
4675

Bus 2,
4702

Bus 1,
4701

Region 7
4677

| Every Arc | | Route | | Collect Info | | Create Obstacles |
|-----------|--|-------|--|--------------|--|------------------|
| 4711 | | 4712 | | 4713 | | 4714 |

Repeat Until
all Arcs Routed, 4715

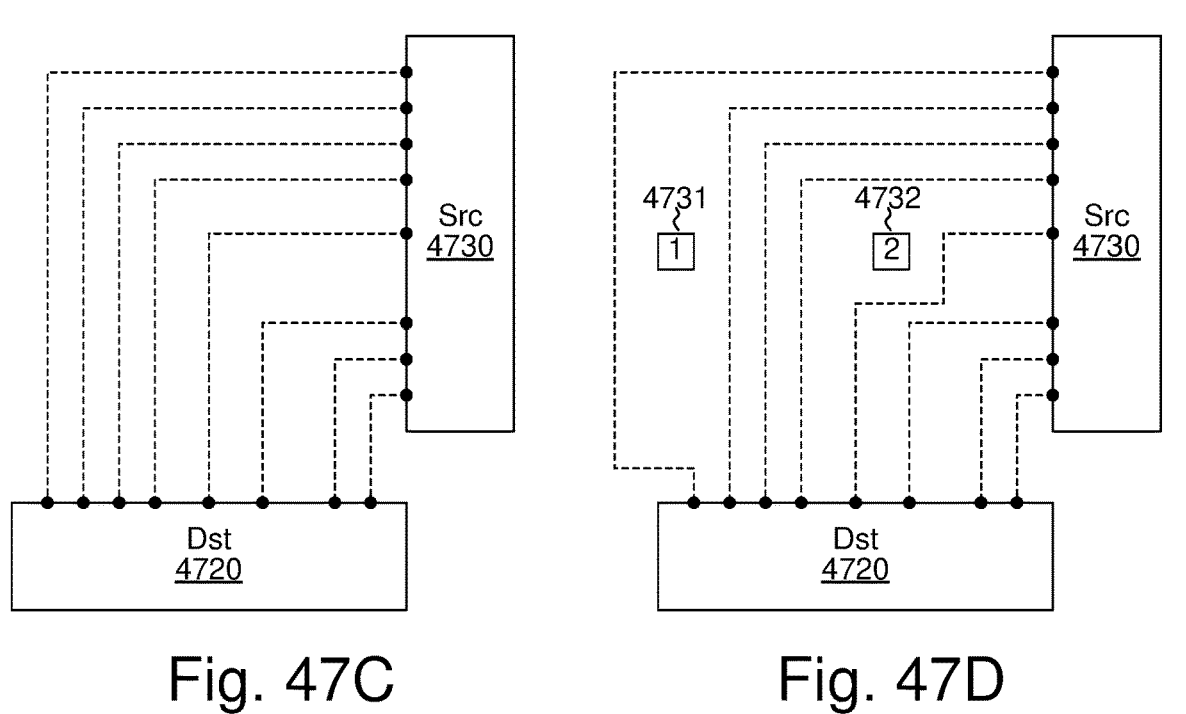
Fig. 47C                    Fig. 47D
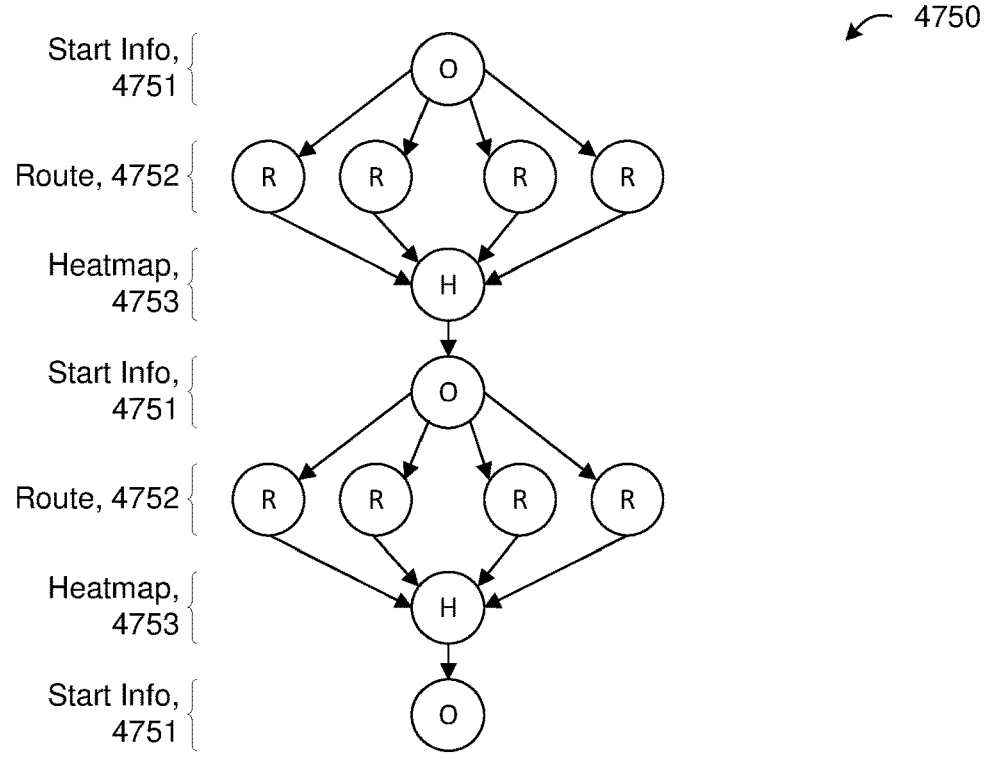
Fig. 47E

Region 1
4671

Region 4
4674

Color 2,
4762

Color 3,
4763

Region 6
4676

Region 2
4672

Region 3
4673

Region 5
4675

Color 1,
4761

Region 7
4677

OPTIMIZED PLACEMENT FOR EFFICIENCY FOR ACCELERATED DEEP LEARNING

CROSS REFERENCE TO RELATED APPLICATIONS

To the extent permitted by the type of the instant application, this application incorporates by reference for all purposes the following applications, all commonly owned with the instant application not later than the effective filing date of the instant application:

U.S. Provisional Application Ser. No. 62/928,198, filed 2019 Oct. 30, first named inventor Vladimir KIBARDIN, and entitled TENSOR FLOW ON A WAFER SCALE COMPUTE ENGINE; and U.S. Provisional Application Ser. No. 62/929,055, filed 2019 Oct. 31, first named inventor Vladimir KIBARDIN, and entitled TECHNIQUES FOR ACCELERATED DEEP LEARNING.

BACKGROUND

Field: Advancements in accelerated deep learning are needed to provide improvements in one or more of accuracy, performance, and energy efficiency.

Related Art: Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

BRIEF DESCRIPTION OF DRAWINGS

FIG. 2 illustrates selected details of an embodiment of software elements associated with neural network training and inference, using a deep learning accelerator.

FIG. 3 illustrates selected details of an embodiment of processing associated with training a neural network and performing inference using the trained neural network, using a deep learning accelerator.

FIG. 9A illustrates selected details of an embodiment of processing a wavelet for task initiation.

FIG. 9B illustrates selected details of an embodiment of task activating.

FIG. 10 illustrates selected details of an embodiment of a multiple operand instruction.

FIG. 11 illustrates selected details of an embodiment of a one source, no destination operand instruction.

FIG. 12 illustrates selected details of an embodiment of an immediate instruction.

FIG. 13A illustrates selected details of an embodiment of a sparse wavelet.

FIG. 13B illustrates selected details of an embodiment of a dense wavelet.

FIG. 15 illustrates selected details of an embodiment of receiving a wavelet.

FIG. 16 illustrates selected details of an embodiment of consuming a wavelet.

FIG. 24 illustrates selected details of an embodiment of TensorFlow integration via an estimator Application Programming Interface (API).

FIG. 35 illustrates example layout annotations for placement and routing.

FIG. 36 illustrates a table, a tree, and a resultant placement.

FIG. 37 illustrates an updated table, an updated tree, and an updated resultant placement.

FIG. 38 illustrates permuting branches within a partition domain.

FIG. 39 illustrates an example of wire cost.

FIG. 40 illustrates an example of a router configuration.

FIGS. 47A-47E illustrate selected details of various embodiments of software elements associated with using a deep learning accelerator, such as determining routes between kernels.

-continued

Figure 1:
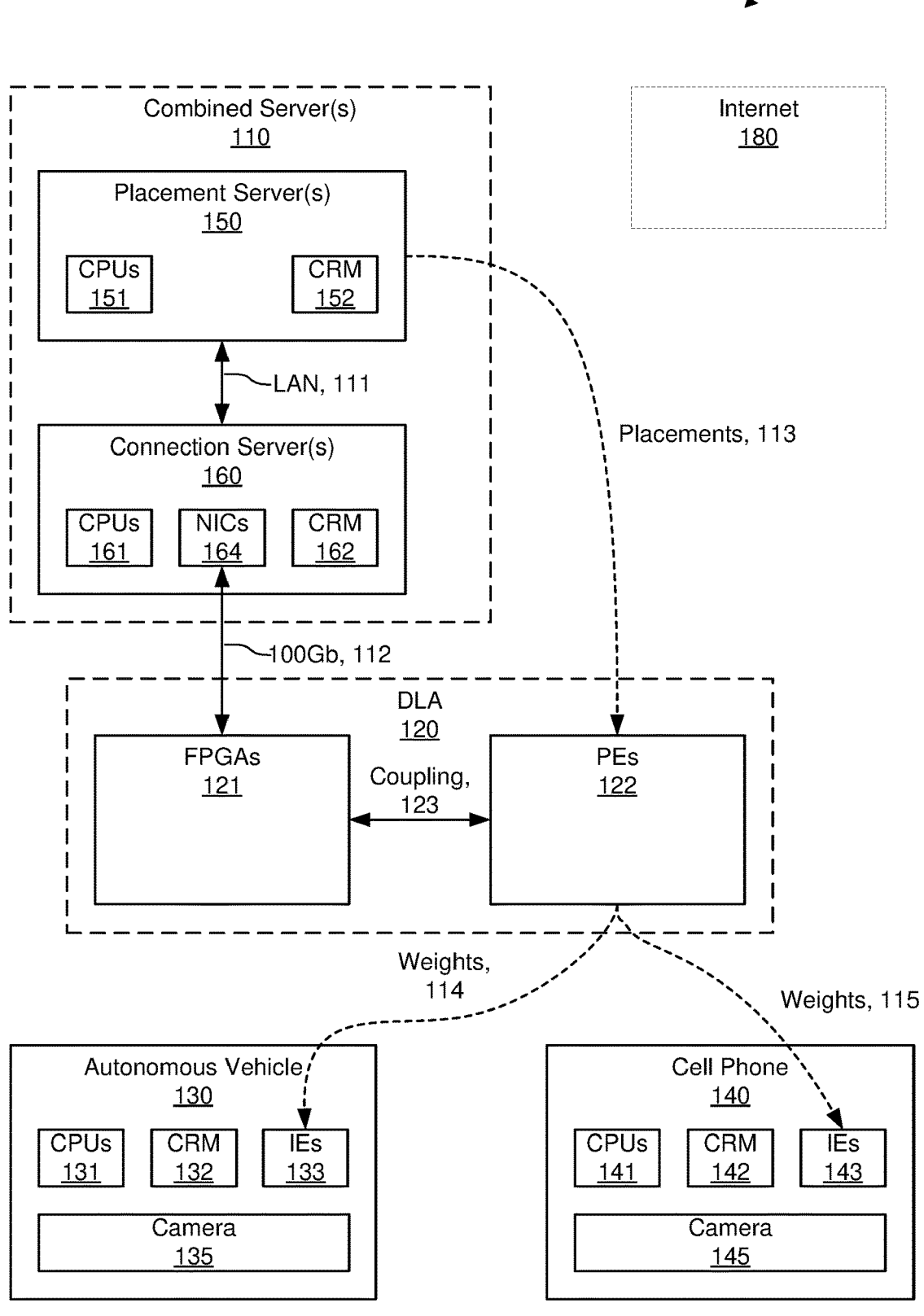
FIG. 1 illustrates selected details of an embodiment of a system for neural network training and inference, using a deep learning accelerator.

| List of Reference Symbols in Drawings | |
| --- | --- |
| Ref. Symbol | Element Name |
| 113 | Placements |
| 114 | Weights |
| 115 | Weights |
| 120 | DLA |
| 121 | FPGAs |
| 122 | PEs |
| 123 | Coupling |
| 130 | Autonomous Vehicle |
| 131 | CPUs |
| 132 | CRM |
| 133 | IEs |
| 135 | Camera |
| 140 | Cell Phone |
| 141 | CPUs |
| 142 | CRM |
| 143 | IEs |
| 145 | Camera |
| 150 | Placement Server(s) |
| 151 | CPUs |
| 152 | CRM |
| 160 | Connection Server(s) |
| 161 | CPUs |
| 162 | CRM |
| 164 | NICs |
| 180 | Internet |
| 200 | Neural Network Software |
| 210 | Placement Server(s) SW |
| 212 | Neuron to PE Mapping SW |
| 220 | Connection Server(s) SW |
| 224 | 100 Gb NIC Driver |
| 225 | Training Info Provider SW |
| 226 | Weight Receiver SW |
| 230 | Autonomous Vehicle SW |
| 232 | Video Camera SW |
| 233 | Inference Engine(s) SW |
| 234 | Navigating SW |
| 240 | Cell Phone SW |
| 242 | Still Camera SW |
| 243 | Inference Engine(s) SW |
| 244 | Posting SW |
| 250 | Misc SW on FPGAs |
| 260 | Task SW on PEs |
| 300 | Neural Network Training/Inference, Overall |
| 310 | Place Neurons |
| 320 | Initialize FPGAs |
| 330 | Initialize PEs |
| 340 | Training Data => PEs |
| 350 | Forward Pass, Delta Pass, Chain Pass, Update Weights |
| 360 | Training Complete? |
| 370 | Weights Out |
| 380 | Use Weights for Inference |
| 400A | DLA |
| 400B | DLA |
| 400C | DLA |
| 401 | Forward |
| 402 | Delta |
| 403 | Chain |
| 404 | X Extent |
| 405 | Y Extent |
| 410 | ASIC |
| 411 | ASIC |
| 412 | Wafer |
| 413 | Substrate |
| 414 | Substrate |
| 420A | I/O FPGAs |
| 420B | I/O FPGAs |
| 420C | I/O FPGAs |
| 430 | North coupling |
| 431 | East coupling |
| 432 | South coupling |
| 433 | West coupling |
| 434 | Horizontal coupling |
| 435 | Vertical coupling |
| 436 | PE Cluster and HBM coupling |
| 481 | PE Cluster |

| List of Reference Symbols in Drawings | |
| --- | --- |
| Ref. Symbol | Element Name |
| 100 | Neural Network System |
| 110 | Combined Server(s) |
| 111 | LAN |
| 112 | 100 Gb |

-continued

| | List of Reference Symbols in Drawings | |
|---|---|---|
| Ref. Symbol | Element Name | |
| 482 | HBM | |
| 483 | PEs + HBM | |
| 497 | Particular PE | |
| 498 | Particular PE | |
| 499 | PE | |
| 500 | PE | |
| 510 | Router | |
| 511 | West | |
| 512 | Skip West | |
| 513 | North | |
| 514 | Skip East | |
| 515 | East | |
| 516 | South | |
| 520 | Compute Element | |
| 521 | Off Ramp | |
| 522 | On Ramp | |
| 600 | Router | |
| 610 | Data In | |
| 611 | skipX+ | |
| 612 | skipX− | |
| 613 | X+ | |
| 614 | X− | |
| 615 | Y+ | |
| 616 | Y− | |
| 617 | On Ramp | |
| 620 | Data Out | |
| 621 | skipX+ | |
| 622 | skipX− | |
| 623 | X+ | |
| 624 | X− | |
| 625 | Y+ | |
| 626 | Y− | |
| 627 | Off Ramp | |
| 630 | Stall Out | |
| 631 | skipX+ | |
| 632 | skipX− | |
| 633 | X+ | |
| 634 | X− | |
| 635 | Y+ | |
| 636 | Y− | |
| 637 | On Ramp | |
| 640 | Stall In | |
| 641 | skipX+ | |
| 642 | skipX− | |
| 643 | X+ | |
| 644 | X− | |
| 645 | Y+ | |
| 646 | Y− | |
| 647 | Off Ramp | |
| 650 | Data Queues | |
| 651 | Write Dec | |
| 652 | Out | |
| 653 | Sources | |
| 654 | Router Sched | |
| 656 | Gen Stall | |
| 657 | Stall | |
| 660 | Control Info | |
| 661 | Dest | |
| 662 | Sent | |
| 663 | Fabric Filter Info | |
| 670 | Src | |
| 710 | Wavelet Ingress | |
| 711 | Wait for Wavelet | |
| 712 | Receive Wavelet | |
| 713 | Wavelet => Router Q | |
| 740 | Generating and Providing Backpressure Information, Overall | |
| 741 | CE of PE | |
| 742 | Router of PE | |
| 743 | Start | |
| 744 | Determine Input Q(s) over Threshold | |
| 745 | Determine Colors Associated with Input Q(s) | |
| 746 | Provide Stall/Ready to Router | |
| 747 | Provide Wavelet to CE in Accordance with Stall/Ready | |
| 748 | End | |

-continued

| | List of Reference Symbols in Drawings | |
|---|---|---|
| Ref. Symbol | Element Name | |
| 750 | Generating and Providing Backpressure Information, Overall | |
| 751 | Router of PE | |
| 752 | CE of PE | |
| 753 | Router(s) of Neighbor(s) | |
| 755 | Start | |
| 756 | Determine Data Queue(s) Over Threshold | |
| 757 | Check Color Sources | |
| 758 | Determine Stall/Ready Colors for CE, Neighbors | |
| 759 | Provide Stall/Ready to CE, Neighbors | |
| 760 | Provide Wavelet to Router in Accordance with Stall/Ready | |
| 761 | Provide Wavelet to Router in Accordance with Stall/Ready | |
| 762 | End | |
| 780 | Stalling Processing, Overall | |
| 781 | CE of PE | |
| 782 | Start | |
| 783 | Determine Full Output Q(s) | |
| 784 | Determine Colors Associated Output Q(s) | |
| 785 | Stall Processing for Colors Associated with Full Output Q(s) | |
| 786 | End | |
| 800 | CE | |
| 812 | Terminate | |
| 820 | Off Ramp | |
| 822 | Hash | |
| 824 | Qdistr | |
| 830 | Picker | |
| 825 | Wavelets | |
| 826 | Filter Stall | |
| 834 | PC | |
| 836 | I-Seq | |
| 837 | On Ramp | |
| 840 | Dec | |
| 842 | RF | |
| 844 | D-Seq | |
| 845 | UT State | |
| 846 | DSRs | |
| 847 | Off Ramp | |
| 848 | D-Store | |
| 852 | Data Path | |
| 854 | Memory | |
| 859 | Output Queues | |
| 859.0 | Output Q0 | |
| 859.N | Output QN | |
| 860 | On Ramp | |
| 890 | Base | |
| 896 | Scheduling Info | |
| 897 | Input Qs | |
| 897.0 | Input Q0 | |
| 897.N | Input QN | |
| 898 | Active Bits | |
| 898.0 | Active Bit 0 | |
| 898.N | Active Bit N | |
| 899 | Block Bits | |
| 899.0 | Block Bit 0 | |
| 899.N | Block Bit N | |
| 900 | Processing a Wavelet for Task Initiation, Overall | |
| 901 | Start | |
| 902 | Select Ready Wavelet for Task Initiation | |
| 903 | Control/Data? | |
| 904 | Add (Color * 4) to Base Register to Form Instruction Address | |
| 905 | Fetch Instructions From Memory at Instruction Address | |
| 906 | Execute Fetched Instruction(s) | |
| 908 | Not Terminate | |
| 909 | Terminate | |
| 910 | Add Lower Index Bits to Base Register to Form Instruction Address | |
| 919 | End | |
| 920 | Task Activating, Overall | |
| 921 | Start | |
| 923 | Activate Operation for Color(s) | |
| 924 | Activate Color(s) | |

-continued

-continued

List of Reference Symbols in Drawings

| Ref. Symbol | Element Name |
| --- | --- |
| 925 | Picker Selects Color |
| 926 | Initiate Task, Deactivate Color |
| 929 | End |
| 1010 | Multiple Operand Instruction |
| 1011 | Instruction Type |
| 1012 | Opcode |
| 1013 | Operand 0 Encoding |
| 1013.1 | Operand 0 Type |
| 1013.2 | Operand 0 |
| 1014 | Operand 1 Encoding |
| 1014.1 | Operand 1 Type |
| 1014.2 | Operand 1 |
| 1015 | Terminate |
| 1020 | One Source, No Destination Operand Instruction |
| 1021 | Instruction Type |
| 1022 | Opcode |
| 1023 | Operand 1 Encoding |
| 1023.1 | Operand 1 Type |
| 1023.2 | Operand 1 |
| 1024 | Immediate |
| 1025 | Terminate |
| 1030 | Immediate Instruction |
| 1031 | Instruction Type |
| 1032 | Opcode |
| 1033.2 | Operand 0 |
| 1034.1 | Immediate Low |
| 1034.2 | Immediate High |
| 1034 | Immediate |
| 1301 | Sparse Wavelet |
| 1302 | Sparse Wavelet Payload |
| 1320 | Control Bit |
| 1321 | Index |
| 1321.1 | Lower Index Bits |
| 1321.2 | Upper Index Bits |
| 1322 | Sparse Data |
| 1324 | Color |
| 1331 | Dense Wavelet |
| 1332 | Dense Wavelet Payload |
| 1340 | Control Bit |
| 1343.1 | Dense Data |
| 1343.2 | Dense Data |
| 1344 | Color |
| 1400 | Wavelet Creation Flow, Overall |
| 1401 | Start |
| 1402 | Initialize PEs |
| 1403 | Set Source |
| 1404 | Set Destination (Fabric) DSR |
| 1405 | Fetch/Decode Instruction with Destination DSR |
| 1406 | Read DSR(s) |
| 1407 | Read (Next) Source Data Element(s) from Queue/Memory |
| 1408 | Provide Data Element(s) as Wavelet to Output Queue |
| 1409 | More Data Elements? |
| 1411 | Transmit Wavelet(s) to Fabric |
| 1412 | Receive Wavelet(s) from Fabric |
| 1410 | End |
| 1420 | CE of Transmitting PE |
| 1430 | Router of Transmitting PE |
| 1440 | Router of Receiving PE |
| 1500 | Wavelet Receive Flow, Overall |
| 1501 | Start |
| 1502 | Initialize PEs |
| 1503 | Receive Wavelet at Router |
| 1504 | To Other PE(s)? |
| 1505 | Transmit Wavelet to Output(s) |
| 1506 | For Local CE? |
| 1507 | Selectively Write Wavelet to Picker Queue |
| 1510 | End |
| 1520 | Router of Receiving PE |
| 1530 | CE of Receiving PE |
| 1600 | Wavelet Consumption Flow, Overall |
| 1601 | Start |
| 1602 | Picker Selects Wavelet for Processing |
| 1603 | Fetch, Execute Instructions |
| 1604 | End |
| 1700 | Usage Model |

List of Reference Symbols in Drawings

| Ref. Symbol | Element Name |
| --- | --- |
| 1710 | Model Training |
| 1711 | Extract Model |
| 1712 | Model |
| 1713 | Placement SW |
| 1714 | NNPU Compute Fabric HW |
| 1715 | Realtime Stats Feedback to Adjust Placement |
| 1800 | Placement Pipeline |
| 1801 | TensorFlow |
| 1802 | LAIR |
| 1803 | Kernel Matching |
| 1804 | Buffer Sizing |
| 1805 | Placement |
| 1806 | Orient |
| 1807 | Global (B + R) |
| 1808 | Routing |
| 1809 | Coloring |
| 1810 | Supervisor |
| 1820 | Meta Goals |
| 1830 | Delta t |
| 1831 | Kernel Weight |
| 1832 | Max Buffer Size |
| 1833 | Sparsity and Total Mem |
| 1834 | Max Delta t |
| 1835 | Rectangle Distance |
| 1836 | Wire Length |
| 1837 | Wire Cost |
| 1838 | Feasible Point |
| 1839 | Resource Constraint Heatmap |
| 1900 | Placement Pipeline Optimization Structure |
| 1901 | Quality |
| 1902 | Cost |
| 1903 | Goal |
| 1904 | Budget |
| 2001 | Load Neural Model |
| 2002 | Read/Write Parameters |
| 2003 | Stream Training Data |
| 2004 | Script Control Loop |
| 2110 | Agent |
| 2111-2118 | Workers, respective |
| 2119 | Chief |
| 2120 | Switch |
| 2210 | Framework Integration |
| 2211 | NGDL |
| 2212 | TCP Streams |
| 2213 | Layer API |
| 2214 | Shell Scripts |
| 2215 | Stand-Alone Executables |
| 2220 | Tool Chain |
| 2221 | Intrinsic Kernel Library |
| 2222 | Graph Compiler |
| 2223 | Reference Tools |
| 2224 | Network Primitives |
| 2230 | Compiler Output |
| 2231 | Compiled Model |
| 2232 | Symbol Table |
| 2300 | Learning Framework Structure |
| 2301 | Load Neural Model |
| 2302A | Write Parameters |
| 2302B | Read Parameters |
| 2303A | Stream Training Data |
| 2303B | Stream Model Analytics |
| 2304 | Hyperparameter Script |
| 2310 | Model Source |
| 2320 | Training Database |
| 2400 | TensorFlow Integration |
| 2410 | Worker |
| 2420 | Chief |
| 2500 | Node in Context |
| 2600 | Arc in Context |
| 2700 | Tensor Operation Functional Description |
| 2801 | Image Convolution Tensor Contraction |
| 2802 | Image Convolution Algorithm |
| 2900 | Data Flow Graph |
| 2901 | Node phi1 |
| 2902 | Node phi'1 |

-continued

| List of Reference Symbols in Drawings | |
| --- | --- |
| Ref. Symbol | Element Name |
| 2903 | Node z2 |
| 2904 | Node sigma2 |
| 2905 | Node x |
| 2906 | Node y |
| 2907 | Node sub |
| 3000 | Compilation Phases |
| 3010 | Framework Glue |
| 3011 | Tensor Flow |
| 3020 | Graph Transformations |
| 3021 | Tensor Graph |
| 3022 | Pipeline Graph |
| 3023 | Layer Graph |
| 3024 | Kernel Graph |
| 3030 | Kernel Layout |
| 3031 | Placed Layout |
| 3032 | Oriented Layout |
| 3033 | Route and Buffer Layout |
| 3034 | Colored Layout |
| 3035 | Layout Supervisor |
| 3040 | Code Generation |
| 3041 | Distributed Task Code |
| 3042 | Context Swap Planning |
| 3043 | Instruction Selection |
| 3044 | Instruction Scheduling |
| 3045 | Register Allocation |
| 3100 | Fully Connected Network Equations |
| 3200 | Fully Connected Network Tensor Graph |
| 3300 | Fully Connected Network Kernel Graph |
| 3400 | Fully Connected Network Layout |
| 3410 | UNPACK |
| 3420 | LOSS |
| 3430 | SM |
| 3440 | $FC_1$ |
| 3450 | $FC_0$ |
| 3501 | Placement Layout Annotations |
| 3502 | Route Layout Annotations |
| 3503 | Layout |
| 3504 | $(x_0, y_0)$ |
| 3610 | Table |
| 3620 | Tree |
| 3630 | Placement |
| 3710 | Table |
| 3720 | Tree |
| 3730 | Placement |
| 3800 | Branch Permuting Example |
| 3900 | Wire Cost Example |
| 4000 | Example Router Configuration |
| 4100 | Routing Terminology Examples |
| 4110 | Source Bus Terminals |
| 4120 | Sink Bus Terminals |
| 4130 | Bus with three Nets |
| 4200 | Example Ordered and Swizzled Routing Modes |
| 4210 | A => B Swizzled Bus (permuted) |
| 4220 | C => D Ordered Bus |
| 4230 | E => F Swizzled Bus (flipped) |
| 4301 | Input Net (undelayed) |
| 4302 | Output Net (delayed tap) |
| 4310 | Distributed Buffer |
| 4410 | Gap |
| 4420 | Arbitrary Route |
| 4510 | Input Net Available |
| 4520 | Output Net Available |
| 4601-4607 | Kernels 1-7 |
| 4612 | Buf 1to2 |
| 4623 | Buf 2to3 |
| 4634 | Buf 3to4 |
| 4636 | Buf 3to6 |
| 4645 | Buf 4to5 |
| 4646 | Buf 4to6 |
| 4657 | Buf 5to7 |
| 4667 | Buf 6to7 |
| 4671-4677 | Regions 1-7 |
| 4681 | $DAG_1$ |
| 4682 | G |
| 4683 | Extract Cycles |

-continued

| List of Reference Symbols in Drawings | |
| --- | --- |
| Ref. Symbol | Element Name |
| 4684 | $DAG_2$ |
| 4685 | Linear Constraints Cost Function |
| 4686 | LP |
| 4691 | Kernel Placement & Buffer Sizing |
| 4692 | Hierarchical Rectangular Regions |
| 4693 | Find "Best" Region |
| 4694 | Update Regions |
| 4695 | Repeat Until all Buffers Placed |
| 4701 | Bus 1 |
| 4702 | Bus 2 |
| 4703 | Bus 3 |
| 4711 | Every Arc |
| 4712 | Route |
| 4713 | Collect Info |
| 4714 | Create Obstacles |
| 4715 | Repeat Until all Arcs Routed |
| 4720 | Dst |
| 4730 | Src |
| 4731 | Obstacle 1 |
| 4732 | Obstacle 2 |
| 4734 | Node 3to4 |
| 4737 | Node 3to7 |
| 4746 | Node 4to6 |
| 4750 | Route Determining Processing |
| 4751 | Start Info |
| 4752 | Route |
| 4753 | Heatmap |
| 4761 | Color 1 |
| 4762 | Color 2 |
| 4763 | Color 3 |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In an aspect conceptually related to optimized placement for efficiency for accelerated deep learning, techniques in advanced deep learning provide improvements in one or more of accuracy, performance, and energy efficiency. An array of processing elements comprising a portion of a neural network accelerator performs flow-based computations on wavelets of data. Each processing element comprises a respective compute element enabled to execute programmed instructions using the data and a respective router enabled to route the wavelets. Each router enables communication via the wavelets with at least nearest neighbor processing elements in a 2D mesh. The routing is in accordance with a respective virtual channel specifier (e.g. a color) of each of the wavelets and controlled by routing configuration information of the router. A software stack determines optimized placement based on a description of a neural network. The determined placement is used to configure the routers including usage of the respective colors. The determined placement is used to configure the compute elements including the respective programmed instructions each is configured to execute.

In an aspect conceptually related to placement of compute and memory for accelerated deep learning, techniques in advanced deep learning provide improvements in one or more of accuracy, performance, and energy efficiency. An array of processing elements comprising a portion of a neural network accelerator performs flow-based computations on wavelets of data. Each processing element comprises a respective compute element enabled to execute programmed instructions using the data and a respective router enabled to route the wavelets. Each router enables communication via the wavelets with at least nearest neighbor processing elements in a 2D mesh. The routing is in accordance with a respective virtual channel specifier (e.g. a color) of each of the wavelets and controlled by routing configuration information of the router. A software stack determines placement of compute resources and memory resources based on a description of a neural network. The determined placement is used to configure the routers including usage of the respective colors. The determined placement is used to configure the compute elements including the respective programmed instructions each is configured to execute.

In an aspect conceptually related to distributed placement of linear operators for accelerated deep learning, techniques in advanced deep learning provide improvements in one or more of accuracy, performance, and energy efficiency. An array of processing elements comprising a portion of a neural network accelerator performs flow-based computations on wavelets of data. Each processing element comprises a respective compute element enabled to execute programmed instructions using the data and a respective router enabled to route the wavelets. Each router enables communication via the wavelets with at least nearest neighbor processing elements in a 2D mesh. The routing is in accordance with a respective virtual channel specifier (e.g. a color) of each of the wavelets and controlled by routing configuration information of the router. A software stack determines distributed placement of linear operators based on a description of a neural network. The determined placement is used to configure the routers including usage of the respective colors. The determined placement is used to configure the compute elements including the respective programmed instructions each is configured to execute.

A first example of accelerated deep learning is using a deep learning accelerator to train a neural network. A second example of accelerated deep learning is using a deep learning accelerator to operate a trained neural network to perform inferences. A third example of accelerated deep learning is using a deep learning accelerator to train a neural network and subsequently perform inference with any one or more of the trained neural network, information from same, and a variant of same.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and generative adversarial networks.

An example of training a neural network is determining one or more weights associated with the neural network, such as by hardware acceleration via a deep learning accelerator. An example of making an inference is using a trained neural network to compute results by processing input data based on weights associated with the trained neural network. As used herein, the term 'weight' is an example of a 'parameter' as used in various forms of neural network processing. For example, some neural network learning is directed to determining parameters that are then usable for performing neural network inferences using the parameters.

For example, the parameters are variously any combination of scalars, vectors, matrices, tensors, and so forth, such as arrangements of an arbitrary number and an arbitrary complexity of elements. For example, the parameters are of various dimensions, such as one-dimensional, two-dimensional, three-dimensional, and otherwise multidimensional. For example, the parameters are of various datatypes, such as, integer and floating-point. For example, the parameters (or respective portions thereof, e.g., an exponent or a mantissa) are represented with various precisions (sometimes referred to as widths), such as, 8-bit, 16-bit, 32-bit, 64-bit, and so forth.

A neural network processes data according to a dataflow graph comprising layers of neurons. Stimuli (e.g., input data) are received by an input layer of neurons and the computed results of the dataflow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained, subject to hardware acceleration. After being trained, a neural network is conditionally and/or selectively used for inference, subject to hardware acceleration.

An example of a deep learning accelerator is one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs.

An example implementation of a deep learning accelerator is enabled to process dataflow in accordance with computations performed for training of a neural network and/or inference with a neural network. Some deep learning accelerators comprise processing elements coupled via a fabric and enabled to communicate with each other via the fabric. Sometimes the processing elements and the fabric are collectively referred to as a fabric of processing elements.

An example implementation of a processing element is enabled to communicate and process wavelets. In various circumstances, the wavelets correspond to dataflow and/or instruction flow in accordance with communication and/or processing enabling computations performed for training of and/or inference using a neural network.

An example processing element comprises a router to communicate wavelets via the fabric and a compute element to process the wavelets. An example router is coupled to a plurality of elements: a fabric, an off ramp to the compute element, and an on ramp from the compute element. An example coupling between the router and the fabric enables communication between the router and, e.g., four logically and/or physically adjacent processing elements. The router variously receives wavelets from the fabric and the on ramp. The router variously transmits wavelets to the fabric and the off ramp.

An example implementation of a compute element is enabled to process wavelets by initiating tasks and executing instructions associated with the wavelets, and accessing data associated with the wavelets and/or the instructions. The instructions are in accordance with an instruction set architecture comprising arithmetic instructions, control flow instructions, datatype conversion instructions, configuration instructions, fabric management instructions, and load/store instructions. The instructions operate on operands comprising various datatypes, e.g., integer datatypes and floating-point datatypes of various widths. The operands variously comprise scalar operands and vector operands. In various embodiments and/or usage scenarios, a vector variously represents, e.g., weights of a neural network, inputs or stimuli of a neural network, activations of a neural network, and/or partial sums of a neural network. In some scenarios, a vector is a sparse vector (e.g., a vector of neuron activations) and comprises sparse data elements (e.g., only non-zero elements). In some other scenarios, a vector is a dense vector (e.g., pixel values) and comprises dense data elements (e.g., all elements of the vector, including zero elements).

An example compute element comprises hardware elements that collectively execute the instructions associated with a wavelet by performing operations specified by the instructions (e.g., arithmetic operations, control flow operations, and load/store operations). Examples of the hardware elements include picker queues, a picker, a task definition table, an instruction sequencer, an instruction decoder, a data sequencer, a register file, a memory, a pseudo-random number generator, and an ALU. Some implementations of the hardware elements are in accordance with hardware logic circuitry elements as described elsewhere herein. Sometimes a compute element is referred to as a compute engine.

Sometimes the compute scheduler is referred to as a picker and the compute scheduler queues are referred to as picker queues.

An example fabric is a collection of logical and/or physical couplings between processing elements and/or within a single processing element. The fabric is usable to implement logical and/or physical communication topologies such as a mesh, a 2D mesh, a 3D mesh, a hypercube, a torus, a ring, a tree, or any combination thereof. An example of a physical coupling between processing elements is a set of physical interconnects (comprising optional and/or selective buffering) between physically-coupled processing elements. A first example of physically-coupled processing elements is immediately physically adjacent processing elements, such as a first processing element located directly beside (such as 'north', 'south', 'east', or 'west') of a second processing element. A second example of physically-coupled processing elements is relatively physically nearby processing elements, such as a first processing element located within a relatively small number of intervening processing elements, e.g., one or two 'rows' and/or 'columns' away from a second processing element. A third example of physically-coupled processing elements is relatively physically far away processing elements, such as a first processing element located physical relatively far away from a second processing element, such as a distance limited by signal propagation (with or without optional and/or selective buffering) within a clock cycle and/or clock sub-cycle associated with the processing elements. An example of physical coupling within a single processing element (having, e.g., a compute element and a router) is an on ramp coupling output information from the compute element to the router, and an off ramp coupling input information from the router to the compute element. In some situations, the router routes information from the on ramp to the off ramp.

An example of a logical coupling between processing elements is a virtual channel as implemented by routers within processing elements. A route between a first processing element and a second processing element is implemented, e.g., by routers within processing elements along the route forwarding in accordance with the virtual channel and routing configuration information. An example of a logical coupling within a single particular processing element (having, e.g., a router) is a virtual channel as implemented by the router, enabling the particular processing element to send information via the virtual channel to the particular processing element. The router forwards "internally" with respect to the particular processing element in accordance with the virtual channel and routing configuration information.

An example wavelet is a bundle of information communicated between processing elements via the fabric. An example wavelet comprises a wavelet payload and a color. A wavelet payload comprises data and is associated with instructions. A first response to a wavelet received by a compute element of a processing element comprises the compute element initiating a task, such as corresponding to processing of instructions associated with the wavelet. A second response to a wavelet received by a compute element of a processing element comprises the compute element processing data of the wavelet. Example types of wavelets include dense wavelets and sparse wavelets, as well as data wavelets and control wavelets.

Wavelets are used, for example, for communicating between processing elements. In a first scenario, a first processing element transmits wavelets to a second processing element. In a second scenario, an external device (e.g., an FPGA) transmits wavelets to a processing element. In a third scenario, a processing element transmits wavelets to an external device (e.g., an FPGA).

An example virtual channel is one or more communication pathways specified by a color and enabled, e.g., by a fabric and one or more routers. A wavelet comprising a particular color is sometimes referred to as being associated with a particular virtual channel associated with the particular color. A first example of a color is a fabric color specifying a virtual channel between two different processing elements. In some embodiments, a fabric color is a 5-bit integer. A second example of a color is a local color specifying a virtual channel from a processing element to the processing element. In some embodiments, a color is a 6-bit integer and specifies one of a fabric color and a local color.

An example task comprises a collection of instructions executed in response to a wavelet. An example instruction comprises an operation and optionally one or more operands specifying locations of data elements to be processed in accordance with the operation. A first example of an operand specifies data elements in memory. A second example of an operand specifies data elements communicated (e.g., received or transmitted) via the fabric. An example of a data sequencer determines the locations of data elements. An example of an instruction sequencer determines an address in memory of instructions associated with a wavelet.

An example picker queue is enabled to hold wavelets received via an off ramp of the fabric for processing in the compute element. An example of a picker selects a wavelet from the picker queue for processing, and/or selects an active unblocked color for processing to initiate a corresponding task.

An example of storage is one or more elements enabled to retain state information, e.g., any one or more of: a flip-flop, a latch or an array of latches, a register or an array of registers, a register file, a memory, a memory array, a magnetic storage device, an optical storage device, SRAM, DRAM, flash, and ROM. In various embodiments storage is volatile (e.g., SRAM or DRAM) and/or non-volatile (e.g., flash or ROM).

An example of an Integrated Circuit (IC) is a collection of circuitry implemented on one or more portions of semiconductor material, such as a single die or a plurality of dice. An example of 3D-stacking of dice is providing mechanical connectivity and/or electrical connectivity between the dice, e.g., in a dimension orthogonal to a major surface of the dice, to form a unit. The mechanical connectivity and/or the electrical connectivity are variously implemented, e.g., via one or more of solder balls, microbumps, and through-silicon vias. An example of 2.5D stacking of dice is providing mechanical connectivity and/or electrical connectivity between the dice via a common element (e.g., a silicon interposer) to form a unit, wherein the mechanical connectivity and/or electrical connectivity between each die and the common substrate is in a dimension orthogonal to a major surface of the die. The mechanical connectivity and/or the electrical connectivity are variously implemented, e.g., via one or more of solder balls, microbumps, and through-silicon vias. An example of an Application-Specific Integrated Circuit (ASIC) is an IC designed for a particular use. An example of wafer-scale integration is implementing a system using all or a significant portion of a wafer as an element of the system, e.g., by leaving the wafer whole or substantially whole.

An example of a package is an element enabled to mechanically retain and/or contain one or more electronic circuits and/or to electrically interconnect one or more electronic circuits. Example electronic circuits are any one or more of one or more portions of semiconductor material, one or more dice, one or more interposers, and one or more substrates. Particular examples of packages include a BGA package and variants thereof. Some ICs comprise a package. An example of a substrate is an element to mechanically retain and/or electrically interconnect one or more dice and/or one or more packages. A particular example of a substrate is a PCB, to, e.g., retain and interconnect packages. Another particular example of a substrate is a silicon interposer to, e.g., couple one or more 3D-stacked or 2.5-stacked dice. Another particular example of a substrate is a package, e.g., retaining a plurality of dice.

An example of inter-package communication is communication between packages, e.g., between a first package and a second package. A particular example of inter-package communication is communication between a first BGA mounted on a PCB and a second BGA mounted on the PCB. An example of intra-package communication is communication within elements of a package. A particular example of intra-package communication is communication between a first die in a package and a second die in the package. An example of intra-substrate communication is communication between elements of a substrate, such as between a first package mounted on a PCB and a second package mounted on the PCB. An example of inter-die communication is communication between dice, such as between a first 3D-stacked die of a package and a second 3D-stacked die of the package. Some inter-die communication is in accordance with intra-package communication. Some inter-die communication is in accordance with intra-substrate communication. An example of intra-die communication is communication between elements of a same die, such as between electrically interconnected routers of a same die.

In some embodiments and/or usage scenarios, wafer-scale integration enables connecting multiple elements in a system via wafer interconnect formed using silicon fabrication processes instead of via inter-chip interconnect, and thus improves any one or more of improved performance, cost, reliability, and energy efficiency. As a specific example, a system implemented using wafer-scale integration technology enables implementation of three million PEs on a single wafer, each of the PEs having bandwidth to nearest physical neighbors that is greater than a comparable system using other-than wafer-scale integration technology. The greater bandwidth enables the system implemented using wafer-scale integration technology to relatively efficiently train and/or perform inferences for larger neural networks than the system implemented using other-than wafer-scale integration technology.

Acronyms

At least some of the various shorthand abbreviations (e.g., acronyms) defined here refer to certain elements used herein.

| Acronym | Description |
| --- | --- |
| API | Application Programming Interface |
| ASIC | Application Specific Integrated Circuit |
| BGA | Ball Grid Array |
| CE | Compute Element |
| CLI | Command Line Interface |
| CNN | Convolutional Neural Network |
| CPU | Central Processing Unit |
| CRM | Computer Readable Media |
| DLA | Deep Learning Accelerator |
| DRAM | Dynamic Random Access Memory |
| DSD | Data Structure Descriptor |

-continued

| Acronym | Description |
|---------|-------------|
| DSP | Digital Signal Processor |
| DSR | Data Structure Register |
| FCNN | Fully Connected Neural Network |
| FLOP | FLoating-point OPeration |
| FP | Floating-Point |
| FPGA | Field-Programmable Gate Array |
| GPU | Graphics Processing Unit |
| HBM | High Bandwidth Memory |
| HBM2 | High Bandwidth Memory (second generation) |
| HW | HardWare |
| IC | Integrated Circuit |
| IE | Inference Engine |
| IP | Internet Protocol |
| LFSR | Linear Feedback Shift Register |
| LSTM | Long Short-Term Memory |
| LVDS | Low-Voltage Differential Signaling |
| ML | Machine Learning |
| MNIST | Modified National Institute of Standards and Technology |
| NGDL | Neural Graph Description Language |
| PCB | Printed Circuit Board |
| PE | Processing Element |
| PRN | Pseudo Random Number |
| PRNG | Pseudo Random Number Generator |
| RNN | Recurrent Neural Network |
| SGD | Stochastic Gradient Descent |
| SIMD | Single Instruction Multiple Data |
| SRAM | Static Random Access Memory |
| SW | SoftWare |
| TCP | Transmission Control Protocol |
| XDSD | eXtended Data Structure Descriptor |
| XDSR | eXtended Data Structure Register |
| XLA | Accelerated Linear Algebra |

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:

extracting a model from a neural network description;

determining accelerator configuration information usable to configure a deep learning accelerator to provide a trained model that is in accordance with the extracted model; and wherein the deep learning accelerator comprises a fabric and a plurality of processing elements enabled to communicate packets with each other via the fabric in accordance with a plurality of communication pathways identifiable by respective virtual channel identifiers.

EC2) The method of EC1, EC67, EC69, or EC71, wherein one or more of the extracting and the determining are performable on a server.

EC3) The method of EC1, EC67, EC69, or EC71, wherein a substantially whole wafer comprises the deep learning accelerator.

EC4) The method of EC1, EC67, EC69, or EC71, wherein the neural network description is compatible with any one or more of Caffe2, Theano, Torch, and TensorFlow.

EC5) The method of EC1, EC67, EC69, or EC71, wherein each packet comprises a respective instance of one of the virtual channel identifiers.

EC6) The method of EC1, EC67, EC69, or EC71, further comprising configuring the deep learning accelerator using the accelerator configuration information.

EC7) The method of EC6, further comprising providing training data to the configured deep learning accelerator.

EC8) The method of EC7 or EC68, further comprising receiving from the configured deep learning accelerator a trained model that is in accordance with the extracted model and the training data.

EC9) The method of EC7, further comprising receiving from the configured deep learning accelerator feedback results and repeating at least a portion of the determining in accordance with the feedback results.

EC10) The method of EC9 or EC68, wherein the feedback results comprise performance information.

EC11) The method of EC1, EC69, or EC71, further comprising evaluating one or more results of the determining in accordance with one or more predetermined cost criteria to produce one or more goal-evaluation metrics.

EC12) The method of EC11, further comprising conditionally altering one or more meta-parameters that the determining is based at least in part on wherein the conditionally altering is dependent on at least one of the one or more goal-evaluation metrics being less than a respective predetermined threshold.

EC13) The method of EC12 or EC67, further comprising repeating at least a portion of the determining in accordance with the altered meta-parameters.

EC14) The method of EC1, EC67, or EC71, wherein the determining comprises ascertaining delay buffers required to match delays for all convergent nodes of the extracted model.

EC15) The method of EC1, EC67, or EC71, wherein the determining comprises ascertaining routing to implement data communication in accordance with arcs of the extracted model.

EC16) The method of EC15, wherein the ascertaining ignores interactions between routes.

EC17) The method of EC16, further comprising scanning results of the ascertaining to produce hotspot information to repeat the ascertaining in accordance with.

EC18) The method of EC15, wherein the ascertaining ignores coloring and bandwidth interactions with other routes.

EC19) The method of EC1, EC67, EC69, or EC71, wherein the determining comprises removing direction information from a directed acyclic graph corresponding to the extracted model, ascertaining cycle information based on results of the removing, building a set of linear constraint cost functions based on results of the ascertaining, and solving the set of linear constraint cost functions to determine respective numbers of buffers such that all convergent paths in the directed acyclic graph have a same delay.

EC20) The method of EC19, further comprising assigning, in accordance with a predetermined maximum number of virtual channels, a respective one of the communication pathways to each of a plurality of arcs the extracted model is comprised of.

EC21) The method of EC1, EC67, EC69, or EC71, wherein the extracted model comprises arcs representing communication described by the neural network description and the extracted model further comprises nodes representing computation described by the neural network description.

EC22) The method of EC1, EC67, EC69, or EC71, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC23) The method of EC22, wherein the determining comprises expressing placement constraints as a binary tree with groups of nodes of the extracted model represented by leaf nodes of the binary tree wherein internal nodes of the binary tree are separable by either a horizontal partition or a vertical partition in the context of the target wafer, estimating respective relative areas corresponding to each of the groups, computing respective partition coordinates corresponding to each of the groups based at least in part on the respective relative areas, and revising the estimating based on the respective partition coordinates.

EC24) The method of EC23, wherein the determining further comprises swapping any two of the leaf nodes.

EC25) The method of EC23, wherein the determining further comprises flipping orientation of one of the internal nodes between horizontal and vertical orientations.

EC26) The method of EC23, wherein the determining further comprises performing simulated annealing on a plurality of candidate solutions each based on a respective binary tree.

EC27) The method of EC22, wherein the determining comprises assigning routes associated with respective arcs of the extracted model to respective ones of the communication pathways and wherein the assigning is in accordance with the context of the target wafer.

EC28) The method of EC27, wherein the assigning is in accordance with starting with relatively more constrained ones of the arcs.

EC29) The method of EC27, wherein the assigning is in accordance with a plurality of the communication pathways being associated with a single one of the arcs.

EC30) The method of EC27, wherein the assigning is in accordance with a solution to a graph coloring problem that is representative of intersections of the routes in the context of the target wafer.

EC31) The method of EC30, wherein the solution is obtainable via a saturated-degree technique.

EC32) The method of EC22, wherein the determining comprises assigning computations associated with respective nodes of the extracted model to respective portions of the plurality of logical processing elements in accordance with the respective physical locations.

EC33) The method of EC32 or EC70, wherein the determining comprises identifying a region of physically contiguous ones of the plurality of physical processing elements, cutting the identified region orthogonal to a boundary of the identified region into two sub-regions, evaluating each of the sub-regions with respect to a placement of a delay buffer, and responsive to the evaluating ascertaining that the placement is a better one for the delay buffer, indicating that the placement is a best placement for the delay buffer.

EC34) The method of EC33, wherein the cutting is in accordance with a binary search and application to four edges of the identified region.

EC35) The method of EC33, wherein the delay buffer is a particular one of a plurality of delay buffers and chosen from the plurality of delay buffers based on an order of largest to smallest.

EC36) The method of EC32, wherein the determining further comprises performing a first routing of all communication paths between a plurality of regions of the plurality of physical processing elements, evaluating a heatmap in accordance with the first routing, inserting obstacles responsive to the heatmap, and performing a second routing of all the communication paths.

EC37) The method of EC32, wherein the determining further comprises evaluating a wire cost based on Manhattan distance.

EC38) The method of EC37, wherein the wire cost accounts for bandwidth of communication between the computations.

EC39) The method of EC32, wherein the determining further comprises updating a placement tree associated with the assigning such that placement cost is unchanged.

EC40) The method of EC39, wherein the placement tree updating comprises exchanging branches of the placement tree that are in a same domain.

EC41) The method of EC1, EC67, EC69, or EC71, wherein the accelerator configuration information comprises a symbol table comprising a parameter tensor map indicating where each named tensor in the neural network description resides in respective memories of the plurality of processing elements.

EC42) The method of EC1, EC67, EC69, or EC71, wherein the accelerator configuration information comprises one or more indicators of expected runtime performance statistics.

EC43) The method of EC1, EC67, EC69, or EC71, wherein the determining comprises computing a number of arithmetic operations to be performed per each of the plurality of processing elements responsive to one input into the neural network description and the determining further comprises duplicating one or more copies of the extracted model onto the plurality of processing elements responsive to the number being less than a predetermined threshold.

EC44) The method of EC1, EC67, EC69, or EC71, wherein each of the plurality of processing elements comprises a respective router coupled to the fabric and enabled to forward packets in accordance with the communication pathways based at least in part on router configuration information retainable in the router.

EC45) The method of EC44, wherein the accelerator configuration information comprises respective instances of the router configuration information.

EC46) The method of EC45, wherein the determining comprises allocating particular ones of the plurality of processing elements to corresponding particular portions of the extracted model.

EC47) The method of EC46, wherein one of the respective instances comprises forwarding configuration information that is in accordance with results of the allocating.

EC48) The method of EC47, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC49) The method of EC48, wherein the allocating is in accordance with the respective physical locations.

EC50) The method of EC1, EC67, EC69, or EC71, wherein each of the plurality of processing elements is enabled to forward the packets in accordance with the communication pathways based at least in part on respective processing element configuration information retainable in the respective processing element.

EC51) The method of EC50, wherein each of the plurality of processing elements comprises a respective one or more router configuration registers and the respective processing element configuration information comprises respective forwarding configuration settings for at least a portion of the respective router configuration registers.

EC52) The method of EC1, EC67, or EC69, wherein each of the plurality of processing elements comprises a respective compute element enabled to execute programmed instructions based at least in part on respective compute element configuration information retainable in the respective compute element.

EC53) The method of EC52, wherein the accelerator configuration information comprises respective instances of the respective compute element configuration information.

EC54) The method of EC53, wherein each of the plurality of compute elements comprises a respective one or more registers and the respective instances of the compute element configuration information comprise respective settings for at least a portion of the respective registers.

EC55) The method of EC53, wherein each of the plurality of compute elements is enabled to store programmed instructions for execution and the respective instances of the compute element configuration information comprise respective instruction code corresponding to the stored programmed instructions of each respective compute element.

EC56) The method of EC53, wherein the determining comprises matching an element of the extracted model with a corresponding element from a library of executable kernel modules, one of the respective instances comprises executable code associated with the corresponding element, and the executable code comprises instances of the programmed instructions.

EC57) The method of EC56, wherein each of the executable kernel modules is associated with a respective template code generator enabled to generate the executable code associated with the respective executable kernel module.

EC58) The method of EC57, wherein at least one of the template code generators is enabled to accept arguments specifying dimensions, measured in numbers of the plurality of processing elements, to generate the executable code for.

EC59) The method of EC56, wherein each of the executable kernel modules is associated with a respective cost model indicating any one or more of memory, bandwidth, and compute utilization used by the respective executable kernel module.

EC60) The method of EC56, wherein one or more of the executable kernel modules comprise a hand-written microcode element.

EC61) The method of EC56, wherein one or more of the executable kernel modules is associated with a respective utilization function that monotonically decreases with larger areas.

EC62) The method of EC56, wherein at least one of the executable kernel modules is associated with a performance model that is usable to determine a shape of a compute region for the at least one executable kernel module.

EC63) The method of EC56, wherein the element corresponds to a plurality of nodes in the extracted model.

EC64) The method of EC1, EC67, EC69, or EC71, wherein each of the plurality of processing elements is enabled to execute programmed instructions based at least in part on respective processing element configuration information retainable in the respective processing element.

EC65) The method of EC64, wherein each of the plurality of processing elements comprises a respective one or more registers and the accelerator configuration information comprises respective settings for at least a portion of the respective registers.

EC66) The method of EC64, wherein each of the plurality of processing elements is enabled to store programmed instructions for execution and the accelerator configuration information comprises respective instruction code corresponding to the stored programmed instructions of each respective processing element.

EC67) A method comprising:

extracting a model from a neural network description;

determining accelerator configuration information usable to configure a deep learning accelerator to provide a trained model that is in accordance with the extracted model;

evaluating one or more results of the determining in accordance with one or more predetermined cost criteria to produce one or more goal-evaluation metrics;

conditionally altering one or more meta-parameters that the determining is based at least in part on wherein the conditionally altering is dependent on at least one of the one or more goal-evaluation metrics being less than a respective predetermined threshold; and wherein the deep learning accelerator comprises a fabric and a plurality of processing elements enabled to communicate packets with each other via the fabric in accordance with a plurality of communication pathways identifiable by respective virtual channel identifiers.

EC68) The method of EC67, further comprising configuring the deep learning accelerator using the accelerator configuration information, providing training data to the configured deep learning accelerator, receiving from the configured deep learning accelerator feedback results, and repeating at least a portion of the determining in accordance with the feedback results.

EC69) A method comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers; and wherein the determining comprises computing delay buffers required to match delays for all convergent nodes of the extracted model and ascertaining routing to implement data communication in accordance with arcs of the extracted model.

EC70) A method comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements; and wherein the determining comprises assigning computations associated with respective nodes of the extracted model to respective portions of the plurality of logical processing elements in accordance with the respective physical locations.

EC71) A method comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein each of the plurality of processing elements comprises a respective compute element enabled to execute programmed instructions based at least in part on respective compute element configuration information retainable in the respective compute element;

wherein the accelerator configuration information comprises respective instances of the respective compute element configuration information; and wherein the determining comprises matching an element of the extracted model with a corresponding element from a library of executable kernel modules, one of the respective instances comprises executable code associated with the corresponding element, and the executable code comprises instances of the programmed instructions.

EC72) The method of EC70 or EC71, further comprising evaluating one or more results of the determining in accordance with one or more predetermined cost criteria to produce one or more goal-evaluation metrics, conditionally altering one or more meta-parameters that the determining is based at least in part on wherein the conditionally altering is dependent on at least one of the one or more goal-evaluation metrics being less than a respective predetermined threshold, and repeating at least a portion of the determining in accordance with the altered meta-parameters.

EC73) A non-transitory computer-readable medium comprising one or more sequences of instructions that, when executed by one or more processors, cause the one or more processors to perform actions comprising:

extracting a model from a neural network description;

determining accelerator configuration information usable to configure a deep learning accelerator to provide a trained model that is in accordance with the extracted model; and wherein the deep learning accelerator comprises a fabric and a plurality of processing elements enabled to communicate packets with each other via the fabric in accordance with a plurality of communication pathways identifiable by respective virtual channel identifiers.

EC74) The non-transitory computer-readable medium of EC73, EC139, EC141, or EC143, wherein one or more of the extracting and the determining are performable on a server.

EC75) The non-transitory computer-readable medium of EC73, EC139, EC141, or EC143, wherein a substantially whole wafer comprises the deep learning accelerator.

EC76) The non-transitory computer-readable medium of EC73, EC139, EC141, or EC143, wherein the neural network description is compatible with any one or more of Caffe2, Theano, Torch, and TensorFlow.

EC77) The non-transitory computer-readable medium of EC73, EC139, EC141, or EC143, wherein each packet comprises a respective instance of one of the virtual channel identifiers.

EC78) The non-transitory computer-readable medium of EC73, EC139, EC141, or EC143, further comprising configuring the deep learning accelerator using the accelerator configuration information.

EC79) The non-transitory computer-readable medium of EC78, further comprising providing training data to the configured deep learning accelerator.

EC80) The non-transitory computer-readable medium of EC79 or EC140, further comprising receiving from the configured deep learning accelerator a trained model that is in accordance with the extracted model and the training data.

EC81) The non-transitory computer-readable medium of EC79, further comprising receiving from the configured deep learning accelerator feedback results and repeating at least a portion of the determining in accordance with the feedback results.

EC82) The non-transitory computer-readable medium of EC81 or EC140, wherein the feedback results comprise performance information.

EC83) The non-transitory computer-readable medium of EC73, EC141, or EC143, further comprising evaluating one or more results of the determining in accordance with one or more predetermined cost criteria to produce one or more goal-evaluation metrics.

EC84) The non-transitory computer-readable medium of EC83, further comprising conditionally altering one or more meta-parameters that the determining is based at least in part on wherein the conditionally altering is dependent on at least one of the one or more goal-evaluation metrics being less than a respective predetermined threshold.

EC85) The non-transitory computer-readable medium of EC84 or EC139, further comprising repeating at least a portion of the determining in accordance with the altered meta-parameters.

EC86) The non-transitory computer-readable medium of EC73, EC139, or EC143, wherein the determining comprises ascertaining delay buffers required to match delays for all convergent nodes of the extracted model.

EC87) The non-transitory computer-readable medium of EC73, EC139, or EC143, wherein the determining comprises ascertaining routing to implement data communication in accordance with arcs of the extracted model.

EC88) The non-transitory computer-readable medium of EC87, wherein the ascertaining ignores interactions between routes.

EC89) The non-transitory computer-readable medium of EC88, further comprising scanning results of the ascertaining to produce hotspot information to repeat the ascertaining in accordance with.

EC90) The non-transitory computer-readable medium of EC87, wherein the ascertaining ignores coloring and bandwidth interactions with other routes.

EC91) The non-transitory computer-readable medium of EC73, EC139, EC141, or EC143, wherein the determining comprises removing direction information from a directed acyclic graph corresponding to the extracted model, ascertaining cycle information based on results of the removing, building a set of linear constraint cost functions based on results of the ascertaining, and solving the set of linear constraint cost functions to determine respective numbers of buffers such that all convergent paths in the directed acyclic graph have a same delay.

EC92) The non-transitory computer-readable medium of EC91, further comprising assigning, in accordance with a predetermined maximum number of virtual channels, a respective one of the communication pathways to each of a plurality of arcs the extracted model is comprised of.

EC93) The non-transitory computer-readable medium of EC73, EC139, EC141, or EC143, wherein the extracted model comprises arcs representing communication described by the neural network description and the extracted model further comprises nodes representing computation described by the neural network description.

EC94) The non-transitory computer-readable medium of EC73, EC139, EC141, or EC143, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC95) The non-transitory computer-readable medium of EC94, wherein the determining comprises expressing placement constraints as a binary tree with groups of nodes of the extracted model represented by leaf nodes of the binary tree wherein internal nodes of the binary tree are separable by either a horizontal partition or a vertical partition in the context of the target wafer, estimating respective relative areas corresponding to each of the groups, computing respective partition coordinates corresponding to each of the groups based at least in part on the respective relative areas, and revising the estimating based on the respective partition coordinates.

EC96) The non-transitory computer-readable medium of EC95, wherein the determining further comprises swapping any two of the leaf nodes.

EC97) The non-transitory computer-readable medium of EC95, wherein the determining further comprises flipping orientation of one of the internal nodes between horizontal and vertical orientations.

EC98) The non-transitory computer-readable medium of EC95, wherein the determining further comprises performing simulated annealing on a plurality of candidate solutions each based on a respective binary tree.

EC99) The non-transitory computer-readable medium of EC94, wherein the determining comprises assigning routes associated with respective arcs of the extracted model to respective ones of the communication pathways and wherein the assigning is in accordance with the context of the target wafer.

EC100) The non-transitory computer-readable medium of EC99, wherein the assigning is in accordance with starting with relatively more constrained ones of the arcs.

EC101) The non-transitory computer-readable medium of EC99, wherein the assigning is in accordance with a plurality of the communication pathways being associated with a single one of the arcs.

EC102) The non-transitory computer-readable medium of EC99, wherein the assigning is in accordance with a solution to a graph coloring problem that is representative of intersections of the routes in the context of the target wafer.

EC103) The non-transitory computer-readable medium of EC102, wherein the solution is obtainable via a saturated-degree technique.

EC104) The non-transitory computer-readable medium of EC94, wherein the determining comprises assigning computations associated with respective nodes of the extracted model to respective portions of the plurality of logical processing elements in accordance with the respective physical locations.

EC105) The non-transitory computer-readable medium of EC104 or EC142, wherein the determining comprises identifying a region of physically contiguous ones of the plurality of physical processing elements, cutting the identified region orthogonal to a boundary of the identified region into two sub-regions, evaluating each of the sub-regions with respect to a placement of a delay buffer, and responsive to the evaluating ascertaining that the placement is a better one for the delay buffer, indicating that the placement is a best placement for the delay buffer.

EC106) The non-transitory computer-readable medium of EC105, wherein the cutting is in accordance with a binary search and application to four edges of the identified region.

EC107) The non-transitory computer-readable medium of EC105, wherein the delay buffer is a particular one of a plurality of delay buffers and chosen from the plurality of delay buffers based on an order of largest to smallest.

EC108) The non-transitory computer-readable medium of EC104, wherein the determining further comprises performing a first routing of all communication paths between a plurality of regions of the plurality of physical processing elements, evaluating a heatmap in accordance with the first routing, inserting obstacles responsive to the heatmap, and performing a second routing of all the communication paths.

EC109) The non-transitory computer-readable medium of EC104, wherein the determining further comprises evaluating a wire cost based on Manhattan distance.

EC110) The non-transitory computer-readable medium of EC109, wherein the wire cost accounts for bandwidth of communication between the computations.

EC111) The non-transitory computer-readable medium of EC104, wherein the determining further comprises updating a placement tree associated with the assigning such that placement cost is unchanged.

EC112) The non-transitory computer-readable medium of EC111, wherein the placement tree updating comprises exchanging branches of the placement tree that are in a same domain.

EC113) The non-transitory computer-readable medium of EC73, EC139, EC141, or EC143, wherein the accelerator configuration information comprises a symbol table comprising a parameter tensor map indicating where each named tensor in the neural network description resides in respective memories of the plurality of processing elements.

EC114) The non-transitory computer-readable medium of EC73, EC139, EC141, or EC143, wherein the accelerator configuration information comprises one or more indicators of expected runtime performance statistics.

EC115) The non-transitory computer-readable medium of EC73, EC139, EC141, or EC143, wherein the determining comprises computing a number of arithmetic operations to be performed per each of the plurality of processing elements responsive to one input into the neural network description and the determining further comprises duplicating one or more copies of the extracted model onto the plurality of processing elements responsive to the number being less than a predetermined threshold.

EC116) The non-transitory computer-readable medium of EC73, EC139, EC141, or EC143, wherein each of the plurality of processing elements comprises a respective router coupled to the fabric and enabled to forward packets in accordance with the communication pathways based at least in part on router configuration information retainable in the router.

EC117) The non-transitory computer-readable medium of EC116, wherein the accelerator configuration information comprises respective instances of the router configuration information.

EC118) The non-transitory computer-readable medium of EC117, wherein the determining comprises allocating particular ones of the plurality of processing elements to corresponding particular portions of the extracted model.

EC119) The non-transitory computer-readable medium of EC118, wherein one of the respective instances comprises forwarding configuration information that is in accordance with results of the allocating.

EC120) The non-transitory computer-readable medium of EC119, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC121) The non-transitory computer-readable medium of EC120, wherein the allocating is in accordance with the respective physical locations.

EC122) The non-transitory computer-readable medium of EC73, EC139, EC141, or EC143, wherein each of the plurality of processing elements is enabled to forward the packets in accordance with the communication pathways based at least in part on respective processing element configuration information retainable in the respective processing element.

EC123) The non-transitory computer-readable medium of EC122, wherein each of the plurality of processing elements comprises a respective one or more router configuration registers and the respective processing element configuration information comprises respective forwarding configuration settings for at least a portion of the respective router configuration registers.

EC124) The non-transitory computer-readable medium of EC73, EC139, or EC141, wherein each of the plurality of processing elements comprises a respective compute element enabled to execute programmed instructions based at least in part on respective compute element configuration information retainable in the respective compute element.

EC125) The non-transitory computer-readable medium of EC124, wherein the accelerator configuration information comprises respective instances of the respective compute element configuration information.

EC126) The non-transitory computer-readable medium of EC125, wherein each of the plurality of compute elements comprises a respective one or more registers and the respective instances of the compute element configuration information comprise respective settings for at least a portion of the respective registers.

EC127) The non-transitory computer-readable medium of EC125, wherein each of the plurality of compute elements is enabled to store programmed instructions for execution and the respective instances of the compute element configuration information comprise respective instruction code corresponding to the stored programmed instructions of each respective compute element.

EC128) The non-transitory computer-readable medium of EC125, wherein the determining comprises matching an element of the extracted model with a corresponding element from a library of executable kernel modules, one of the respective instances comprises executable code associated with the corresponding element, and the executable code comprises instances of the programmed instructions.

EC129) The non-transitory computer-readable medium of EC128, wherein each of the executable kernel modules is associated with a respective template code generator enabled to generate the executable code associated with the respective executable kernel module.

EC130) The non-transitory computer-readable medium of EC129, wherein at least one of the template code generators is enabled to accept arguments specifying dimensions, measured in numbers of the plurality of processing elements, to generate the executable code for.

EC131) The non-transitory computer-readable medium of EC128, wherein each of the executable kernel modules is associated with a respective cost model indicating any one or more of memory, bandwidth, and compute utilization used by the respective executable kernel module.

EC132) The non-transitory computer-readable medium of EC128, wherein one or more of the executable kernel modules comprise a hand-written microcode element.

EC133) The non-transitory computer-readable medium of EC128, wherein one or more of the executable kernel modules is associated with a respective utilization function that monotonically decreases with larger areas.

EC134) The non-transitory computer-readable medium of EC128, wherein at least one of the executable kernel modules is associated with a performance model that is usable to determine a shape of a compute region for the at least one executable kernel module.

EC135) The non-transitory computer-readable medium of EC128, wherein the element corresponds to a plurality of nodes in the extracted model.

EC136) The non-transitory computer-readable medium of EC73, EC139, EC141, or EC143, wherein each of the plurality of processing elements is enabled to execute programmed instructions based at least in part on respective processing element configuration information retainable in the respective processing element.

EC137) The non-transitory computer-readable medium of EC136, wherein each of the plurality of processing elements comprises a respective one or more registers and the accelerator configuration information comprises respective settings for at least a portion of the respective registers.

EC138) The non-transitory computer-readable medium of EC136, wherein each of the plurality of processing elements is enabled to store programmed instructions for execution and the accelerator configuration information comprises respective instruction code corresponding to the stored programmed instructions of each respective processing element.

EC139) A non-transitory computer-readable medium comprising one or more sequences of instructions that, when executed by one or more processors, cause the one or more processors to perform actions comprising:

extracting a model from a neural network description;

determining accelerator configuration information usable to configure a deep learning accelerator to provide a trained model that is in accordance with the extracted model;

evaluating one or more results of the determining in accordance with one or more predetermined cost criteria to produce one or more goal-evaluation metrics;

conditionally altering one or more meta-parameters that the determining is based at least in part on wherein the conditionally altering is dependent on at least one of the one or more goal-evaluation metrics being less than a respective predetermined threshold; and wherein the deep learning accelerator comprises a fabric and a plurality of processing elements enabled to communicate packets with each other via the fabric in accordance with a plurality of communication pathways identifiable by respective virtual channel identifiers.

EC140) The non-transitory computer-readable medium of EC139, further comprising configuring the deep learning accelerator using the accelerator configuration information, providing training data to the configured deep learning accelerator, receiving from the configured deep learning accelerator feedback results, and repeating at least a portion of the determining in accordance with the feedback results.

EC141) A non-transitory computer-readable medium comprising one or more sequences of instructions that, when executed by one or more processors, cause the one or more processors to perform actions comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers; and wherein the determining comprises computing delay buffers required to match delays for all convergent nodes of the extracted model and ascertaining routing to implement data communication in accordance with arcs of the extracted model.

EC142) A non-transitory computer-readable medium comprising one or more sequences of instructions that, when executed by one or more processors, cause the one or more processors to perform actions comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements; and wherein the determining comprises assigning computations associated with respective nodes of the extracted model to respective portions of the plurality of logical processing elements in accordance with the respective physical locations.

EC143) A non-transitory computer-readable medium comprising one or more sequences of instructions that, when executed by one or more processors, cause the one or more processors to perform actions comprising:

extracting a model from a neural network description;

determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein each of the plurality of processing elements comprises a respective compute element enabled to execute programmed instructions based at least in part on respective compute element configuration information retainable in the respective compute element;

wherein the accelerator configuration information comprises respective instances of the respective compute element configuration information; and wherein the determining comprises matching an element of the extracted model with a corresponding element from a library of executable kernel modules, one of the respective instances comprises executable code associated with the corresponding element, and the executable code comprises instances of the programmed instructions.

EC144) The non-transitory computer-readable medium of EC142 or EC143, further comprising evaluating one or more results of the determining in accordance with one or more predetermined cost criteria to produce one or more goal-evaluation metrics, conditionally altering one or more meta-parameters that the determining is based at least in part on wherein the conditionally altering is dependent on at least one of the one or more goal-evaluation metrics being less than a respective predetermined threshold, and repeating at least a portion of the determining in accordance with the altered meta-parameters.

EC145) A system comprising:

means for extracting a model from a neural network description;

means for determining accelerator configuration information usable to configure a deep learning accelerator to provide a trained model that is in accordance with the extracted model; and wherein the deep learning accelerator comprises a fabric and a plurality of processing elements enabled to communicate packets with each other via the fabric in accordance with a plurality of communication pathways identifiable by respective virtual channel identifiers.

EC146) The system of EC145, EC211, EC213, or EC215, wherein one or more of the extracting and the determining are performable on a server.

EC147) The system of EC145, EC211, EC213, or EC215, wherein a substantially whole wafer comprises the deep learning accelerator.

EC148) The system of EC145, EC211, EC213, or EC215, wherein the neural network description is compatible with any one or more of Caffe2, Theano, Torch, and TensorFlow.

EC149) The system of EC145, EC211, EC213, or EC215, wherein each packet comprises a respective instance of one of the virtual channel identifiers.

EC150) The system of EC145, EC211, EC213, or EC215, further comprising means for configuring the deep learning accelerator using the accelerator configuration information.

EC151) The system of EC150, further comprising means for providing training data to the configured deep learning accelerator.

EC152) The system of EC151 or EC212, further comprising means for receiving from the configured deep learning accelerator a trained model that is in accordance with the extracted model and the training data.

EC153) The system of EC151, further comprising means for receiving from the configured deep learning accelerator feedback results and means for repeating at least a portion of the determining in accordance with the feedback results.

EC154) The system of EC153 or EC212, wherein the feedback results comprise performance information.

EC155) The system of EC145, EC213, or EC215, further comprising means for evaluating one or more results of the means for determining in accordance with one or more predetermined cost criteria to produce one or more goal-evaluation metrics.

EC156) The system of EC155, further comprising means for conditionally altering one or more meta-parameters that the determining is based at least in part on wherein the means for conditionally altering is dependent on at least one of the one or more goal-evaluation metrics being less than a respective predetermined threshold.

EC157) The system of EC156 or EC211, further comprising means for repeating at least a portion of the determining in accordance with the altered meta-parameters.

EC158) The system of EC145, EC211, or EC215, wherein the determining comprises ascertaining delay buffers required to match delays for all convergent nodes of the extracted model.

EC159) The system of EC145, EC211, or EC215, wherein the determining comprises ascertaining routing to implement data communication in accordance with arcs of the extracted model.

EC160) The system of EC159, wherein the ascertaining ignores interactions between routes.

EC161) The system of EC160, further comprising means for scanning results of the ascertaining to produce hotspot information to repeat the ascertaining in accordance with.

EC162) The system of EC159, wherein the ascertaining ignores coloring and bandwidth interactions with other routes.

EC163) The system of EC145, EC211, EC213, or EC215, wherein the determining comprises removing direction information from a directed acyclic graph corresponding to the extracted model, ascertaining cycle information based on results of the removing, building a set of linear constraint cost functions based on results of the ascertaining, and solving the set of linear constraint cost functions to determine respective numbers of buffers such that all convergent paths in the directed acyclic graph have a same delay.

EC164) The system of EC163, further comprising means for assigning, in accordance with a predetermined maximum number of virtual channels, a respective one of the communication pathways to each of a plurality of arcs the extracted model is comprised of.

EC165) The system of EC145, EC211, EC213, or EC215, wherein the extracted model comprises arcs representing communication described by the neural network description and the extracted model further comprises nodes representing computation described by the neural network description.

EC166) The system of EC145, EC211, EC213, or EC215, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC167) The system of EC166, wherein the determining comprises expressing placement constraints as a binary tree with groups of nodes of the extracted model represented by leaf nodes of the binary tree wherein internal nodes of the binary tree are separable by either a horizontal partition or a vertical partition in the context of the target wafer, estimating respective relative areas corresponding to each of the groups, computing respective partition coordinates corresponding to each of the groups based at least in part on the respective relative areas, and revising the estimating based on the respective partition coordinates.

EC168) The system of EC167, wherein the determining further comprises swapping any two of the leaf nodes.

EC169) The system of EC167, wherein the determining further comprises flipping orientation of one of the internal nodes between horizontal and vertical orientations.

EC170) The system of EC167, wherein the determining further comprises performing simulated annealing on a plurality of candidate solutions each based on a respective binary tree.

EC171) The system of EC166, wherein the determining comprises assigning routes associated with respective arcs of the extracted model to respective ones of the communication pathways and wherein the assigning is in accordance with the context of the target wafer.

EC172) The system of EC171, wherein the assigning is in accordance with starting with relatively more constrained ones of the arcs.

EC173) The system of EC171, wherein the assigning is in accordance with a plurality of the communication pathways being associated with a single one of the arcs.

EC174) The system of EC171, wherein the assigning is in accordance with a solution to a graph coloring problem that is representative of intersections of the routes in the context of the target wafer.

EC175) The system of EC174, wherein the solution is obtainable via a saturated-degree technique.

EC176) The system of EC166, wherein the determining comprises assigning computations associated with respective nodes of the extracted model to respective portions of the plurality of logical processing elements in accordance with the respective physical locations.

EC177) The system of EC176 or EC214, wherein the determining comprises identifying a region of physically contiguous ones of the plurality of physical processing elements, cutting the identified region orthogonal to a boundary of the identified region into two sub-regions, evaluating each of the sub-regions with respect to a placement of a delay buffer, and responsive to the evaluating ascertaining that the placement is a better one for the delay buffer, indicating that the placement is a best placement for the delay buffer.

EC178) The system of EC177, wherein the cutting is in accordance with a binary search and application to four edges of the identified region.

EC179) The system of EC177, wherein the delay buffer is a particular one of a plurality of delay buffers and chosen from the plurality of delay buffers based on an order of largest to smallest.

EC180) The system of EC176, wherein the determining further comprises performing a first routing of all communication paths between a plurality of regions of the plurality of physical processing elements, evaluating a heatmap in accordance with the first routing, inserting obstacles responsive to the heatmap, and performing a second routing of all the communication paths.

EC181) The system of EC176, wherein the determining further comprises evaluating a wire cost based on Manhattan distance.

EC182) The system of EC181, wherein the wire cost accounts for bandwidth of communication between the computations.

EC183) The system of EC176, wherein the determining further comprises updating a placement tree associated with the assigning such that placement cost is unchanged.

EC184) The system of EC183, wherein the placement tree updating comprises exchanging branches of the placement tree that are in a same domain.

EC185) The system of EC145, EC211, EC213, or EC215, wherein the accelerator configuration information comprises a symbol table comprising a parameter tensor map indicating where each named tensor in the neural network description resides in respective memories of the plurality of processing elements.

EC186) The system of EC145, EC211, EC213, or EC215, wherein the accelerator configuration information comprises one or more indicators of expected runtime performance statistics.

EC187) The system of EC145, EC211, EC213, or EC215, wherein the determining comprises computing a number of arithmetic operations to be performed per each of the plurality of processing elements responsive to one input into the neural network description and the determining further comprises duplicating one or more copies of the extracted model onto the plurality of processing elements responsive to the number being less than a predetermined threshold.

EC188) The system of EC145, EC211, EC213, or EC215, wherein each of the plurality of processing elements comprises a respective router coupled to the fabric and enabled to forward packets in accordance with the communication pathways based at least in part on router configuration information retainable in the router.

EC189) The system of EC188, wherein the accelerator configuration information comprises respective instances of the router configuration information.

EC190) The system of EC189, wherein the determining comprises allocating particular ones of the plurality of processing elements to corresponding particular portions of the extracted model.

EC191) The system of EC190, wherein one of the respective instances comprises forwarding configuration information that is in accordance with results of the allocating.

EC192) The system of EC191, wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements.

EC193) The system of EC192, wherein the allocating is in accordance with the respective physical locations.

EC194) The system of EC145, EC211, EC213, or EC215, wherein each of the plurality of processing elements is enabled to forward the packets in accordance with the communication pathways based at least in part on respective processing element configuration information retainable in the respective processing element.

EC195) The system of EC194, wherein each of the plurality of processing elements comprises a respective one or more router configuration registers and the respective processing element configuration information comprises respective forwarding configuration settings for at least a portion of the respective router configuration registers.

EC196) The system of EC145, EC211, or EC213, wherein each of the plurality of processing elements comprises a respective compute element enabled to execute programmed instructions based at least in part on respective compute element configuration information retainable in the respective compute element.

EC197) The system of EC196, wherein the accelerator configuration information comprises respective instances of the respective compute element configuration information.

EC198) The system of EC197, wherein each of the plurality of compute elements comprises a respective one or more registers and the respective instances of the compute element configuration information comprise respective settings for at least a portion of the respective registers.

EC199) The system of EC197, wherein each of the plurality of compute elements is enabled to store programmed instructions for execution and the respective instances of the compute element configuration information comprise respective instruction code corresponding to the stored programmed instructions of each respective compute element.

EC200) The system of EC197, wherein the determining comprises matching an element of the extracted model with a corresponding element from a library of executable kernel modules, one of the respective instances comprises executable code associated with the corresponding element, and the executable code comprises instances of the programmed instructions.

EC201) The system of EC200, wherein each of the executable kernel modules is associated with a respective template code generator enabled to generate the executable code associated with the respective executable kernel module.

EC202) The system of EC201, wherein at least one of the template code generators is enabled to accept arguments specifying dimensions, measured in numbers of the plurality of processing elements, to generate the executable code for.

EC203) The system of EC200, wherein each of the executable kernel modules is associated with a respective cost model indicating any one or more of memory, bandwidth, and compute utilization used by the respective executable kernel module.

EC204) The system of EC200, wherein one or more of the executable kernel modules comprise a hand-written microcode element.

EC205) The system of EC200, wherein one or more of the executable kernel modules is associated with a respective utilization function that monotonically decreases with larger areas.

EC206) The system of EC200, wherein at least one of the executable kernel modules is associated with a performance model that is usable to determine a shape of a compute region for the at least one executable kernel module.

EC207) The system of EC200, wherein the element corresponds to a plurality of nodes in the extracted model.

EC208) The system of EC145, EC211, EC213, or EC215, wherein each of the plurality of processing elements is enabled to execute programmed instructions based at least in part on respective processing element configuration information retainable in the respective processing element.

EC209) The system of EC208, wherein each of the plurality of processing elements comprises a respective one or more registers and the accelerator configuration information comprises respective settings for at least a portion of the respective registers.

EC210) The system of EC208, wherein each of the plurality of processing elements is enabled to store programmed instructions for execution and the accelerator configuration information comprises respective instruction code corresponding to the stored programmed instructions of each respective processing element.

EC211) A system comprising:

means for extracting a model from a neural network description;

means for determining accelerator configuration information usable to configure a deep learning accelerator to provide a trained model that is in accordance with the extracted model;

means for evaluating one or more results of the means for determining in accordance with one or more predetermined cost criteria to produce one or more goal-evaluation metrics;

means for conditionally altering one or more meta-parameters that the determining is based at least in part on wherein the means for conditionally altering is dependent on at least one of the one or more goal-evaluation metrics being less than a respective predetermined threshold; and wherein the deep learning accelerator comprises a fabric and a plurality of processing elements enabled to communicate packets with each other via the fabric in accordance with a plurality of communication pathways identifiable by respective virtual channel identifiers.

EC212) The system of EC211, further comprising means for configuring the deep learning accelerator using the accelerator configuration information, means for providing training data to the configured deep learning accelerator, means for receiving from the configured deep learning accelerator feedback results, and means for repeating at least a portion of the determining in accordance with the feedback results.

EC213) A system comprising:

means for extracting a model from a neural network description;

means for determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers; and wherein the determining comprises computing delay buffers required to match delays for all convergent nodes of the extracted model and ascertaining routing to implement data communication in accordance with arcs of the extracted model.

EC214) A system comprising:

means for extracting a model from a neural network description;

means for determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein the plurality of processing elements is a plurality of logical processing elements, a target wafer comprises a plurality of physical processing elements each having a respective physical location in a context of the target wafer, and each of the plurality of logical processing elements has a correspondence to a respective one of the plurality of physical processing elements; and wherein the determining comprises assigning computations associated with respective nodes of the extracted model to respective portions of the plurality of logical processing elements in accordance with the respective physical locations.

EC215) A system comprising:

means for extracting a model from a neural network description;

means for determining accelerator configuration information usable to configure a deep learning accelerator to provide a trained model that is in accordance with the extracted model;

wherein the deep learning accelerator comprises a fabric and a plurality of processing elements enabled to communicate packets with each other via the fabric in accordance with a plurality of communication pathways identifiable by respective virtual channel identifiers;

wherein each of the plurality of processing elements comprises a respective compute element enabled to execute programmed instructions based at least in part on respective compute element configuration information retainable in the respective compute element;

wherein the accelerator configuration information comprises respective instances of the respective compute element configuration information; and wherein the determining comprises matching an element of the extracted model with a corresponding element from a library of executable kernel modules, one of the respective instances comprises executable code associated with the corresponding element, and the executable code comprises instances of the programmed instructions.

EC216) The system of EC214 or EC215, further comprising means for evaluating one or more results of the means for determining in accordance with one or more predetermined cost criteria to produce one or more goal-evaluation metrics, means for conditionally altering one or more meta-parameters that the determining is based at least in part on wherein the means for conditionally altering is dependent on at least one of the one or more goal-evaluation metrics being less than a respective predetermined threshold, and means for repeating at least a portion of the determining in accordance with the altered meta-parameters.

EC217) A method comprising:

analyzing a neural network model to determine matches to a predetermined library of executable modules;

determining delay buffers required to match delays for all convergent nodes of the neural network model;

allocating physical processing elements of a target wafer to the matched executable modules, the allocating in accordance with physical locations of the physical processing elements in the context of the target wafer;

devising routing to implement data communication in accordance with arcs of the neural network model, wherein each arc is separately routable;

assigning a virtual channel to each of the arcs in accordance with a predetermined maximum number of virtual channels;

evaluating results of the determining, the allocating, the devising, and the assigning in accordance with various predetermined cost criteria to produce one or more goal-evaluation metrics; and in response to one or more of the goal-evaluating metrics being less than a respective predetermined threshold, altering one or more meta-parameters that any one or more of the determining, the allocating, the devising, and the assigning are dependent upon and then repeating one or more of the determining, the allocating, the devising, and the assigning in accordance with the altered meta-parameters.

EC218) The method of EC217, further comprising, in response to all the goal-evaluating metrics being equal to or greater than the respective predetermined thresholds, providing configuration information in accordance with results of any one or more of the determining, the allocating, the devising, and the assigning to a deep learning hardware accelerator comprising an instance of a manufactured wafer compatible with target wafer.

Selected Embodiment Details

Embodiments relating to neural network training and inference, comprising deep learning accelerator hardware elements and software elements are described herein (see, e.g., FIGS. 1-4C and section "Deep Learning Accelerator Overview"). The deep learning accelerator comprises hardware processing elements (see, e.g., FIGS. 5-8 and sections "Fabric Overview" and "Processing Element: Compute Element and Router"). The deep learning accelerator implements and/or uses various techniques such as tasks, including task initiation (see, e.g., FIGS. 9A-9B and section "Task Initiation" and section "Example Workload Mapping"), instruction formats (see, e.g., FIGS. 10-12 and section "Instruction Formats"), and wavelet processing (see, e.g., FIGS. 13A-16 and section "Wavelets"). Various software elements enable using the deep learning accelerator to produce a trained model. DLA software architecture concepts relating to producing a trained model via a DLA are described (see, e.g., FIGS. 17A-B, 18, and 19; and section "DLA Software Architecture Concepts"). An example DLA software architecture embodiment is described (see, e.g., FIGS. 20-45 and section "DLA Software Architecture Example Embodiment"). Sizing and placement of delay buffers is described (see, e.g., FIGS. 46A-D and section "DLA Software Architecture—Delay Buffers"). Determining routes between kernels is described (see, e.g., FIGS. 47A-E and section "DLA Software Architecture—Routes Between Kernels"). Assigning colors to routes is described (see, e.g., FIGS. 47F-G and section "DLA Software Architecture—Color Assignment"). The deep learning accelerator is contemplated in various embodiments (see, e.g., section "Other Embodiment Details"). The deep learning accelerator is variously implementable (see, e.g., section "Example Implementation Techniques").

Deep Learning Accelerator Overview

FIG. 1 illustrates selected details of an embodiment of a system for neural network training and inference, using a deep learning accelerator, as Neural Network System 100. Conceptually a neural network is trained using the deep learning accelerator. One or more results of the training (e.g., weights) are then used for inferences. For example, the training comprises mapping neurons of the neural network onto PEs of the deep learning accelerator. Then training data is applied to the PEs. The PEs process the training data (e.g., via forward, delta, and chain passes) and update weights until the training is complete. Then the weights are used for inference.

Referring to the figure, DLA 120 comprises FPGAs 121 and PEs 122, enabled to communicate with each other, as illustrated by Coupling 123. Placement Server(s) 150, (comprising CPUs 151 and CRM 152) is coupled to Connection Server(s) 160 (comprising CPUs 161, CRM 162, and NICs 164) via LAN 111. Connection Server(s) 160 is enabled to communicate with FPGAs 121 via NICs 164 and 100 Gb 112. Autonomous Vehicle 130 comprises CPUs 131, CRM 132, IEs 133, and Camera 135. Cell Phone 140 comprises CPUs 141, CRM 142, IEs 143, and Camera 145.

Internet 180 provides for coupling (not explicitly illustrated) between any combination of Placement Server(s) 150, Connection Server(s) 160, Autonomous Vehicle 130, and/or Cell Phone 140, according to various embodiments and/or usage scenarios.

Dashed-arrow Placements 113 conceptually indicates placement information communicated from Placement Server(s) 150 to PEs 122 (e.g., via LAN 111, Connection Server(s) 160/NICs 164, 100 Gb 112, FPGAs 121, and Coupling 123). In some embodiments and/or usage scenarios, Placements 113 is implicit, reflected in initialization information provided to router elements of PEs 122 and compute elements of PEs 122. In some embodiments and/or usage scenarios, a portion of initialization information of Placements 113 is provided to FPGAs 121 to configure elements of FPGAs 121 for operation with PEs 122.

Dashed-arrow Weights 114 and dashed-arrow Weights 115 conceptually indicate weight information communicated from PEs 122 respectively to Autonomous Vehicle 130 and Cell Phone 140 (e.g., via Coupling 123, FPGAs 121, 100 Gb 112, Connection Server(s) 160/NICs 164 and Internet 180). In some embodiments and/or usage scenarios, the weight information is any one or more of all or any portions of weight information as directly produced as a result of training, a sub-sampling thereof, a quantization thereof, and/or other transformations thereof.

DLA 120 is enabled to perform training of neural networks, such as by computing weights in response to placement information and training information received via 100 Gb 112. DLA 120 is further enabled to, upon training completion, provide the weights as results via 100 Gb 112. The weights are then usable for inference, such as in Autonomous Vehicle 130 and/or in Cell Phone 140. PEs 122 comprises a relatively large number of PEs (e.g., 10,000 or more) each enabled to independently perform routing and computations relating to training. In some embodiments and/or usage scenarios, PEs 122 is implemented via wafer-scale integration, such as respective pluralities of PEs implemented on respective dice of a single wafer. FPGAs 121 is enabled to interface PEs 122 to information provided via 100 Gb 112. The interfacing includes conversion to/from modified Ethernet frames from/to Wavelets, as communicated on Coupling 123.

Placement Server(s) 150 is enabled to programmatically determine placements of neurons (e.g., as indicated by Placements 113) via one or more placement programs. The placement programs are stored in CRM 152 and executed by CPUs 151. The placement information is communicated to Connection Server(s) 160 via LAN 111. An example of a placement is a mapping of logical neurons of a neural network onto physical memory and execution hardware resources (e.g., PEs 122).

Connection Server(s) 160 is enabled to communicate with FPGAs 121 and indirectly with PEs 122 via FPGAs 121/ Coupling 123, via NICs 164 and programmed control thereof via driver programs. In various embodiments and/or usage scenarios, the communication comprises placement information (e.g., from Placement Server(s) 150), training information (e.g., from sources not illustrated but accessible via Internet 180) and/or results of training (e.g., weights from PEs 122). The driver programs are stored in CRM 162 and executed by CPUs 161.

Autonomous Vehicle 130 is enabled to use Weights 114 to perform inferences using IEs 133 as programmatically controlled and/or assisted by CPUs 131 executing programs stored in CRM 132. The inferences are optionally and/or selectively performed using information obtained from Camera 135. For example, a car is operable as an autonomous vehicle. The car comprises cameras enabled to provide video to an inference engine. The inference engine is enabled to recognize objects related to navigating the car, such as traffic lanes, obstructions, and other objects. The car is enabled to navigate using results of the object recognition. Any combination of the providing, the recognizing, and the navigating are controlled and/or performed at least in part via one or more CPUs executing programs stored in a CRM.

Cell Phone 140 is enabled to use Weights 115 to perform inferences using IEs 143 as programmatically controlled and/or assisted by CPUs 141 executing programs stored in CRM 142. The inferences are optionally and/or selectively performed using information obtained from Camera 145. For example, the cell phone is operable to post tagged photos on a social networking web site. The cell phone comprises a camera enabled to provide image data to an inference engine. The inference engine is enabled to tag objects (e.g., by type such as 'cat', 'dog', and so forth, or by name such as 'Bob', 'Mary', and so forth) in the image. The cell phone is enabled to post the image and results of the tagging to the social networking web site. Any combination of the providing, the tagging, and the posting are controlled and/or performed at least in part via one or more CPUs executing programs stored in a CRM.

In various embodiments and/or usage scenarios, all or any portions of weight information determined via a deep learning accelerator is post-processed outside of the accelerator before inference usage. For example, all or any portions of information represented by Weights 114 and/or Weights 115, is processed in whole or in part by Placement Server(s) 150 before inference usage by Autonomous Vehicle 130 and/or Cell Phone 140. In various embodiments and/or usage scenarios, an example of post-processing comprises quantizing Weights 114 and/or Weights 115 (e.g., converting from a floating-point number format to a fixed-point number format). In various embodiments and/or usage models, Camera 135 and Camera 145 are respective examples of sensors that provide input to IEs 133 and IEs 143. Other examples of sensors are location sensors, orientation sensors, magnetic sensors, light sensors, and pressure sensors.

CPUs 151 comprises one or more CPUs that are compatible with respective instruction set architectures. CPUs 151 is enabled to fetch and execute instructions from CRM 152 in accordance with the instruction set architectures. CPUs 161 comprises one or more CPUs that are compatible with respective instruction set architectures. CPUs 161 is enabled to fetch and execute instructions from CRM 162 in accordance with the instruction set architectures. In some embodiments, at least one of the instruction set architectures of CPUs 151 is compatible with at least one of the instruction set architectures of CPUs 161.

CPUs 131 comprises one or more CPUs that are compatible with respective instruction set architectures. CPUs 131 is enabled to fetch and execute instructions from CRM 132 in accordance with the instruction set architectures. CPUs 141 comprises one or more CPUs that are compatible with respective instruction set architectures. CPUs 141 is enabled to fetch and execute instructions from CRM 142 in accordance with the instruction set architectures. In some embodiments, at least one of the instruction set architectures of CPUs 131 is compatible with at least one of the instruction set architectures of CPUs 141. In some embodiments, any one or more of CPUs 151, CPUs 161, CPUs 131, and CPUs 141 have instruction set architectures that are compatible with each other.

In some embodiments and/or usage scenarios, at least a respective portion of each of CRM 152 and CRM 162 CRM 132, and CRM 142, is non-volatile and comprised of any one or more of flash memory, magnetic memory, optical memory, phase-change memory, and other non-volatile memory technology elements.

In various embodiments and/or usage scenarios, IEs 133 and/or IEs 143 comprise one or more inference engines enabled to use weight information as determined by DLA 120 (and indicated conceptually by Weights 114 and/or Weights 115). In various embodiments and/or usage scenarios, IEs 133 operates in conjunction with and/or under control of programs executed by CPUs 131 and stored in CRM 132. In various embodiments and/or usage scenarios, IEs 143 operates in conjunction with and/or under control of programs executed by CPUs 141 and stored in CRM 142. In various embodiments and/or usage scenarios, all or any portions of IEs 133 and/or IEs 143 are implemented via various combinations of HW and/or SW techniques. In some embodiments, all or any portions of functionality provided by IEs 133 and/or IEs 143 is implemented using techniques such as implemented by and/or associated with DLA 120. In various embodiments and/or usage scenarios, all or any portions of IEs 133 and/or IEs 143 are variously implemented via techniques comprising various combinations of conventional CPUs, conventional GPUs, conventional DSPs, conventional FPGAs, and specialized hardware.

In various embodiments, 100 Gb 112, is variously a 100 Gb Ethernet coupling for sending standard Ethernet frames, a 100 Gb Ethernet coupling for sending modified Ethernet frames, a 100 GB modified Ethernet coupling for sending modified Ethernet frames, a 100 Gb serial coupling of other-than Ethernet technology, or some other relatively high-speed serial coupling.

In some embodiments and/or usage scenarios, Coupling 123 communicates information as wavelets.

In various embodiments, LAN 111 is implemented using techniques such as Ethernet, Fibre Channel, and/or other suitable interconnection technologies.

In some embodiments and/or usage scenarios, Placement Server(s) 150 and Connection Server(s) 160 are implemented and/or operated as a combined element (e.g., sharing CPU, CRM, and/or NIC resources), as illustrated conceptually by Combined Server(s) 110. In some embodiments and/or usage scenarios, Placement Server(s) 150 and Connection Server(s) 160 are coupled via Internet 180 rather than (or in addition to) LAN 111.

FIG. 2 illustrates selected details of an embodiment of software elements associated with neural network training and inference, using a deep learning accelerator, as Neural Network Software 200. Placement Server(s) SW 210 comprises Neuron to PE Mapping SW 212, as well as other elements not illustrated, according to embodiment. In various embodiments and/or usage scenarios, all or any portions of Placement Server(s) SW 210 is stored in CRM 152 and executable by CPUs 151 of FIG. 1. One or more programs of Neuron to PE Mapping SW 212 enable determining placements of neurons of a neural network onto specific PEs of PEs 122 of FIG. 1.

Connection Server(s) SW 220 comprises 100 Gb NIC Driver 224, Training Info Provider SW 225, and Weight Receiver SW 226, as well as other elements not illustrated, according to embodiment. In various embodiments and/or usage scenarios, all or any portions of Connection Server(s) SW 220 is stored in CRM 162 and executable by CPUs 161 of FIG. 1. One or more programs of 100 Gb NIC Driver 224 enable communication between Connection Server(s) 160 and DLA 120, both of FIG. 1 (via NICs 164 and 100 Gb 112, also of FIG. 1). One or more programs of Training Info Provider SW 225 enable determination of training information for application under control of 100 Gb NIC Driver 224 for communication to DLA 120 of FIG. 1 (via NICs 164 and 100 Gb 112). In various embodiments and/or usage scenarios, the training information is variously determined from, e.g., non-volatile storage accessible to Connection Server(s) 160 and/or Internet 180, both of FIG. 1. One or more programs of Weight Receiver SW 226 enable receiving weight information under control of 100 Gb NIC Driver 224 as determined by DLA 120 (via NICs 164 and 100 Gb 112).

In various embodiments and/or usage scenarios, Misc SW on FPGAs 250 conceptually represents SW executed by one or more CPUs comprised in FPGAs 121 of (FIG. 1). The CPUs of the FPGAs are, e.g., hard-coded during manufacturing of one or more elements of FPGAs 121, and/or soft-coded during initialization of one or more elements of FPGAs 121. In various embodiments and/or usage scenarios, all or any portions of Misc SW on FPGAs 250 and/or a representation thereof is stored in non-volatile memory comprised in FPGAs 121 and/or accessible to Connection Server(s) 160. In various embodiments and/or usage scenarios, Misc SW on FPGAs 250 enables performing various housekeeping functions, such as relating to initialization and/or debugging of PEs 122 of FIG. 1.

In various embodiments and/or usage scenarios, Task SW on PEs 260 conceptually represents distributed SW executed as tasks on various PEs of PEs 122. In various embodiments and/or usage scenarios, all or any portions of Task SW on PEs 260 and/or a representation thereof is stored in non-volatile memory comprised in PEs 122 and/or accessible to Connection Server(s) 160. In various embodiments and/or usage scenarios, Task SW on PEs 260 enables performing processing of training data such as to determine weights of a neural network (e.g., via forward, delta, and chain passes).

Autonomous Vehicle SW 230 comprises Video Camera SW 232, Inference Engine(s) SW 233, and Navigating SW 234, as well as other elements not illustrated, according to embodiment. In various embodiments and/or usage scenarios, all or any portions of Autonomous Vehicle SW 230 is stored in CRM 132 and executable by CPUs 131 of FIG. 1. One or more programs of Video Camera SW 232 enable controlling and/or operating Camera 135 of FIG. 1 to provide video information to Inference Engine(s) SW 233. One or more programs of Inference Engine(s) SW 233 enable controlling and/or operating IEs 133 of FIG. 1 to determine navigational information, such as objects to avoid and/or traffic lanes to follow, from the video information.

One or more programs of Navigating SW 234 enable navigating Autonomous Vehicle SW 230 in response to the navigational information.

Cell Phone SW 240 comprises Still Camera SW 242, Inference Engine(s) SW 243, Posting SW 244, as well as other elements not illustrated, according to embodiment. In various embodiments and/or usage scenarios, all or any portions of Cell Phone SW 240 is stored in CRM 142 and executable by CPUs 141 of FIG. 1. One or more programs of Still Camera SW 242 enable controlling and/or operating Camera 145 of FIG. 1 to provide still image information to Inference Engine(s) SW 243. One or more programs of Inference Engine(s) SW 243 enable controlling and/or operating IEs 143 of FIG. 1 to determine tag information from the still image information. One or more programs of Posting SW 244 enable posting to a social networking web site in response to the still image information and/or the tag information.

In various embodiments and/or usage scenarios, any one or more of SW collections Placement Server(s) SW 210, Connection Server(s) SW 220, Autonomous Vehicle SW 230, and/or Cell Phone SW 240 optionally and/or selectively comprise one or more operating system elements, e.g., one or more real-time operating systems, one or more non-real-time operating systems, and/or one or more other control programs to coordinate elements of each respective SW collection.

FIG. 3 illustrates selected details of an embodiment of processing associated with training a neural network and performing inference using the trained neural network, using a deep learning accelerator, as Neural Network Training/Inference 300. As illustrated, neurons of the neural network are placed, e.g., allocated and/or associated with specific PE resources in action 310. Then FPGA resources are initialized in preparation for training of the neural network in action 320. Then the PE resources are initialized in preparation for training of the neural network in action 330.

After the FPGA resources and PE resources are initialized in preparation for the training, training data is applied to the PEs in action 340. The PE resources process the training data in action 350. Then a check is made to determine if training is complete, e.g., because application of the training data is complete and/or one or more completion criteria are met (such as an inference error below a predetermine bound) in action 360. If not, then flow passes back to action 340 for application of further training data. In some scenarios, the training does not complete and in some embodiments, control instead passes to another action (not illustrated) to enable changing, for example, hyperparameters of the neural network (e.g., any one or more of: adding layers of neurons, removing layers of neurons, changing connectivity between neurons, changing the batch size, and changing the learning rule). The changed neural network is then trained in accordance with actions 310, 320, 330, 340, 350, and 360.

If training is complete, then flow continues to provide weights that are results of the training for use in inferences in 370. In some embodiments and/or usage scenarios, the weights are quantized, e.g., transformed to an integer data format. In some embodiments and/or usage scenarios, the integer data format is a reduced precision number format (e.g., 8-bit or 16-bit). The weights are then provided to one or more inference engines and used to make inferences in action 380.

In various embodiments and/or usage scenarios, the inference engines correspond to one or more inference applications, e.g., text translation, optical character recognition, image classification, facial recognition, scene recognition for a self-driving car, speech recognition, data analysis for high energy physics, and drug discovery.

In various embodiments and/or usage scenarios, the PE resources correspond, e.g., to PEs 122 of FIG. 1, and the FPGAs resources correspond, e.g., to FPGAs 121 of FIG. 1.

In various embodiments and/or usage scenarios, any one or more of all or any portions of actions of Neural Network Training/Inference 300 are performed by and/or related to all or any portions of any one or more elements of Neural Network System 100 of FIG. 1 and/or Neural Network Software 200 of FIG. 2. For example, all or any portions of action 310 are performed by Placement Server(s) 150 via execution of Neuron to PE Mapping SW 212. For another example, all or any portions of action 320 are performed by Placement Server(s) 150 via execution of Neuron to PE Mapping SW 212. For another example, all or any portions of action 330 are performed by Placement Server(s) 150 via execution of Neuron to PE Mapping SW 212. For another example, all or any portions of action 330 are performed by PEs 122 via execution of Task SW on PEs 260. For another example, all or any portions of action 340 are performed by Connection Server(s) 160 via execution of Training Info Provider SW 225. For another example, all or any portions of action 350 are performed by PEs 122 via execution of Task SW on PEs 260. For another example, all or any portions of action 350 are performed by Combined Server(s) 110, Placement Server(s) 150 and/or Connection Server(s) 160. For another example, all or any portions of 370 are performed by Connection Server(s) 160 via execution of Weight Receiver SW 226. For another example, all or any portions of action 370 are performed by FPGAs 121 via execution of Misc SW on FPGAs 250. For another example, all or any portions of 380 are performed by IEs 133 such as under control of Inference Engine(s) SW 233. For another example, all or any portions of action 380 are performed by IEs 143 such as under control of Inference Engine(s) SW 243.

In various embodiments and/or usage scenarios, any one or more of all or any portions of actions of Neural Network Training/Inference 300 are performed in conjunction with communicating information between various elements of Neural Network System 100 of FIG. 1. For example, various actions of Neural Network Training/Inference 300 are performed at least in part via NICs 164 and 100 Gb 112 communicating information between Connection Server(s) 160 and FPGAs 121. For another example, various actions of Neural Network Training/Inference 300 are performed in conjunction with FPGAs 121 and Coupling 123 communicating information between Connection Server(s) 160 and PEs 122. For another example, various actions of Neural Network Training/Inference 300 performed in conjunction with any one or more of Placement Server(s) 150, Connection Server(s) 160, Autonomous Vehicle 130, and Cell Phone 140 communicating information as enabled at least in part by Internet 180.

Figure 4A:
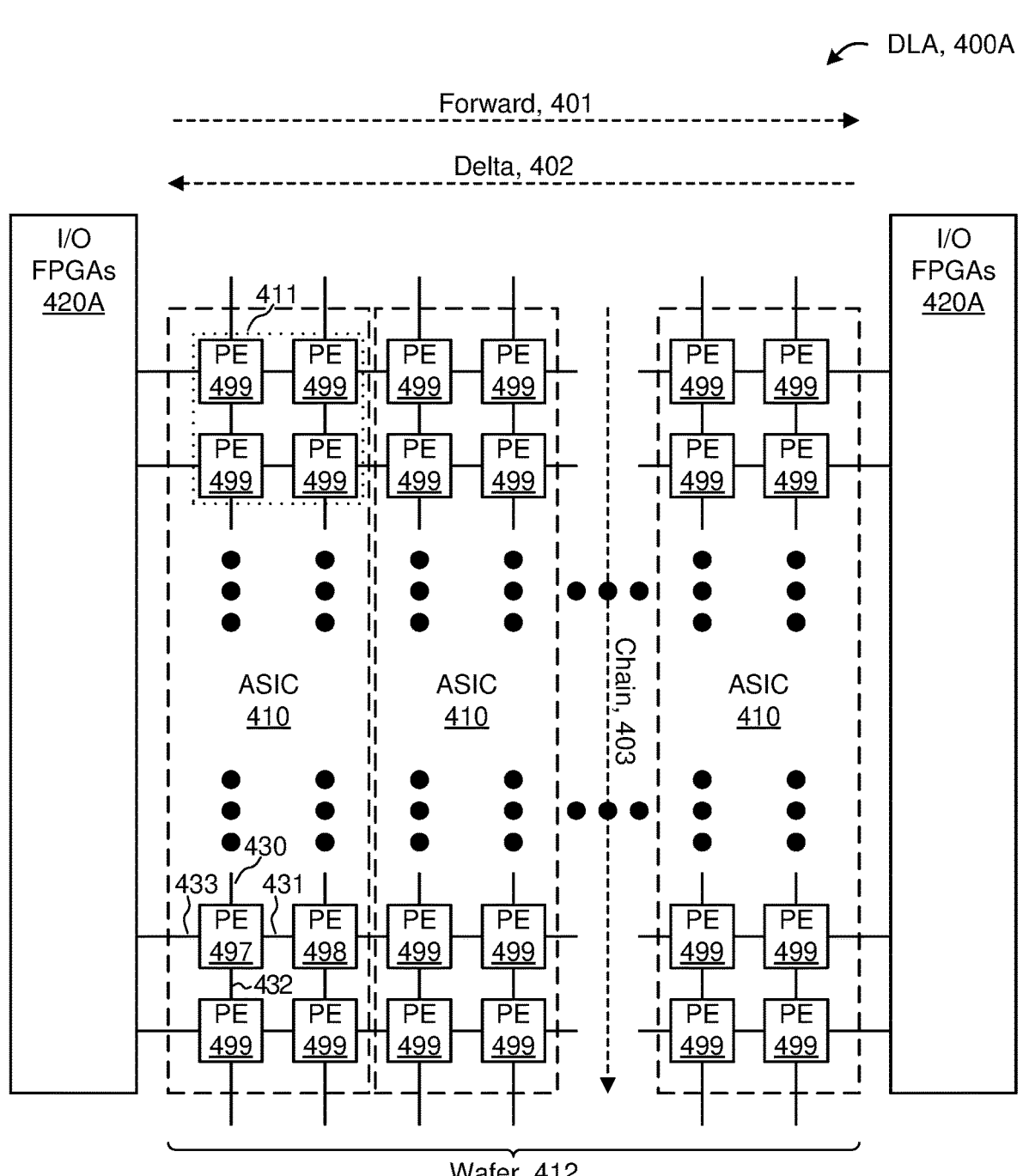
FIG. 4A illustrates selected details of an embodiment of a deep learning accelerator.

FIG. 4A illustrates selected details of an embodiment of a deep learning accelerator as DLA 400A. Each of PE 499 elements has couplings to other of PE 499 elements. Two of the PE elements (PE 497 and PE 498) are illustrated with unique identifiers and are otherwise respectively identical to instances of PE 499. PE 497 is illustrated with identifiers for each of four couplings (North coupling 430, East coupling 431 with PE 498, and South coupling 432) to others of the PEs and one of the I/O FPGAs (West coupling 433), but is otherwise identical to others of the PE elements illustrated. In some embodiments and/or usage scenarios, the couplings are logical and/or physical. In various embodiments and/or usage scenarios, the couplings are usable to communicate wavelets, backpressure information, or both. In various embodiments and/or usage scenarios, all or any portions of the physical couplings are to physically adjacent PEs. In some embodiments and/or usage scenarios, the PEs are physically implemented in a 2D grid. In some embodiments and/or usage scenarios, the PEs are physically implemented in a 2D grid of aligned rectangles, and physically adjacent PEs correspond to PEs sharing a horizontal boundary (North/South PEs with respect to each other) and PEs sharing a vertical boundary (East/West PEs with respect to each other).

In some embodiments and/or usage scenarios, an array of identical instances of a same ASIC is formed on a wafer, and each of the same ASICs comprises a plurality of identical instances of a same PE (e.g., PE 499), forming a wafer (e.g., Wafer 412) usable in wafer-scale integration techniques. Unless indicated to the contrary, references herein to a "wafer" (including to Wafer 412) are applicable to embodiments of a whole or substantially whole wafer as well as to embodiments of a significant portion of a wafer. In some embodiments and/or usage scenarios, one or more peripheral portions of the PEs are coupled to I/O FPGAs 420A. Example ASICs are illustrated as ASIC 410, comprising a column-organized section of PEs (replicated, e.g., in a one-dimensional fashion to form a wafer), and ASIC 411, comprising a square-organized section or a rectangular-organized section of PEs (replicated, e.g., in a two-dimensional fashion to form a wafer). Other organizations of ASICs on a wafer are contemplated.

In some embodiments and/or usage scenarios, neurons associated with layers in a neural network are generally placed on PE 499 elements in a left to right fashion, with earlier layers (e.g., the input layer) on the left and subsequent layers (e.g., the output layer) on the right. Accordingly, data flow during training is illustrated conceptually as dashed-arrows Forward 401, Delta 402, and Chain 403. During Forward 401, stimuli are applied to the input layer and activations from the input layer flow to subsequent layers, eventually reaching the output layer and producing a forward result. During Delta 402, deltas (e.g., differences between the forward result and the training output data) are propagated in the backward direction. During Chain 403, gradients are calculated based on the deltas (e.g., with respect to the weights in the neurons) as they are generated during Delta 402. In some embodiments and/or usage scenarios, processing for Delta 402 is substantially overlapped with processing for 403.

In some embodiments and/or usage scenarios, DLA 400A is an implementation of DLA 120 of FIG. 1. In some embodiments and/or usage scenarios, individual PE 499 elements correspond to individual PEs of PEs 122 of FIG. 1. In some embodiments and/or usage scenarios, each ASIC 410 element or alternatively each ASIC 411 element corresponds to all or any portions of PEs of PEs 122 implemented as individual integrated circuits. In some embodiments and/or usage scenarios, each ASIC 410 element or alternatively each ASIC 411 element corresponds to (optionally identical) portions of PEs 122 implemented via respective dice of a wafer. In some embodiments and/or usage scenarios, I/O FPGAs 420A elements collectively correspond to FPGAs 121 of FIG. 1.

In some embodiments and/or usage scenarios, the placement of neurons (e.g., associated with layers in a neural network) onto PE 499 elements is performed in whole or in part by all or any portions of Placement Server(s) SW 210 of FIG. 2.

Figure 4B:
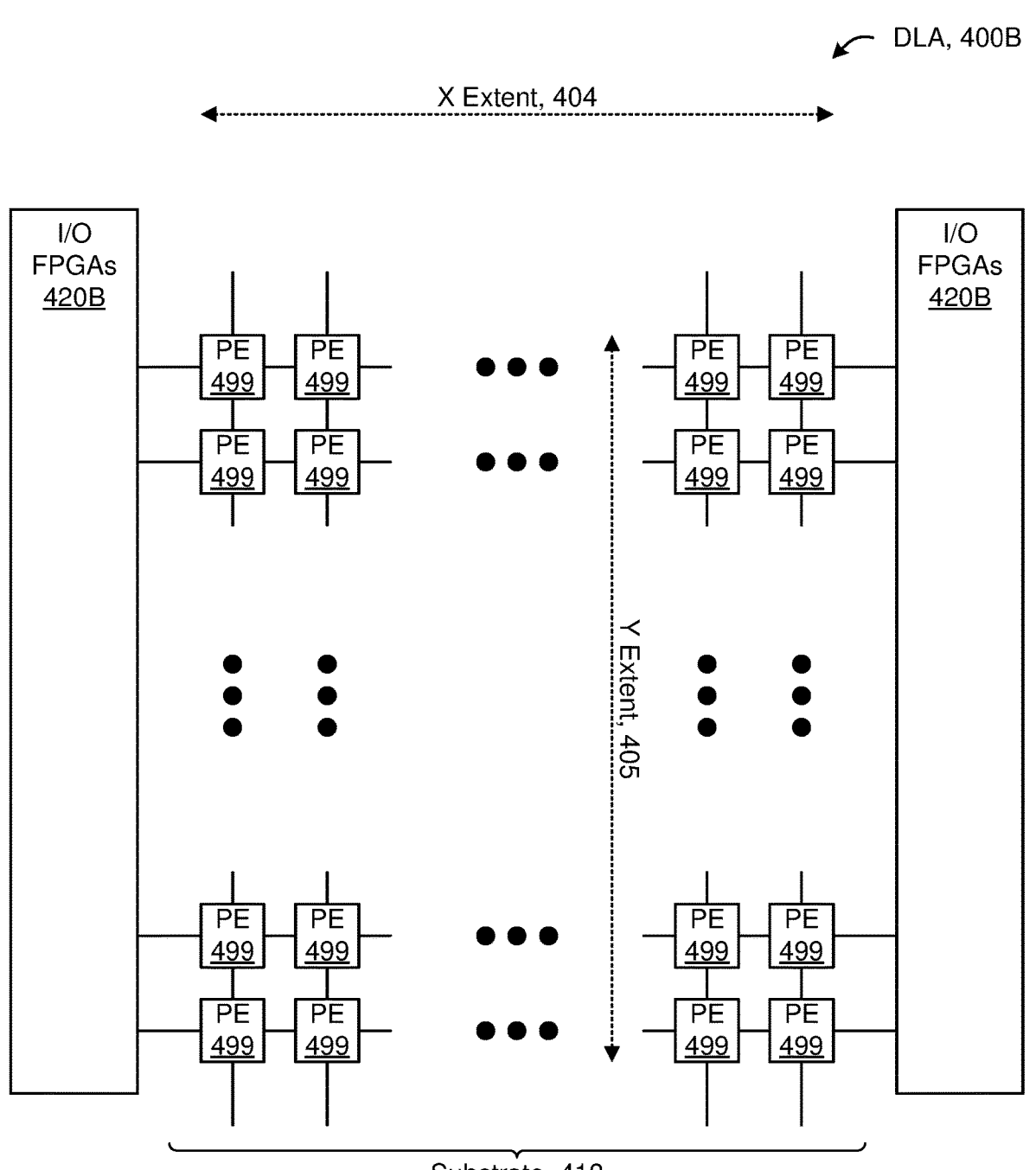
FIG. 4B illustrates selected details of a first embodiment of a scaled compute fabric for a deep learning accelerator.

FIG. 4B illustrates selected details of a first embodiment of a scaled compute fabric for a deep learning accelerator as DLA 400B. DLA 400B comprises an array of instances of PE 499 as Substrate 413. DLA 400B further comprises instances of I/O FPGAs 420B that one or more peripheral portions of the PEs are coupled to. As in FIG. 4A, each of PE 499 elements has couplings to at least some other of PE 499 elements. Couplings between the PEs are, in various embodiments, similar or identical in nature to the couplings between the PEs of FIG. 4A. The individual PEs are, in various embodiments, physically and/or logically implemented similarly to or identically to the PEs of FIG. 4A; however, X-Extent 404 and Y-Extent 405 vary according to embodiment. Varying the X-Extent and the Y-Extent according to embodiment enables scaling up (or down) compute capacity and storage capacity in tandem, enabling various price/performance implementations. For a first example, X-Extent 404 is 700, corresponding to 700 PEs in the X dimension, and Y-Extent 405 is 700, corresponding to 700 PEs in the Y dimension. Thus, in the first example, there are 490,000 PEs. For a second example, X-Extent 404 is 1750, corresponding to 1750 PEs in the X dimension, and Y-Extent 405 is 1750, corresponding to 1750 PEs in the Y dimension. Thus, in the second example, there are 3,062,500 PEs. Other examples have differing X- and Y-Extents.

In various embodiments, Substrate 413 comprises any one or more of an entire wafer, a portion of a wafer, a single ASIC, a plurality of ASICs, a plurality of dice, a plurality of 3D-stacked dice, and a PCB comprising one or more of the foregoing. For a first example, Substrate 413 comprises a portion of a wafer corresponding to a largest rectangle, according to physical granularity of the PEs, fitting inside an entire substantially circular wafer. For a second example Substrate 413 comprises N by M ASICs coupled via a PCB, each ASIC comprising A by B PEs. Thus, in the second example, the X-Extent is N times A, the Y-Extent is M times B, and there are N times A times M times B PEs.

In some embodiments of a scaled compute fabric for a deep learning accelerator (such as illustrated by FIG. 4B), the PEs are identical to the PEs of FIG. 4A, as indicated by the like element identifiers of the PEs (PE 499) in FIG. 4A and FIG. 4B. In some embodiments (not illustrated), the PEs of FIG. 4B are variations on the PEs of FIG. 4A. For example, the PEs of FIG. 4B have a different amount of memory than the PEs of FIG. 4A. For another example, the PEs of FIG. 4B comprise differing coupling technology than the PEs of FIG. 4A. For yet another example, the PEs of FIG. 4B are implemented to use more power than the PEs of FIG. 4A, enabling, e.g., operation at a higher frequency. For yet another example, the PEs of FIG. 4B are implemented to use less power than the PEs of FIG. 4A, restricting, e.g., operation to a lower frequency.

In some embodiments and/or usage scenarios, DLA 400B is an implementation of DLA 120 of FIG. 1. In some embodiments and/or usage scenarios, individual PE 499 elements correspond to individual PEs of PEs 122 of FIG. 1. In some embodiments and/or usage scenarios, I/O FPGAs 420B elements collectively correspond to FPGAs 121 of FIG. 1.

In a first specific example of an embodiment of a scaled compute fabric for a deep learning accelerator, PEs are arranged and interconnected similar to either of FIG. 4A or FIG. 4B, and the PEs are implemented with more memory than the PEs of FIG. 4A. In some circumstances, embodiments in accordance with the first specific example enable higher performance (albeit at a higher cost) than embodiments in accordance with either of FIG. 4A or FIG. 4B. In some conditions, the higher performance is enabled, e.g., by increased local storage of weights, such as in a context of larger neural networks.

In a second specific example of an embodiment of a scaled compute fabric for a deep learning accelerator, PEs are arranged and interconnected similar to either of FIG. 4A or FIG. 4B, and there are fewer PEs than in either FIG. 4A or FIG. 4B. In some circumstances, embodiments in accordance with the second specific example enable lower cost (albeit at a lower performance) than embodiments in accordance with either of FIG. 4A or FIG. 4B. In some conditions, the lower cost is enabled by using a smaller wafer due to fewer PEs.

In a third specific example of an embodiment of a scaled compute fabric for a deep learning accelerator, PEs are arranged and interconnected similar to either of FIG. 4A or FIG. 4B, the PEs are implemented with more memory than the PEs of FIG. 4A, and there are fewer PEs than in either FIG. 4A or FIG. 4B. In some circumstances, embodiments in accordance with the third specific example enable either of lower cost or higher performance, depending on computation versus storage requirements for a particular application. In some conditions, the lower cost is enabled by reducing the number of PEs so that even with the larger memory using a smaller wafer is possible. In some conditions, the higher performance is enabled for neural networks with more weights than simultaneously storable in the deep learning accelerator without the larger memory.

Figure 4C:
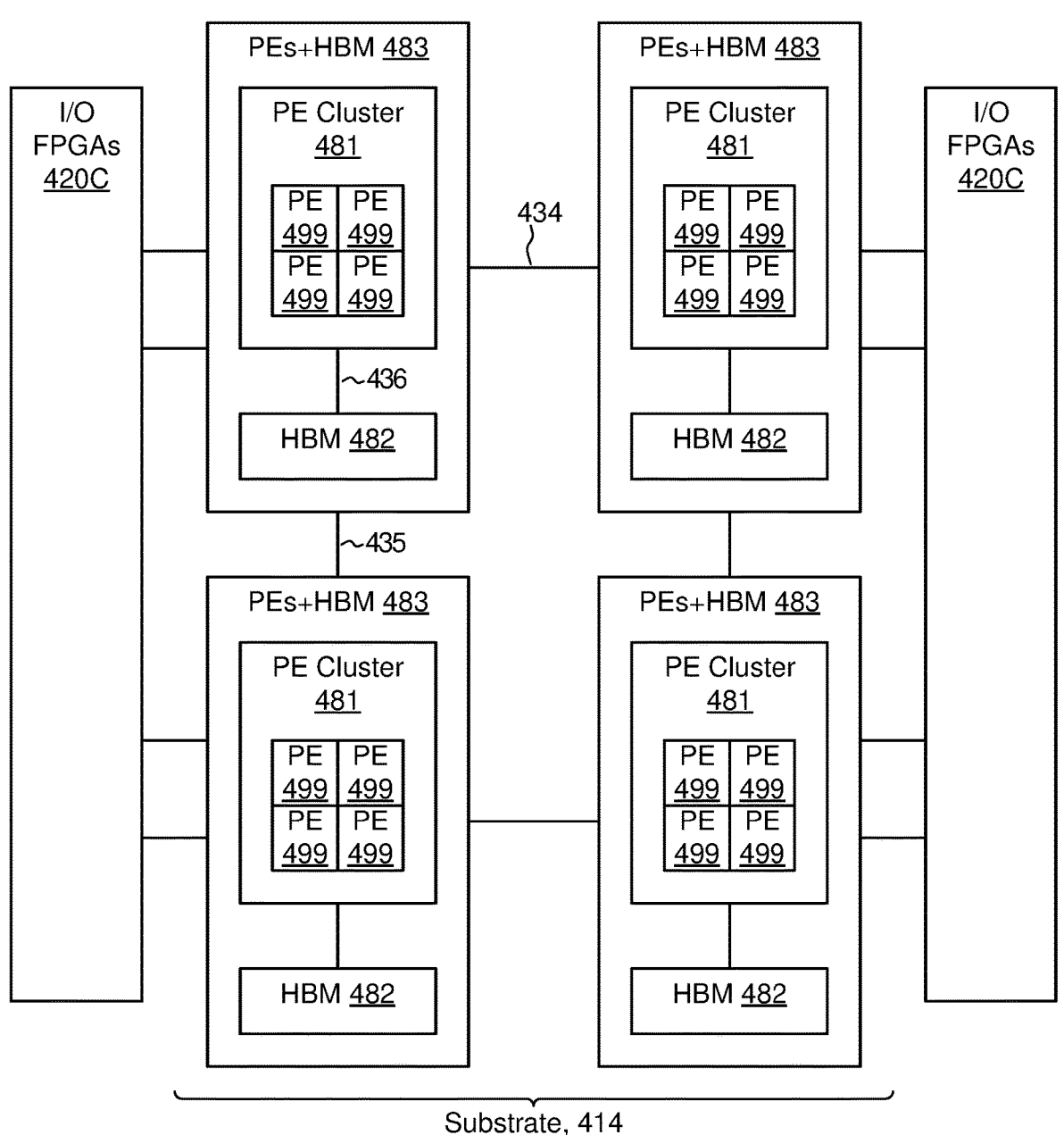
FIG. 4C illustrates selected details of a second embodiment of a scaled compute fabric for a deep learning accelerator.

FIG. 4C illustrates selected details of a second embodiment of a scaled compute fabric for a deep learning accelerator as DLA 400C. DLA 400C comprises an array of instances of PEs+HBM 483 (for clarity illustrated as a two by two array) as Substrate 414. DLA 400C further comprises instances of I/O FPGAs 420C that one or more peripheral portions of the instances of PEs+HBM 483 are coupled to. Each of the PEs+HBM 483 instances has couplings to at least some others of the PEs+HBM 483 elements, as illustrated conceptually by (representative) Horizontal coupling 434 and (representative) Vertical coupling 435. PEs+HBM 483 comprises PE Cluster 481 coupled to HBM 482 as illustrated conceptually by (representative) PE Cluster and HBM coupling 436. Each of the PEs of PE Cluster 481 has shared access to HBM 482 via PE Cluster and HBM coupling 436. PE Cluster 481 comprises an array of instances of PE 499 (for clarity illustrated as a two by two array). The individual PEs are, in various embodiments, physically and/or logically implemented similarly to or identically to the PEs of FIG. 4A.

Within an instance of PE Cluster 481, PE 499 elements are coupled to each other similarly or identically in nature to the PEs of FIG. 4A. The couplings between the PEs enable communication of wavelets, backpressure information, or both, as in FIG. 4A. The couplings between the instances of PEs+HBM 483 (e.g. via Horizontal coupling 434 and/or Vertical coupling 435) enable communication of wavelets between the instances of PEs+HBM 483 and/or on behalf of the PEs comprised therein. In some embodiments, one or more formats of wavelets communicated via the couplings between the instances of PEs+HBM 483 are similar to or identical to one or more formats of wavelets communicated via the couplings between the PEs. In some embodiments, one or more wavelets communicated via the couplings between the instances of PEs+HBM 483 correspond to and/or are in accordance with respective wavelets communicated via the couplings between the PEs. For example, a first instance of PEs+HBM 483 comprises two instances of PE 499. A wavelet communicated between the two instances of PE 499 is encapsulated for further communication to a second instance of PEs+HBM 483. In some embodiments, some of the formats of the wavelets communicated via the couplings between the instances of PE 499 and/or between the instances of PEs+HBM 483 comprise a wavelet payload and/or a color.

In some embodiments, wavelets are communicated relatively more in parallel between PEs of a PE cluster than between PE clusters. For example, the couplings between PE 499 elements enable communication of an entire wavelet (in at least some circumstances) in a single clock cycle via a parallel transfer of a plurality of bits on a plurality of physical wires. Continuing with the example, the couplings between the instances of PEs+HBM 483 (e.g. Horizontal coupling 434 and/or Vertical coupling 435) enable communication of a wavelet over a plurality of clock cycles via a serial transfer of the bits of the wavelet. In some implementations in accordance with the example, the clock for the parallel transfer and the clock for the serial transfer are multiples of each other so that bandwidth of the parallel transfer and the serial transfer are identical, or alternatively an integer multiple of one another.

In various embodiments, Substrate 414 comprises differing extents of instances of PEs+HBM 483 in horizontal and/or vertical dimensions. In various embodiments, PE Cluster 481 comprises differing extents of instances of PE 499 in horizontal and/or vertical dimensions. Embodiments with differing numbers of instances of PEs+HBM 483 and/or differing numbers of instances of PE 499 enable design reuse of components in various price/performance implementations.

In various embodiments, one or more of PE Cluster 481, HBM 482, PEs+HBM 483, and Substrate 414, comprise any one or more of an entire wafer, a portion of a wafer, a single ASIC, a plurality of ASICs, a plurality of dice, a plurality of 3D-stacked dice, a plurality of 2.5D-stacked dice, and a PCB comprising one or more of the foregoing. In some embodiments, PE Cluster 481 and HBM 482 comprise 3D-stacked dice, such as, one or more dice corresponding to PE Cluster 481, and one or more dice corresponding to HBM 482. For example, PE Cluster 481 is implemented with one or more PE dice, HBM 482 is implemented with one or more DRAM dice and an HBM controller die, and PEs+HBM 483 is implemented by 3D-stacking the PE dice, the DRAM dice, and the HBM controller die. In various embodiments, PEs+HBM 483 is implemented by 2.5D-stacking two or more of the PE dice, the DRAM dice, and the HBM controller die to a common silicon interposer. In some embodiments, HBM 482 implements storage via dynamic storage cells. In some embodiments and/or usage scenarios, HBM 482 is compatible with one or more standards adopted by JEDEC. In some embodiments and/or usage scenarios, PE Cluster and HBM coupling 436 is compatible with one or more HBM interface standards adopted by JEDEC.

In various embodiments and/or usage scenarios, any one or more of the horizontal couplings between instances of PEs+HBM 483 (e.g., as illustrated by Horizontal coupling 434), and/or any one or more of the vertical couplings between instances of PEs+HBM 483 (e.g., as illustrated by Vertical coupling 435) are implemented by a plurality of high-speed serial couplings, e.g., SerDes couplings, sometimes referred to as SERDES techniques.

In some embodiments and/or usage scenarios, DLA 400C is an implementation of DLA 120 of FIG. 1. In some embodiments and/or usage scenarios, individual PE 499 elements correspond to individual PEs of PEs 122 of FIG. 1.

In some embodiments and/or usage scenarios, I/O FPGAs 420C elements collectively correspond to FPGAs 121 of FIG. 1.

Consider a specific exemplary embodiment of a scaled compute fabric for a deep learning accelerator in accordance with FIG. 4C that simultaneously considers memory capacity, memory bandwidth, and communication bandwidth. HBM 482 comprises an HBM2 3D stack providing 4 GB of non-local memory capacity at 2 Tb/s bandwidth via PE Cluster and HBM coupling 436. PE Cluster 481 comprises 64 instances of PE 499 on a die, each PE with 48 KB of local memory and operable at 500 MHz. PEs+HBM 483 comprises the HBM2 3D stack 3D-stacked on top of the PE die in a BGA package with approximately 800 pins and dissipating approximately watts during operation. There is 4 GB/64=64 MB of non-local memory capacity per PE. Substrate 414 comprises a PCB with instances of I/O FPGAs 420C and an array of up to 1000 instances of PEs+HBM 483 mounted and coupled thereon. Horizontal coupling 434 and Vertical coupling 435 link together the instances of PEs+HBM 483 and collectively comprise 42 15 Gb/s SERDES channels per instance of PEs+HBM 483. A multidimensional interconnect graph is used for communication between the instances of PEs+HBM 483 resulting in a sublinear (versus PE count) interconnect bandwidth.

The area of the PE cluster die is approximately 10 mm^2, and the power dissipation of 32-128 PEs is approximately 1-watts. Each PE sustains 64 bits per cycle in/out for communication with the non-local memory and 320 bits per cycle in/out for communication via the SERDES channels.

The 48 KB local memory of each PE is used to store instructions (e.g., all or any portions of Task SW on PEs 260 of FIG. 2) and data, such as parameters and activations. The instructions and/or data are paged in and out of the local 48 KB memory of each PE from and to the non-local memory under control of software executing on the respective PE, thus using the local memories as software managed caches for the PEs.

In some embodiments and/or usage scenarios, the PEs of any of FIG. 4A, FIG. 4B, or FIG. 4C are conceptually partitioned into compute and storage roles by configuring and/or programming such that a fraction of the PEs substantially or entirely perform computation and the remainder of the PEs substantially or entirely perform operand storage. For example, 50% of the PEs perform computation and operand storage. The remaining 50% of the PEs perform operand storage, providing operands to and receiving results from the other 50% of the PEs. In some conditions, the partitioning enables decreased power consumption. In some conditions, the decreased power consumption is obtainable with relatively little reduction in performance, e.g., for neural networks having relatively lower compute requirements and/or relatively higher storage requirements. In some scenarios, the partitioning enables increased yield, e.g., PEs with manufacturing defects in computational logic are configured for operand storage.

Fabric Overview

As illustrated, e.g., in FIG. 4A, an embodiment of a deep learning accelerator comprises a plurality of PEs coupled to each other via a fabric. Each PE includes a CE (e.g., for performing computations) and a router (e.g., for managing and/or implementing movement of information on the fabric).

The fabric operates as a communication interconnect between all the PEs in the deep learning accelerator. The fabric transfers wavelets, e.g., via 30-bit physical couplings to enable transfer of an entire wavelet per cycle (e.g., core clock cycle). Conceptually the fabric is a local interconnect distributed throughout the PEs such that each PE is enabled to communicate directly with its (physical) neighbors. Communication to other-than (physical) neighbors is via hops through intermediate nodes, e.g., others of the PEs. In some embodiments and/or usage scenarios, a distributed local fabric topology efficiently maps to a neural network workload, e.g., each layer sends data to a neighboring layer) and/or is implementable with relatively lower cost in hardware.

An example fabric comprises logically independent networks referred to as and/or specified by colors. Each color is and/or specifies to a virtual network, e.g., virtual channel, overlaid on a single physical network. Each color has dedicated physical buffering resources but shares the same physical routing resources. The dedicated physical buffers enable non-blocking operation of the colors. The shared physical routing reduces physical resources. In various embodiments and/or usage scenarios, a fabric comprises various numbers of colors (e.g., 8, 24, or 32).

There is a routing pattern associated with each color and implemented by the routers. The routing pattern of each pattern is programmable and in some embodiments is statically configured, e.g., based at least in part on determinations made by Placement Server(s) SW 210 and/or Neuron to PE Mapping SW 212 of FIG. 2. Once configured, e.g., under control of software (such as Connection Server(s) SW 220 of FIG. 2), each color is a fixed routing pattern. All data that flows within a color always flows in accordance with the fixed routing pattern. There are no dynamic routing decisions. The fixed routing matches neural network communication patterns where neuron connections are statically specified. The fixed routing enables relatively lower cost hardware implementation.

As illustrated in FIG. 4A, an example (physical) fabric topology comprises a 2D mesh with each hop in the X or Y dimension (e.g. West 511 or North 513 of FIG. 5, respectively) performed in a single core clock cycle. In addition to the 2D mesh illustrated, some embodiments further comprise "skip" connections, e.g., in the horizontal dimension and "loop" connections, e.g., in the vertical dimension. An example skip connection enables PEs in a same row of the 2D mesh and physically separated by N other PEs to communicate with each other as if the PEs were physically adjacent. A hop along a skip connection (e.g. Skip West 512 of FIG. 5) is performed in a single core clock cycle. In various embodiments, an example loop connection enables a PE at the bottom of a column of PEs to communicate with a PE at the top of the column as if the PEs were physically adjacent. In some embodiments, a hop along a loop connection is performed in a single core clock cycle.

Performing each hop in the X or Y dimension in a single clock, in some embodiments and/or usage scenarios, enables simplifying implementation of arbitrary programmable routing topologies and related timing constraints. In some circumstances, the single cycle per hop latency is compatible with an associated pipelined data flow pattern. In some circumstances (e.g., when communicating from one layer to a next layer), the single cycle per hop latency adds additional latency and reduces performance. The additional latency is worst when the layer is deep and uses many PEs, since more hops are used to escape the layer and to reach all the PEs of the next layer. The additional latency results in overall workload pipeline length increasing and therefore storage (e.g. for forward pass activations) increasing.

The skip connections are used to reduce the additional latency. Consider an example. Each skip connection skips 50

PEs in a single core clock cycle. The latency to enter the first skip connection is 49 hops maximum. The latency to reach a final PE after exiting a final skip connection is 49 hops maximum. Therefore, there is a 98-core clock cycle maximum latency overhead and a 49-core clock cycle average latency overhead. The latency to process a layer is 2000 core clock cycles. Thus, in the example, there is a 5% maximum overall overhead and a 2.5% average overall overhead.

In some embodiments and/or usage scenarios, each row has skip connections and each column has loop connections. In some embodiments and/or usage scenarios, each skip connection skips 50 PEs, and each column has 200 PEs that a loop connection encompasses. In some embodiments, a single loop connection (e.g., in a context of a column of PEs, between the PE at the bottom of the column and the PE at the top of the column) approximately physically spans the column, and in other embodiments, loop connections of the column are physically implemented by folding so that the average and worst case loop hops approximately physically span two PEs.

In some embodiments and/or usage scenarios, the fabric interconnects 200×100 PEs per ASIC, with 200 PEs in the vertical dimension and 100 PEs in the horizontal dimension. The fabric is general purpose and usable by software executing on the PEs (e.g. Task SW on PEs 260 of FIG. 2) for any function. In some embodiments and/or usage scenarios, the software uses the horizontal dimension for communicating data between layers (e.g., activation broadcasting). The communicating data between layers is optionally and/or selectively via one or more skip connections. In some embodiments and/or usage scenarios, the software uses the vertical dimension for communicating data within a layer (e.g., partial sum accumulating). The communicating within a layer is optionally and/or selectively via one or more loop connections. In some circumstances, partial sum accumulating is via a ring topology.

Conceptually, on the fabric, backpressure information flows along the same topology and at the same rate as data the backpressure information corresponds to, but in the opposite direction of the corresponding data. E.g., a router sends backpressure information along the reverse path of the fixed routing pattern. There is an independent backpressure channel (e.g., signal) for each color, enabling communicating backpressure information for multiple colors simultaneously. The independent back pressure channels simplify, in some embodiments and/or usage scenarios, the backpressure communication when there are multiple queues draining on the same cycle (e.g., to different outputs).

When a color is back pressured, data queued at each hop within the fabric is stalled. Conceptually, the queued data is an extension to a queue at the destination since it is drained into the destination once the backpressure is released. For example, the backpressure signal from a particular PE and corresponding to a particular color is only asserted when a data queue of the router of the particular PE and corresponding to the particular color is at a predetermined threshold (e.g., full or nearly full). Therefore, with respect to the particular color, data flows until reaching a stalled PE, such that the data queue effectively operates as a portion of a distributed in-fabric queue.

The fixed routing pattern provides for multicast replication within each router. Multicast enables high fan-out communication patterns, such as within some neural network workloads. To perform multicast, each router node is statically configured with multiple outputs per multicast color. The router replicates an incoming wavelet corresponding to the multicast color to all outputs specified by the static configuration before processing the next wavelet of the multicast color. In some circumstances, there is a plurality of multicast colors, each statically configured with a respective set of multiple outputs.

The router provides for multiple input sources per color and processes a single active input source at a time. Coordination of the input sources is performed, for example, by software at a higher-level (e.g. flow control dependency, explicit messaging between PEs, or other suitable mechanisms) so that only a single input source is active at a time. Implementing a single active input source enables, in some embodiments and/or usage scenarios, relatively lower-cost hardware since the router has a single buffer per color instead of a buffer per input source.

Since there is only a single active input source at a time, there is not any congestion within a color. However, in some circumstances, congestion occurs between colors since the colors share a single physical channel. The router responds to the congestion by scheduling between ready colors onto a single shared output channel.

Deadlock on the fabric is possible since the fabric is blocking (e.g., the fabric and the routers have no hardware deadlock avoidance mechanisms). Deadlock is avoided by software configuring the fixed routing patterns to be free of dependent loops, thus avoiding circular dependencies and deadlock.

Software also ensures there are no circular dependencies through PE data path resources. Such dependencies would otherwise be possible since the training workload shares the same physical PE data path for all three mega-phases (forward pass, delta pass, and chain pass) and processing of the delta pass and the chain pass is on the same PEs as processing of the forward pass. To break any circular dependencies, software ensures that all tasks in the (forward pass, delta pass, and chain pass) loop do not block indefinitely. To do so, at least one task in the loop is ensured to complete once scheduled. The task scheduling is enabled by the wavelet picker in the compute element. The picker is programmed to schedule a wavelet only when the downstream color for the wavelet is available. It is also independently desirable for software to program tasks with the foregoing property for performance, in some embodiments and/or usage scenarios.

Figure 5:
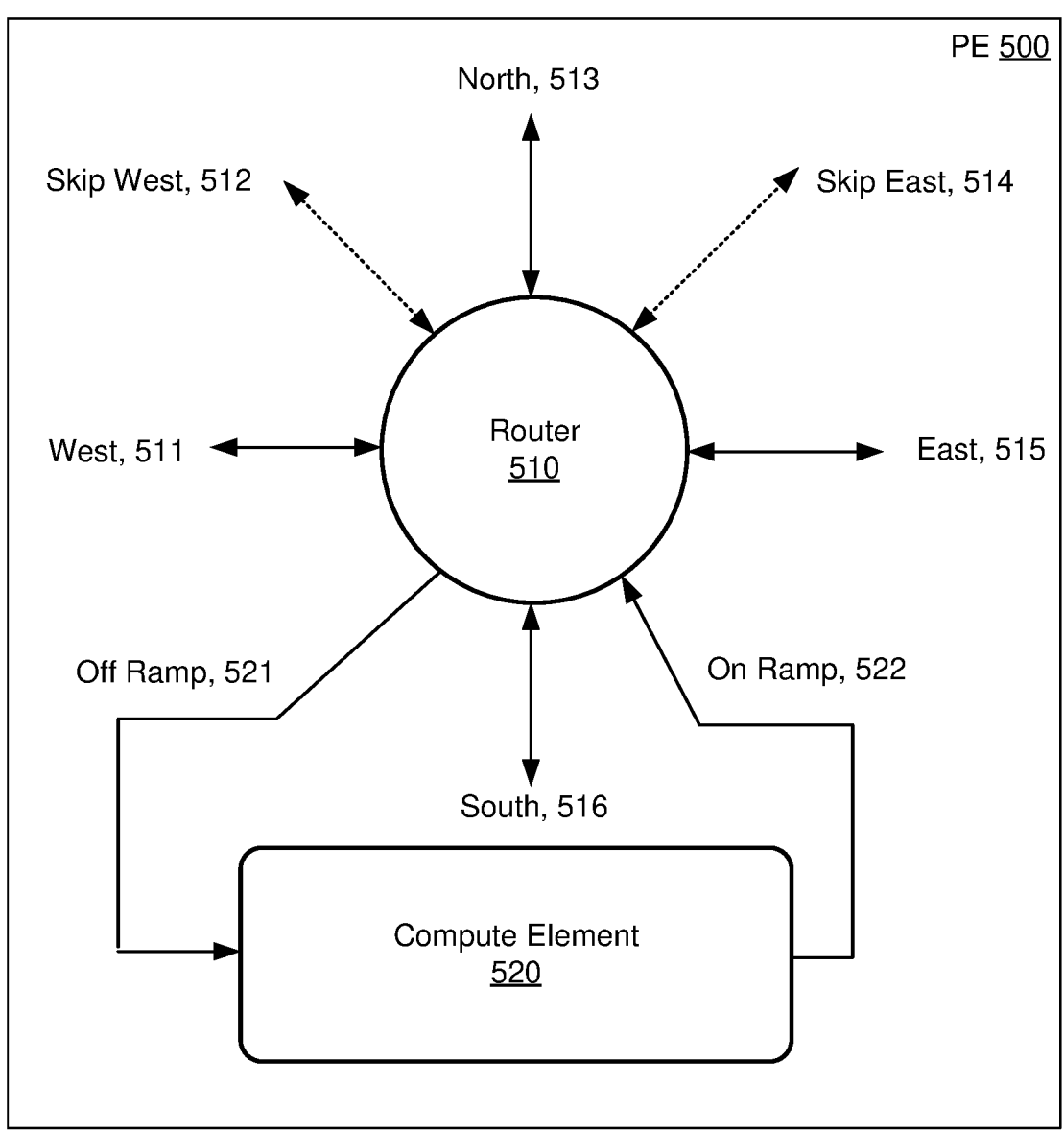
FIG. 5 illustrates selected details of an embodiment of a processing element of a deep learning accelerator.

In the event of incorrect configuration leading to deadlock, there is a watchdog mechanism that detects lack of progress and signals a fault to management software.
Processing Element: Compute Element and Router FIG. 5 illustrates selected details of an embodiment of a PE as PE 500 of a deep learning accelerator. PE 500 comprises Router 510 and Compute Element 520. Router 510 selectively and/or conditionally communicates (e.g. transmits and receives) wavelets between other PEs (e.g., logically adjacent and/or physically adjacent PEs) and PE 500 via couplings 511-516. Couplings 511-516 are illustrated as bidirectional arrows to emphasize the bidirectional communication of wavelets on the couplings. Backpressure information is also transmitted on the couplings in the reverse direction of wavelet information the backpressure corresponds to. Router 510 selectively and/or conditionally communicates wavelets to PE 500 (e.g., Compute Element 520) via Off Ramp 521 and communicates wavelets from PE 500 (e.g., Compute Element 520) via On Ramp 522. Off Ramp 521 is illustrated as a unidirectional arrow to emphasize the unidirectional communication of wavelets on the coupling (e.g., from Router 510 to Compute Element 520). Backpressure information is also transmitted on the coupling in the reverse direction of wavelet information (e.g. from Compute Element 520 to Router 510). On Ramp 522 is illustrated as a unidirectional arrow to emphasize the unidirectional communication of wavelets on the coupling (e.g., from Compute Element 520 to Router 510). Backpressure information is also transmitted on the coupling in the reverse direction of wavelet information (e.g. from Router 510 to Compute Element 520).

Compute Element 520 performs computations on data embodied in the wavelets according to instruction address information derivable from the wavelets. The instruction address information is used to identify starting addresses of tasks embodied as instructions stored in storage (e.g., any one or more of memory, cache, and register file(s)) of the compute element. Results of the computations are selectively and/or conditionally stored in the storage and/or provided as data embodied in wavelets communicated to the router for, e.g., transmission to the other PEs and or PE 500.

In addition to data, Router 510 selectively and/or conditionally communicates (e.g. transmits and receives) backpressure information between the other PEs and PE 500 via couplings 511-516. Router 510 selectively and/or conditionally transmits backpressure information to PE 500 via On Ramp 522. Router 510 receives backpressure information from PE 500 via Off Ramp 521. The backpressure information provided to the other PEs, as well as the backpressure information provided to PE 500, is used by the other PEs and PE 500 to stall transmitting data (e.g. wavelets) that would otherwise be lost due to insufficient queue space to store the data in Router 510. The backpressure information received from the other PEs and PE 500 is used respectively by Router 510 to prevent transmitting data (e.g. wavelets) that would otherwise be lost respectively to insufficient queue space in the routers of the other PEs and insufficient space in input queues of Compute Element 520.

In various embodiments, any one or more of 511-516 are omitted.

In some embodiments and/or usage scenarios, PE 500 is an embodiment of PE 499 of FIG. 4A, and/or elements of PE 500 correspond to an implementation of PE 499. In some embodiments and/or usage scenarios, North 513, East 515, South 516, and West 511 correspond respectively to North coupling 430, East coupling 431, South coupling 432, and West coupling 433 of FIG. 4A.

Figure 6:
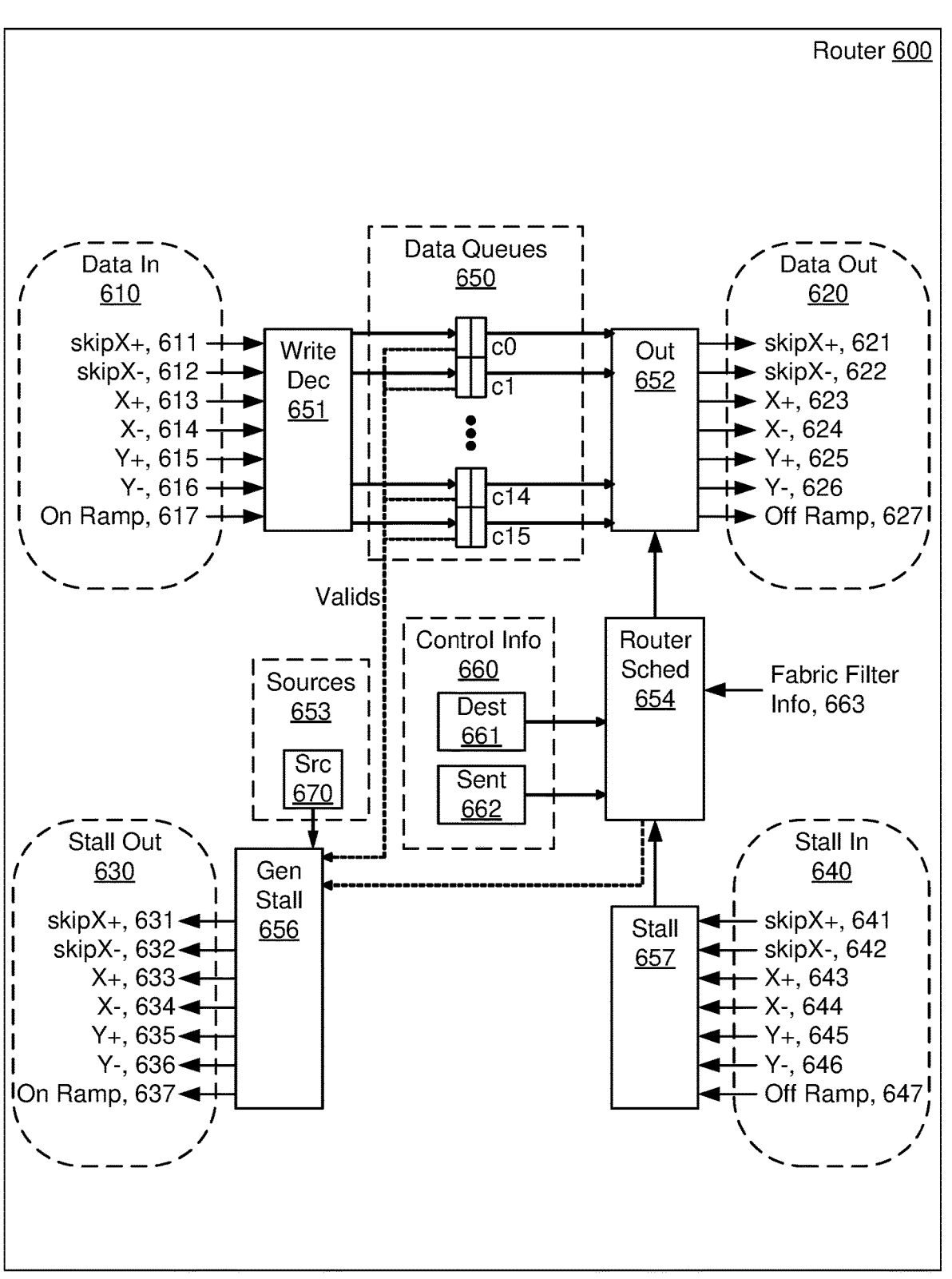
FIG. 6 illustrates selected details of an embodiment of a router of a processing element.

FIG. 6 illustrates selected details of an embodiment a router of a PE, as Router 600. Consider that there is a plurality of PEs, each comprising a respective router and a respective CE. Router 600 is an instance of one of the respective routers. Router 600 routes wavelets, in accordance with color information of the wavelets and routing configuration information, to the CE of the PE that the instant router is comprised in, as well as others of the routers. The routed wavelets are variously received by the instant router and/or generated by the CE of the PE that the instant router is comprised in. The routing enables communication between the PEs. Stall information is communicated to prevent overflowing of wavelet storage resources in Router 600.

Router 600 comprises four groups of interfaces, Data In 610, Data Out 620, Stall Out 630, and Stall In 640. Data In 610, Data Out 620, Stall Out 630, and Stall In 640 respectively comprise interface elements 611-617, 621-627, 631-637, and 641-647. Router 600 further comprises Write Dec 651, Out 652, Gen Stall 656, and Stall 657, respectively coupled to Data In 610, Data Out 620, Stall Out 630, and Stall In 640. Router 600 further comprises Sources 653 comprising Src 670 coupled to Gen Stall 656. Router 600 further comprises Data Queues 650, Control Info 660, and Router Sched 654. Control Info 660 comprises Dest 661 and Sent 662.

Conceptually, skipX+ 611, skipX+ 621, skipX+ 631, and skipX+ 641 comprise one of seven 'directions', e.g., the 'skipX+' direction. In some embodiments, the skipX+ direction corresponds to Skip East 514 of FIG. 5. SkipX− 612, SkipX− 622, SkipX− 632, and SkipX− 642 comprise a second, 'SkipX−' direction. In some embodiments, the skipX− direction corresponds to Skip West 512 of FIG. 5. X+ 613, X+ 623, X+ 633, and X+ 643 comprise a third, 'X+' direction. In some embodiments, the X+ direction corresponds to East 515 of FIG. 5. X− 614, X− 624, X− 634, and X− 644 comprise a fourth, 'X−' direction. In some embodiments, the X− direction corresponds to West 511 of FIG. 5. Y+ 615, Y+ 625, Y+ 635, and Y+ 645 comprise a fifth, 'Y+' direction. In some embodiments, the Y+ direction corresponds to North 513 of FIG. 5. Y− 616, Y− 626, Y− 636, and Y− 646 comprise a sixth, 'Y−' direction. In some embodiments, the Y− direction corresponds to South 516 of FIG. 5. Lastly, On Ramp 617, Off Ramp 627, On Ramp 637, and Off Ramp 647 comprise a seventh, 'On/Off Ramp' direction. In some embodiments, On Ramp 617 and On Ramp 637 portions of the On/Off Ramp direction correspond to On Ramp 522 of FIG. 5. In some embodiments, Off Ramp 627 and Off Ramp 647 of the On/Off Ramp direction correspond to Off Ramp 521 of FIG. 5.

Data In 610 is for receiving up to one wavelet from each direction each core clock cycle. Stall Out 630 is for transmitting stall information in each direction for each color each core clock cycle. Data Out 620 is for transmitting up to one wavelet to each direction in each core clock cycle. Stall In 640 is for receiving stall information from each direction for each color each core clock cycle.

Data Queues 650 is coupled to Write Dec 651 to receive incoming wavelet information and coupled to Out 652 to provide outgoing wavelet information. Data Queues 650 is further coupled to Gen Stall 656 to provide data queue validity information (e.g., corresponding to fullness) used for, e.g., generating stall information. Router Sched 654 is coupled to Control Info 660 to receive control information relevant to scheduling queued wavelets. Router Sched 654 is further coupled to Stall 657 to receive stall information relevant to scheduling queued wavelets. Router Sched 654 is further coupled to Out 652 to direct presentation of queued wavelets on one or more of 621-627. Router Sched 654 is further coupled to Gen Stall 656 to partially direct generation of stall information. Router Sched 654 is enabled to receive Fabric Filter Info 663. In various embodiments, Fabric Filter Info 663 comprises a respective indicator (e.g. a signal) associated with each color. In some embodiments, Router Sched 654 is enabled to suppress transmitting wavelets (e.g., wavelets associated with the one or more colors associated with the one or more indicators asserted by Fabric Filter Info 663) from Out 652 to Off Ramp 627 in response to Fabric Filter Info 663.

In some embodiments, Data Queues 650 comprises two entries per color (c0 . . . c15). Each entry is enabled to store at least payload information of a wavelet. In various embodiments, color information of the wavelet is not stored. A first of the entries is used to decouple the input of the queue from the output of the queue. A second of the entries is used to capture inflight data when a stall is sent in parallel (e.g., on a same core clock cycle) with the inflight data. In various embodiments, Data Queues 650 comprises a number of bits of storage equal to a number of colors multiplied by a number of bits of stored information per wavelet multiplied by a number of queue entries per color, e.g., 864 bits=16 colors*27 bits of wavelet data*2 entries per color. Alternatively, 33 bits of wavelet data are stored, and Data Queues 650 comprises 1056 bits=16 colors*33 bits of wavelet data*2 entries per color. In various embodiments, Data Queues 650 is implemented via one or more registers and/or a register file. Write Dec 651 stores, for each of the directions, information of the respective incoming wavelet into an entry of Data Queues 650 corresponding to the color of the incoming wavelet.

In some embodiments, Router Sched 654 comprises a scheduler for each of the directions (e.g., per 621-627). For each direction, the respective scheduler assigns available data in Data Queues 650 to the respective direction. Destination information per color is (statically) provided by Dest 661. In various embodiments, Dest 661 comprises a number of bits of storage equal to a number of colors multiplied by a number of directions, e.g., 112 bits=16 colors*7 directions. In various embodiments, Dest 661 is implemented via one or more registers and/or a register file. In some embodiments, Dest 661 comprises a data structure accessed by color that provides one or more directions as a result. E.g., a register file/array addressed by color encoded as a binary value and providing one bit per direction as a bit vector, each asserted bit of the bit vector indicating the color is to be sent to the associated direction(s).

Each of the schedulers operates independently of one another. Thus, for multicast outputs, a single wavelet is selectively and/or conditionally scheduled onto different directions in different core clock cycles, or alternatively in a same core clock cycle. Sent 662 is used to track which direction(s) a wavelet has been sent to. Each scheduler picks a color if the color has not been previously sent and the direction is not stalled for the color. In various embodiments, Sent 662 comprises a number of bits of storage equal to a number of colors multiplied by a number of directions, e.g., 112 bits=16 colors*7 directions. In various embodiments, Sent 662 is implemented via one or more registers and/or a register file.

In various embodiments, each scheduler implements one or more scheduling policies, e.g., round-robin and priority. The round-robin scheduling policy comprises the scheduler choosing between all available colors one at a time, conceptually cycling through all the colors before picking a same color again. The priority scheduling policy comprises the scheduler choosing from among a first set of predetermined colors (e.g., colors 0-7) with higher priority than from among a second set of predetermined colors (e.g., colors 8-15).

In various embodiments, Fabric Filter Info 663 indicates, on a per color basis, whether it is optional (versus required) to provide wavelets of each respective color to the CE of the PE comprising the router (e.g., via scheduling the wavelets to Off Ramp 627). Fabric Filter Info 663 is enabled to simultaneously indicate all or any of the combinations of the colors as being optional. The indications are only applicable to wavelets destined for the CE, e.g., the indications are not applicable to other destinations such as used for Multicast.

For example, when one or more wavelet filters indicate that wavelets of a particular color (and destined for the CE) are to be discarded rather than being processed by the CE, then Fabric Filter Info 663 indicates that scheduling wavelets of the particular color to the CE is optional. In response, the router optionally and/or selectively schedules wavelets of other than the particular color to the CE (e.g., via Off Ramp 627), such as by not considering wavelets of the particular color when scheduling wavelets to the CE. However, scheduling of wavelets of the particular color to destinations other than the CE is not affected. For another example, when no wavelet filters indicate that wavelets of a particular color (and destined for the CE) are to be discarded, then Fabric Filter Info 663 indicates that scheduling wavelets for the particular color to the CE is required (e.g., not optional). In response, the router considers the wavelets of the particular color for scheduling when scheduling wavelets to the CE.

In some embodiments, Fabric Filter Info 663 is implemented as a bit vector, one bit for each color. In some embodiments, Fabric Filter Info 663 is implemented as a vector of fields, one field for each color.

In some embodiments, Stall 657 is enabled to capture stall information and comprises a number of bits of storage equal to a number of colors multiplied by a number of directions, e.g., 112 bits=16 colors*7 directions. In various embodiments, Stall 657 is implemented via one or more registers and/or a register file.

In some embodiments, stall information is generated by Gen Stall 656 for all the colors of all the directions, based on occupancy of Data Queues 650. E.g., there is a stall generator for each color of each of 631-637. Src 670 stores and provides to Gen Stall 656 information to map a corresponding color of Data Queues 650 to one or more corresponding directions. In response to insufficient queue space in Data Queues 650 corresponding to a particular color, the directions acting as sources for the particular color are directed to stall providing further input, until queue space becomes available in Data Queues 650 for the further input. In various embodiments, Src 670 comprises a number of bits of storage equal to a number of colors multiplied by a number of directions, e.g., 112 bits=16 colors*7 directions. In various embodiments, Src 670 is implemented via one or more registers and/or a register file. In some embodiments, Src 670 comprises a data structure accessed by color that provides one or more directions as a result. E.g., a register file/array addressed by color encoded as a binary value and providing one bit per direction as a bit vector, each asserted bit of the bit vector indicating the color is sourced from the associated direction(s).

In various embodiments and/or usage scenarios, all or any portions of information retained in any one or more of Src 670 and Dest 661 corresponds to all or any portions of routing configuration information. In various embodiments and/or usage scenarios, all or any portions of the routing configuration information is determined, e.g., based at least in part on Placement Server(s) SW 210 and/or Neuron to PE Mapping SW 212 of FIG. 2. In various embodiments and/or usage scenarios, the routing configuration information is distributed to routers, e.g., under control of software (such as Connection Server(s) SW 220, Misc SW on FPGAs 250, and/or Task SW on PEs 260 of FIG. 2). In various embodiments and/or usage scenarios, one or more predetermined colors (e.g. color zero) are used to distribute, in accordance with a predetermined fixed routing pattern, all or any portions of the routing configuration information and/or all or any portions of compute element configuration information. An example of the predetermined fixed routing pattern is a predetermined multicast topology, optionally and/or conditionally in conjunction with a non-stalling flow. In some embodiments and/or usage scenarios, the distribution of the configuration information is implemented via a wavelet format unique to the distribution. Wavelets of the unique format are parsed and interpreted, e.g., by a hard-coded state machine monitoring Off Ramp 627.

In various embodiments, each of interface elements 611-616, 621-626, 631-636, and 641-646 is variously implemented via passive interconnect (e.g., wire(s) without buffering), active interconnect (e.g., wire(s) with selective and/or optional buffering), and coupling with logic to accommodate additional functionality between one instance of Router 600 and another instance of Router 600. In various embodiments, each of interface elements 617, 627, 637, and 647 is variously implemented via passive interconnect (e.g., wire(s) without buffering), active interconnect (e.g., wire(s) with selective and/or optional buffering), and coupling with logic to accommodate additional functionality between the instant router and the CE of the PE the instant router is comprised in.

In some embodiments and/or usage scenarios, Router 600 is an implementation of Router 510 of FIG. 5.

Figure 7A:
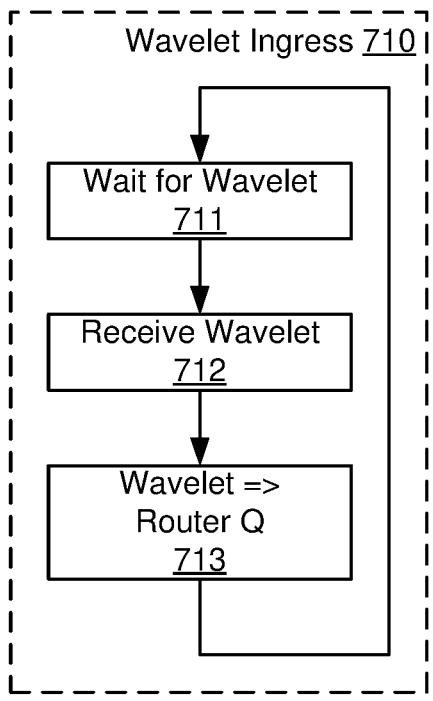
FIG. 7A illustrates selected details of an embodiment of processing associated with a router of a processing element.

FIG. 7A illustrates selected details of an embodiment of processing associated with a router of a processing element, as Wavelet Ingress 710. Conceptually, the router accepts as many wavelets as possible from ingress ports, queuing as necessary and as queue space is available, and routes as many wavelets as possible to egress ports per unit time (e.g., core clock cycle). In some embodiments and/or usage scenarios, there is one queue per color.

Wavelet Ingress 710 comprises actions 711-713 corresponding to wavelet ingress from (logically and/or physically) adjacent PEs and/or an instant PE, for each respective router direction (e.g., any of 611-617 of FIG. 6). The router waits for an incoming wavelet (Wait for Wavelet 711). In response to the incoming wavelet, the wavelet is received (Receive Wavelet 712) and written into a router queue corresponding to a color comprised in the wavelet (Wavelet=>Router Q 713). In some embodiments, the writing is at least partly under the control of Write Dec 651. Flow then returns to wait for another wavelet. In some embodiments and/or usage scenarios, a respective instance of Wavelet Ingress 710 operates concurrently for each router direction. In various embodiments and/or usage scenarios, any one or more of all or any portions of actions of 710 correspond to actions performed by and/or related to all or any portions of any one or more elements of Router 600 of FIG. 6.

Figure 7B:
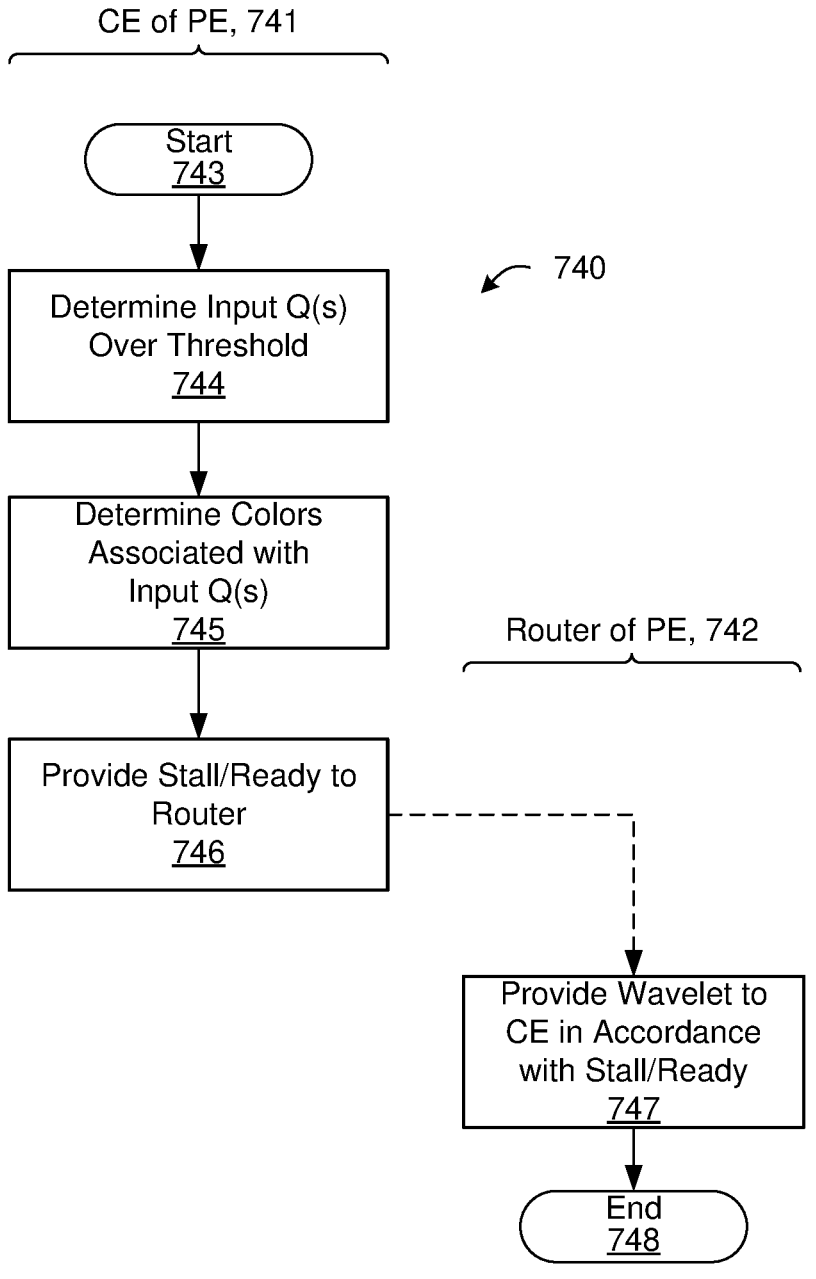
FIG. 7B illustrates selected details of an embodiment of generating and providing backpressure information associated with a compute element of a processing element.

FIG. 7B illustrates selected details of an embodiment of generating and providing backpressure information associated with a compute element of a processing element as flow 740. Actions of flow 740 are performed by various agents. A PE comprises a CE that performs actions 744-746, as illustrated by CE of PE 741. The PE further comprises a router that performs action 747, as illustrated by Router of PE 742.

In some embodiments, flow for generating and transmitting backpressure information begins (Start 743) by determining which input queues of the CE are storing more wavelets than a per-queue threshold (Determine Input Q(s) Over Threshold 744). In some embodiments, the per-queue threshold is predetermined. In various embodiments, the threshold for an input queue is two less than the maximum capacity of the input queue (e.g., an input queue enabled to store six wavelets has a threshold of four). In some other embodiments, the threshold for an input queue is one less than the maximum capacity. The determining occurs every period, e.g., every core clock cycle, and considers wavelets received and stored in the input queues and wavelets consumed and removed from the input queues in the period. Colors associated with each input queue and are determined by the CE (Determine Colors Associated with Input Q(s) 745). In some embodiments, an input queue is associated with multiple colors, and in other embodiments an input queue is associated with a single color. Based on whether the associated input queue is over/under the threshold, a stall/ready state is determined by the CE for each of the colors and provided as signals by the CE to the router (Provide Stall/Ready to Router 746).

In various embodiments, a ready state for a color indicates that the associated input queue has sufficient capacity to receive a number of wavelets (e.g., one or two) and the stall state indicates that the associated input queue does not have sufficient capacity to receive the number of wavelets. Based upon the provided stall/ready states, Router of PE 742 conditionally provides a wavelet to the CE (Provide Wavelet to CE in Accordance with Stall/Ready 747) and flow concludes (End 748). In some embodiments and/or usage scenarios, the router provides a wavelet for a color in the ready state and does not provide a wavelet for a color in the stall state.

Figure 8:
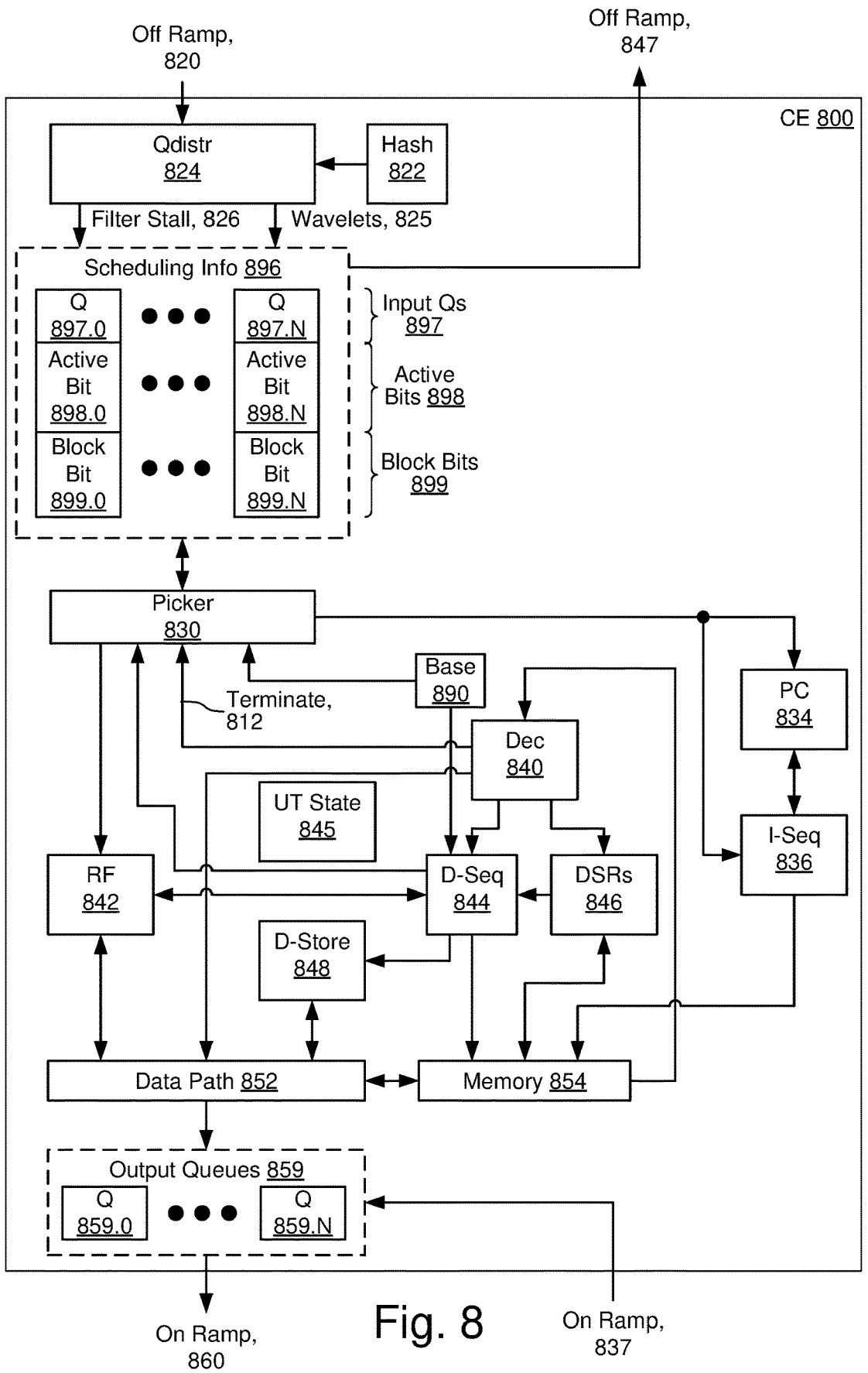
FIG. 8 illustrates selected details of an embodiment of a compute element of a processing element.

In various embodiments and/or usage scenarios, actions of flow 740 are conceptually related to a CE, e.g., CE 800 of FIG. 8 and a router, e.g., Router 600 of FIG. 6. In some embodiments, the input queues correspond to Input Qs 897. In various embodiments, the colors associated with each input queue are determined by computing the inverse of Hash 822. In some embodiments, the group of stall/ready signals is provided to the router via Off Ramp 647. In some embodiments and/or usage scenarios, one or more of: any portion or all of FIG. 9A and any portion or all of FIG. 16 correspond to portions of consuming a wavelet from an input queue. In various embodiments, portions of FIG. 15 (e.g., Selectively Write Wavelet to Picker Queue 1507) correspond to receiving and storing a wavelet in an input queue.

Figure 7C:
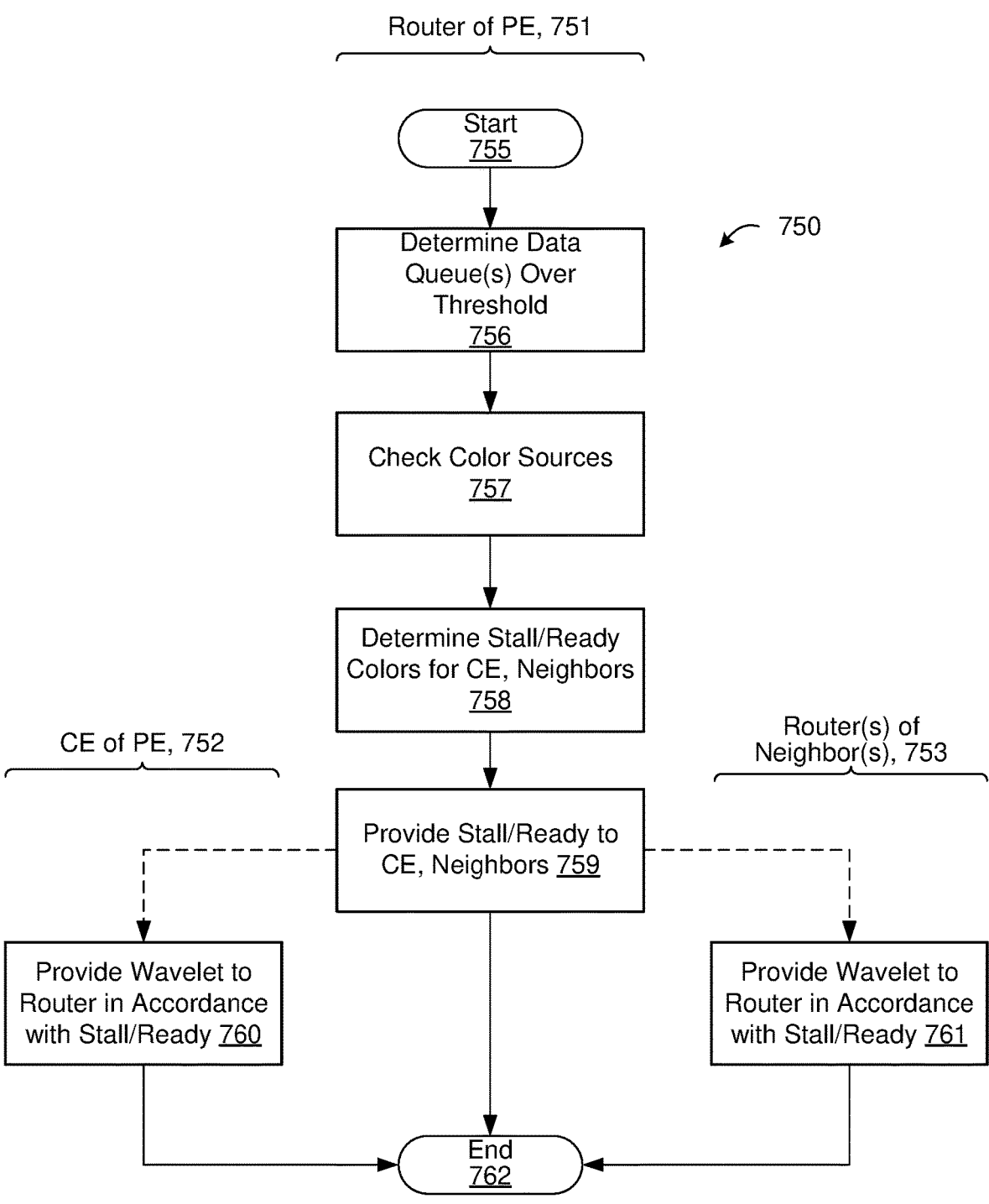
FIG. 7C illustrates selected details of an embodiment of generating and providing backpressure information associated with a router of a processing element.

FIG. 7C illustrates selected details of an embodiment of generating and providing backpressure information associated with a router of a processing element, as flow 750. Actions of flow 750 are performed by various agents. A router of a PE performs actions 756-759, as illustrated by Router of PE 751. The PE further comprises a CE that performs action 760, as illustrated by CE of PE 752. One or more routers of neighboring PEs perform actions 761 as illustrated by Router(s) of Neighbor(s) 753.

In some embodiments, flow for generating and providing backpressure information begins (Start 755) by the router of the PE determining which data queues of the router are storing more wavelets than a threshold (Determine Data Queue(s) Over Threshold 756). In some embodiments, the threshold is predetermined. In various embodiments, the threshold for a data queue is one less than the maximum capacity of the queue (e.g., a queue enabled to store two wavelets has a threshold of one). The determining occurs every period, e.g., every core clock cycle, and considers wavelets received and stored in the data queues and wavelets that are transmitted and removed from the data queues in the period. The router determines sources of wavelets for each color (Check Color Sources 757). Based on whether the data queues are over/under the threshold and the sources of wavelets, for each router output (e.g., the local CE and neighbor PEs), the router determines which colors are in a stall/ready state (Determine Stall/Ready Colors for CE, Neighbors 758).

In various embodiments, a ready state for a color indicates that the associated data queue for the color has sufficient capacity to receive a number of wavelets (e.g., one or two) and the stall state indicates that the associated data queue does not have sufficient capacity to receive the number of wavelets. For each output, the stall/ready state for the colors are provided as a group by asserting stall/ready signals to CE of PE 752 and to Router(s) of Neighbor(s) 753 (Provide Stall/Ready to CE, Neighbors 759). In some embodiments and/or usage scenarios, backpressure information provided to CE of PE 752 and each router of Router(s) of Neighbor(s) 753 is identical. Based upon the provided stall/ready states, CE of PE 752 conditionally provides a wavelet to Router of PE 751 (Provide Wavelet to Router in Accordance with Stall/Ready 760), Router(s) of Neighbor(s) 753 conditionally provide wavelet(s) to Router of PE 751 (Provide Wavelet to Router in Accordance with Stall/Ready 761), and flow concludes (End 762). In some embodiments and/or usage scenarios, the CE and neighbor routers provide a wavelet for a color in the ready state and do not provide a wavelet for a color in the stall state.

In various embodiments and/or usage scenarios, actions of flow 750 are conceptually related to a CE, e.g., CE 800 of FIG. 8 and a router, e.g., Router 600 of FIG. 6. In some embodiments, the router receives stall/ready colors via Stall In 640 (e.g., from a local CE via Off Ramp 647 and from neighbor PEs via 641-646). In various embodiments, each color and associated source(s) are stored in Src 670, which indicates direction(s) to provide stall/ready signals to for each respective color. For example, the entry for color seven in Src 670 indicates that the sources include the local CE (On Ramp 617) and X+ 613; thus, stall/ready state for color seven is provided to the local CE and X+. In some embodiments, a group of stall/ready signals is transmitted from the router to the CE via On Ramp 637. In various embodiments, a group of stall/ready signals is provided from the router to the routers of neighbor PEs via 631-636 of Stall Out 630.

Figure 7D:
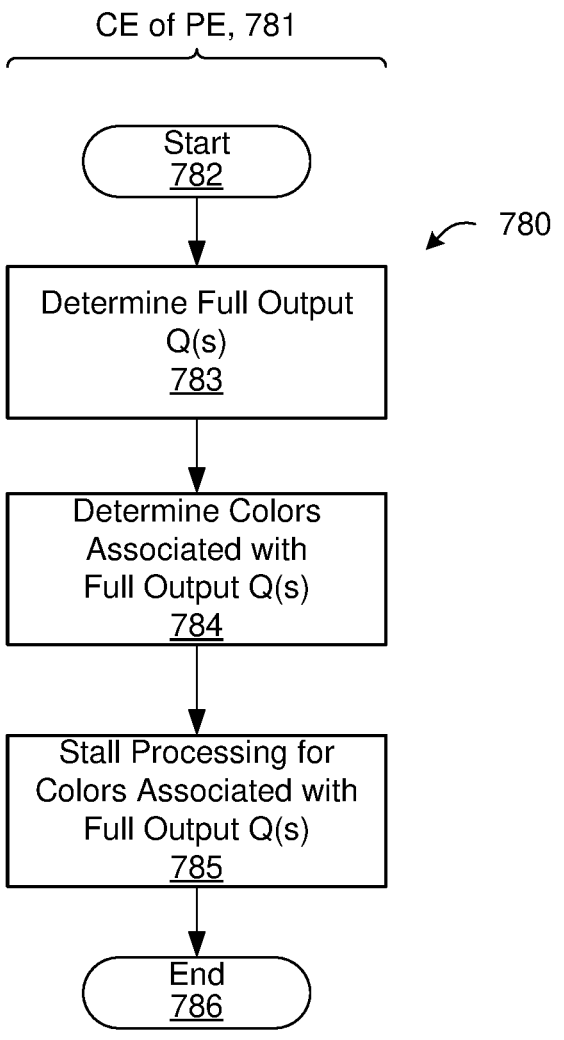
FIG. 7D illustrates selected details of an embodiment of stalling processing associated with a compute element of a processing element.

FIG. 7D illustrates selected details of an embodiment of stalling processing associated with a compute element of a processing element, as flow 780. Actions of flow 780 are performed by a CE of a PE, as illustrated by CE of PE 781.

In some embodiments, flow for stalling processing begins (Start 782) by the CE determining whether any output queues are storing a per-queue maximum capacity of wavelets (Determine Full Output Q(s) 783). In some embodiments, the per-queue maximum capacity is predetermined. The determining occurs every period, e.g., every core clock cycle, and considers wavelets that are created and stored in the output queues and wavelets that are transmitted to the router and removed from the output queues in the period. In response to determining an output queue is storing the maximum capacity of wavelets, the CE determines the colors associated with the output queue (Determine Colors Associated with Full Output Q(s) 784) and stalls processing for those colors (Stall Processing for Colors Associated with Full Output Q(s) 785), concluding flow (End 786).

In various embodiments and/or usage scenarios, actions of flow 780 are conceptually related to a CE, e.g., CE 800 of FIG. 8. In some embodiments, the output queues correspond to Output Queues 859. In various embodiments and usage scenarios, wavelets are stored in output queues in response to receiving a stall from the router on the color associated with the wavelet. In some embodiments and usage scenarios, each of Output Queues 859 is associated with one or more colors and the association is tracked in a portion of Output Queues 859. In other embodiments, each of Output Queues 859 is associated with a single color. In some embodiments and usage scenarios, the CE stalls processing associated with colors associated with output queues storing the maximum capacity of wavelets. In some embodiments, action 785 is performed at least in part by Picker 830. In various embodiments, processing is enabled for any colors associated with output queues storing less than the maximum capacity of wavelets.

FIG. 8 illustrates selected details of an embodiment of a compute element of a processing element, as CE 800.

In various embodiments, CE 800 is coupled to Router 600 of FIG. 6. For example, Off Ramp 820, On Ramp 860, Off Ramp 847, and On Ramp 837 are coupled respectively to Off Ramp 627, On Ramp 617, On Ramp 647, and On Ramp 637. CE 800 comprises Qdistr 824 coupled to receive wavelets via Off Ramp 820. Qdistr 824 is coupled to enable selective and/or conditional transmission of wavelets to Scheduling Info 896 via Wavelets 825. The selective and/or conditional transmission is based, for example, on one or more programmable filters and/or associated state. Qdistr 824 is coupled to enable selective and/or conditional transmission of stall information to Off Ramp 847 via Filter Stall 826. The selective and/or conditional transmission is based, for example, on one or more programmable filters and/or associated state. Scheduling Info 896 comprises Input Qs 897, Active Bits 898, and Block Bits 899. Scheduling Info 896 is coupled to Off Ramp 847 to send stall information (e.g., stall/ready signals for each color) to a router.

In various embodiments, Input Qs 897 comprises a virtual queue for each fabric color and each local color. The virtual queues for each fabric color are usable, e.g., to hold wavelets created by other processing elements and associated with the respective color. The virtual queues for each local color are usable, e.g., to hold wavelets created by CE 800 and associated with the respective color. In various embodiments, the virtual queues are implemented by one or more physical input queues. In some other embodiments, Input Qs 897 comprises a physical queue for each fabric color and each local color. Each one of Input Qs 897 (e.g., Input Q0 897.0) is associated with a respective one of Active Bit 898 (e.g., Active Bit 0 898.0) and Block Bits 899 (e.g., Block Bit 0 899.0). Each one of Active Bits 898 and each one of Block Bits 899 contain information about the respective one of Input Qs 897, e.g., Block Bit N 899.N indicates whether Input QN 897.N is blocked.

In various embodiments, there is variously a physical Q for each color, one or more physical Qs for a predetermined subset of colors, and one or more physical Qs for a dynamically determined subset of colors. In various embodiments, there is variously one or more physical Qs of a same size (e.g., each enabled to hold a same number of wavelets) and one or more physical Qs of differing sizes (e.g., each enabled to hold a different number of wavelets). In various embodiments, there are one or more physical Qs that are variously mapped to virtual Qs, each of the virtual Qs being associated with one or more colors. For example, there are N logical Qs and less than N physical Qs. For another example, some of Input Qs 897 are enabled to hold eight wavelets and others of Input Qs 897 are enabled to hold three wavelets. In some embodiments, traffic for one or more colors associated with a particular one of Input Qs 897 is estimated and/or measured, and the particular one of Input Qs 897 is enabled to hold a particular number of wavelets based on the traffic. In some embodiments, one or more of the physical Qs are implemented by one or more of: registers and SRAM.

Hash 822 is coupled to Qdistr 824 and selects a physical queue to store a wavelet, based at least in part on the color of the wavelet (e.g., by applying a hash function to the color). In some embodiments, the color associated with a wavelet payload is stored explicitly with the wavelet payload in a queue, such that an entry in the queue holds an entire wavelet (payload with color). In some embodiments, the color associated with a wavelet payload is not stored explicitly with the wavelet payload in a queue, such that an entry in the queue stores a wavelet payload without storing an associated color. The color of the wavelet payload is inferred, such as from the specific queue the wavelet payload is stored in.

In some embodiments, one or more of Active Bits 898 and Block Bits 899 are implemented as respective bit vectors with N entries, one entry for each color. In various embodiments, one or more of Active Bits 898 and Block Bits 899 are implemented as respective bit fields in a table comprising one entry for each color.

Picker 830 is coupled to Scheduling Info 896, RF 842, Dec 840, Base 890, PC 834, I-Seq 836, and D-Seq 844. RF, Dec, Base, PC, I-Seq, and D-Seq are respectively shorthand for Register File, Decoder, Base Register, Program Counter, Instruction Sequencer, and Data Sequencer. Picker 830 is enabled to select a wavelet for processing from one of Input Qs 897. In some embodiments, Picker 830 selects a wavelet by selecting one of Input Qs 897 and selecting the oldest wavelet in the selected queue. In some scenarios, Picker 830 selects a new wavelet for processing when Dec 840 signals that a terminate instruction has been decoded. In some other scenarios (e.g., an instruction accessing fabric input), Picker 830 selects a new wavelet for processing from one of Input Qs 897 in response to a queue identifier received from D-Seq 844.

Picker 830 receives the selected wavelet from one of Input Qs 897 and is enabled to selectively and/or optionally send one or more of data and index from the selected wavelet to RF 842. In some embodiments, Input Qs 897 is coupled to Data Path 852, and the Data Path is enabled to receive data directly from one of the Qs. Picker 830 is enabled to read a base address from Base 890 and calculate an instruction address to send to PC 834 and I-Seq 836. Base 890 stores a base address and is also coupled to D-Seq 844. PC 834 stores the address of the next instruction to fetch. In various embodiments, Base 890 and PC 834 are implemented as registers. In some embodiments, D-Seq 844 is enabled to read a base address from Base 890 and request data at one or more addresses from Memory 854 and D-Store 848, based at least in part upon the value read from Base 890.

Picker 830 is further enabled to select an activated color (as indicated by assertion of a corresponding one of Active Bits 898) for processing instead of selecting a wavelet for processing. A task corresponding to the selected color is initiated. In some embodiments and/or usage scenarios, unlike selection of a wavelet for processing, no information is provided to RF 842, and thus data communicated to the initiated task is via, e.g., global registers and/or memory.

I-Seq 836 is coupled to PC 834 and is enabled to read and modify PC 834 (e.g., increment for a sequential instruction or non-sequentially for a branch instruction). I-Seq 836 is also coupled to Memory 854 and is enabled to provide an instruction fetch address to Memory 854 (e.g., based upon PC 834).

Memory 854 is further coupled to Dec 840, Data Path 852, and D-Seq 844. In response to an instruction fetch address from I-Seq 836, Memory 854 is enabled to provide instructions located at the instruction fetch address to Dec 840 (an instruction decoder). In various embodiments, Memory 854 is enabled to provide up to three instructions in response to each instruction fetch address. In some embodiments, an instruction is formatted in accordance with one or more of FIGS. 10, 11, and 12.

In various embodiments and/or usage scenarios, instructions are distributed to PEs, e.g., under control of software (such as Connection Server(s) SW 220, Misc SW on FPGAs 250, and/or Task SW on PEs 260 of FIG. 2). In various embodiments and/or usage scenarios, a PE operating as a master PE (e.g., any PE of PEs 122) distributes instructions and/or any portions of configuration information to one or more slave PEs (e.g., any PE of PEs 122, including the master PE) via the fabric. In some embodiments, the distribution is via wavelets on one or more predetermined colors (e.g. color zero) and/or in accordance with a predetermined fixed routing pattern. In some other embodiments, the distribution is via wavelets on one or more selected colors (e.g., selected by a program). In various embodiments, the wavelets are received by one or more PEs operating as slave PEs and written to respective instances of Memory 854 for subsequent fetch and execution.

Dec 840 is enabled to determine one or more characteristics of instructions, according to various embodiments and/or usage scenarios. For example, Dec 840 is enabled to parse instructions into an opcode (e.g., Opcode 1012 of FIG. 10) and zero or more operands (e.g., source and/or destination operands). For another example, Dec 840 is enabled to identify an instruction according to instruction type (e.g., a branch instruction, or a multiply-accumulate instruction, and so forth). For yet another example, Dec 840 is enabled to determine that an instruction is a specific instruction and activates one or more signals accordingly.

Dec 840 is coupled to Picker 830 via Terminate 812 and is enabled to signal that one of the decoded instructions is a terminate instruction that ends a task (e.g., the terminate instruction is the last instruction of the instructions executed in response to a task initiated in response to the selected wavelet).

In some scenarios, Dec 840 is enabled to decode a branch instruction. Examples of branch instructions include: conditional branch instructions that conditionally modify PC 834 and jump instructions that unconditionally modify PC 834. A branch instruction is executed by I-Seq 836 and optionally and/or conditionally modifies PC 834. In some scenarios, a branch instruction implements software control flow (e.g., a loop) by conditionally modifying PC 834.

In response to decoding an instruction (e.g., a multiply-accumulate instruction), Dec 840 is enabled to transmit an opcode to Data Path 852. Dec 840 is coupled to DSRs 846 and enabled to transmit one or more operand identifiers to DSRs 846. Dec 840 is also coupled to D-Seq 844 and enabled to transmit one or more operand type identifiers to D-Seq 844.

DSRs 846 comprise registers that hold Data Structure Descriptors (DSDs) and is coupled to and enabled to send one or more DSDs to D-Seq 844. In some embodiments, DSRs comprise source DSRs, destination DSRs, extended DSRs, and stride registers. In response to receiving an operand identifier from Dec 840, DSRs 846 is enabled to read the DSD specified by the operand identifier, and to transmit the DSD to D-Seq 844. In various embodiments, DSRs 846 is enabled to receive up to two source operand identifiers and one destination operand identifier, read two source DSRs and one destination DSR, and transmit two source DSDs and one destination DSD to D-Seq 844. In some embodiments, the CE is enabled to explicitly write a DSD to DSRs from memory in response to load DSR instructions and the CE is enabled to explicitly write a DSD to memory from DSRs in response to store DSR instructions. In some embodiments, DSRs 846 is coupled to and enabled to receive data from and transmit data to Memory 854.

In some embodiments, DSRs 846 comprise three sets of DSRs: DSRs for source0 operands (sometimes referred to as S0DSRs), DSRs for source1 operands (sometimes referred to as S1DSRs), and DSRs for destination operands (sometimes referred to as DDSRs). In addition, DSRs 846 also comprises six extended DSRs (sometimes referred to as XDSRs) and six stride registers. In some embodiments, DSRs comprise 48 bits, XDSRs comprise 51 bits, and stride registers comprise 15 bits. In various embodiments, respective instructions load 48 bits of data from memory (e.g., D-Store 848 or Memory 854) into respective DSRs (e.g., LDS0WDS, LDS1WDS, and LDDWDS instructions respectively load source0, source1, and destination DSRs). In various embodiments, respective instructions store 48 bits of data from respective DSRs to memory (e.g., STS0WDS, STS1WDS, and STDWDS instructions respectively store source0, source1, and destination DSRs to memory). In some embodiments, instructions (e.g., LDXDS) load data from memory into XDSRs and other instructions (e.g., STXDS) store data from XDSRs to memory. Instructions that move data between memory and XDSRs (e.g., LDXDS and STXDS) access 64 bits of memory, and only use the lower 51 bits. In some embodiments, instructions (e.g., LDSR) load data from memory into stride registers, and other instructions (e.g., STSR) store data from stride registers to memory. In some embodiments, instructions that move data between memory and stride registers access bits of memory, and only use the lower bits.

D-Seq 844 is also coupled to D-Store 848, RF 842, and Picker 830, and is enabled to initiate accessing vector data at various sources in response to DSDs received from DSRs 846. In some scenarios (e.g., in response to receiving a DSD describing one of a 1D memory vector, 4D memory vector, and circular memory buffer), D-Seq 844 is enabled to calculate a sequence of memory addresses to access (e.g., in Memory 854 and/or D-Store 848). In some other scenarios, (e.g., in response to receiving a DSD describing a fabric input), D-Seq 844 is enabled to initiate reading fabric data from one of Input Qs 897 via Picker 830. In yet other scenarios, (e.g., in response to receiving a DSD describing a fabric output), D-Seq 844 is enabled to initiate transforming data into wavelet(s) and transmitting wavelet(s) to a fabric coupling via Output Queues 859 and On Ramp 860. In some embodiments, D-Seq 844 is enabled to simultaneously access vector data at three sources (e.g., read vector data from memory, read vector data from a fabric input, and write vector data to a fabric output).

In some embodiments, D-Seq 844 is enabled to access data in one or more registers in RF 842 (e.g., an instruction with one or more input operands and/or one output operand). In some scenarios, D-Seq 844 is enabled to request operands from registers in RF 842. In yet other scenarios, D-Seq 844 is enabled to request data from a register (e.g., an index) in RF 842 as an input for calculating a sequence of memory addresses to access in accordance with a DSD.

In various embodiments, all or any portions of state of PE 800 is mapped in an address space comprising software visible state (e.g., any combination of D-Store 848, Memory 854, RF 842, DSRs 846, Output Queues 859, and Input Qs 897, Block Bits 899) and state that is not software accessible (e.g., UT State 845). In various embodiments, the address space and/or portions of the address space are implemented by one or more of registers and SRAM. In some embodiments, the address spaces of multiple PEs implemented on a single ASIC are mapped to a single address space. In some embodiments, each respective PE (e.g., of multiple PEs implemented on a single ASIC or portion thereof) has a respective private address space. In some embodiments having private address spaces, one PE is unable to directly access elements in the address spaces of other PEs.

Data Path 852 is coupled to RF 842 and D-Store 848. In various embodiments, any one or more of Memory 854, RF 842, Input Qs 897, and D-Store 848 are enabled to provide data to Data Path 852 (e.g., in response to a request from D-Seq 844) and to receive data from Data Path 852 (e.g., results of operations). Data Path 852 comprises execution resources (e.g., ALUs) enabled to perform operations (e.g., specified by an opcode decoded and/or provided by Dec 840, according to embodiment). In some embodiments, RF 842 comprises sixteen general-purpose registers sometimes referred to as GPR0-GPR15. Each of the GPRs is 16 bits wide and is enabled to store integer or floating-point data.

Data Path 852 is also coupled via Output Queues 859 and On Ramp 860 to the router and enabled to send data via Output Queues 859 and On Ramp 860 to the router. In various embodiments, Output Queues 859 comprises a virtual queue for each fabric color (e.g., to hold information for wavelets created by Data Path 852 and associated with the respective color), e.g., Q 859.0, . . . , and Q 859.N. In various embodiments, a first portion of Output Queues 859 are statically or dynamically enabled to hold six wavelets, a second portion of Output Queues 859 are statically or dynamically enabled to hold two wavelets, and a third portion of Output Queues 859 are statically or dynamically enabled to hold zero wavelets.

In some embodiments, Data Path 852 is enabled to write one or more wavelets into one of Output Queues 859 based upon the fabric color associated with the one or more wavelets and the mapping of fabric colors to Output Queues 859. Output Queues 859 is enabled to transmit wavelets via On Ramp 860 to the router (e.g., Router 600 of FIG. 6). In some embodiments and/or usage scenarios, Output Queues 859 buffers wavelets that are not deliverable to the router (e.g., due to backpressure or contention). In some embodiments and/or usage scenarios, when one of Output Queues 859 is full, processing that writes fabric packets to the one of Output Queues 859 is stalled (e.g., by Picker 830). In some embodiments and/or usage models, Output Queues 859 is coupled to a router via On Ramp 837 and enabled to receive backpressure information from the router. In various embodiments, the backpressure information comprises stall/ready signals for each color, and in response to the backpressure information, wavelets corresponding to stalled colors are not sent to the router.

UT State 845 is coupled to Picker 830, Dec 840, D-Seq 844, DSRs 846, Scheduling Info 896, and Output Queues 859 (the foregoing couplings are omitted from the figure for clarity). In various embodiments and or usage scenarios, UT State 845 is used to store and provide information about one or more microthreaded instructions. An example of a microthreaded instruction is an instruction enabling microthreading, e.g., via at least one fabric vector operand with a corresponding UE field indicating microthreading is enabled. In some embodiments, UT State 845 comprises a data structure of one or more (e.g., eight) entries (e.g., implemented by storage such as SRAM) and enabled to store and provide information about respective one or more microthreaded instructions (such as any combination of: the microthreaded instruction itself, an opcode of the microthreaded instruction, one or more operands of the microthreaded instruction, and one or more DSDs associated with operands of the microthreaded instruction). In various embodiments, each respective entry of UT State 845 is associated with one or more of a respective one of Input Qs 897 and Output Queues 859 (e.g., entry 0 is associated with Q 897.0 and Q 859.0). In some embodiments, the mapping from entries of UT State 845 to ones of Input Qs 897 and Output Queues 859 is static and predetermined. UT State 845 is enabled to communicate microthreaded instruction information (such as the microthreaded instruction itself) with Dec 840 and communicate portions of a DSD with one or more of D-Seq 844 and DSRs 846. In some embodiments, information about a microthreaded instruction is stored in the entry of UT State 845 determined by a microthread identifier from the associated DSD.

In various embodiments and usage scenarios, UT State 845 is enabled to receive and/or monitor stall information with any one or more of D-Seq 844, DSRs 846, Scheduling Info 896, and Output Queues 859. In some embodiments, UT State 845 is enabled to communicate to Picker 830 that one or more microthreaded instructions are ready for execution, and Picker 830 is enabled to schedule a microthreaded instruction for execution. In various embodiments and/or usage scenarios, when a microthreaded instruction from UT State 845 executes, UT State 845 is enabled to communicate instruction information (e.g., the operation and/or one or more operands) to one or more of: Dec 840, D-Seq 844, and Data Path 852.

In some embodiments, D-Store 848 is a type of memory that is smaller and more efficient (e.g., lower joules per bit of data read) than Memory 854. In some embodiments, D-Store 848 is a type of memory of relatively lower capacity (e.g., retaining less information) and relatively lower access latency and/or relatively higher throughput than Memory 854. In some scenarios, more frequently used data is stored in D-Store 848, while less frequently used data is stored in Memory 854. In some embodiments, D-Store 848 comprises a first address range and Memory 854 comprises a second, non-overlapping address range. In some embodiments and/or usage scenarios, Memory 854 is considered a first memory enabled to store instructions and any combination of D-Store 848 and RF 842 is considered a second memory enabled to store data.

In some embodiments and/or usage scenarios, there is a one to one correspondence between virtual queues (e.g., Input Qs 897 and Output Queues 859) and physical queues (e.g., storage implemented via SRAM), e.g., there is a physical queue for each virtual queue. In some of the one to one embodiments, respective sizes of one or more of the virtual queues are dynamically managed to vary over time, such as being zero at one time and being a maximum size in accordance with the physical queues at another point in time. In various embodiments and/or usage scenarios, there is a many to one correspondence between virtual queues and physical queues, e.g., a single physical queue implements a plurality of virtual queues. In various embodiments, there is variously a physical Q for each color, one or more physical Qs for a predetermined subset of colors, and one or more physical Qs for a dynamically determined subset of colors. In various embodiments, there is variously one or more physical Qs of a same size (e.g., each enabled to hold a same number of wavelets) and one or more physical Qs of differing sizes (e.g., each enabled to hold a different number of wavelets). In various embodiments, there are one or more physical Qs that are variously mapped to virtual Qs, each of the virtual Qs being associated with one or more colors. For example, there are more virtual Qs than physical Qs. For another example, a first portion of the virtual queues are statically or dynamically enabled to hold six wavelets, a second portion of the virtual queues are statically or dynamically enabled to hold two wavelets, and a third portion of the virtual queues are statically or dynamically enabled to hold zero wavelets. In some embodiments, one or more of the physical Qs are implemented by one or more of: registers and SRAM.

In various embodiments, CE 800 is enabled to process instructions in accordance with a five-stage pipeline. In some embodiments, in a first stage the CE is enabled to perform instruction sequencing, e.g., one or more of: receiving a wavelet (e.g., in Input Qs 897), selecting a wavelet for execution (e.g., by Picker 830), and accessing (e.g., by I-Seq 836) an instruction corresponding to the wavelet. In a second stage, the CE is enabled to decode (e.g., by Dec 840) the instruction, read any DSR(s) (e.g., from DSRs 846), and compute addresses of operands (e.g., by D-Seq 844 in accordance with a DSD). In a third stage, the CE is enabled to read data from any one or more memories (e.g., Memory 854, RF 842, D-Store 848, and Input Qs 897). In a fourth stage, the CE is enabled to perform an operation specified by the instruction (e.g., in Data Path 852) and write results to a register file (e.g., RF 842). In a fifth stage, the CE is enabled to write results to any one or more memories, e.g., Memory 854, DSRs 846, D-Store 848. In various embodiments, in one of the stages the CE is enabled to optionally and/or conditionally provide results to Output Queues 859, and asynchronously provide wavelets to a router.

In some embodiments and/or usage scenarios, elements of the figure correspond to an implementation of Compute Element 520 of FIG. 5. For example, Off Ramp 820 and Off Ramp 847 in combination correspond to Off Ramp 521, and On Ramp 860 and On Ramp 837 in combination correspond to On Ramp 522.

The partitioning and coupling illustrated in FIG. 8 are illustrative only, as other embodiments are contemplated with different partitioning and/or coupling. For example, in other embodiments, RF 842 and DSRs 846 are combined into one module. In yet other embodiments, DSRs 846 and Data Path 852 are coupled. In some embodiments and/or usage scenarios, elements of Scheduling Info 896 are organized, managed, and/or implemented by color, e.g., a respective data structure and/or physical element or partition thereof is dedicated to color zero, another to color one, and so forth.

Task Initiation

FIG. 9A illustrates selected details of an embodiment of processing a wavelet for task initiation as flow 900. Conceptually, the processing comprises initiating a task by determining an address to begin fetching and executing instructions of the task. The address is determined based at least in part on information the wavelet comprises.

In some embodiments, processing a wavelet for task initiation begins (Start 901) by selecting a ready wavelet from among, e.g., one or more queues for processing (Select Ready Wavelet for Task Initiation 902). In some embodiments, the wavelet is selected based upon one or more of: block/unblock state associated with each queue, active/inactive state associated with each queue, color(s) of previously selected wavelets, and a scheduling algorithm.

After selecting the ready wavelet, the wavelet is checked to determine if the wavelet is a control wavelet or a data wavelet (Control/Data? 903). If the wavelet is a control wavelet (aka closeout wavelet), then a starting address of a task associated with the control wavelet is calculated by adding the lower six bits of the index of the wavelet to a base register (Add Lower Index Bits to Base Register to Form Instruction Address 910). If the wavelet is not a control wavelet, then the wavelet is a data wavelet. The starting address of a task associated with the data wavelet is calculated by adding the base register to the color of the wavelet multiplied by four (Add(Color*4) to Base Register to Form Instruction Address 904). The starting address of the task, either as calculated for a control wavelet or as calculated for a data wavelet, corresponds to a starting address of instructions for the task.

Once the starting address of the instructions has been calculated, the instructions are fetched from the starting instruction address (Fetch Instructions From Memory at Instruction Address 905). One or more of the fetched instructions are decoded and executed (Execute Fetched Instruction(s) 906). Fetching and executing (as illustrated by actions 905 and 906) continue (Not Terminate 908) until a Terminate instruction is executed (Terminate 909), and then processing associated with the initiated task is complete (End 919). In some embodiments, a terminate instruction is the last instruction associated with processing a wavelet. After the initiated task is complete, flow optionally and/or selectively proceeds to process another wavelet for task initiating, beginning with Start 901.

According to various usage scenarios, the executing (Execute Fetched Instruction(s) 906) comprises executing sequential and/or control-flow instructions, and the instruction address used for fetching varies accordingly (Fetch Instructions From Memory at Instruction Address 905).

The ready wavelet selected for task initiation is comprised of a particular color. In some embodiments and/or usage scenarios, once a ready wavelet has been selected for task initiation (Select Ready Wavelet for Task Initiation 902), further wavelets, if any, received of the particular color are consumed as operands for execution of instructions (Execute Fetched Instruction(s) 906). The consuming of the wavelets comprising the particular color as operands continues until fetching and executing of a terminate instruction (Terminate 909).

In various embodiments and/or usage scenarios, actions of flow 900 are conceptually related to a CE, e.g., CE 800 of FIG. 8. As an example, Block Bits 899 corresponds to block/unblock state associated with each queue. Active Bits 898 corresponds to active/inactive state associated with each queue. In some embodiments, the active bit of an input queue is set to an active state when a wavelet is written into the input queue. As another example, portions of action 902 are performed by Picker 830. Picker 830 selects the oldest wavelet from one of Input Qs 897 that is ready (e.g., the associated one of Block Bits 899 is deasserted and the associated one of Active Bits 898 is asserted), according to a scheduling policy such as round-robin or pick-from-last. In some embodiments and/or usage models, when Picker 830 operates in accordance with the pick-from-last scheduling policy, Picker 830 continues selecting wavelets from a same one of Input Qs 897 that is ready until Picker 830 selects a closeout wavelet. The wavelet selected by Picker 830 comprises a color and a wavelet payload formatted in accordance with one of FIG. 13A and FIG. 13B, e.g., assertion of Control Bit 1320 (FIG. 13A) or assertion of Control Bit 1340 (FIG. 13B) indicates a closeout wavelet.

As another example, action 903 is performed by elements of CE 800. If the control bit of the wavelet payload (e.g., Control Bit 1320 of FIG. 13A) is asserted (determined e.g., by Picker 830), then the wavelet is a control wavelet. Subsequently, action 910 is performed by CE 800, such as by Picker 830 adding contents of Base 890 to the six lowest bits of Lower Index Bits 1321.1 of FIG. 13A to form the instruction fetch address for instructions of the task associated with the control wavelet. Picker 830 then provides the instruction fetch address to PC 834. If the control bit of the wavelet payload (e.g., Control Bit 1320 of FIG. 13A) is deasserted (determined e.g., by Picker 830), then the wavelet is a data wavelet. Subsequently, action 904 is performed by CE 800, such as by Picker 830 adding contents of Base 890 to the color of the wavelet (e.g., corresponding to Color 1324 of FIG. 13A and FIG. 13B) multiplied by 4 to form the instruction fetch address for instructions of the task associated with the data wavelet. Picker 830 then provides the instruction fetch address to PC 834.

As another example, action 905 is performed by elements of CE 800, e.g., PC 834, I-Seq 836, and Memory 854. Action 906 is performed by elements of CE 800, e.g., Dec 840, D-Seq 844, Memory 854, RF 842, and Data Path 852, among others. Execution comprises execution of a terminate instruction. An example of a terminate instruction is an instruction with a terminate bit asserted. In the context of the example, when Dec 840 decodes a terminate instruction, Dec 840 signals Picker 830 via Terminate 812 that the wavelet is finished, and Picker 830 selects another wavelet for processing, corresponding, e.g., to action 902.

In various embodiments and/or usage scenarios, all or any portions of elements of Processing a Wavelet for Task Initiation 900 conceptually correspond to all or any portions of executions of instructions of Task SW on PEs 260 of FIG. 2.

In various embodiments and/or usage scenarios, all or any portions of the actions comprising flow 900 conceptually variously correspond to all or any portions of flow 1500 of FIG. 15 and/or flow 1600 of FIG. 16. E.g., action 902 comprises all or any portions of action 1602, and actions 903, 904, 910, 905, and 906 comprise all or any portions of action 1603.

FIG. 9B illustrates selected details of an embodiment of task activating as flow 920. Conceptually, the task activating comprises activating on or more colors, resulting in the colors becoming selectable for execution, and then choosing a color (e.g. one of the activated colors) and initiating a task corresponding to the color.

In some embodiments, flow for task activating begins (Start 921) by performing an activate operation for one or more colors (Activate Operation for Color(s) 923). The activate operation is responsive to, e.g., an instruction or one of a set of events. In response to the activate operation, corresponding colors are activated, making them selectable for execution (Activate Color(s) 924). Then a color that is selectable for execution is chosen by the picker (Picker Selects Color 925). The task corresponding to the chosen color is initiated and the chosen color is deactivated (Initiate Task, Deactivate Color 926). Task initiation comprises determining a starting address for the task and fetching and executing instruction beginning at the starting address. Flow is then complete (End 929).

The instruction the activate operation is responsive to comprises an activate instruction. The activate instruction specifies the one or more colors to activate. The colors to activate are variously specified by one or more of an immediate value (e.g. a 6-bit field specifying a single color to activate) in the activate instruction, a register specified by the activate instruction, or other information. In some embodiments and/or usage scenarios, if an activate instruction source is not an immediate, then new task selection is stalled until the activate instruction completes.

In some embodiments and/or usage scenarios, the set of events the activate operation is responsive to comprises completing processing for a fabric vector that enables microthreading. For example, a fabric vector is processed in accordance with a fabric input Data Structure Descriptor (DSD). The fabric input DSD specifies that microthreading is enabled and the fabric input DSD further specifies a color to activate responsive to completing processing of the fabric vector. The color is activated in response to the completing processing of the fabric vector. For another example, a fabric vector is processed in accordance with a fabric output DSD. The fabric output DSD specifies that microthreading is enabled and the fabric output DSD further specifies a color to activate responsive to completing processing of the fabric vector. The color is activated in response to the completing processing of the fabric vector.

In some embodiments and/or usage scenarios, the set of events the activate operation is responsive to further comprises pushing and/or popping an element from a circular buffer in accordance with a circular memory buffer DSD having an associated circular memory buffer eXtended DSD (XDSD). The circular memory buffer XDSD has respective fields to specify colors to activate responsive to pushing an element onto the circular buffer and popping an element off of the circular buffer. The respective color is activated in response to the pushing and/or the popping.

In some embodiments and/or usage scenarios, activating a color comprises setting an indicator corresponding to the color to an activated stated, and making a color inactive comprises setting the indicator to an inactivated state. In some embodiments and/or usage scenarios, the indicator comprises a bit, assertion of the bit indicates the activated state, and deassertion of the bit indicates the inactivated state, and there is a corresponding bit for each color.

In various embodiments and/or usage scenarios, actions illustrated in FIG. 9B are applicable to fabric colors and/or local colors.

In some embodiments and/or usage scenarios, responsive to an activate instruction of a color that there is a wavelet pending in an input queue for, the activate instruction takes precedence, and the pending wavelet remains in the input queue. In some embodiments and/or usage scenarios, if a self-activated task of a particular color and wavelet of the particular color are ready at a same time, then the self-activated task is picked and runs; the wavelet is not popped. In some embodiments and/or usage scenarios, there is no wavelet data and no index associated with an activated task. When the activated task is selected (e.g. by Picker 830 of FIG. 8), GPRs that would otherwise be updated (if there were wavelet data) are not updated responsive to the selecting of the activated task. In various implementations, data communication between tasks is performed via memory and/or global registers.

In some embodiments and/or usage scenarios, there is an activate queue associated with queue activation. In some embodiments and/or usage scenarios, the activate queue is one deep per color. In some embodiments and/or usage scenarios, there is no effect if there is an attempt to activate a color that has already been activated.

In various embodiments and/or usage scenarios, actions of flow 920 are conceptually related to a CE, e.g., CE 800 of FIG. 8. For example, activating/deactivating a color is performed by asserting/deasserting a corresponding one of Active Bits 898. For another example, Picker Selects Color 925 is performed by Picker 830. In various embodiments and/or usage scenarios, all or any portions of the actions comprising flow 920 conceptually variously correspond to all or any portions of flow 900 of FIG. 9A, e.g., action 926 comprises all or any portions of actions 904, 905, and 906 of FIG. 9A.

Example Workload Mapping

Conceptually, any of DLAs 400A, 400B, or 400C (FIGS. 4A, 4B, and 4C, respectively) is a programmable compute fabric (see, e.g., FIGS. 5-8 and section "Processing Element: Compute Element and Router"). For example, the compute element of each PE 499 element is enabled to execute sequences of instructions of tasks (such as conceptually corresponding to all or any portions of executions of instructions of Task SW on PEs 260 of FIG. 2), and the respective router element of each PE 499 is configurable to route wavelets between the PEs. The programmable compute fabric enables mapping of workloads onto the compute fabric in various manners. Described following is an example high-level mapping of a workload to the compute fabric to illustrate various techniques and mechanisms implemented by the compute fabric.

The workload is deep neural network training, implemented via SGD. The deep neural network comprises a plurality of layers of neurons. The workload has three mega-phases: a forward pass, a delta pass, and a chain pass. The forward pass propagates activations in a forward direction. The delta pass propagates deltas in a backward direction. The chain pass calculates gradients based on the deltas as the deltas are generated in the delta pass. The three mega-phases have approximately a same amount of compute.

FIG. 4A illustrates an example mapping of the mega-phases to the PEs. Each layer is implemented by blocks of PEs allocated from the compute fabric (aka 'placed') back-to-back (e.g., in a horizontal dimension). Data movement propagates to the end of the fabric during the forward pass (Forward 401), and then circles back in the reverse direction during the delta pass (Delta 402) and chain pass (Chain 403). The placement is directed to reduce data movement since the forward pass saves activations to be used by the delta pass and the chain pass. In the example, all the PEs are time shared three ways between the three mega-phases, with each mega-phase using approximately a same amount of compute. In some circumstances, an entire chain of PEs performing the passes operates as a pipeline such that each layer is a pipe stage (taking roughly a same amount of time to complete) and each activation of a mini-batch fills the pipeline.

In some embodiments and/or usage scenarios, within a set of the PEs mapped to a single one of the layers, the weights of the single layer are distributed across the PEs such that a single neuron is mapped to multiple PEs. Splitting a single neuron across multiple PEs, in some circumstances, provides a load balancing benefit and provides a communication partitioning benefit.

Conceptually, processing proceeds as follows (see Forward 401 of FIG. 4A). Activations are broadcasted into the layer along the horizontal axis. Activations are received by the PEs and trigger a lookup of the associated weights that are stored local to the PEs (corresponding to the neurons mapped to the PEs). Only non-zero activations are broadcasted, so no compute is wasted for zero activations (an example of activation sparsity harvesting). Each PE performs a local multiply and accumulate of the incoming activation with all the neuron weights producing local partial sums. Since the weights of each neuron are distributed to multiple PEs, partial sums are then accumulated across the PEs in the vertical direction, in accordance with the neuron weight distribution. After the partial sums are accumulated producing a final sum, the activation function is performed and all new non-zero activations are broadcast to the next layer.

The delta pass (see Delta 402 of FIG. 4A) and the chain pass (see Chain 403 of FIG. 4A) follow a data flow similar to that of the forward pass. In some embodiments and/or usage scenarios, the delta pass and the chain pass are placed offset by one layer, so the activations are stored in the same layers as the weights used in the backward direction. Activations are stored by the receiving layer such that in the delta pass and the chain pass, the activations are used directly without additional communication. In addition to storing activations, a weight transpose is performed to implement the delta pass. The weight transpose, in some embodiments and/or usage scenarios, is implemented by replicating the weights, using additional memory capacity and additional communication when updating the weights. In some embodiments and/or usage scenarios, the weight transpose is implemented by transposing the delta broadcast in the vertical dimension.

Instruction Formats

Each element identifier in the description of FIGS. 10-12 having a first digit of "8" refers to an element of FIG. 8, and for brevity is not otherwise specifically identified as being an element of FIG. 8.

FIG. 10 illustrates selected details of an embodiment of a multiple operand instruction, as Multiple Operand Instruction 1010. Multiple Operand Instruction 1010 is one of: a two/three source, one destination operand instruction (e.g., a multiply-add such as FMACH), a two source, no destination operand instruction (e.g., a comparison such as LT16), and a one source, one destination operand instruction (e.g., a move instruction such as MOV16).

Multiple Operand Instruction 1010 comprises various fields: Instruction Type 1011, Opcode 1012, Operand 0 Encoding 1013, Operand 1 Encoding 1014, and Terminate 1015. Operand 0 Encoding 1013 comprises Operand 0 Type 1013.1 and Operand 0 1013.2. Operand 1 Encoding 1014 comprises Operand 1 Type 1014.1 and Operand 1 1014.2. In some embodiments, Multiple Operand Instruction 1010 comprises 20 bits.

In some embodiments, the value of Instruction Type 1011 distinguishes between different types of instructions (e.g., two/three source, one destination and one source, and one destination instruction types) according to the table following. In various embodiments, the value of Opcode 1012 specifies a particular operation (e.g., multiply, add, or subtract). The length of Opcode 1012 varies between different types of instructions as described in the table following.

| Instruction Family | Value of Instruction Type 1011 | Length of Opcode 1022 |
|---|---|---|
| Two/three source, one destination | 10 | 5 bits |
| Two source, no destination | 1110 | 4 bits |
| One source, one destination | 110 | 5 bits |

In some embodiments, Operand 0 Encoding 1013 describes a source and/or destination operand, according to the table following. In some embodiments, Operand 1 Encoding 1014 describes a source operand.

| Instruction Family | Operand 0 Encoding 1013 | Operand 1 Encoding 1014 |
|---|---|---|
| Two/three source, one destination | Source0 and destination | Source1 |
| Two source, no destination | Source0 | Source1 |
| One source, one destination | Destination | Source1 |

In some embodiments, Operand 0 1013.2 and Operand 1 1014.2 comprise respective 4-bit fields. In some embodiments, Operand 0 Type 1013.1 and Operand 1 Type 1014.1 comprise respective 2-bit fields and respectively determine how to interpret Operand 0 1013.2 and Operand 1 1014.2. For a two/three source operand, one destination operand instruction, Operand 0 Type 1013.1 is interpreted according to the table following.

| Value of 1013.1 | Operand 0 Encoding 1013 |
|---|---|
| 0 | Source0 is S0DSR[Operand 0 1013.2], destination is S0DSR[Operand 0 1013.1] |
| 1 | Source0 is S0DSR[Operand 0 1013.2], destination is DDSR[Operand 0 1013.1] |
| 2 | Source0 is GPR[Operand 0 1013.2], destination is GPR[Operand 0 1013.1] |
| 3 | Source0 is GPR[Operand 0 1013.2], destination is DDSR[Operand 0 1013.1] if Operand 1 Type 1014.1 is 0, destination is GPR[0] otherwise |

For example, if the value of Operand 0 Type 1013.1 is "1" and the value of Operand 0 1013.2 is "4", then Operand 0 Encoding 1013 specifies that the source0 operand is a vector described by S0DSR[4] and the destination operand is a vector described by DDSR[4].

For a two source operand, no destination operand instruction, Operand 0 Type 1013.1 is interpreted according to the table following.

| Value of 1013.1 | Operand 0 Encoding 1013 |
|---|---|
| 0 | Source0 is S0DSR[Operand 0 1013.2] |
| 1 | Source0 is GPR[Operand 0 1013.2] |

For example, if the value of Operand 0 Type 1013.1 is "0" and the value of Operand 0 1013.2 is "4", then Operand 0 Encoding 1013 specifies that the source0 operand is a vector described by S0DSR[4].

For a one source operand, one destination operand instruction, Operand 0 Type 1013.1 is interpreted according to the table following.

| Value of 1013.1 | Operand 0 Encoding 1013 |
|---|---|
| 0 | Destination is DDSR[Operand 0 1013.2] |
| 1 | Destination is GPR[Operand 0 1013.2] |

For example, if the value of Operand 0 Type 1013.1 is "0" and the value of Operand 0 1013.2 is "4", then Operand 0 Encoding 1013 specifies that the destination operand is a vector described by DDSR[4].

For Multiple Operand Instruction 1010, Operand 1 Type 1014.1 is interpreted according to the table following.

| Value of 1014.1 | Operand 1 Encoding 1014 |
|---|---|
| 0 | Source1 is S1DSR[Operand 1 1014.2] |
| 1 | Source1 is the data in memory at the address specified by GPR[6] |
| 2 | Source1 is GPR[Operand 1 1014.2] |
| 3 | Source1 is an immediate |

For example, if the value of Operand 0 Type 1013.1 is "0" and the value of Operand 0 1013.2 is "4", then Operand 0 Encoding 1013 specifies that the destination operand is a vector described by DDSR[4].

In various embodiments, a source1 operand that is an immediate specifies one of: several predetermined values (e.g., 0, 1, and −1) and a pseudo-random number generated by an LFSR. For example, if the value of Operand 1 Type 1014.1 is "3" and the value of Operand 1 1014.2 is "8", then Operand 1 Encoding 1014 specifies a PRN generated by an LFSR.

In various embodiments, a source1 operand that is a floating-point immediate specifies one of: several predetermined values (e.g., 0, 1, −1, +infinity, −infinity, min normal, max normal, -min normal, -min normal) and a pseudo-random number generated by an LFSR. For example, if the value of Operand 1 Type 1014.1 is "3" and the value of Operand 1 1014.2 is "8", then Operand 1 Encoding 1014 specifies a PRN generated by an LFSR.

In some embodiments, Terminate 1015 comprises a 1-bit field specifying that the instruction is the last instruction in a task. When the instruction finishes execution, the task is terminated, enabling selection and execution of a new task (e.g., via Terminate 812 and Picker 830).

FIG. 11 illustrates selected details of an embodiment of a one source, no destination operand instruction, as One Source, No Destination Instruction 1020. One Source, No Destination Instruction 1020 comprises Instruction Type 1021, Opcode 1022, Operand 1 Encoding 1023, Immediate High 1024, and Terminate 1025. Operand 1 Encoding 1023 describes a source operand and comprises Operand 1 Type 1023.1 and Operand 1 1023.2. In some embodiments, One Source, No Destination Instruction 1020 comprises 20 bits.

In some embodiments, Instruction Type 1021 comprises four bits, "1111", specifying that the instruction is a one source, no destination operand instruction, and Opcode 1022 comprises a 4-bit field specifying a particular operation (e.g., block, unblock, activate, set active PRNG, data filter, conditional branch, and jump).

In some embodiments, Immediate High 1024 comprises a 4-bit field. In some scenarios, Immediate High 1024 concatenated with Operand 1 1023.2 forms an 8-bit immediate.

In some embodiments, Operand 1 Type 1023.1 comprises a 2-bit field that determines how Operand 1 1023.2 is interpreted. If Operand 1 Type 1023.1 is "0", then Operand Encoding 1023 specifies a vector (e.g., a fabric vector of data elements from Input Qs 897, or a memory vector of data elements in one of Memory 854 and D-Store 854) and the value of Operand 1 1023.2 identifies which one of the 12 S1DSRs of DSRs 846 describe the vector. If Operand 1 Type 1023.1 is "1", then Operand Encoding 1023 describes a value in memory (e.g., one of Memory 854 and D-Store 848) at an 8-bit address formed by a concatenation of Immediate High 1024 with Operand 1 1023.2. If Operand 1 Type 1023.1 is "2", then Operand 1 Encoding 1023 describes a value in a register (e.g., one of RF 842) identified by the value of Operand 1 1023.2. If Operand 1 Type 1023.1 is "3", then Operand 1 Encoding 1023 describes an immediate. If Opcode 1022 specifies an operation (e.g., block, unblock, or activate) that operates on 16-bit integer operands, then the immediate comprises eight bits and is a concatenation of Immediate High 1024 and Operand 1 1023.2.

In some embodiments, Terminate 1025 comprises a 1-bit field specifying that the instruction is the last instruction in a task. When the instruction finishes execution, the task is terminated, enabling selection and execution of a new task (e.g., via Terminate 812 and Picker 830. If One Source, No Destination Instruction 1020 is a conditional branch, then the task is only terminated if the conditional branch is not taken.

FIG. 12 illustrates selected details of an embodiment of an immediate instruction, as Immediate Instruction 1030. Immediate Instruction 1030 comprises Instruction Type 1031, Opcode 1032, Operand 0 1033.2, and Immediate 1034. In some embodiments, Immediate Low 1034.1 comprises a 9-bit field and Immediate High 1034.2 comprises a 1-bit field. The concatenation of Immediate Low 1034.1 and Immediate High 1034.2 is collectively referred to (and illustrated as) as Immediate 1034. In some embodiments, Immediate Instruction 1020 comprises 20 bits.

In some embodiments, Instruction Type 1031 comprises a 1-bit field, "0", specifying that the instruction is an immediate instruction, and Opcode 1032 comprises a 5-bit field specifying a particular operation (e.g., load source0 DSR, load source1 DSR, load destination DSR, store source0 DSR, store source1 DSR, and store destination DSR). In some scenarios, execution of an Immediate Instruction 1030 (e.g., a load DSR instruction, and a load XDSR instruction) loads data from one of Memory 854 and D-Store 848 to a DSR of DSRs 846. In other scenarios, execution of an Immediate Instruction 1030 (e.g., a store DSR instruction, and a store XDSR instruction) stores data from a DSR of DSRs 846 to one of Memory 854 and D-Store 848.

In some embodiments, Operand 0 1033.2 comprises a 4-bit field and Opcode 1032 determines how Operand 0 1033.2 is interpreted. In some scenarios (e.g., if Operand 0 1033.2 specifies an operation without a register operand such as a jump operation), Immediate Low 1034.1, Operand 0 1033.2, and Immediate High 1034.2 are concatenated to form a 14-bit immediate. In some other scenarios, Immediate 1034 is sign extended to form a 16-bit immediate. In yet other scenarios, Immediate 1034 is sign extended to form a 15-bit address. In yet other scenarios, Immediate 1034 is shifted one bit to the left and sign extended to form a 15-bit address (e.g., for 32-bit data).

Wavelets

FIG. 13A illustrates selected details of an embodiment of a sparse wavelet, as Sparse Wavelet 1301. Sparse Wavelet 1301 comprises Sparse Wavelet Payload 1302 and Color 1324. Sparse Wavelet Payload 1302 comprises Index 1321, Sparse Data 1322, and Control Bit 1320. Index 1321 comprises Lower Index Bits 1321.1 and Upper Index Bits 1321.2.

In some embodiments, Sparse Data 1322 comprises a field for a 16-bit floating-point number or a 16-bit integer number. In various scenarios, Sparse Data 1322 variously represents a weight of a neural network, an input or stimulus of a neural network, an activation of a neural network, or a partial sum of a neural network.

In some embodiments, Index 1321 comprises a 16-bit field. In some scenarios, Index 1321 is an integer number and is an index that explicitly indicates a specific neuron of a neural network. In some embodiments, Lower Index Bits 1321.1 is six bits, and Upper Index Bits 1321.2 is 10 bits.

In some embodiments, Control Bit 1320 is 1-bit field. In some scenarios, Control Bit 1320 indicates whether Sparse Wavelet Payload 1302 triggers control activity or data activity. In some scenarios, control activity comprises computing the last activation of a neuron and data activity comprises computing activations of a neuron that are not the last activation. In some embodiments and/or usage scenarios, the control activity comprises a closeout activity.

In some embodiments, Color 1324 comprises a 5-bit field. In some embodiments, a color corresponds to and/or specifies a virtual channel over a shared physical channel, such as via routing in accordance with the color. In some scenarios, a color is used for a specific purpose such as sending configuration information to processing elements or sending input of a neural network to a neuron that is mapped to a processing element.

FIG. 13B illustrates selected details of an embodiment of a dense wavelet, as Dense Wavelet 1331. Dense Wavelet 1331 comprises Dense Wavelet Payload 1332 and Color 1344. Dense Wavelet Payload 1332 comprises Dense Data 1343.1, Dense Data 1343.2, and Control Bit 1340.

In some embodiments, Control Bit 1340 is a 1-bit field and is functionally identical to Control Bit 1320.

In some embodiments, Color 1344 comprises a 5-bit field and is functionally identical to Color 1324.

In some scenarios, Dense Data 1343.1 and Dense Data 1343.2 comprise fields for respective 16-bit floating-point numbers or respective 16-bit integer numbers. In various scenarios, Dense Data 1343.1 and Dense Data 1343.2 variously represent weights of a neural network, inputs or stimuli of a neural network, activations of a neural network, or partial sums of a neural network. In some scenarios, Dense Data 1343.1 and Dense Data 1343.2 collectively comprise a 32-bit floating-point number (e.g., Dense Data 1343.1 comprises a first portion of the 32-bit floating-point number and Dense Data 1343.2 comprises a second portion of the 32-bit floating-point number).

In various embodiments and/or usage scenarios, usage of sparse wavelets vs. dense wavelets is variously predetermined, dynamically determined, and/or both. In various embodiments and/or usage scenarios, usage of sparse wavelets vs. dense wavelets is determined by software.

Figure 14:
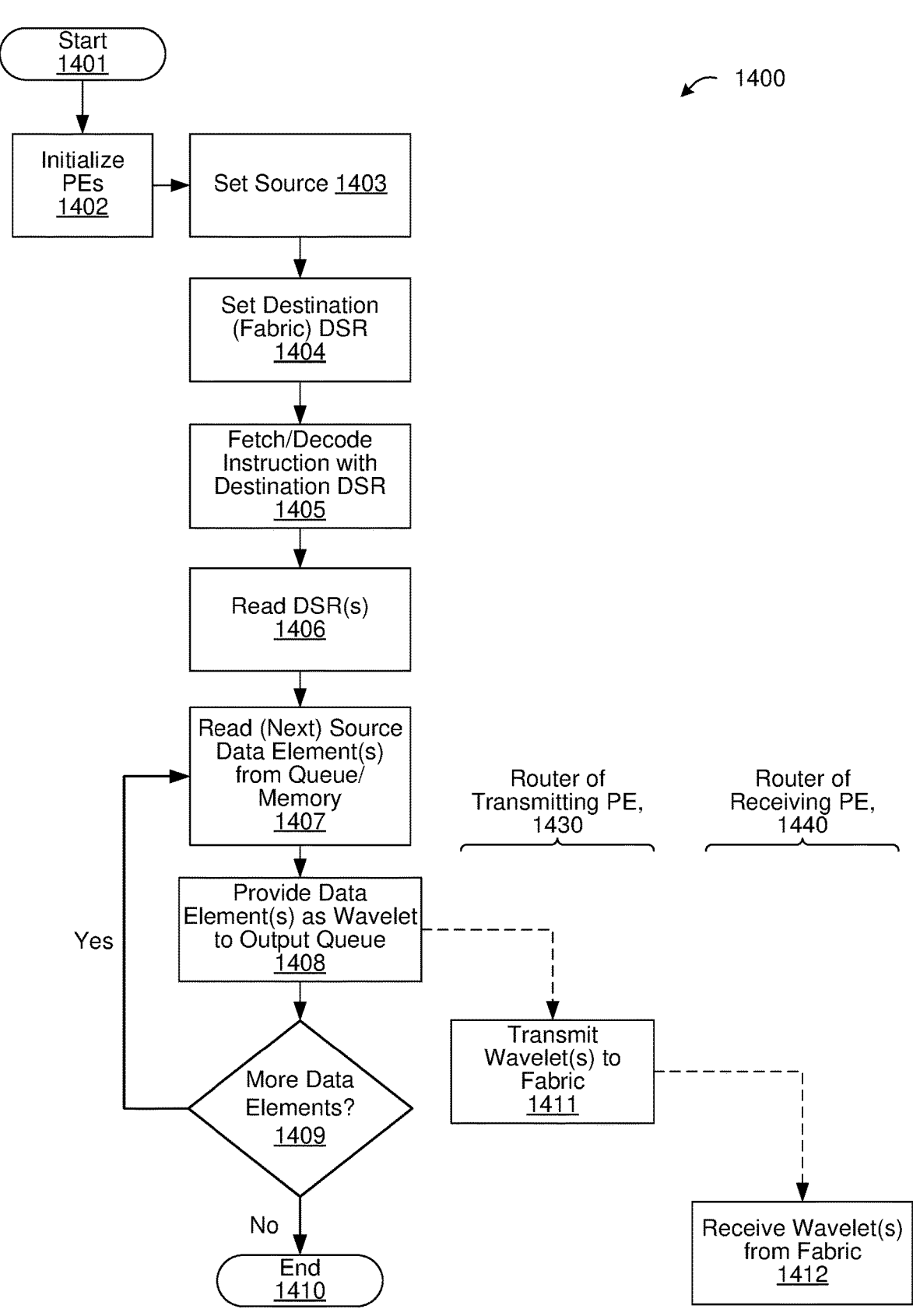
FIG. 14 illustrates selected details of an embodiment of creating and transmitting a wavelet.

FIG. 14 illustrates selected details of an embodiment of creating and transmitting a wavelet, as Wavelet Creation Flow 1400. Actions of Wavelet Creation Flow 1400 are performed by various agents. A transmitting PE comprises a CE that performs actions 1403-1409, as illustrated by CE of Transmitting PE 1420. The transmitting PE further comprises a router that performs action 1411, as illustrated by Router of Transmitting PE 1430. A receiving PE comprises a router that performs action 1412, as illustrated by Router of Receiving PE 1440.

Creating and transmitting a wavelet begins (Start 1401) by initializing at least one transmitting PE and one or more receiving PEs, as well as any PEs comprising routers implementing a fabric coupling the transmitting PEs and the receiving PEs (Initialize PEs 1402). Each of the PEs comprises a respective router (e.g., Router 510 of FIG. 5) and a respective CE (e.g., Compute Element 520 of FIG. 5). In some scenarios, initializing a PE enables the CE of the PE to perform computations and enables the router of the PE to transmit, receive, and/or route wavelets over the fabric.

In various embodiments, a DSR holds a DSD comprising information about an operand such as location of data elements (e.g., memory, fabric input, and/or fabric output), number of the data elements (e.g., length), an address or addresses of the data elements (e.g., start address and stride in memory). For fabric output operands (e.g., wavelets sent via the fabric), the DSR comprises a color for the wavelet(s) on the fabric, a control bit, and optionally a value or location of an index.

In some embodiments, the CE of the transmitting PE configures a source (Set Source 1403). In some scenarios, the source is a source DSD describing a source operand. In various embodiments, the source DSD describes one or more data elements stored in one of: cache and memory. In other embodiments, the source DSD describes one or more data elements received via the fabric (e.g., the data elements are payloads of wavelets arriving via the fabric). In some other scenarios, the source comprises a source register (e.g., one of RF 842). In yet other scenarios, the source comprises an immediate specified in an instruction.

The CE also configures a destination DSD in a destination DSR describing the location of a destination operand. In various embodiments, the location of the destination operand is the fabric (Set Destination (Fabric) DSR 1404). In some embodiments, the destination DSD describes one or more data elements transmitted via the fabric. In various embodiments, the source and the destination DSDs are configured via one or more instructions.

Subsequently, the CE fetches and decodes an instruction (e.g., FMACH, MOV, LT16) comprising one or more source operands, an operation, and a destination operand specified by the DSD in the destination DSR (Fetch/Decode Instruction with Destination DSR 1405). In some embodiments, the operand type fields of the instruction specify whether an operand is specified by a DSD.

The CE reads the destination DSD from the destination DSR and any source DSDs in source DSRs (Read DSR(s) 1406). Based on the DSDs, the CE determines the type of data structure, the source of the data element(s), whether multiple data elements are read together (e.g., for a SIMD operation), and a total number of data elements for each operand. In some scenarios, DSRs are read for one or more of: a source0 operand, a source1 operand, and a destination operand. In some embodiments and/or usage scenarios, the DSRs are read entirely or partially in parallel, and in other embodiments and/or usage scenarios, the DSRs are read entirely or partially sequentially.

The CE of the transmitting PE reads (e.g., from register or memory) the first data element(s) specified by the source (Read (Next) Data Elements(s) from Queue/Memory 1407) and performs the operation specified by the instruction (e.g., multiplication) on the first data element(s). In response to the destination operand being specified as a fabric type by the destination DSD, the CE creates one or more wavelets. One or more results of the operation (e.g., in a form of data elements) are used to form a wavelet payload, based on the destination DSD. The control bit of the wavelet payload and the color of the wavelet are specified by the destination DSD. The wavelet payload and the color are provided to the router of the transmitting CE (Provide Data Element(s) as Wavelet to Output Queue 1408). In some embodiments and/or usage scenarios, a single data element is used to create the payload of a sparse wavelet. In other embodiments and/or usage scenarios, two data elements are used to create the payload of a dense wavelet. In various embodiments, four data elements are used to create the payload of two wavelets. In some embodiments, the number of data elements used is specified by the destination DSD.

The CE of the transmitting PE determines if additional data element(s) are specified by the destination DSD (More Data Elements? 1409). If additional data element(s) are specified by the destination DSD, then the CE creates additional wavelet(s) via actions Read (Next) Source Data Element(s) from Queue/Memory 1407, Provide Data Element(s) as Wavelet to Output Queue 1408, and More Data Elements? 1409 until no additional data element(s) are specified by the destination DSD. If no additional data element(s) are specified by the destination DSD, then flow concludes (End 1410). In some embodiments, the wavelets created via action 1408 are of the same color as specified by the destination DSR.

The router of the transmitting PE transmits the wavelet(s) in accordance with the color of the wavelet(s) (Transmit Wavelet(s) to Fabric 1411), in accordance with respective colors of the wavelets. In some embodiments and/or usage scenarios, the transmitting is directly to the router of the receiving PE. In some embodiments and/or usage scenarios, the transmitting is indirectly to the router of the receiving PE, e.g., via one or more intervening PEs acting to forward the wavelet(s) in accordance with the colors. The router of the receiving PE receives the wavelet(s) in accordance with the color (Receive Wavelet(s) from Fabric 1412).

In various embodiments, action 1411 is performed asynchronously with respect to any one or more of actions 1407, 1408, and 1409. For example, a plurality of wavelets is produced by action 1408 before any of the produced wavelets are transmitted as illustrated by action 1411.

In various embodiments, Receive Wavelet(s) from Fabric 1412 corresponds in various respects to Receive Wavelet at Router 1503 of FIG. 15.

In various embodiments and/or usage scenarios, all or any portions of any one or more of elements of Wavelet Creation Flow 1400 correspond conceptually to and/or are related conceptually to operations performed by and/or elements of a PE, e.g., PE 499 of FIG. 4.

In various embodiments and/or usage scenarios, all or any portions of any one or more of elements of Wavelet Creation Flow 1400 (e.g., any one or more of actions 1403-1409) correspond conceptually to and/or are related conceptually to operations performed by and/or elements of a compute element, such as all or any portions of a CE of a PE, e.g., Compute Element 520 of FIG. 5 and/or CE 800 of FIG. 8. As an example, the destination DSR (associated with Set DSR Destination (Fabric) DSR 1404) is one of DSRs 846. In some scenarios, the source DSR (associated with Set Source 1403) is one of DSRs 846; in other scenarios the source register (associated with Set Source 1403) is one of RF 842.

As another example, CE 800 as the CE of the transmitting PE performs action 1403 in response to a load DSR instruction copying information from Memory 854 into the source DSR (e.g., one of DSRs 846). In various embodiments, the source DSR specifies the location of the data elements as one of Memory 854, D-Store 848, and RF 842. In some scenarios, the source DSR specifies an address of a first data element in Memory 854 (e.g., address 0x0008), a number of data elements (e.g., nine data elements), and a stride between subsequent data elements (e.g., bytes). As another example, CE 800 performs action 1403 by writing data into a register of RF 842.

As another example, CE 800 as the CE of the transmitting PE performs action 1404 in response to a load DSR instruction copying information from Memory 854 into the destination DSR (e.g., one of DSRs 846). In various embodiments, the destination DSR specifies transformation of one or more data elements into one or more wavelets and transmitted by Router 510 via a fabric-coupled egress port (e.g., North 513). The destination DSR specifies a color for the wavelet(s), a control bit for the wavelet(s), a number of data elements (e.g., length), and information about an index of the wavelet(s). In some scenarios, the destination DSR specifies the value of the index and in other scenarios the destination DSR specifies a location of the value of the index (e.g., in a register of RF 842).

As another example, CE 800 as the CE of the transmitting PE performs actions 1406, 1407, 1408, and 1409 in response to fetching and decoding an instruction specifying a destination DSR as a destination operand (action 1405). In some embodiments and/or usage scenarios, D-Seq 844 reads the source DSR(s) and accesses one, two, or four data elements specified by each source DSR, e.g., from Memory 854 or D-Store 848, thereby performing action 1407. In various embodiments, Memory 854 and/or D-Store 848 provide the data elements to Data Path 852. The Data Path 852 performs the operation on the data elements (e.g., adding source0 data elements to source1 data elements). In accordance with the destination DSD, Data Path 852 transforms the result data of the operation into a wavelet and writes the wavelet to one of Output Queues 859 as specified by a color of the destination DSD, thereby performing action 1408. In some embodiments, CE 800 of the transmitting PE performs action 1409 by comparing a number of data elements specified in the destination DSD (e.g., a length) against the number of data elements sent via action 1408 (e.g., tracked by a counter).

As another example, CE 800 as the CE of the transmitting PE performs action 1408. The CE transforms the one or two data element(s) into a wavelet payload, according to the destination DSD. In some embodiments and/or usage scenarios, the CE transforms a single data element into a wavelet payload formatted in accordance with Sparse Wavelet 1301 of FIG. 13A. The single data element is transformed into an instantiation of Sparse Data 1322, an index value specified by the destination DSD is transformed into an instantiation of Index 1321, and a control bit from the destination DSD is transformed into an instantiation of Control Bit 1320, thereby forming an instantiation of Sparse Wavelet Payload 1302.

As another example, CE 800 as the CE of the transmitting PE transforms two data elements into a wavelet payload formatted in accordance with Dense Wavelet 1331 of FIG. 13B. The first data element is transformed into an instantiation of Dense Data 1343.1 and the second data element is transformed into an instantiation of Dense Data 1343.2. The control bit from the destination DSD is transformed into an instantiation of Control Bit 1340, thereby forming an instantiation of Dense Wavelet Payload 1332.

In some embodiments, the CE provides the wavelet(s) to the router asynchronously (e.g., in accordance with action 760 of FIG. 7C).

In various embodiments and/or usage scenarios, all or any portions of any one or more of elements of Wavelet Creation Flow 1400 (e.g., any one or more of actions 1411 and 1412) correspond conceptually to and/or are related conceptually to operations performed by and/or elements of a router, such as all or any portions of a router of a PE, e.g., Router 510 of FIG. 5 and/or Router 600 of FIG. 6, action 760 of FIG. 7C, and action 747 of FIG. 7B.

As an example, Transmit Wavelet(s) to Fabric 1411 is performed by Router 600 as Router of Transmitting PE 1430 in accordance with action 760 of FIG. 7C. As another example, Receive Wavelet(s) from Fabric 1412 is performed by Router 600 as Router of Receiving PE 1440 in accordance with action 747 of FIG. 7B.

In some embodiments and/or usage scenarios, all or any portions of elements of Wavelet Creation Flow 1400 conceptually correspond to all or any portions of executions of instructions of Task SW on PEs 260 of FIG. 2.

FIG. 15 illustrates selected details of an embodiment of receiving a wavelet as Wavelet Receive Flow 1500. Actions of Wavelet Receive Flow 1500 are performed by various agents. A receiving PE comprises a router performing actions 1503-1506, as illustrated by Router of Receiving PE 1520. The receiving PE further comprises a CE performing action 1507, as illustrated by CE of Receiving PE 1530.

Receiving a wavelet begins (Start 1501) by initializing at least one transmitting PE and one or more receiving PEs as well any PEs comprising routers implementing fabric coupling the transmitting PEs and the receiving PEs (Initialize PEs 1502). Each of the PEs comprises a respective router (e.g., Router 510 of FIG. 5) and a respective CE (e.g., Compute Element 520 of FIG. 5). In some scenarios, initializing a PE enables the CE of the PE to perform computations and enables the router of the PE to transmit, receive, and/or forward wavelets over the fabric.

The following description assumes there is a single receiving PE. In usage scenarios where there is plurality of receiving PEs, the respective routers and CEs of each of the receiving PEs perform processing in accordance with FIG. 15.

The router of the receiving PE receives a wavelet 'on a color' (e.g., the wavelet comprises the color) of the fabric (Receive Wavelet at Router 1503), as transmitted by the transmitting PE. The router checks the destination(s) of the wavelet based on the color, e.g., by reading a configuration register. If the destination(s) of the wavelet includes other PEs (To Other PE(s)? 1504), then the router transmits the wavelet to the destination PE(s). The router sends the wavelet to output(s) of the router (Transmit Wavelet to Output(s) 1505), and the wavelet is transmitted from the output across the fabric to the destination PE(s). If the destination(s) of the wavelet does not include other PEs, then the transmitting is omitted.

If the destination(s) of the wavelet do not include the local CE (For Local CE? 1506), then no further action is taken (End 1510). If one of the destination(s) of the wavelet is the local CE, then the router provides the wavelet to the local CE via the Off Ramp and the wavelet is selectively (e.g., in accordance with zero or more wavelet filters) written into a picker queue associated with the color that the wavelet was received on (Selectively Write Wavelet to Picker Queue 1507), thereby receiving the wavelet (End 1510).

In various embodiments and/or usage scenarios, all or any portions of any one or more of elements of Wavelet Receive Flow 1500 (e.g., any one or more of actions 1503-1506) correspond conceptually to and/or are related conceptually to operations performed by and/or elements of a router, such as all or any portions of a router of a PE, e.g., Router 510 of FIG. 5 and/or Router 600 of FIG. 6.

As an example, Receive Wavelet at Router 1503 is performed by Router 600 as Router of Receiving PE 1520 when a wavelet is received on one of Data In 610. Subsequently, To Other PE(s)? 1504 and For Local CE? 1506 are performed by Router 600, using the color of the wavelet to determine the destination(s) of the wavelet, e.g., by reading Dest 661. For each input color, Dest 661 indicates the output destination(s), e.g., one or more of Data Out 620. If Dest 661 indicates that the output includes other PEs (e.g., via one of SkipX+ 621, SkipX− 622, X+ 623, X− 624, Y+ 625, and Y− 626), then the wavelet is sent to other PEs by Router Sched 654. If Dest 661 indicates that the output includes the CE of the PE (e.g., Off Ramp 627), then the wavelet is sent to the CE by Router Sched 654. The wavelet remains in one of Data Queues 650 until action 1505 is performed by scheduling the wavelet (e.g., by Router Sched 654) to be sent to one or more of Data Out 620.

In various embodiments and/or usage scenarios, all or any portions of any one or more of elements of Wavelet Receive Flow 1500 (e.g., action 1507) correspond conceptually to and/or are related conceptually to operations performed by and/or elements of a compute element, such as all or any portions of a CE of a PE, e.g., Compute Element 520 of FIG. 5 and/or CE 800 of FIG. 8. As an example, Selectively Write Wavelet to Picker Queue 1507 is performed by sending the wavelet via Off Ramp 820 to CE 800 and selectively (e.g., in accordance with zero or more wavelet filters) writing the wavelet into one of Input Qs 897. In some embodiments, action 1507 additionally comprises setting the active bit (of Active Bits 898) corresponding to the one of Input Qs 897.

In some embodiments and/or usage scenarios, wavelets are received by the router, queued, and routed to router output ports without any specific determination that a wavelet is for a local CE. Instead, wavelets destined for the local CE are routed to the off ramp and are then written into the picker queue. Wavelets not destined for the local CE are routed to other-than the off ramp router outputs.

FIG. 16 illustrates selected details of an embodiment of consuming a wavelet as Wavelet Consumption Flow 1600. Actions of Wavelet Consumption Flow 1600 are performed by a CE of a PE.

Consuming a wavelet begins (Start 1601) by the picker selecting the wavelet from a queue for processing (Picker Selects Wavelet for Processing 1602), and then the CE processes the wavelet. The CE fetches and executes instructions associated with the wavelet (Fetch, Execute Instructions 1603), thereby consuming the wavelet (End 1604). In some embodiments and/or usage scenarios, fetching and executing instructions associated with the wavelet ends with fetching and executing a terminate instruction.

In some embodiments, Picker Selects Wavelet for Processing 1602 is performed by Picker 830 of FIG. 8. In various scenarios, Picker 830 selects one of Input Qs 897 that is ready (e.g., Block Bits 899 and Active Bits 898 are certain values), according to a scheduling policy such as round-robin or pick-from-last. In some embodiments, portions of Wavelet Consumption Flow 1600 correspond to portions of Processing a Wavelet for Task Initiation 900 of FIG. 9A. As an example, action 1602 corresponds to action 902. As another example, action 1603 corresponds to actions 903, 904, 910, 905, and 906.

In some other scenarios, the wavelet is accessed as an operand by an instruction (e.g., FMACH) executing on the CE and the wavelet is consumed by the CE during the execution of the instruction.

DLA Software Architecture Concepts

Figure 17A:
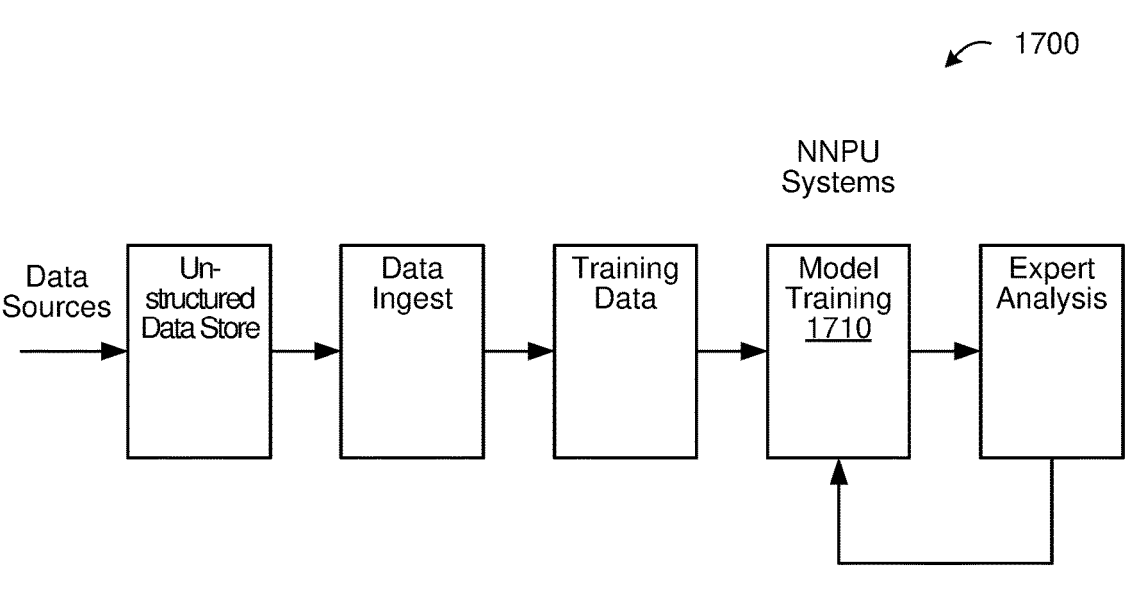
FIGS. 17A and 17B illustrate selected concepts associated with various embodiments of software elements associated with a deep learning accelerator.

FIG. 17A illustrates a high-level view of concepts of a deep learning accelerator usage model as Usage Model 1700. As illustrated, data sources are provided to an unstructured data store that in turn feeds forward to data ingest that in turn feeds to training data. The training data feeds into Model Training 1710 that loops with expert analysis.

Figure 17B:
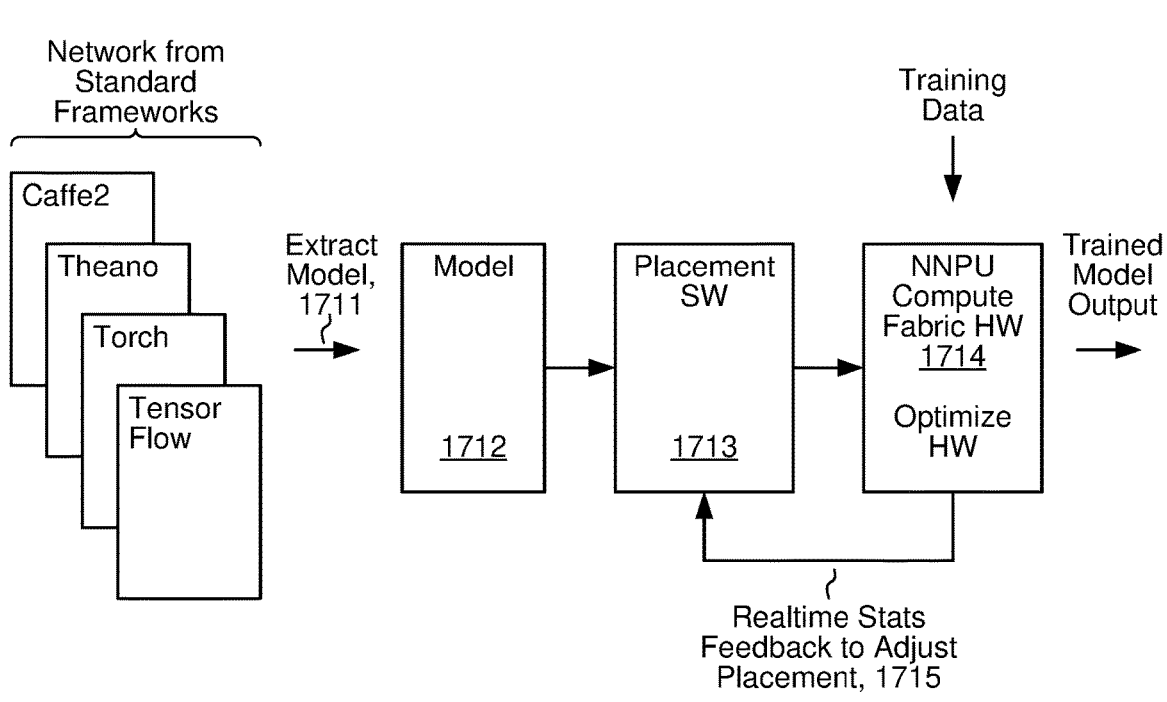

FIG. 17B illustrates various details of Model Training 1710. As illustrated, a network is provided from a standard framework (e.g. Caffe2, Theano, Torch, and TensorFlow). A model (Model 1712) is extracted (Extract Model 1711) and fed into placement SW (Placement SW 1713). Results of the placement SW are used to configure NNPU compute fabric HW (NNPU Compute Fabric HW 1714). Realtime stats are fed back to the placement SW (Realtime Stats Feedback to Adjust Placement 1715) to effect placement adjustments. The NNPU outputs a trained model.

In various embodiments and/or usage models, all or any portions of NNPU Compute Fabric HW 1714 correspond to all or any portions of DLA 120 of FIG. 1, and all or any portions of Extract Model 1711, Model 1712, Placement SW 1713, and Realtime Stats Feedback to Adjust Placement 1715 correspond to all or any portions of FIG. 2 and/or FIG. 3.

Figure 18:
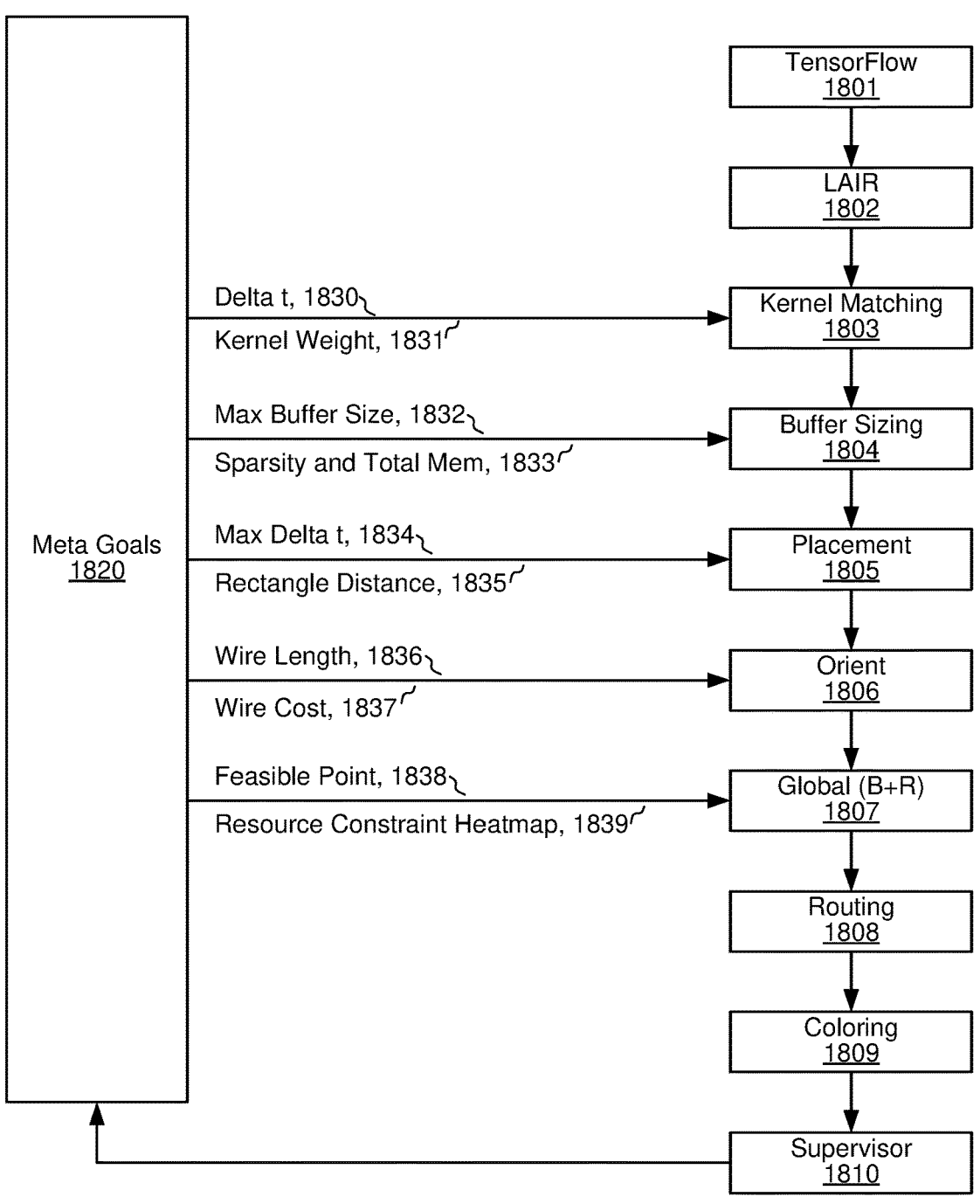
FIG. 18 illustrates selected concepts associated with various embodiments of software elements (operated as e.g. a software stack), such as a placement pipeline, associated with a deep learning accelerator.

FIG. 18 illustrates selected concepts associated with various embodiments of software elements (operated as e.g. a software stack), such as a placement pipeline, associated with a deep learning accelerator, as Placement Pipeline 1800. Each stage of the pipeline is an optimization problem and makes simplifying assumptions. Each stage is constrained by previous and subsequent stages. The stages communicate indirectly via "meta goals".

The meta goals are illustrated as Meta Goals 1820. Stages 1801-1810 feed forward from one to the next (TensorFlow 1801, LAIR 1802, Kernel Matching 1803, Buffer Sizing 1804, Placement 1805, Orient 1806, Global (B+R) 1807, Routing 1808, Coloring 1809, and Supervisor 1810). Supervisor 1810 then feeds into Meta Goals 1820. Meta Goals 1820 then feeds various stages with meta goal information. Meta goal information is provided to Kernel Matching 1803 via Delta t 1830 and Kernel Weight 1831. Meta goal information is provided to Buffer Sizing 1804 via Max Buffer Size 1832 and Sparsity and Total Mem 1833. Meta goal information is provided to Placement 1805 via Max Delta t 1834 and Rectangle Distance 1835. Meta goal information is provided to Orient 1806 via Wire Length 1836 and Wire Cost 1837. Meta goal information is provided to Global (B+R) 1807 via Feasible Point 1838 and Resource Constraint Heatmap 1839.

Figure 19:
FIG. 19 illustrates selected concepts associated with various embodiments of software elements, such as how optimization is structured, associated with a deep learning accelerator.

FIG. 19 illustrates selected concepts associated with various embodiments of software elements, such as how optimization is structured, associated with a deep learning accelerator. The selected concepts are conceptually representative of quality/cost tradeoffs for model realization. The selected concepts are illustrated collectively as Placement Pipeline Optimization Structure 1900 and are applicable generally to the placement pipeline stages illustrated in FIG. 18. Elements of FIG. 18 variously implement respective views corresponding to graphs such as illustrated by Placement Pipeline Optimization Structure 1900, e.g., as one or more cost functions.

Cost 1902 corresponds to hardware cost (e.g. resources). Budget 1904 corresponds to how much hardware is available according to embodiment, e.g., an entire wafer of PEs. Quality 1901 is relatively high, for example, when solution runtime time is low. Goal 1903 represents an objective for optimization.

DLA Software Architecture Example Embodiment

The following describes an example software architecture for operation with a DLA (such as all or any portions of Deep Learning Accelerator 120 of FIG. 1).

The 'DLA-compute-engine' of this section corresponds, in various embodiments and/or usage scenarios, to, e.g., all or any portions of any one or more instances of any one or more of PE 497, 498, and/or 499 elements of any of FIGS. 4A-C. The 'compute fabric' of this section corresponds, in various embodiments and/or usage scenarios, to, e.g., all or any portions of any one of Wafer 412 of FIG. 4A, Substrate 413 of FIG. 4B, and Substrate 414 of FIG. 4C. The 'DLA' of this section corresponds, in various embodiments and/or usage scenarios, to, e.g., all or any portions of DLA 120 of FIG. 1. In various embodiments and/or usage scenarios, any one or more of all or any portions of the 'Graph Compiler' of this section correspond variously to all or any portions of Placement Server(s) SW 210 of FIG. 2, e.g., Neuron to PE Mapping SW 212 of FIG. 2, all or any portions of all or any elements of FIG. 3, and/or all or any portions of all or any elements of FIGS. 46A-46D and FIGS. 47A-47G.

The DLA is a neural network acceleration appliance. The DLA is a hardware appliance that performs accelerated training of neural models. As an accelerator, the DLA operates together with a controlling master, workers, clients, etc. that run on industry standard servers. The DLA operates by loading a neural architecture into the DLA and then streaming training data through the DLA. When training is complete, the trained model parameters are exported from the DLA into matrix files.

Figure 20:
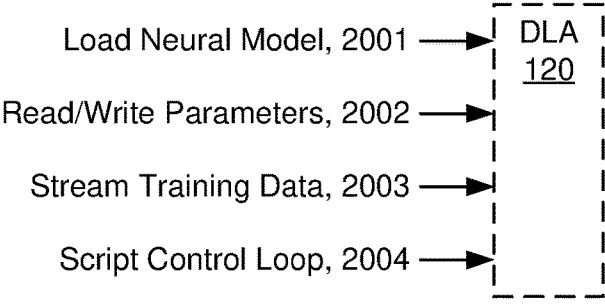
FIG. 20 illustrates various aspects of an embodiment of a streaming neural programming model, as used by a Deep Learning Accelerator(DLA).

FIG. 20 illustrates various aspects of an embodiment of a streaming neural programming model, as used by a DLA.

The DLA uses a streaming neural programming model, illustrated, e.g., as Load Neural Model 2001, Read/Write Parameters 2002, Stream Training Data 2003, and Script Control Loop 2004 interacting with DLA 120.

An example usage includes:

1. A neural connectionist model is placed on the DLA.
2. Initial model parameters are loaded onto the DLA.
3. In a loop (e.g. as a script running in Python):
    a. Model hyperparameters on the DLA are set/updated,
    b. Training data is streamed to the DLA, and
    c. Model parameters are check-pointed from the DLA to a client computer.

Figure 21:
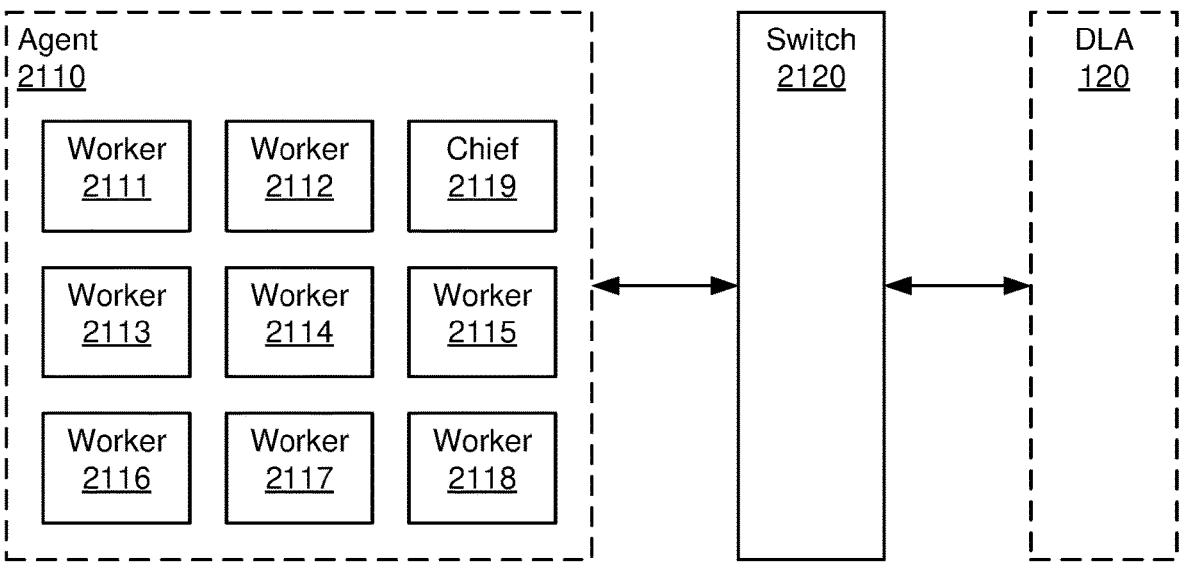
FIG. 21 illustrates an example DLA deployment.

FIG. 21 illustrates an example DLA deployment. An agent (Agent 2110) comprises a plurality of workers (Workers 2111-2118) and a chief (Chief 2119) coupled to a DLA (DLA 120) via a switch (Switch 2120). In various embodiments and/or usage scenarios, a DLA operates with a distributed training agent that is run using a cloud of virtual machines. As illustrated, Agent 2110 is coordinated by Chief 2119. Chief 2119 runs a neural framework such as TensorFlow. Chief 2119 defines the neural model, compiling the model for DLA 120, configuring DLA 120, and running a script control loop. Workers 2111-2118 pre-process and stream training data into DLA 120. DLA 120 implements connections from up to, e.g., 4096 simultaneous workers. The number of required workers depends on characteristics of the neural model, the size of the training dataset, and on the CPU efficiency of pre-processing. For example, Chief 2119 variously performs any one or more of cluster orchestration, script control loop processing, model definition, parameter checkpoints, and arbitration for DLA access, while any one or more of Workers 2111-2118 variously perform any one or more of processing associated with a training database, an ingest pipeline, and/or streaming training data.

The following example exemplifies various concepts relating to using the DLA to train a neural model, with respect to infrastructure as illustrated in FIG. 21.

1. A user decides to use the DLA to train a neural network.
2. The user logs into a network host in the datacenter where the DLA is installed. The network host is operated as the chief.
3. On the chief, the user runs the graph compiler on a neural network description, at least in part to identify potential errors and to generate a binary image suitable for execution on the DLA.
4. The user uses the chief to allocate a number of additional network hosts in the datacenter to use as workers to stream training data into the DLA. The allocation is variously managed by a framework environment, a cloud provisioning environment, and/or according to the instructions of a network administrator, according to various embodiments and/or usage scenarios.
5. The user ensures that a training database is available to each worker host. In various embodiments and/or usage scenarios, the worker hosts are used exclusively for pre-processing training examples in the database and collectively streaming the data into the DLA.
6. The chief instructs the workers to obtain network socket bindings to the DLA.
7. The chief loads the compiled model into the DLA. The model is now resident on the DLA and in a paused state not yet consuming training input.
8. The chief instructs the workers to send training data to the DLA. The training data is sent indefinitely in an infinite loop until the chief later commands the workers to stop.

9. The chief sets the initial value of all model parameters on the DLA.
10. The chief invokes a training control script that runs some number of training epochs in a loop.
11. Each loop iteration performs the following:
    a. The chief sets model hyperparameters such as learning rate.
    b. The chief commands the DLA to start/resume training for one epoch of data.
    c. The chief commands the DLA to pause.
    d. Once out of every several epochs only, the chief reads all model parameters from the DLA to save on local disk as a checkpoint.
12. When training is complete, the chief instructs all the workers to stop streaming and close their network connections.
13. The user retains the results of training in the captured checkpoint data. In various embodiments and/or usage scenarios, capture streaming analytics (such as values of the loss function and/or hidden layer statistics) are captured from the trained model.

In various embodiments and/or usage scenarios, the DLA is comprised of any one or more of a DLA-compute-engine for evaluating neural models, a high bandwidth DLA-data-path for feeding the DLA-compute-engine, a DLA-control-path that orchestrates the activity of the DLA-data-path, and a DLA-system-manager that manages provisioning, power, cooling, and boot sequencing. The DLA-compute-engine comprises an interconnected mesh of individual computer cores (such as a mesh of PEs as illustrated in any of FIGS. 4A, 4B, and 4C). The DLA-compute-engine is the active computational substrate where neural model training is performed. Each core has respective floating-point arithmetic units, addressable memory, and a programmable neural multicast router.

The DLA-data-path comprises many TCP/IP protocol streams. The streams flow into a staging buffer. A separate part of the DLA-data-path transfers data from the staging buffer to the DLA-compute-engine. In some embodiments, all transfers between the DLA-compute-engine and the staging buffer are triggered by the DLA-control-path.

The control plane is comprised of a Connection Manager and a TCP Offload Engine Driver. The Connection Manager is a control host that orchestrates activity on the DLA-data-path, and variously implements any one or more of:

1. Connection Management: provisioning network connections to the DLA-data-path,
2. Memory Management: allocating staging buffer memory,
3. Transfer Management: triggering data transfers between staging memory and the DLA-compute-engine,
4. Execution Control: global pause and resume of activity, and
5. Locking Arbitration: arbitration of a global system advisory lock.

In various embodiments and/or usage scenarios, the TCP Offload Engine Driver implements all or any portions of a TCP state machine.

Regarding System Management, the DLA-System-Manager is a processor in an always-on power domain and implements any one or more of:

1. Firmware storage,
2. System diagnostics,
3. Power management,
4. Cooling management, and
5. Boot sequencing.

In various embodiments and/or usage scenarios, the DLA-System-Manager provides various baseboard management controller (e.g. BMC) functionalities.

The following describes a usage model such as an example operating environment architecture for interaction with the DLA.

Various functionalities of the DLA are exposed via a toolchain. The toolchain provides a structure in which all or any portions of development components are integrated, according to embodiment. The toolchain provides flexible deployment on one network host as a single agent, or on multiple network hosts as a single distributed agent.

Figure 22:
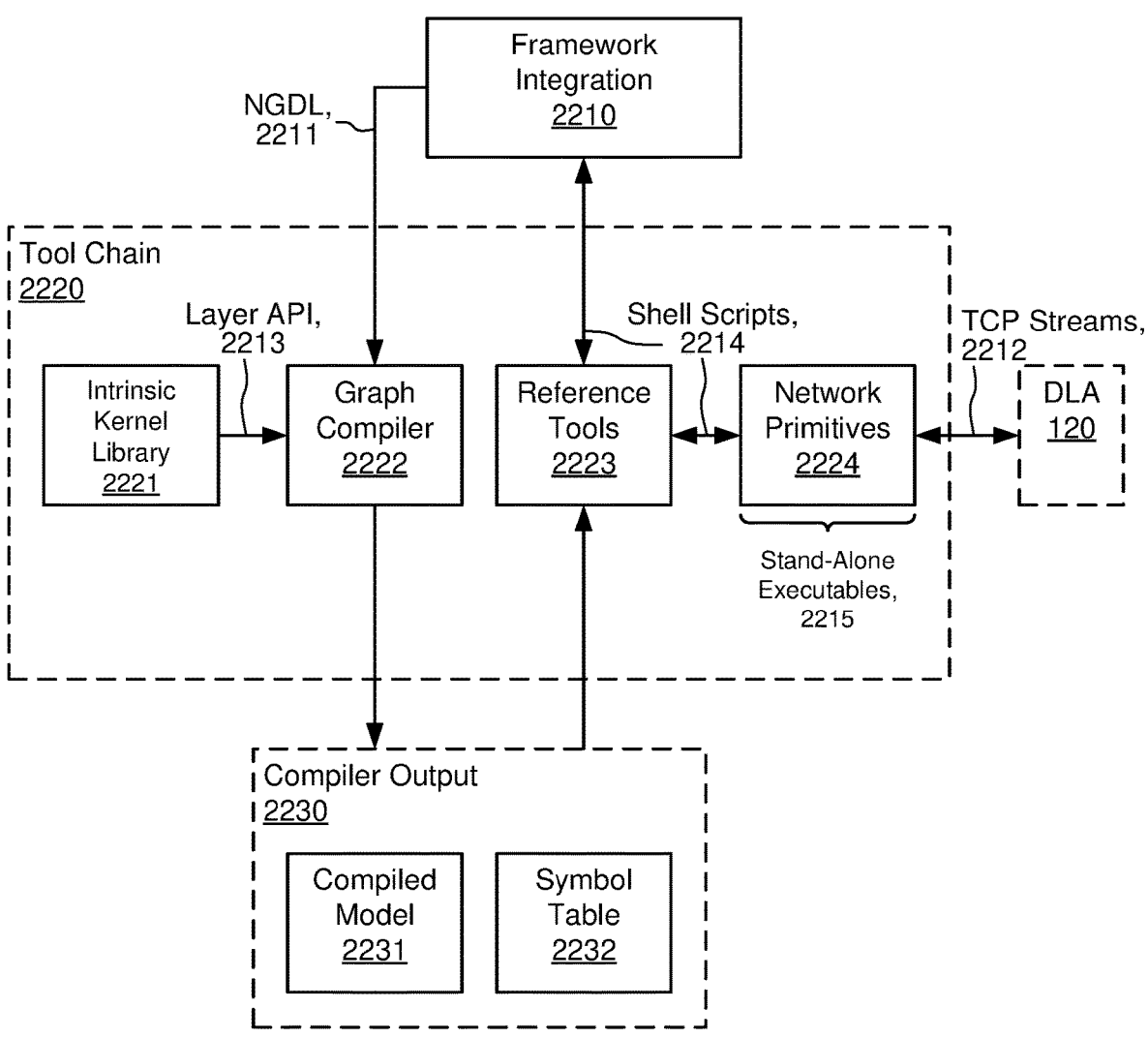
FIG. 22 illustrates selected details of an embodiment of a run time support environment.

FIG. 22 illustrates selected details of an embodiment of a run time support environment. Conceptually, Framework Integration 2210 communicates with Tool Chain 2220 that in turn communicates with Compiler Output 2230 and DLA 120.

Tool Chain 2220 comprises Intrinsic Kernel Library 2221, Graph Compiler 2222, Reference Tools 2223, and Network Primitives 2224. Compiler Output 2230 comprises Compiled Model 2231 and Symbol Table 2232.

Framework Integration 2210 communicates NGDL 2211 to Graph Compiler 2222 of Tool Chain 2220. Graph Compiler 2222 of Tool Chain 2220 communicates with Compiler Output 2230. Compiler Output 2230 communicates with Reference Tools 2223 of Tool Chain 2220. Network Primitives 2224 communicates with DLA 120 via TCP Streams 2212.

Intrinsic Kernel Library 2221 communicates with Graph Compiler 2222 via Layer API 2213. Reference Tools 2223 communicates with Network Primitives 2224 and Framework Integration 2210 via Shell Scripts 2214. Network Primitives 2224 implements Stand-Alone Executables 2215.

The following table summarizes example toolchain components.

| Component | Provides | Interface Elements |
|---|---|---|
| Network Primitives | CLI access to DLA-control-path | Connection Manager Network protocol |
| | CLI access to DLA-data-path | Connection Manager API functions Port transfer protocol |
| Reference Tools | CLI access to DLA programming model | Network Primitives Compiled model format Fabric symbol table Programming model |
| Graph Compiler | Compilation from NGDL to DLA | NGDL model description Compiled model format |
| | Linking of intrinsic kernel library | Layer API Compute Fabric |
| | Optimized placement of kernels | |
| Framework Integration | TensorFlow bindings for DLA | TensorFlow APIs XLA TensorFlow Graph DataSet API Estimator API NGDL Reference Tools |
| Intrinsic Kernel Library | Optimized implementations of common network layers | Layer API Compute Fabric Algebraic Specification |

Network primitives comprise stand-alone executables that perform isolated DLA-control-path and DLA-data-path primitives. In various embodiments and/or usage scenarios, the network primitives execute on a user agent Chief and/or Worker nodes.

The graph compiler is enabled to receive NGDL input and to produce compiled binaries for the DLA. Graph compiler output comprises any one or more of:

1. Core State: settings of the registers for every PE in the DLA,
2. Instruction code: instruction code for every PE in the DLA,
3. Inter-processor Routing: router configuration for every PE in the DLA,
4. Symbol Table: parameter tensor map describing where each named tensor in the NGDL graph resides in memory, and
5. Performance Analysis: expected run-time performance statistics for the given compiler output.

A library of intrinsic kernels, each of which includes, e.g., a hand-written microcode template-program, provides arbitrary extensibility to the graph compiler. The graph compiler automatically identifies when it is appropriate to use an intrinsic kernel for a given model. In various embodiments and/or usage scenarios, the graph compiler is enabled to automatically generate kernels if an intrinsic kernel is not present in the library.

The following describes a framework interface that enables using various open source neural modeling frameworks with the DLA.

The DLA is compatible with various open source neural modelling frameworks. Frameworks provide any one or more of the following:

1. Neural modelling language,
2. Automatic differentiation,
3. Neural learning processes,
4. Training data selection and preprocessing,
5. Hyperparameter update schedule,
6. Model parameter initialization,
7. Model parameter checkpoint and restore,
8. Training statistics log, and
9. Training visualization tools.

Figure 23:
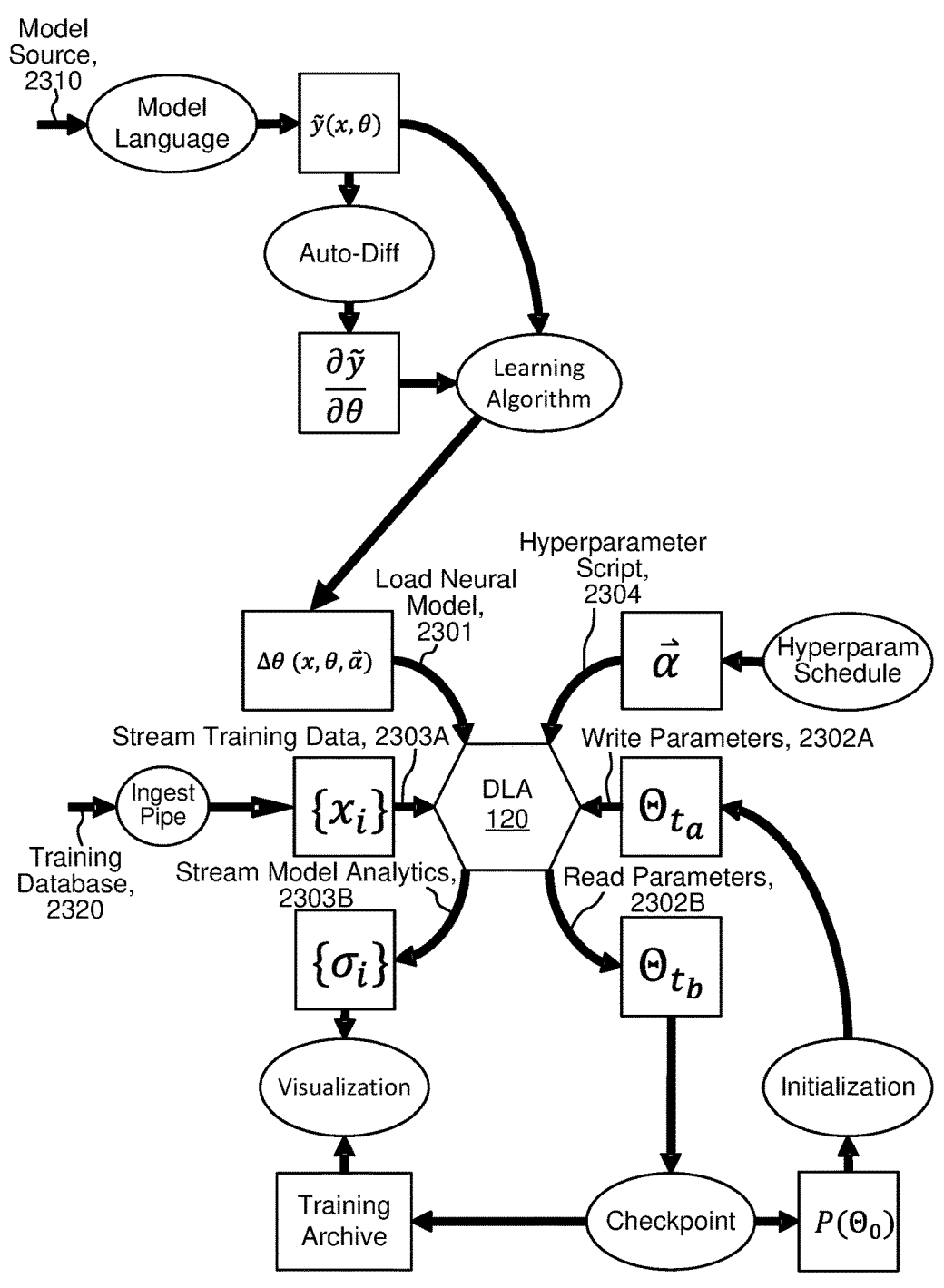
FIG. 23 illustrates selected details of an embodiment of a structure of a learning framework.

FIG. 23 illustrates selected details of an embodiment of a structure of a learning framework as Learning Framework Structure 2300. Model Source 2310 and Training Database 2320 are inputs to the learning framework that serves a train element, illustrated as an instance of DLA 120.

In operation, a neural model is loaded into DLA 120 (Load Neural Model 2301). Parameters are written to DLA 120 (Write Parameters 2302A). Training data is streamed to DLA 120 (Stream Training Data 2303A). Parameters are read from DLA 120 (Read Parameters 2302B). Model analytics are streamed from DLA 120 (Stream Model Analytics 2303B). A hyperparameter script manages selected aspects of operation of DLA 120 (Hyperparameter Script 2304).

FIG. 24 illustrates selected details of an embodiment of TensorFlow integration via an estimator API as TensorFlow Integration 2400. As illustrated, various operations are performed by Worker 2410 and Chief 2420.

TensorFlow is an example framework. In various embodiments and/or usage scenarios, TensorFlow bindings are provided. TensorFlow bindings comprise any one or more of the following APIs and tools based on the reference framework.

1. Graph importer—Accepts a TensorFlow model as an XLA (e.g. Accelerated Linear Algebra) protobuf and converts the model to NGDL.
2. Dataset ingest adapter—In various embodiments and/or usage scenarios, is a fully compliant implementation of the TensorFlow Dataset API that sends data directly to a DLA target. In some embodiments, the dataset ingest adapter is implemented in Python. In various embodiments and/or usage scenarios, any TensorFlow Dataset ingest code is enabled to directly use this implementation to redirect training data to the DLA. The Dataset API provides infinite streams of input for models.

3. Mega-batch trainer—Is invoked in place of, e.g., Session.run( ), and takes the equivalent spot of a "mini-batch" in existing TensorFlow with the exception. In various embodiments and/or usage scenarios, that batch-size is specified to be extremely large such that at O(100 ms–10 s) of DLA host time is utilized per call. Internally the DLA still performs processing at the native batch size specified in NGDL, enabling transparent use of a pre-existing TensorFlow Python training loop. The mega-batch trainer instructs the DLA to consume a specified number of input samples from the input stream. Then, model execution is quiescent so that subsequent variable and hyperparameter queries are enabled to have atomic access.

4. Training loop modifications—Calls to the reference tools are placed inside the training loop at appropriate places so that the TensorFlow process sees a consistent view of the TensorFlow model for all Python library calls.

The bindings provide a way to use the DLA on unmodified TensorFlow code that uses the Estimator API for models and the DataSet API for ingest pipeline.

The following is an overview of an NGDL.

The neural model is presented to the DLA using a neural graph description language (NGDL). NGDL implements various elements, such as any one or more of:

1. Graph of tensor operations,
2. Model parameters (as cycles in the graph),
3. Training dataset input nodes,
4. Function definitions,
5. Scalar constants embedded in node definitions, and
6. Initialization of reductions to identity elements of the reduction operator.

NGDL optionally implements various annotations, such as any one or more of:

1. Names for nodes and edges in the graph,
2. Graph pipelining effects,
3. Graph edge buffering, and
4. Numeric representation format for all tensors.

NGDL optionally implements various enhancements, such as any one or more of:

1. Graph re-computation strategy,
2. Linear operation parallel computation strategy, and
3. Operation sparsity expectations.

When in fully annotated form, NGDL unambiguously specifies all computations for neural network training. In various embodiments and/or usage scenarios, various software tools enable creating optimized fully annotated NGDL starting from unannotated NGDL input.

The following is an introduction to NGDL.

Neural Graph Description Language (NGDL) is an unambiguous notation for tensor dataflow programs. In various embodiments and/or usage scenarios, an NGDL program represents a process used to train a neural network, including inference, backpropagation, and parameter update.

An NGDL program is a dataflow graph (nodes and arcs), with an annotation on every node that describes its behavior, and an annotation on every arc that describes its storage capacity. There are input nodes and operational nodes. Input nodes provide training data inputs, operational nodes perform operations, and arcs hold tensor intermediate results that are passed between nodes. Arcs are directed; if (u,v) is a directed arc, the u is the tail node of the arc, v the head node of the arc; the node v is called an immediate successor of u, and u an immediate predecessor of v. An arc optionally holds one or more tensors (all the same size and shape) in transit, such as in a FIFO queue.

The dataflow graph is cyclic. Learned neural network parameters correspond to cycles in the graph. The execution model is deterministic. There are delays and storage around every cycle in the graph; this eliminates the potential for races. The tensors in the graph are required to be, and are, functions of the initial state of the system (the hyperparameters, the initial parameter values) and the inputs accepted up to a particular time.

The graph executes in a Petri Net style. A node with tensor inputs available on all its input ports, and with storage available for its output, is enabled to fire. When the node fires, the node produces a single tensor output that the node provides on all its output arcs. That output tensor is stored at the node that has produced it and remains on the output arcs until all the arcs connected to output ports accept this tensor as input. If the arc has no attached queue, then it accepts the tensor when its head node fires. If it has storage, then it accepts the tensor as soon as the tail of the queue is available to hold it. After the last of these consumers of the output tensor accept it, the output port becomes free and the node is now enabled to fire again. Operational nodes therefore alternate between waiting for outputs (to accept the last tensor it created) and waiting for inputs (so that it is enabled to fire again). All operational nodes are initially in the latter state.

Tensor operations are performed at each node in the graph. The tensor operations have a C equivalent, as a perfect loop nest (one with statements only inside the innermost loop); affine index expressions that specify which tensor elements are involved at a given loop iteration; and a C-language expression specifies how to combine elements of the input tensors to generate elements of the output tensor. In NGDL, for example, the inner loop operation is of the form <output tensor element> <binop1>=(<unop1><input tensor element>) <binop2> <unop2> <input tensor element>.

The two binary operators are, e.g., any one or more of: *(multiply), +(add), max, and min. Element by element division is performed via a*reciprocal(b). Element by element subtraction is a+(−b).

Scalar data are scalar constants or scalar hyperparameters. Scalars are permitted to occur freely, and are promotable to tensors, as in multiplication of a tensor by a scalar, or addition of a scalar to every element of a tensor (use of a scalar as an argument to a binop, as in max(a, 0)).

The unary operators are, e.g., any one or more of: negation, reciprocal, square root, inverse square root, exp, tanh, sigmoid, ReLU, and a binop applied to a scalar datum and an array element, as for example in the expression c+=a*alpha*b, where alpha is a scalar, and a, b, and c are tensor elements; the first multiply is binop2, the second is part of unop(alpha*).

A canonical example is matrix multiplication, C=C+AB for an M×K matrix A and a K×N matrix B. Then the loop nest has bounds vector [M, K, N], the inner loop operation is c+=a*b, and the affine index mapping from, for example, loop index (m,k,n) to the element of C accessed is (m,k,n)→(m,n). Other multidimensional tensor contractions, in which reduction occurs across several loop dimensions, are possible within this framework, as are convolutions, down-sampling, and the other operations of neural network layer processing.

The following describes various concepts relating to a dataflow graph.

Figure 25:
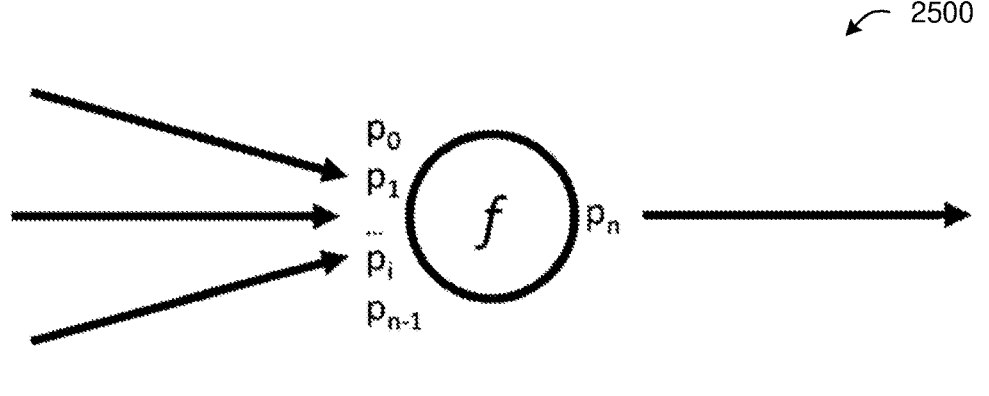
FIG. 25 illustrates a node in a data flow graph context.

Each node in the dataflow graph has one or more ports. Each port is designated as either an input port or an output port. Each node has exactly one output port. Optionally and/or selectively, the one output port leads to several output arcs. Tensors are received on the input ports and the output port generates a tensor that is a function of the input tensors:

FIG. 25 illustrates a node in a data flow graph context as Node in Context 2500.

A directed arc $xy_j$=<x, y, j> in the dataflow graph connects the output port of node x to input port $p_j$ of node y. It is a requirement that each node input port has a unique in-directed arc. Each arc is additionally labeled with a non-negative capacity $l(xy_j)$.

Figure 26:
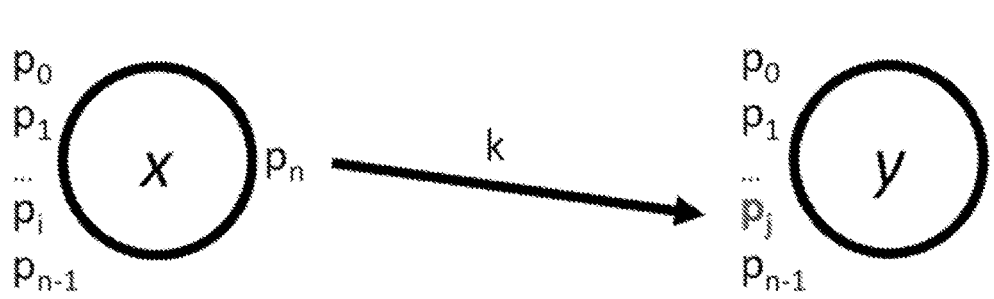
FIG. 26 illustrates an arc in a data flow graph context.

FIG. 26 illustrates an arc in a data flow graph context as Arc in Context 2600, e.g., arc $xy_j$=<x,y,j> with $l(xy_j)$=k.

Some nodes of the dataflow graph are designated as input nodes. Each input node accepts a sequence of inputs; an input is some collection of training data.

Evaluation of the dataflow graph occurs in discrete elements, called input iterations. An input iteration is the set of events that begins with arrival of the next in the sequence of inputs at the input nodes, and it encompasses all the events that occur, in response to that arrival, as data flow through the network.

The node performs a tensor operation, such as a tensor contraction of some kind. The unique arc on each input port specifies one of the tensor inputs to the operation. Arcs present tensor values that were computed by their source node $l(.)$ input iterations prior. For this computation model to be well defined, it is required that all cyclic paths $\{a=x^{(0)}, x^{(1)}, \ldots, x^{(n)}=a\}$ have a positive path capacity, $\Sigma_i l(x^{(i)} x^{(i+1)}{}_k)$>0.

In various embodiments and/or usage scenarios, cycles in the graph correspond to trainable neural network model parameters. These parameters are named symbolically and are associated with an arc with positive capacity in the graph.

The trainable parameters are one way that previous input iterations interact with a subsequent input iteration. Learned gradient values or hidden layer activation statistics are also a way for information to flow between iterations, as in momentum-based techniques and/or when normalizations are in use.

The following describes various concepts relating to tensor operations.

A tensor operation can be thought of in terms of a loop nest. A perfect loop nest of depth L has an iteration space of valid loop indices that is a rectangular subset of the L dimensional lattice of integer points. In a tensor contraction, one element of every input and one element of the unique output tensor is referenced at each loop iteration. The access functions that go from loop index to tensor index are affine.

The access function for the output tensor may be an affine many-to-one function, or it may be one to one. (An affine function is many to one on a bounded integer domain only if its linear part is a singular matrix.) If one to one, then each loop iteration creates (or modifies) one element of the output tensor.

But if the access function for the output tensor is many to one, then the meaning is that all the values created by operations at the set of loop iterations that map to a single element of the output tensor are combined by a reduction operation and that reduction updates the original output tensor element.

In the case of ordinary matrix multiplication, C=C+AB, the loop nest depth is three. At iteration (i,j,k), elements A(i,k), B(k,j), and C(i,j) are accessed. All the loop iterations (i,j,*) for fixed i and j are mapped to the same element C(i,j) of the output tensor C. This is a many to one map. Thus C(i,j) is updated (added to) with the reduction obtained by adding together the products A(i,k)*B(k,j) obtained at the subset of the iteration space {i, j, *}.

Thus, tensor contractions can be thought of too as map-reduce operations. At each loop iteration, one value from each input tensor is accessed and a map function combines them into a single value.

Thus, tensor operations are performed logically by nested loops iterating over fixed bounds. For each loop iteration, one element from each tensor is collected into an input tuple. The input tuples are collected into partitions. One collection exists for each component of the result tensor. The final result tensor is obtained by applying a reduction operation over each partition:

$$<A_{\phi_0(i)}, \ldots, A_{\phi_{n-1}(i)}> \in s_{*,(i)} \forall i = \{i_0, \ldots, i_k\} \in \mathbb{Z}^k C_k= \text{Reduce}(\text{Map}(f, S_k))$$

The indexing functions $\phi$ are given by affine transformations from loop index coordinates to tensor index coordinates.

Figure 27:
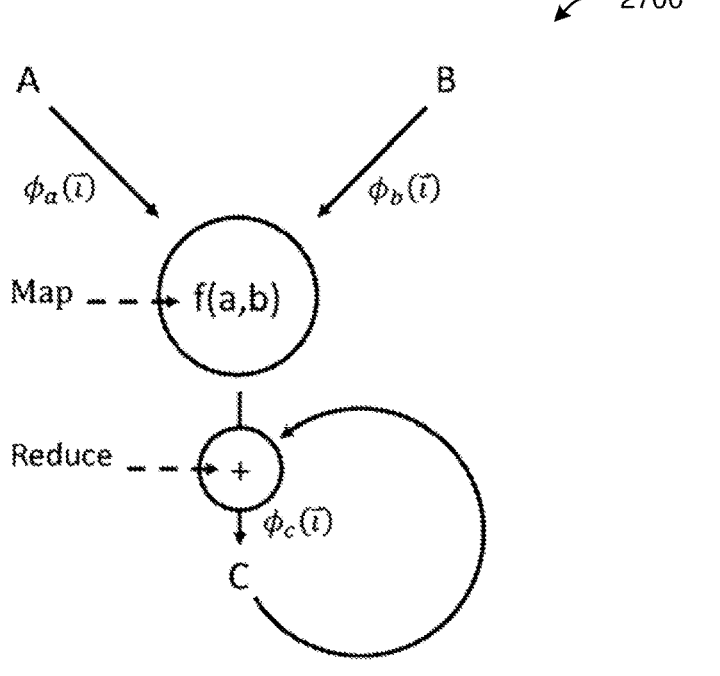
FIG. 27 illustrates a functional description of a tensor operation.

FIG. 27 illustrates a functional description of a tensor operation as Tensor Operation Functional Description 2700 comprising Map and Reduce elements.

Figure 28:
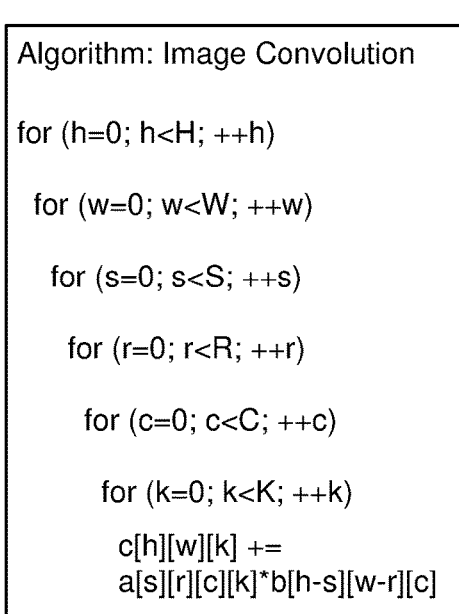
FIG. 28 illustrates selected details of an embodiment of image convolution as an algorithm and an associated tensor contraction.

FIG. 28 illustrates selected details of an embodiment of image convolution as an algorithm and an associated tensor contraction respectively as Image Convolution Algorithm 2802 and Image Convolution Tensor Contraction 2801. The foregoing tensor concepts are compactly representable as a table of integers, as in Image Convolution Tensor Contraction 2801. Each row in the table represents one level of loop nest. Each column in the table represents a dimensional component of a tensor. The table contains the coefficients of the linear part of the affine function that maps loop iteration indices to tensor element indices. Thus, the 1 and −1 in the $B_0$ column are the coefficients of loop indices h and s in the access function for the first dimension of B. The table is sparse: the missing entries are implicitly zero. The affine offsets are represented as an additional row in the table.

In this example, the map from loop indices to elements of C maps all loop iterations such as {h,w, *, *, *, k} to C(h,w,k). Thus, each C element is updated with the reduc-tion across a three-dimension subset of the loop iteration space. The maps to elements of A and B are also many to one. This implies that the elements of A and of B are each involved in multiple operations at multiple loop iterations.

The following describes various concepts relating to closed form expressions.

A C-like expression syntax specifies the mapped function f used in tensor operations. The expression operates over input scalars (one per port), as well as literal and symbolic hyperparameter constants. For example, the literal constant 0 in ReLU, max(x,0); and the hyperparameter symbolic constant alpha in the learning rate in a MNIST example elsewhere herein. The intention of hyperparameters is to enable execution of efficient constant-folded code while still having a mechanism to enable a scripting language to update control knobs.

The following describes various concepts relating to modular subgraphs and continuous propagation (pipelining).

The tensor graph is interpretable as representing the stochastic gradient descent training technique, (SGD). One input iteration flows through the graph in its entirety before the next is admitted. In the execution model, for example in the MNIST case, the input node x is occupied and not available to the next input until the vy node to which it connects fires, which is (almost) the last thing that happens to input iteration 1.

The insertion of enough delays on each arc to enable acceptance of a new input iteration immediately after all previous inputs are consumed enables multiple input iterations to exist in the dataflow graph, and therefore to utilize the DLA's parallel compute resources simultaneously. In continuous propagation, an input iteration flows forward up to the loss calculation, then backwards through back prop operations, and it updates stored weight parameters on the way back. Since subsequent input iterations are following it through the pipe, each input iteration sees weights at each stage that have been updated by a differing set of prior inputs. For example, at the last, rightmost layer, the weights may have been updated by all previous inputs. At the stage to its left, input iteration i may be encountering the weights as updated by input iteration i−2 while, meanwhile, input iteration i−1 is in the last rightmost layer.

The following describes various concepts relating to mini-batch optimization.

Various mechanisms are usable for mini-batch optimization, such as:

1. Use batch dimension. In some embodiments and/or usage scenarios, using the batch dimension is relatively inefficient because there is no cut-through evaluation.
2. Use gradient accumulator and ternary select operation.
3. Exact mini-batch (with pipe-draining).

The following describes various concepts relating to graph hierarchies.

NGDL nodes are amalgamable into "black box" macronodes as follows. Let G=(V,E) be an NGDL graph and let U be a subset of V. Then G'=(V', E') is the graph that results by removing U from V and adding a single new node that represents all of U (V'=V\U ∪{u}) and where all edges internal to U are removed, and arcs connecting a member of U to a member of V/U become arcs from the collapsed node u to the nonmember of U:

$$E'=E\backslash(U \times U) \cup \{(u,v), u \in U, v \in (V \backslash U)\}$$

A black box node has complex semantics not expressible as simply as basic NGDL nodes. They obscure information. Their purpose is to represent computations and data that are to be mapped to the same region in the compute fabric. They obscure information not used in early compilation phases.

For pipelining, macronodes are associated with delay, and their delay is expected to be zero or one, like basic nodes. This limits the amalgamation of subgraphs U that contain delay zero nodes, or in some circumstances, only one unit delay node.

An illustrative instance is a node that updates a parameter tensor at one network layer. It accepts an input activation and a gradient vector (a delta) from the next layer, and optionally explicitly the previous value of the stored, learned parameters, and with these it computes a gradient, then uses that gradient, a learning rate hyperparameter, and optionally other stored data and hyperparameters to implement momentum, ADAM, softmax, or another gradient and weight update technique.

The following describes an example relating to two-layer MNIST.

Figure 29:
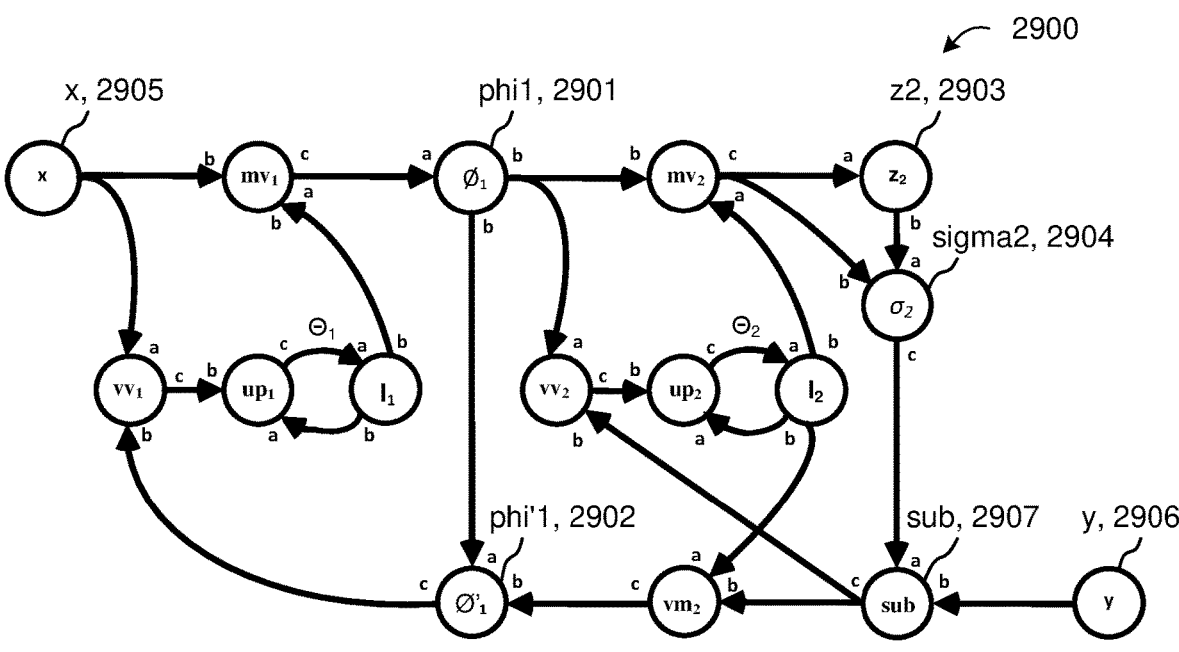
FIG. 29 illustrates selected details of an embodiment of a data flow graph for a 2-layer network for processing Modified National Institute of Standards and Technology (MNIST) data with Stochastic Gradient Descent (SGD) optimization.

FIG. 29 illustrates selected details of an embodiment of a data flow graph for a 2-layer network for processing MNIST data with SGD optimization as Data Flow Graph 2900. The FIG. conceptualizes a representation of a Machine Learning (ML) model. In various embodiments and/or usage scenarios, the model is usable with training via a MNIST (Modified National Institute of Standards and Technology) database. The model is a two-layer fully connected model. In various embodiments and/or usage scenarios, in the figure, 'MV' indicates a Matrix multiplied by a Vector, 'h' indicates one or more hidden representations, and 'Y' indicates one or more predictions.

MNIST is a standard deep learning benchmark with a dataset of images of handwritten digits. FIG. 29 illustrates the NGDL description of a fully connected, two-layer network for MNIST. The MNIST images have 28×28=784 pixels, grey scale, and hence each image can be thought of as a vector of length 784. The first layer creates a vector of 200 features, and the second chooses from among the ten possible digits, hence some of the parameters in tables following describing Nodes mv1, vv1, mv2, vv2, vm2, phi1, phi'1, l1, l2, up1, up2, sub, sigma2, and z2. (The two weight matrices have 784×200=156800 and 200×10=2000 elements.) Node phi1 2901 is a ReLU function, which conforms to the tensor notion with map operation max(a, 0) and no reduce operation (the mappings are one-to-one); Node phi'1 2902 is its derivative, and the node pair Node z2 2903 and Node sigma2 2904 implement a softmax function in which Node z2 2903 creates the denominator by summing the exponentials of the elements of a vector (tensor op (+, exp)) and sigma2 2904 scales the exponentials of its inputs (tensor op (, exp(b)/a)).

In the NGDL graph, input Node x 2905 emits an input activation for every input iteration. Input Node y 2906 at the opposite end emits the corresponding ground-truth classification labels for the training subset used at this input iteration. In this example, the scalar loss function is the sum of squares of the difference between the classification output from Node sigma2 2904 and the true classification from Node y 2906, and the difference, computed by Node sub 2907, is the vector of derivatives of this scalar loss function with respect to the outputs.

This example is generic, in that NGDL dataflow graphs consist of subgraphs corresponding to network layers, with a final softmax and loss function/gradient computation at the right (illustrated as Node z2 2903, Node sigma2 2904, and Node sub 2907).

The following tables summarize various information relating to the nodes illustrated in FIG. 29.

The following table describes Node mv1.

| a_0 | a_1 | b_0 | c_0 | mv1 |
|---|---|---|---|---|
| 784 | 200 | 784 | 200 | c+ = a*b |
| 1 | 0 | 1 | 0 | 784 |
| 0 | 1 | 0 | 1 | 200 |

The following table describes Node vv1.

| c_0 | c_1 | a_0 | b_0 | vv1 |
|---|---|---|---|---|
| 784 | 200 | 784 | 200 | c+ = a*b |
| 1 | 0 | 1 | 0 | 784 |
| 0 | 1 | 0 | 1 | 200 |

The following table describes Node mv2.

| a_0 | a_1 | b_0 | c_0 | mv2 |
|---|---|---|---|---|
| 10 | 200 | 200 | 10 | c+ = a*b |
| 1 | 0 | 1 | 0 | 200 |
| 0 | 1 | 0 | 1 | 10 |

The following table describes Node vv2.

| c_0 | c_1 | a_0 | b_0 | vv2 |
|---|---|---|---|---|
| 10 | 200 | 200 | 10 | c+ = a*b |
| 1 | 0 | 1 | 0 | 200 |
| 0 | 1 | 0 | 1 | 10 |

The following table describes Node vm2.

| a_0 | a_1 | c_0 | b_0 | vm2 |
|---|---|---|---|---|
| 10 | 200 | 200 | 10 | c+ = a*b |
| 1 | 0 | 1 | 0 | 200 |
| 0 | 1 | 0 | 1 | 10 |

The following table describes Node phi1.

| a_0 | b_0 | phi1 |
|---|---|---|
| 200 | 200 | b = max(a, 0) |
| 1 | 1 | 200 |

The following table describes Node phi'1.

| a_0 | b_0 | c_0 | phi'1 |
|---|---|---|---|
| 200 | 200 | 200 | c = a?b:0 |
| 1 | 1 | 1 | 200 |

The following table describes Node I1.

| a_0 | b_0 | I1 |
|---|---|---|
| 156800 | 156800 | b = a |
| 1 | 1 | 156800 |

The following table describes Node I2.

| a_0 | b_0 | I2 |
|---|---|---|
| 2000 | 2000 | b = a |
| 1 | 1 | 2000 |

The following table describes Node up1.

| a_0 | b_0 | c_0 | up1 |
|---|---|---|---|
| 156800 | 156800 | 156800 | c = a + b*alpha |
| 1 | 1 | 1 | 156800 |

The following table describes Node up2.

| a_0 | b_0 | c_0 | up2 |
|---|---|---|---|
| 2000 | 2000 | 2000 | c = a + b*alpha |
| 1 | 1 | 1 | 2000 |

The following table describes Node sub.

| a_0 | b_0 | c_0 | sub |
|---|---|---|---|
| 10 | 10 | 10 | c = b − a |
| 1 | 1 | 1 | 10 |

The following table describes Node sigma2.

| b_0 | a_0 | c_0 | sigma2 |
|---|---|---|---|
| 10 | 1 | 10 | c = exp(b)/a |
| 1 | 0 | 1 | 10 |

The following table describes Node z2.

| a_0 | b_0 | z2 |
|---|---|---|
| 10 | 1 | b+ = exp(a) |
| 1 | 0 | 10 |

The following describes various aspects of embodiments of a graph compiler for use with the DLA.

Conceptually, the graph compiler receives a description of a neural network and, through a series of transformations, converts the description into executable machine code for the DLA.

Figure 30:
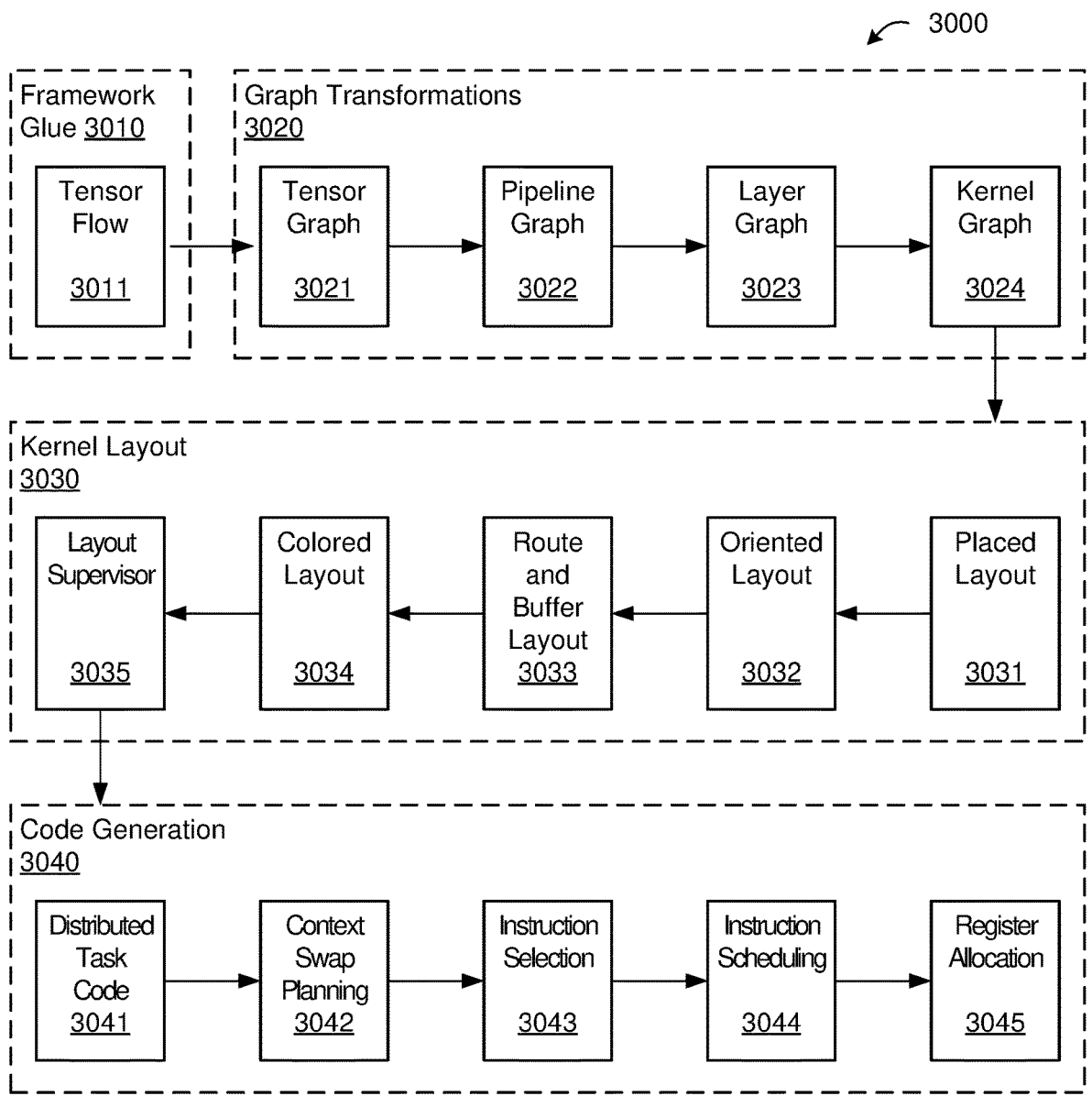
FIG. 30 illustrates selected details of an embodiment of various phases of compilation.

FIG. 30 illustrates selected details of an embodiment of various phases of compilation as Compilation Phases 3000. Compilation Phases 3000 comprises Framework Glue 3010, Graph Transformations 3020, Kernel Layout 3030, and Code Generation 3040. Framework Glue 3010 in turn comprises Tensor Flow 3011. Graph Transformations 3020 in turn comprises Tensor Graph 3021, Pipeline Graph 3022, Layer Graph 3023, and Kernel Graph 3024. Kernel Layout 3030 in turn comprises Placed Layout 3031, Oriented Layout 3032, Route and Buffer Layout 3033, Colored Layout 3034, and Layout Supervisor 3035. Code Generation 3040 in turn comprises Distributed Task Code 3041, Context Swap Planning 3042, Instruction Selection 3043, Instruction Scheduling 3044, 2 and Register Allocation 3045.

FIG. 30 illustrates a conceptual flow of software elements to use a DLA. Conceptually, elements of the figure operate as a compiler, from a framework to graph analysis (e.g., in NGDL to microcode) via a placement engine, to generated runnable code for cores, such as implemented in the DLA. As illustrated, the compiler implements Graph Transformations 3020, Kernel Layout 3030, and Code Generation 3040. In various embodiments and/or usage scenarios, various elements of FIG. 30 represent 'NP Hard' assignment problems. In various embodiments and/or usage scenarios, all or any portions of FIG. 30 are based on one or more heuristics and/or shortcuts to obtain solution(s). A solution is examined by a supervisory element (e.g., executable code), and one or more elements of FIG. 30 are optionally and/or selectively rerun with optional and/or selective adjustment of one or more control settings.

The compiler operates in various phases, such as:

1. Graph transformations operate on the high-level tensor dataflow graph. This phase decides on macro-pipelining and macroscopic compute strategy. It identifies groups of operations that operate together as layers.

2. Network layout is concerned with spatial and geometric aspects of the compilation. It assigns layers to regions of the compute fabric, provisions buffers, and routes communication lines between kernels.

3. Code generation compiles the code for the core micro-architecture. It lowers the representation into its final form that is suitable for execution.

Consider an MNIST example network processed by the compiler.

Figures 31, 32:
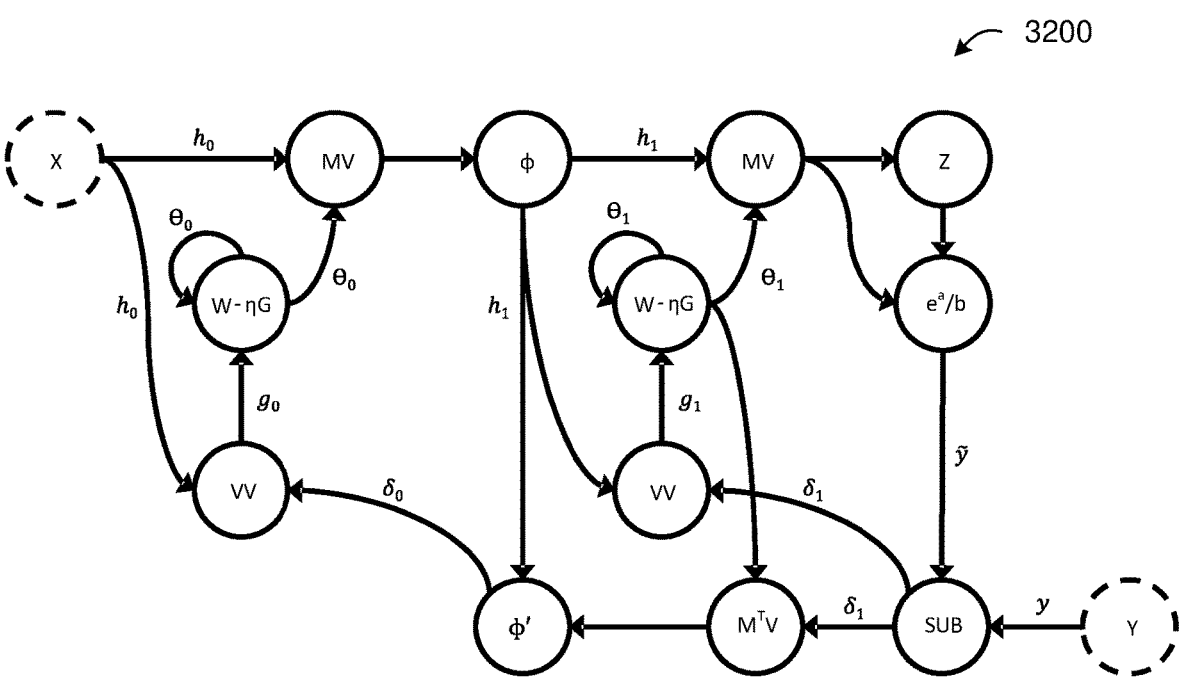
FIG. 31 illustrates a set of equations for an example layer fully connected network.
FIG. 32 illustrates a tensor graph for the 2-layer fully connected network example.

FIG. 31 illustrates a set of equations for an example layer fully connected network as Fully Connected Network Equations 3100. The network begins as a set of equations, illustrated as Connected Network Equations 3100. The equations define a space of parameters $\Theta$; an inference function $\tilde{y}$ that uses $\Theta$ to map an observation x to a probability distribution over target labels; a differentiable loss function L that scores $\tilde{y}$ against ground-truth y; and an optimization procedure (in this case stochastic gradient descent) that updates $\Theta$ given an observation and ground-truth label. In the example, $\phi$ is the rectified linear activation function; $\sigma$ is the softmax function; H is the cross-entropy function; and $\eta$ is the learning rate hyperparameter. Bias parameters are not included in the example to simplify the presentation.

In the example, the learning is performed via a gradient descent approach, but others, such as momentum-based, ADAM, and other approaches are usable. The user (such as with the aid of a framework) converts these equations into a tensor graph. For example, the user expresses the equations through the TensorFlow system, and a first stage tool converts the internal TensorFlow representation, in a form called XLA, into the frontend-independent form described next.

FIG. 32 illustrates a tensor graph for the 2-layer fully connected network example as Fully Connected Network Tensor Graph 3200, such as representing Connected Network Equations 3100 of FIG. 31. A neural network enters the compiler as a tensor graph, e.g., Fully Connected Network Tensor Graph 3200, expressed in NGDL. Arcs in a tensor graph represent tensors; nodes in a tensor graph represent operations. In the figure, some arc labels are directly taken from the learning equations above. The labels h, denote delay FIFO depths: some feed forward arcs carry information to be used at a later time, and these FIFOs implement that delay without slowing the pipeline. The $\delta$ labelled arcs carry partial derivatives of the loss function with respect to node outputs; the vv nodes multiply these by the delayed layer outputs to compute partials of the loss function (components of $$\frac{\partial \mathcal{L}}{\partial \Theta}(x_t, y_t, \Theta_t)\bigg)$$

on g-labelled arcs, and these arcs convey the gradient components to nodes that implement the learning, as in the last equation of FIG. 31.

Figure 33:
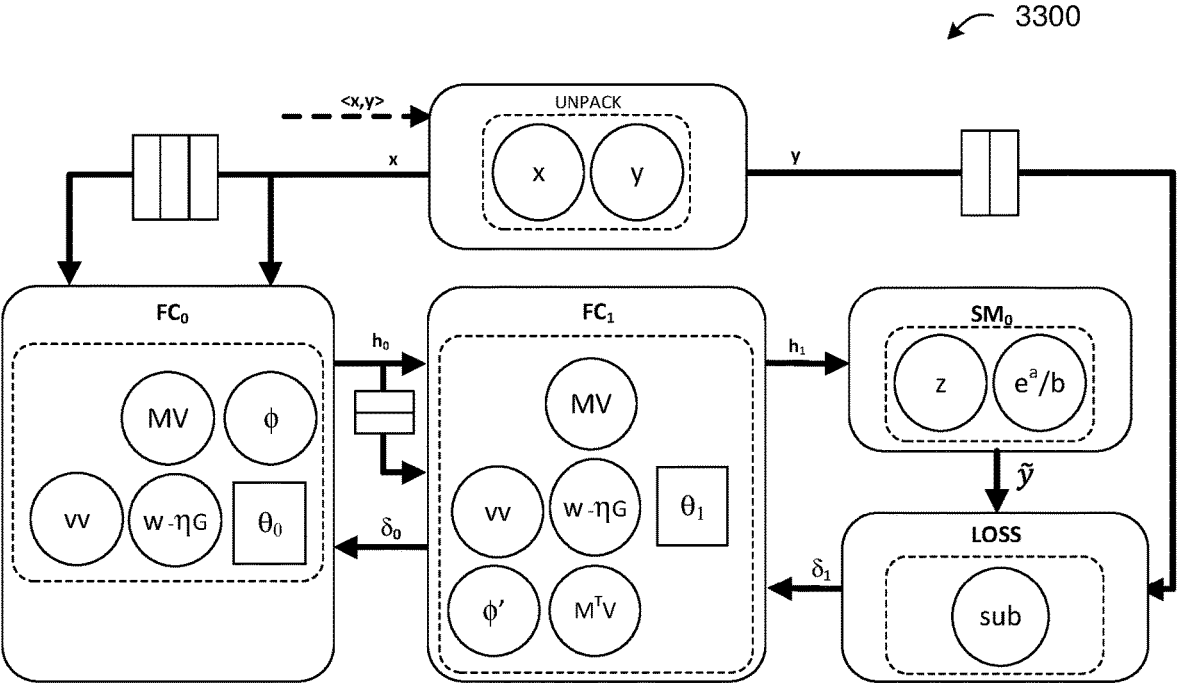
FIG. 33 illustrates a kernel graph for the 2-layer fully connected network example.

FIG. 33 illustrates a kernel graph for the 2-layer fully connected network example as Fully Connected Network Kernel Graph 3300. The graph transformation phases reduce Connected Network Tensor Graph 3200 of FIG. 32 to Fully Connected Network Kernel Graph 3300. Arcs in a kernel graph represent communication and buffering; nodes in a kernel graph represent parallel distributed programs (known as kernels), as described next.

Figure 34:
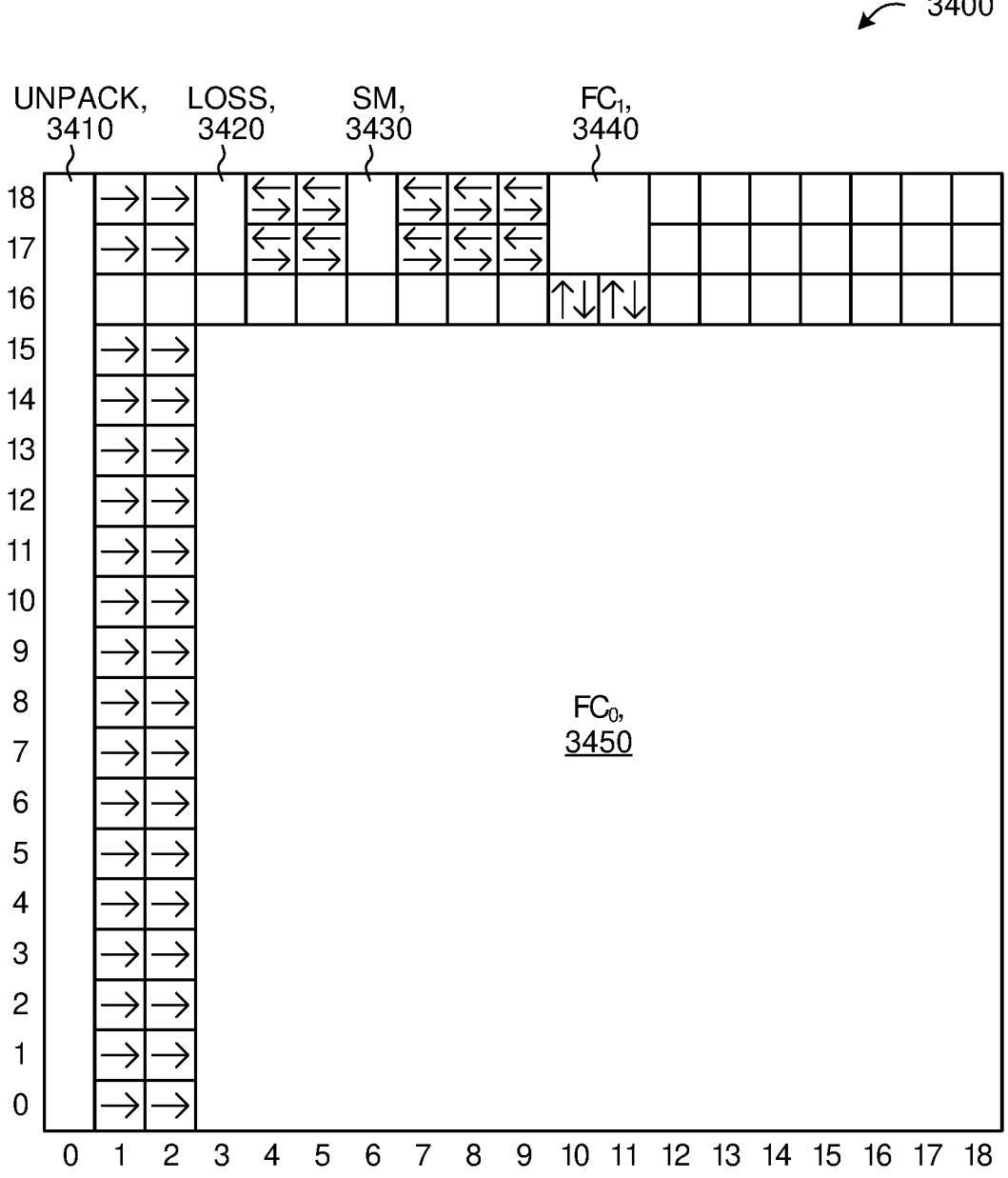
FIG. 34 illustrates a network layout for the 2-layer fully connected network example.

FIG. 34 illustrates a network layout for the 2-layer fully connected network example as Fully Connected Network Layout 3400, such as relating to Fully Connected Network Kernel Graph 3300 of FIG. 33. Fully Connected Network Layout 3400 illustrates a kernel graph with five nodes, and nine arcs. Operation nodes from the tensor graph are depicted inside each kernel node. The kernel layout phase assigns non-overlapping regions of compute fabric to each kernel and provisions routes and buffers. When kernel layout is completed the computation is visualizable over the fabric cores as illustrated by various areas of FIG. 34 (UNPACK 3410, LOSS 3420, SM 3430, $FC_1$ 3440, and $FC_0$ 3450). Thus, the kernels are collections of tensor operations and data that are collocated in the fabric.

Finally, the code generation phase receives the specification of each kernel and produces task code that implements communication of tensor elements between the cores, expression evaluation, and synchronization of sub-tasks. The final output is a binary object file that specifies loader instructions to create a full initial machine state.

Various graph transformations provide for a result graph with nodes representing respective kernels. The graph transform phase of compilation implements a high-level execution strategy of the neural model. The graph transforms proceed through a series of "back-of-the-envelope" calculations to determine how to partition the computation into sub-problems, the amount of memory required, and the order and schedule of operation evaluation. The end result of this phase is a coalesced graph where each node represents a kernel with specific execution assignments.

Each type of transformation is described, following. First, use of a transformation is motivated with a description of a specific example. Second, an algorithmic technique to apply the transformation in a generalized setting is described.

Space filling assessment proceeds as follows. First, assess whether the model is large enough to use the compute fabric efficiently. The number of arithmetic operations performed in response to one input into the graph is counted. This is divided by the number of cores in the system to achieve an operation count per core. If the operation count per core is less than a predetermined threshold (e.g., 100, 1,000, 10,000, or more FLOPS/core), then the cores are underutilized. In response, multiple copies of the network are optionally deployed onto the cores, such as by using a spatial batch to train the copies in parallel with some form of parameter sharing and averaging Graph pipelining proceeds as follows. Delays are inferred and annotated on arcs. The purpose of delays is to delay the arrival of an input at an outer product node, where it meets up with a backpropagating derivative to compute a component of the loss function gradient local to a network layer. Inserting FIFOs on arcs of depth equal to the required delay enables inputs to be pipelined in the graph, thus achieving high throughput through model parallelism.

Operation fusing proceeds as follows. Subsets of graph nodes are coalesced into macronodes that are matched to kernels and mapped to compute fabric regions (each fabric region being, e.g., a collection of one or more PEs that are physically contiguous such as contained within a rectangular area).

Kernel matching proceeds as follows. The semantics of nodes and macronodes are compared to the available kernels in the intrinsic kernel library; where a match is found, the handwritten, optimized kernel is used.

The kernel layout phase of compilation assigns compute resources (such as cores, routes, memory, and/or colors) to every layer of the neural model. The input to this phase is a kernel graph. The output of this phase comprises any one or more of: placement annotations, route annotations, model buffering, and route colors.

Placement annotations are producible as follows. For every node in the graph, determine the coordinates (x, y) in the fabric of a rectangular region of extent ($\Delta x$, $\Delta y$), whose cores implement the corresponding kernel. Regions are sized to balance resources to load, shaped to improve compute efficiency, and placed to ease the problem of routing. The locations on the region's edges of the kernel's input and output ports have been chosen (see, e.g., FIG. 35).

Route annotations are producible as follows. For every arc in the kernel graph, determine the route taken by each of the nets constituting a bus that conveys tensor data to the kernels that consume it. A path is specified for each net of the bus, where a path is a starting ($x_0$, $y_0$) point and an ordered list of cardinal directions (N, E, S, W) that trace the links used along the path. The route may include multicast paths, as a tensor may be consumed by more than one subsequent kernel. In various embodiments and/or usage scenarios, heuristics, such as one based on the solution of a single source shortest path problem, solve these problems well. An alternate version modifies the graph edge weights to reflect the current (due to already-routed busses) sharing of bandwidth in regions of the fabric to bias the shortest path routing to use less congested areas. Routing is described in more detail elsewhere herein (see, e.g., FIG. 35).

FIG. 35 illustrates example layout annotations for placement and routing. Annotations relating to placement (Placement Layout Annotations 3501) and annotations relating to routing (Route Layout Annotations 3502) are illustrated along with a corresponding layout (Layout 3503) having a reference origin (($x_0$, $y_0$) 3504).

Model buffering is producible as follows. For arcs with nonzero labels determined in the pipelining phase, storage is set aside on the cores associated with rectangular regions as well as the cores in the interstitial spaces (not allocated to any core). The buffering analysis preferentially places the required storage in the cores that lie along the paths associated with the graph arc and its routed bus. The allocation is limited by storage availability per core. In various embodiments and/or usage scenarios, the problem is formulated and solved as a linear program. Buffering is described in more detail elsewhere herein.

Route colors are producible as follows. Assigns colors to nets, optionally and/or selectively with changes to alternate colors along the route. The nets coming into a given core/router are required to have different colors, leading to a graph coloring problem solvable with heuristics. Coloring is described in more detail elsewhere herein.

The four (five, considering that placement and sizing are distinct) problems above are tightly coupled; there are really five things to be determined, but only one problem, that of minimizing some objective function over all possible solutions. An example objective function is an estimator of performance on the DLA. Instead of a one-pass approach that performs, e.g., placement first, followed by the other four in some order, a multi-pass, iterative approach that reduces the objective function at each pass, informed by the tentative solutions of the previous pass, is used.

Placement proceeds as follows.

The goal of the placement stage is assigning non-overlapping rectangles to each node in the kernel graph. It attempts to provide a region of fabric area to each kernel that is proportional to the number of FLOPs it is required to perform. Formally, placement seeks to minimize the computation duration ($\Delta t$) of the slowest kernel. The placement phase ignores potential bandwidth bottlenecks. Placement recognizes that kernel efficiency changes depending on its size and shape.

Input to the placement process is a collection of nodes. Each node, A, specifies the fundamental number of FLOPs it is required to perform (normalized to a per-input basis). The node also provides a monotonically decreasing effective utilization function, $u_A$ ($\Delta x$, $\Delta y$). Utilization decreases with larger areas because of parallelization inefficiencies. Effective utilization only counts fundamental FLOPs issued per DLA-data-path cycle. Synchronization, overhead, and other math cycles are not counted as effective utilization.

The placement problem is NP-hard. The technique used to solve placement is to approximate the placement problem by a simpler problem, a simplified placement problem, that is solvable exactly, and to couple this exact solution with a guided search. Each stage of the search produces valid and reasonable answers. As the search proceeds, the process is increasingly likely to find a good solution, if good solutions exist with sufficient density.

The simplified placement problem is to find optimal kernel sizes with additional constraints on the relative positioning of certain nodes.

Kernel placement constraints are expressible as a binary tree with kernels represented by leaf nodes. Internal nodes in the tree express the requirement that nodes in each branch are required to be separable either by a horizontal partition or by a vertical partition. Formally, the tree is a binary space partition (BSP) with all internal nodes using only orthogonal partitions, and each tree corresponds to a placement.

FIG. 36 illustrates a table, a tree, and a resultant placement, respectively as Table 3610, Tree 3620, and Placement 3630. The kernel placement starts by first determining the estimated relative area that each kernel should be assigned. This is performed by first calculating $$\text{Area} = \frac{FundamentalFLOPs}{\text{Estimated Utilization}},$$

and then normalizing by total area (Table 3610). Assigning coordinates to each partition is performed with two passes over the tree. In a first pass from leaf to root, relative areas are summed and recorded in interior nodes (Tree 3620). In a second pass from root to leaf, partition coordinates are calculated using the relative area of each branch. After this pass, each node has a non-overlapping rectangle assignment (Placement 3630).

FIG. 37 illustrates an updated table, an updated tree, and an updated resultant placement, as Table 3710, Tree 3720, and Placement 3730, such as corresponding to a fixed point tree placement iteration of a same problem statement as that illustrated by FIG. 36. The updates are produced by using he width and height of the non-overlapping rectangle assignment to update the utilization using $u_A$ ($\Delta x$, $\Delta y$). This provides updated relative areas (Table 3710 and Tree 3720); the process iterates using the revised relative areas to incrementally adjust the placement (Placement 3730).

This procedure implements optimization over a convex objective. In various embodiments and/or usage scenarios, a relatively small number of iterations (e.g., 4, 5, or 6) result in convergence at a fixed point. To guarantee bounded run-time behavior a cut-off of a threshold (e.g., 9, 10, or 11) revised adjustments is imposed.

A large placement problem may involve one thousand or more kernel nodes. Each node is visited twice per iteration; and its utilization function is evaluated once per iteration. Each such visit is computationally trivial and requires only a fixed memory footprint per node and a small, fixed number of floating-point arithmetic instructions per node. As a specific example, if each node requires about 5 ns of processing per iteration, then the entire simplified placement for 1,000 nodes is generated within $$\left(5\frac{ns}{node}\right)\left(1000\frac{nodes}{iteration}\right)(10 \text{ iterations}) = 50 \ \mu s.$$

Placement search proceeds as follows.

Having solved the simplified placement problem, the entire placement problem is reduced to one of searching over binary trees. Although there are $O(e^n)$ binary trees for an n-node problem, the exponential search space has been cleanly separated from the process of finding a valid placement.

Every binary tree deterministically corresponds to a generatable valid placement that is locally optimal given the relative positioning constraints imposed by the tree. A score is assigned to each locally optimal placement. The score is the weighted utilization of the entire network:

$$\Sigma_{A \in Node} F_A u_A.$$

Elementary mutations, such as swapping and flipping, are defined on a tree. Swapping corresponds to swapping any two nodes (internal or leaf) with each-other. Flipping corresponds to flipping the orientation of an internal node from horizontal to vertical, or vice versa.

Thus, starting from a binary tree with n leaves, all binary trees with n leaves are generatable by an appropriate sequence of elementary mutations.

Then simulated annealing is performed using the score function as an energy landscape, and the mutation function to select neighbors. The annealing process is modified to enable a population of several candidate solutions at once to enable use of a multi-core DLA. Conceptually similar to a genetic algorithm, the population of candidates enables pruning of a bad solution in favor of multiple descendants of a good solution. However, unlike a genetic algorithm, the software stack performs no cross-over mutations.

Untangling proceeds as follows. The untangling process modifies a placement to produce a layout that is easier to route. Information about kernel connectivity is received and kernel positioning is optimized to bring kernels that communicate with each other close together.

The untangling process operates similar to placement search. It updates the placement tree only in ways that leave the placement cost unchanged, such as by exchanging (e.g. permuting) only branches that are in the same partition domain.

FIG. 38 illustrates permuting branches within a partition domain as Branch Permuting Example 3800.

Untangling performs a sequence of branch permutations to minimize tangling cost. The simplest tangling cost is wire cost, the sum of Manhattan distances between connected kernels. The untangling process is modified to account for bandwidth requirements between kernels by using weighted wire cost.

FIG. 39 illustrates an example of wire cost as Wire Cost Example 3900.

When buffering is required along communication paths, having kernels too close together, in some usage scenarios, makes it difficult to position buffer resources. To account for this, it is possible to use a spring cost, which requires additional parameters for ideal kernel distance per connection.

Untangling is runnable as a fused process concurrent with placement. In this case, a coefficient λ blends between the placement score and the tangling cost.

FIG. 40 illustrates an example of a router configuration as Example Router Configuration 4000. Each core has a five-port router with links to adjacent cores in the four cardinal directions (N, E, S, W) as well as to the core's compute element (R). Router messages are tagged with one of a limited number of distinct colors (e.g., 16, 24, or distinct colors). All incoming messages arrive at a dedicated queue per color. The router forwards messages to any subset of links based on color. Forwarding a message to multiple links causes a bifurcation of the message which gives multicast messaging.

The forwarding configuration is specified using, e.g., a 2-bit field for each color-port combination. A forward bit (✓) indicates messages with color c are forwarded to port p. A color swap bit (↑↓) indicates color c messages egressing port p have their color changed to (c XOR 1) on egress.

The routing stage connects communicating kernels using fabric routers. Kernels have designated coordinates for terminals, that either send output or else receive input. A path connecting an output terminal to an input terminal is called a net. Related terminals are grouped into bus terminals. A set of nets connecting an output bus terminal to an input bus terminal is called a bus.

Figure 41:
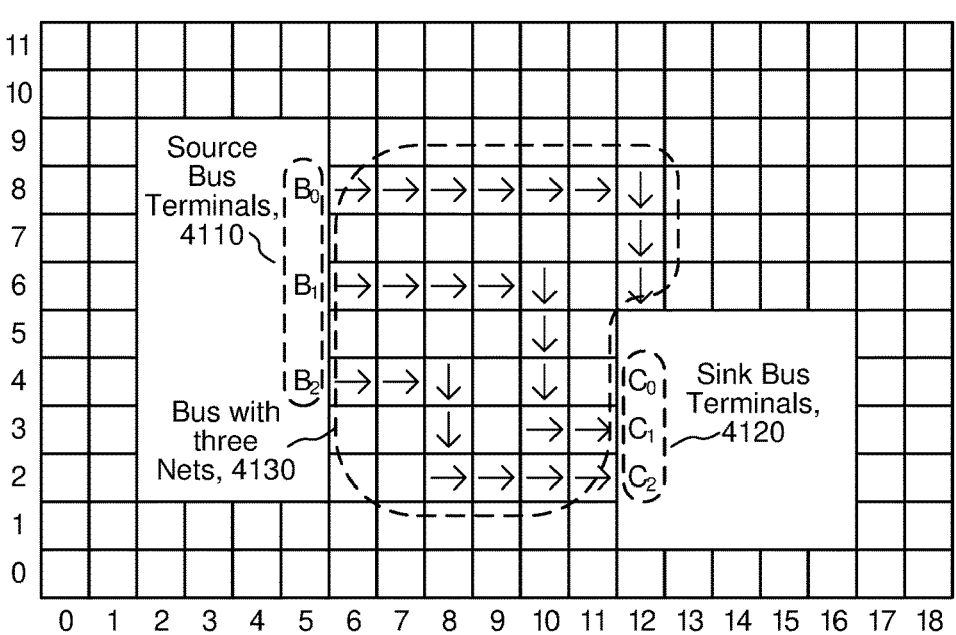
FIG. 41 illustrates examples of routing terminology.

FIG. 41 illustrates examples of routing terminology as Routing Terminology Examples 4100. Source Bus Terminals 4110 is comprised of $B_0$, $B_1$, and $B_2$. Sink Bus Terminals 4120 is comprised of $C_0$, $C_1$, and $C_2$. Bus with three Nets 4130 couples Source Bus Terminals 4110 and Sink Bus Terminals 4120.

The routing problem is known to be NP-hard. The technique used to solve it is to generate candidate solutions ignoring interactions between busses, while generating high quality solutions for individual busses. This enables a very fast parallel process for generating potential solutions. The potential solution is then scanned for hotspot regions of congestion. The hotspots are used to guide modification of background cost estimates in the global routing landscape. The process then restarts from the beginning with the new cost estimates.

Input to the router stage is a set of bus terminal pairs. Each pair has a source bus terminal and a sink bus terminal. The routing stage creates busses that connect sources to sinks. The router has two modes, a swizzled mode and an ordered mode. The swizzled mode does not guarantee any particular pairing of a source terminal to a sink terminal. The ordered mode guarantees each source terminal connects to the corresponding sink terminal based on position within the bus terminal.

Figure 42:
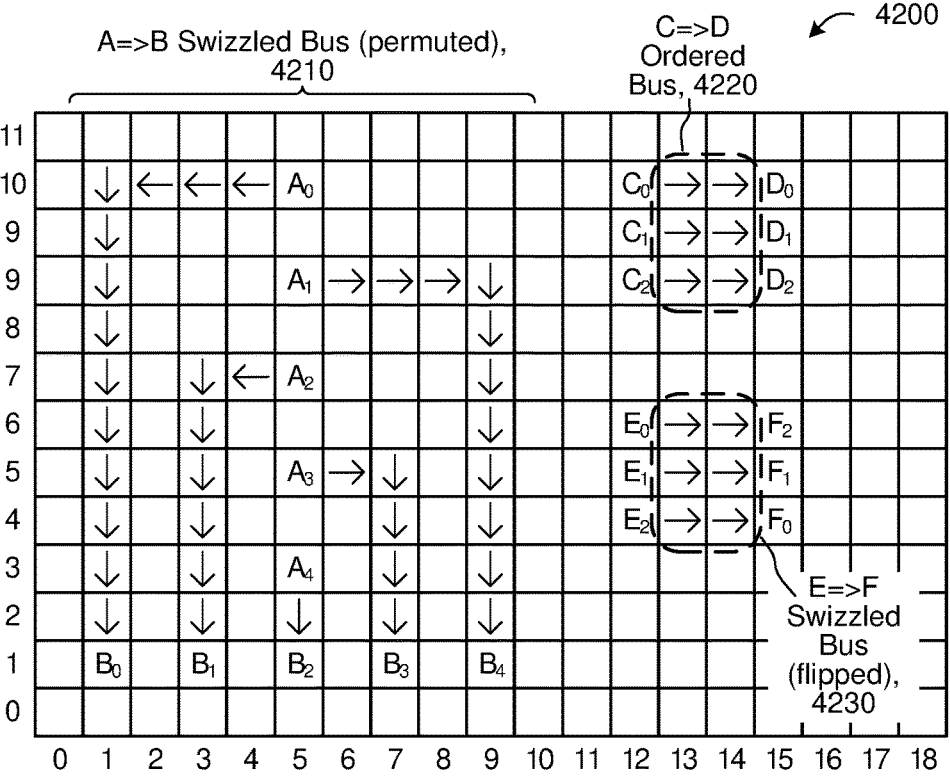
FIG. 42 illustrates examples of routing modes.

FIG. 42 illustrates examples of routing modes as Example Ordered and Swizzled Routing Modes 4200. An example of a swizzled bus (permuted) is illustrated by A=>B Swizzled Bus (permuted) 4210 routing between bus $A_0$, $A_1$, $A_2$, $A_3$, and $A_4$ and bus $B_0$, $B_4$, $B_1$, $B_3$, and $B_2$. An example of an ordered bus is illustrated by C=>D Ordered Bus 4220 routing respectively between bus $C_0$, $C_1$, and $C_2$ and bus $D_0$, $D_1$, and $D_2$. An example of a swizzled bus (flipped) is illustrated by E=>F Swizzled Bus (flipped) 4230 routing between bus $E_0$, $E_1$, and $E_2$ and bus $F_2$, $F_1$, and $F_0$.

The router routes each bus independently, ignoring coloring and bandwidth interactions with other routed busses. The single-bus routing problem is set up as a maximum flow problem with vertex capacities. Unit capacity limits on links enable bus routing that lacks self-intersections. The router uses the Edmonds-Karp algorithm to generate an efficient maximum flow route.

In some circumstances, such as multicast routing, one source bus terminal is connected to multiple sink bus terminals.

Buffering concepts are as follows.

The dataflow graph presented at the top of the compiler stack represents a neural model as information (arcs) and transformations (nodes). All transformations have been encapsulated within kernels prior to entry to the layout phase. Routing is therefore concerned with information.

The routing described so far transports information from producer kernels to consumer kernels. For the computation to run efficiently as a pipeline this information is timed and buffered appropriately. Whereas wires transport information across space, memory holds information through time. Since wires and memories both carry information over space-time, it is efficient to use the same family of processes for planning buffer layout as for planning route layout.

Specifying the size of each router's color queues directly controls buffer capacity along a routing path. Therefore, an integer annotation along every hop of a route is sufficient to specify a buffer layout.

Efficient buffering proceeds as follows.

When implementing an extended-capacity color queue, FIFO read and write transactions spill into main SRAM memory. Queues with capacity of, e.g., two words per en-route core are directly instantiated in router hardware. When a buffer extended over a route is implemented this way, the bucket-brigade of FIFO transactions incurs a cost at every hop on the path because the data are transferred all along the route.

To alleviate this cost, a distributed buffer is implemented. This operates as a distributed ring buffer where every entry entering incurs at most one SRAM write and one SRAM read operation. The total buffer capacity (tensor size times number of in-flight tensors on the arc) is divided by the number of cores implementing the buffer, and that is the amount of memory allocated on each core. Data elements begin to stream from the source node, and as they arrive at the cores on the path they are picked off and stored. Quanta of the data are stored on a given buffer core before that core hands the write token to the next core (loop back to the first from the last) on the path, in turn, which stores the next quantum in its memory. The buffer memory on each core is also used in a circular buffer fashion. In this way, incoming data are buffered in equal amounts across this distributed buffer.

Similarly, the buffer kernel immediately begins to send out the stored data into the fabric, towards the consuming kernel. Network flow control and backpressure control the timing and the synchronization of the entire receive, store, load, send sequence. There is no other synchronization required.

Figure 43:
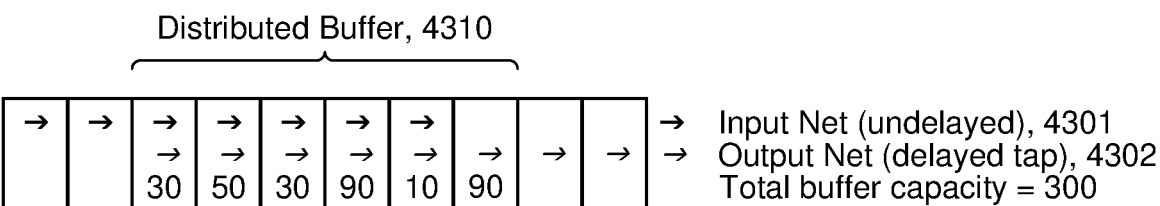
FIG. 43 illustrates an example of a distributed buffer.

FIG. 43 illustrates an example of a distributed buffer. The example comprises Input Net (undelayed) 4301, Output Net (delayed tap) 4302, and Distributed Buffer 4310. As illustrated, the total buffer capacity is 300 (30+50+30+90+10+90).

A distributed buffer is also implementable over an arbitrary path topology. In some embodiments and/or usage scenarios, each core is enabled to participate in one distributed buffer.

Figure 44:
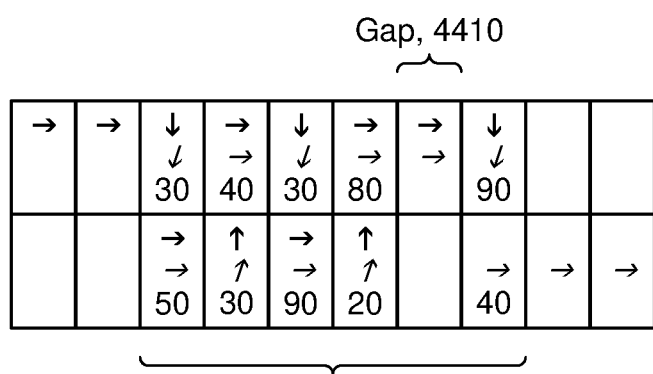
FIG. 44 illustrates an example of a distributed buffer along an arbitrary route.

FIG. 44 illustrates an example of a distributed buffer along an arbitrary route. The example illustrates Gap 4410 and Arbitrary Route 4420.

A distributed buffer uses two routing colors. The input color is usable anywhere. The output color (although it is present throughout the distributed buffer) is only usable at a point after it has reached the last core in the buffer.

Figure 45:
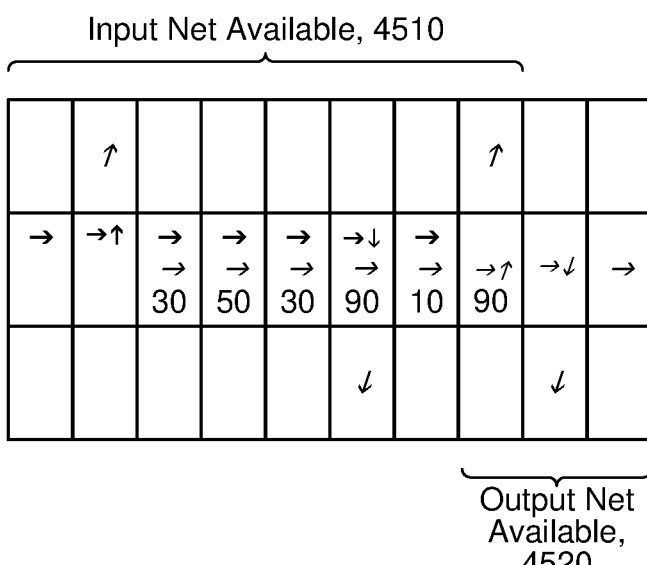
FIG. 45 illustrates an example of usability of input and output nets of a distributed buffer.

FIG. 45 illustrates an example of usability of input and output nets of a distributed buffer. Input Net Available 4510 is illustrative of where in the distributed buffer an input net is usable. Output Net Available 4520 is illustrative of where in the distributed buffer an output net is usable.

Coloring proceeds as follows. The final element in generating a layout is to specify the colors used by each bus. This is an instance of the graph coloring problem. The form it takes here is very similar to, e.g., register allocation in a high-level language compiler. While the general coloring problem is NP-hard, the instance here is solvable with a heuristic that chooses bus colors for the seemingly most constrained busses first. The heuristic may run out of available colors before completing a coloring. In this case, instead of backtracking, a bus is chosen to "spill". The spill enables the bus to change color midway through its net by routing its traffic through the CE of the core.

Code generation proceeds in part as follows.

In some embodiments and/or usage scenarios, it is possible to match one or more kernels to handwritten kernel code. Alternatively and/or in concert with kernel matching, a code generator that is enabled to accept a macronode or kernel in the kernel graph, with its internal connectivity and NGDL specifications, is used. A performance model is exported for use by the placement phase to determine the shape of the compute region for this kernel. That shape being chosen, high level compiler optimization is then used to determine the mapping of tensor contraction loop iterations and of tensor elements to cores within the region, emit CASM (assembly) code, and finally create DLA binaries to implement the kernel on the region. The terminals of the input and output nets are determined for use by the routing phase.

A library of hand-written microcode template-programs (e.g. an intrinsic kernel library) provides arbitrary extensibility to the graph compiler. The template programs provide various elements to integrate with the graph compiler, such as a template code generator, a cost model, and an NGDL sub-graph.

The template code generator accepts width and height arguments that specify the size of the core array (e.g., number of PEs in X and Y dimensions) to generate a program for. The template code generator selectively, conditionally, and/or optionally accepts other scalar and token parameters. The cost model declares the memory, bandwidth, and compute utilization of the generated code for the given template arguments. The NGDL sub-graph matches the implemented computation. The graph compiler uses the sub-graph to determine when to use an intrinsic kernel. It also matches free parameters in the sub-graph to determine template arguments.

The following describes various aspects of the architecture and API of the control plane, such as the Connection Manager and the TCP Offload Engine Driver.

In various embodiments and/or usage scenarios, the Connection Manager implements any one or more of staging buffer memory management, port socket connection assignment, and/or transfer request management. In various embodiments and/or usage scenarios, the Connection Manager optionally implements any one or more of various auxiliary functions, such as: DLA arbitration (e.g., to provide exclusive access to a DLA), execution management (e.g., to start and stop DLA-data-path operation), and/or fabric configuration (e.g., to configure LVDS phy settings).

In various embodiments and/or usage scenarios, the Connection Manager implements any one or more of various functions (e.g. as services to the user agent exposed via a Control API), such as: locking arbitration (e.g. to coordinate mutually exclusive use of a DLA), execution control (e.g., to run a number of wavefronts, to pause at a wavefront boundary, block until DLA processing is complete and in a pipeline consistent state, and/or return a current wavefront counter), memory management (e.g., allocate a block of memory from a memory pool, return a block of previously allocated memory to a memory pool, mark all buffers as victims, and/or free all marked buffers), client management (e.g., for network address and/or socket identifier management), transfer management (e.g., into and out of a DLA), and LVDS management.

DLA Software Architecture—Delay Buffers

Figures 46A, 46B:
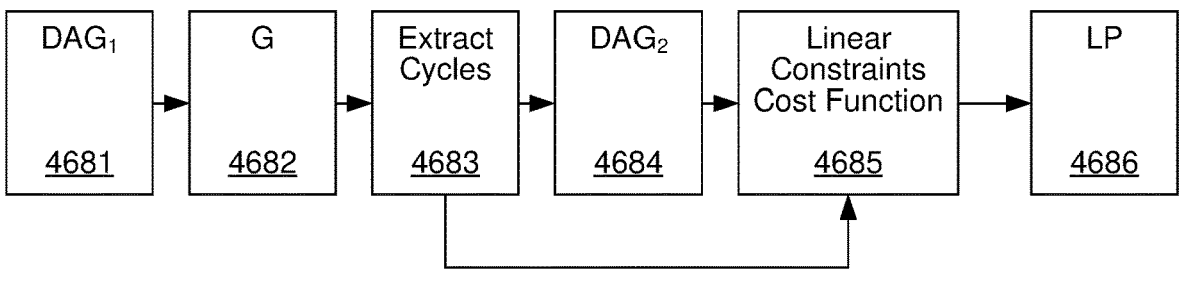
FIGS. 46A-46D illustrate selected details of various embodiments of software elements associated with using a deep learning accelerator, such as sizing and placement of delay buffers.

FIG. 46A illustrates selected details of an embodiment of delay buffer sizing as a portion of software elements associated with using a deep learning accelerator. Kernels 1-7 4601-4607 are results of grouping, matching, and/or creating based on, e.g., a tensor graph, and collectively form a Directed Acyclic Graph (DAG). The various Buf elements (Buf 1to2 4612, Buf 2to3 4623, Buf 3to4 4634, Buf 3to6 4636, Buf 4to5 4645, Buf 4to6 4646, Buf 5to7 4657, and Buf 6to7 4667) represent optional delay buffers selectively inserted in paths between the Kernels. For example, Buf 1to2 4612 represents an (optional) delay buffer from Kernel 1 4601 to Kernel 2 4602, Buf 2to3 4623 represents an (optional) delay buffer from Kernel 2 4602 to Kernel 3 4603, and so forth. In various embodiments and/or usage scenarios, there are hundreds, thousands, tens of thousands, or more kernels.

FIG. 46B illustrates selected details of an embodiment of a process for determining delay buffer sizes as a portion of software elements associated with using a deep learning accelerator. The illustrated process operates on, e.g., a DAG, such as associated with Kernels 1-7 4601-4607 of FIG. 46A. Flow begins with the DAG as $DAG_1$ 4681, that is then processed to remove 'direction' information from the DAG to form a Graph (G 4682). G 4682 is then used to extract cycle information (Extract Cycles 4683), such as the path from Kernel 1 4601 to Kernel 2 4602 to Kernel 3 4603 to Kernel 6 4606 to Kernel 7 4607 and such as the path from Kernel 1 4601 to Kernel 2 4602 to Kernel 3 4603 to Kernel 4 4604 to Kernel 5 4605 to Kernel 7 4607. The cycle information is optionally and/or selectively annotated onto $DAG_1$ 4681 to form $DAG_2$ 4684. Information from $DAG_2$ 4684 as well as the cycle information is used to build a set of linear constraints as a cost function Linear Constraints Cost Function 4685. Linear Constraints Cost Function 4685 is a solvable linear problem that is then solved (LP 4686) to determine a respective number of delay buffers to populate each of the Buf elements illustrated in FIG. 46A. In some embodiments and/or usage scenarios, one or more of the Buf elements are not needed, e.g., the determined number of delay buffers along an arc is zero.

The linear constraints provide that all convergent paths in the DAG have equal delay. For example, a constraint is generated for each cycle: '+1' The cost function is implemented to optimize the total number of delay buffers for the entire DAG. In some embodiments and/or usage scenarios, the cost function ignores physical placement information (if any).

Figures 46C, 46D:
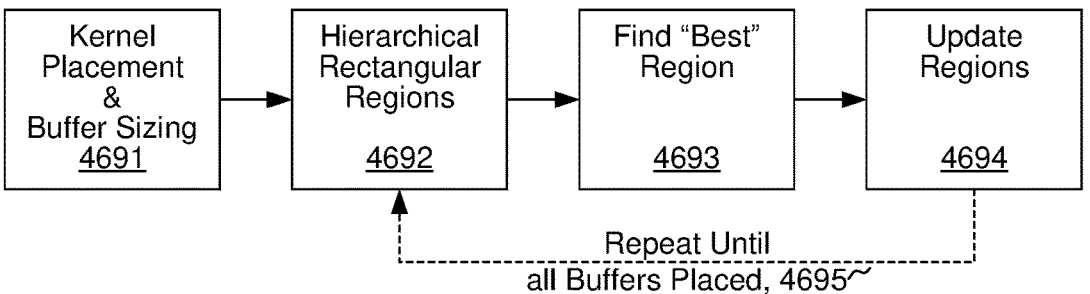

FIG. 46C illustrates selected details of an embodiment of a process for determining delay buffer placement as a portion of software elements associated with using a deep learning accelerator. Regions 1-7 4671-4677 collectively represent all operable PEs of a DLA, e.g., manufactured via wafer-scale integration. In various embodiments and/or usage scenarios, Regions 1-7 4671-4677 collectively variously correspond to e.g., all or any portions of any one of Wafer 412 of FIG. 4A and Substrate 413 of FIG. 4B. Regions 1-7 4671-4677 correspond to results of placement of Kernels 1-7 4601-4607 of FIG. 46A. For example, PEs of Region 1 4671 are allocated (e.g., 'mapped') to performing the operations of Kernel 1 4601; PEs of Region 2 4672 are allocated to performing the operations of Kernel 2 4602; and so forth.

FIG. 46D illustrates selected details of an embodiment of a process for determining delay buffer placement as a portion of software elements associated with using a deep learning accelerator. The illustrated process operates on, e.g., results of kernel placement and results of delay buffer sizing. Flow begins with the results of Kernel Placement & Buffer Sizing 4691 and then proceeds, for each buffer, to determine a 'best' region (e.g., one of Regions 1-7 4671-4677 of FIG. 46C) to place the respective buffer.

For each respective buffer, regions are processed according to hierarchical rectangular regions (Hierarchical Rectangular Regions 4692) until a best region for the respective buffer is identified (Find "Best" Region 4693). Then the regions are updated (Update Regions 4694) in view of the respective buffer to indicate resources of one or more of the regions are consumed by the respective buffer and are not available for use by as-yet unprocessed buffers. Processing continues until all buffers have been placed (Repeat Until all Buffers Placed 4695).

Processing is via hierarchical rectangular regions. For example, a particular region is identified (such as Region 1 4671 alone, Region 2 4672 and Region 3 4673 together, or Regions 1-7 4671-4677 together). The identified region is cut once, orthogonal to one of its boundaries, into two sub-regions. The resultant sub-regions are analyzed to determine which (if either) of them are suitable for the respective buffer and are better regions compared to a previously found best region. If a better region is found, then the best region is updated with the newly found best region.

Partial results of determining delay buffer placement are illustrated as Buf 3to4 4634 in Region 4 4674 and Buf 3to6 4636 in Region 5 4675 of FIG. 46C.

The cuts are in accordance with a binary search and are exhaustively analyzed from each of the four edges of the rectangular regions. In some embodiments and/or usage scenarios, the buffers are processed in a sorted order from largest to smallest. In some embodiments and/or usage scenarios, the buffers are processed in an order communicated (such as from the supervisor) via one or more metaparameters.

DLA Software Architecture—Routes Between Kernels

Figures 47A, 47B:
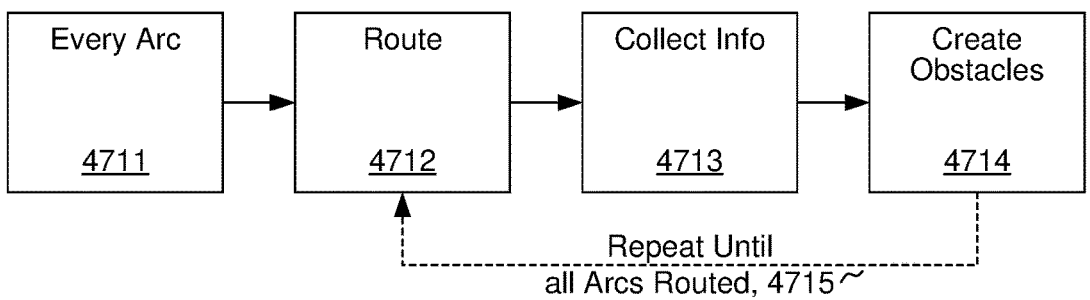

FIG. 47A illustrates selected details of an embodiment of determining routes between placed kernels as a portion of software elements associated with using a deep learning accelerator. Regions 1-7 4671-4677 correspond to identically identified elements of FIG. 46C.

The dot-ended lines between the regions represent arcs implemented as routed communication paths (e.g., 'busses')

between the regions. Bus 2 4702 (the 'shorter dash' lines) collectively represents routes of an arc between Kernel 3 4603 and Kernel 7 4607 of FIG. 46A as implemented respectively in Region 3 4673 and Region 7 4677. Bus 1 4701 (the 'longer dash' lines) collectively represents routes of an arc between Kernel 3 4603 and Kernel 4 4604 of FIG. 46A as implemented respectively in Region 3 4673 and Region 4 4674. Bus 3 4703 (the 'dot dash' lines) collectively represents routes of an arc between Kernel 4 4604 and Kernel 6 4606 of FIG. 46A as implemented respectively in Region 4 4674 and Region 6 4676.

FIG. 47B illustrates selected details of an embodiment of a process for determining routes between placed kernels as a portion of software elements associated with using a deep learning accelerator. For every arc a route is determined (Every Arc 4711). After all arcs have been routed via processing by a routing element (Route 4712), information is collected (Collect Info 4713). The information collecting comprises collecting a (virtual channel and/or color) heat map and/or collecting a congestion (such as bandwidth) map. Responsive to the collected information, zero or more obstacles are inserted into the flow (Create Obstacles 4714). Then flow proceeds to repeat the routing via Route 4712 and so forth (Repeat Until all Arcs Routed 4715).

FIG. 47C illustrates selected details of results of routes between pins of two placed kernels, with no inserted obstacles. The routes correspond to physical paths between a source port illustrated as Src 4730 having a collection of pins along an edge and a destination port illustrated as Dst 4720 having a collection of corresponding pins along an edge. Src 4730 corresponds to the output terminus of an arc from a first kernel as the first kernel is implemented by PEs of a first region. Dst 4720 corresponds to the input terminus of the arc to a second kernel as the second kernel is implemented by PEs of a second region.

FIG. 47D illustrates selected details of results of routes between pins of two placed kernels, with two inserted obstacles. Other than the inserted obstacles Obstacle 1 4731 ('1') and Obstacle 2 4732 ('2') and resultant routes, elements of FIG. 47D are identical to those of FIG. 47C. Routes are determined in accordance with the obstacles as constraints where routing is prohibited.

FIG. 47E illustrates selected concepts relating to an embodiment of a process for determining routes between placed kernels as a portion of software elements associated with using a deep learning accelerator. The selected concepts are illustrated overall as Route Determining Processing 4750. Start Info 4751 elements ('O' elements) represent route starting information, e.g., locations of source and destination pins, and any heat information. Route 4752 elements ('R' elements) represent routing of an arc; each arc is on a separate color and therefore are routable independently (e.g., on separate parallel processes). Heatmap 4753 elements ('H' elements) represent routing information collected based on results of routes of all arcs, e.g., a (virtual channel and/or color) heat map and/or a congestion (such as bandwidth) map.

Figures 47F, 47G:
FIGS. 47F-47G illustrate selected details of various embodiments of software elements associated with using a deep learning accelerator, such as assigning colors to routes.

Conceptually, processing begins by 'expanding' across one or more independent processing resources (as represented by Route 4752 elements) to route all arcs. Then processing 'collapses' as routing information is collected (as represented by Heatmap 4753 elements). Subsequently routing begins anew (as represented Start Info 4751 elements). DLA Software Architecture—Color Assignment FIG. 47F and FIG. 47G illustrate various details of an embodiment of color assignment (e.g., virtual channel allocation) as a portion of software elements associated with using a deep learning accelerator. In various embodiments and/or usage scenarios, a plurality of virtual channels (aka colors) enables simultaneous communication for training workloads. For example, a unique virtual channel is allocated to communication of each of the following:

1. Forward: activation broadcast,
2. Forward: partial sum accumulation,
3. Delta: delta broadcast,
4. Delta: partial sum accumulation, and
5. Chain: delta communication.

In FIG. 47F, Color 1 4761 (the 'shorter dash' lines) collectively represents routes of a first arc, e.g., between Kernel 3 4603 and Kernel 7 4607 as implemented in corresponding Region 3 4673 and Region 7 4677. The routes of the first arc are assigned to a first color. Color 2 4762 (the 'longer dash' lines) collectively represents routes of a second arc, e.g., between Kernel 3 4603 and Kernel 4 4604 as implemented in corresponding Region 3 4673 and Region 4 4674. The routes of the second arc are assigned to a second color. Color 3 4763 (the 'dot dash' lines) collectively represents routes of a third arc, e.g., between Kernel 4 4604 and Kernel 6 4606 as implemented in corresponding Region 4 4674 and Region 6 4676. The routes of the third arc are assigned to a third color.

The colors are assigned by solving a graph coloring problem. In FIG. 47G, the routes have been transformed into nodes, respectively drawn in dash/dot styles matching corresponding routes in FIG. 47F. Arcs between the nodes represent conflicts between routes. E.g., the arc between Node 3to4 4734 and Node 4to6 4746 indicates that one or more of the routes between Region 3 4673 and Region 4 4674 'intersect' with one or more of the routes between Region 4 4674 and Region 6 4676. The arc between Node 4to6 4746 and Node 3to7 4737 indicates that one or more of the routes between Region 4 4674 and Region 6 4676 intersect with one or more of the routes between Region 3 4673 and Region 7 4677. Intersecting routes are assigned, according to a solution of the graph coloring problem, to unique colors. In some embodiments, the graph coloring problem is solved via a heuristic-based technique. In some embodiments, the graph color problem is solved via a 'saturated-degree' technique.

In some circumstances, no solution is found for the graph coloring problem. This is reported back to a supervisor. In response, the supervisor alters one or more meta-parameters and repeats early portions of the software stack, such as beginning with kernel placement.

In various embodiments and/or usage scenarios, all or any portions of elements of all or any of FIGS. 46A-46D, and 47A-47G, correspond to all or any portions of FIG. 2 and/or FIG. 3.

Other Embodiment Details

Embodiments and usage scenarios described with respect to FIGS. 1-16 are conceptually with respect to a PE comprising a CE that is programmable, e.g., that processes data according to instructions. Other embodiments are contemplated with one or more of the CEs being partially or entirely hardwired, e.g., that process data according to one or more fixed-circuit processing elements operable without instructions. As a specific example, a particular CE comprises a hardware logic unit circuit that implements all or a portion of an LSTM unit. The particular CE is comprised with a router in a particular PE that is operable in a fabric with other PEs. Some of the other PEs are similar to or identical to the particular PE and some of the other PEs are similar to or identical to PE 499 of, e.g., FIG. 4A.

Example Implementation Techniques

In some embodiments, various combinations of all or any portions of operations performed for and/or structure associated with any of accelerated deep learning; placement of compute and memory for accelerated deep learning; optimized placement for efficiency for accelerated deep learning; and/or distributed placement of linear operators for accelerated deep learning; as well as portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is compatible with design and/or manufacture according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacture of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, Python, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

Various forms of the words "include" and "comprise" are specifically intended to be construed as abstractions describing logical sets of open-ended scope and are not meant to convey physical containment unless described explicitly (such as followed by the word "within").

Language in the claims or elsewhere herein of the form of "at least one of A, . . . , and N", "one or more of A, . . . , and N", or "any combination of A, . . . , and N" are to be construed to mean "one or more selected from the group of A, . . . , and N" (where ellipsis indicates an arbitrary plurality of group members). Furthermore, without express indication to the contrary, such language is not meant to close an otherwise open-ended group (e.g., a claim or a claim element).

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as file types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
extracting a model from a neural network description;
computing delays based on convergent nodes of the extracted model;
determining routing to implement data communication based on arcs of the extracted model;
determining accelerator configuration information usable to configure a deep learning accelerator to provide a trained model, wherein the accelerator configuration information indicates delay buffer placement based on the delays and on the routing, and wherein the deep learning accelerator comprises a fabric and a plurality of processing elements enabled to communicate packets with each other via the fabric in accordance with a plurality of communication pathways identifiable by respective virtual channel identifiers; and
configuring the deep learning accelerator based on the accelerator configuration information.

2. The method of claim 1, wherein the determining the routing ignores interactions between routes.

3. The method of claim 2, further comprising scanning results based on the determining the routing to produce hotspot information to repeat the determining the routing in accordance therewith.

4. The method of claim 1, wherein the determining the routing ignores coloring and bandwidth interactions with other routes.

5. A non-transitory computer-readable medium comprising one or more instructions encoded thereon that, when executed by one or more processors, cause the one or more processors to perform actions comprising:
extracting a model from a neural network description;
computing delays based on convergent nodes of the extracted model;
determining routing to implement data communication based on arcs of the extracted model;

determining accelerator configuration information usable to configure a deep learning accelerator to provide a trained model, wherein the accelerator configuration information indicates delay buffer placement based on the delays and on the routing, and wherein the deep learning accelerator comprises a fabric and a plurality of processing elements enabled to communicate packets with each other via the fabric in accordance with a plurality of communication pathways identifiable by respective virtual channel identifiers; and
configuring the deep learning accelerator based on the accelerator configuration information.

6. The non-transitory computer-readable medium of claim 5, wherein the determining the routing ignores interactions between routes.

7. The non-transitory computer-readable medium of claim 6, further comprising scanning results based on the determining the routing to produce hotspot information to repeat the determining the routing in accordance therewith.

8. The non-transitory computer-readable medium of claim 5, wherein the determining the routing ignores coloring and bandwidth interactions with other routes.

9. A deep learning accelerator comprising:
a fabric; and
circuitry configured as a plurality of processing elements that is enabled to communicate packets with each other via the fabric in accordance with a plurality of communication pathways identifiable by respective virtual channel identifiers, wherein the circuitry is configured to:
extract a model from a neural network description;
compute delays based on convergent nodes of the extracted model;
determine routing to implement data communication based on arcs of the extracted model;
determine accelerator configuration information usable to configure the deep learning accelerator to provide a trained model, wherein the accelerator configuration information indicates delay buffer placement based on the delays and on the routing; and
configure the deep learning accelerator based on the accelerator configuration information.

10. The system of claim 9, wherein the circuitry, when determining the routing, is configured to ignore interactions between routes.

11. The system of claim 10, wherein the circuitry is further configured to scan results based on the determining the routing to produce hotspot information to repeat the determining the routing in accordance therewith.

12. The system of claim 9, wherein the circuitry, when determining the routing, is configured to ignore coloring and bandwidth interactions with other routes.

* * * * *